(12) United States Patent
Ito et al.

(10) Patent No.: US 9,461,334 B2
(45) Date of Patent: Oct. 4, 2016

(54) NONAQUEOUS ELECTROLYTIC SOLUTION AND NONAQUEOUS ELECTROLYTE BATTERY USING THE SAME

(71) Applicant: MITSUBISHI CHEMICAL CORPORATION, Chiyoda-ku (JP)

(72) Inventors: Kanako Ito, Inashiki-gun (JP); Takashi Fujii, Inashiki-gun (JP); Ryo Yamaguchi, Yokohama (JP); Takeshi Nakamura, Yokohama (JP); Hiromu Watanabe, Yokohama (JP); Shuhei Sawa, Inashiki-gun (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 15/080,933

(22) Filed: Mar. 25, 2016

(65) Prior Publication Data

US 2016/0211553 A1    Jul. 21, 2016

Related U.S. Application Data

(63) Continuation of application No. PCT/JP2014/075750, filed on Sep. 26, 2014.

(30) Foreign Application Priority Data

Sep. 26, 2013 (JP) .................... 2013-200303

(51) Int. Cl.
*H01M 10/056* (2010.01)
*H01M 10/0567* (2010.01)
*H01M 10/0568* (2010.01)
*H01M 10/0525* (2010.01)

(52) U.S. Cl.
CPC ..... *H01M 10/0567* (2013.01); *H01M 10/0525* (2013.01); *H01M 10/0568* (2013.01)

(58) Field of Classification Search
CPC ......... H01M 10/0525; H01M 10/056; H01M 10/0567; H01M 10/0568
See application file for complete search history.

(56) References Cited

U.S. PATENT DOCUMENTS

| | | |
|---|---|---|
| 6,074,777 A | 6/2000 | Reimers et al. |
| 6,503,662 B1 | 1/2003 | Hamamoto et al. |
| 6,632,572 B1 | 10/2003 | Takahashi et al. |
| 2003/0180626 A1 | 9/2003 | Shima et al. |
| 2004/0121239 A1 | 6/2004 | Abe et al. |
| 2008/0050658 A1 | 2/2008 | Abe et al. |
| 2011/0183200 A1 | 7/2011 | Odani et al. |
| 2014/0302387 A1 | 10/2014 | Nishizawa et al. |

FOREIGN PATENT DOCUMENTS

| | | |
|---|---|---|
| JP | 11-162512 | 6/1999 |
| JP | 2001-015155 | 1/2001 |
| JP | 2001-167791 | 6/2001 |
| JP | 2002-056892 | 2/2002 |
| JP | 2002-298909 | 10/2002 |
| JP | 2003-100346 | 4/2003 |
| JP | 2003-109660 | 4/2003 |
| JP | 2003-229170 | 8/2003 |
| JP | 2011-154963 | 8/2011 |
| WO | 02/059999 A1 | 8/2002 |
| WO | 2013/077320 A1 | 5/2013 |

OTHER PUBLICATIONS

International Search Report issued Nov. 11, 2014, in International Application No. PCT/JP2014/075750.
Written Opinion issued Nov. 11, 2014, in International Application No. PCT/JP2014/075750.
Decision to Grant a Patent issued Aug. 18, 2015, in Japanese Patent Application No. 2015-528769 (with English translation).
Supplementary European Search Report issued Jul. 1, 2016, in European Patent Application No. 14849167.3.

*Primary Examiner* — Carlos Barcena
(74) *Attorney, Agent, or Firm* — Oblon, McClelland, Maier & Neustadt, L.L.P.

(57) ABSTRACT

An object of the invention is to provide nonaqueous electrolyte batteries having high initial efficiency, excellent initial capacity and excellent overcharge safety, and nonaqueous electrolytic solutions realizing such batteries. A nonaqueous electrolytic solution includes an electrolyte and a nonaqueous solvent, and further includes an aromatic compound represented by Formula (I) (in which $R^1$ to $R^5$ are independently hydrogen, a halogen, or an unsubstituted or halogen-substituted hydrocarbon group having 1 to 20 carbon atoms, $R^6$ and $R^7$ are independently a hydrocarbon group having 1 to 12 carbon atoms, at least two of $R^1$ to $R^7$ may be bonded together to form a ring, and Formula (I) satisfies at least one of the requirements (A) and (B): (A) at least one of $R^1$ to $R^5$ is a halogen, or an unsubstituted or halogen-substituted hydrocarbon group having 1 to 20 carbon atoms, (B) the total number of carbon atoms in $R^1$ to $R^7$ is 3 to 20). A nonaqueous electrolyte battery includes the nonaqueous electrolytic solution.

14 Claims, No Drawings

NONAQUEOUS ELECTROLYTIC SOLUTION AND NONAQUEOUS ELECTROLYTE BATTERY USING THE SAME

TECHNICAL FIELD

The present invention relates to nonaqueous electrolytic solutions and nonaqueous electrolyte batteries using the same.

BACKGROUND ART

Nonaqueous electrolyte batteries such as lithium secondary batteries are being actually used in various applications ranging from power supplies in so-called consumer products such as mobile phones and notebook computers, to drive power supplies for vehicles such as automobiles. There have recently been increasing demands on higher performances for the nonaqueous electrolyte batteries. In particular, enhancements are desired in various battery characteristics such as high capacity, low-temperature service characteristics, high-temperature storage characteristics, cycle characteristics and overcharge safety.

Electrolytic solutions used in the nonaqueous electrolyte batteries are usually composed of electrolytes and nonaqueous solvents as the main components. Examples of the main nonaqueous solvents include cyclic carbonates such as ethylene carbonate and propylene carbonate; chain carbonates such as dimethyl carbonate, diethyl carbonate and ethyl methyl carbonate; and cyclic carboxylate esters such as γ-butyrolactone and γ-valerolactone.

A number of studies have been carried out on nonaqueous solvents, electrolytes and additives in order to enhance characteristics of nonaqueous electrolyte batteries such as load characteristics, cycle characteristics, storage characteristics and overcharge safety.

Patent Literatures 1 to 3 propose that various aromatic compounds such as cyclohexylbenzene are added to electrolytic solutions, and this method achieves a certain level of enhancements in overcharge safety and durability.

Patent Literatures 4 and 5 propose that a quaternary carbon compound which has a tertiary alkyl group bonded directly to a phenyl group, for example, 2,2-diphenylpropane, is added to an electrolytic solution in order to satisfy both cycle characteristics and overcharge safety of nonaqueous electrolyte secondary batteries.

Patent Literatures 6 to 8 propose that compounds such as tert-butylbenzene and tert-pentylbenzene are added to electrolytic solutions for nonaqueous electrolyte secondary batteries.

CITATION LIST

Patent Literature

Patent Literature 1: Japanese Patent Application Kokai Publication No. 2001-15155
Patent Literature 2: Japanese Patent Application Kokai Publication No. 2002-56892
Patent Literature 3: Japanese Patent Application Kokai Publication No. 2003-109660
Patent Literature 4: Japanese Patent Application Kokai Publication No. H11-162512
Patent Literature 5: Japanese Patent Application Kokai Publication No. 2011-154963
Patent Literature 6: Japanese Patent Application Kokai Publication No. 2001-167791
Patent Literature 7: Japanese Patent Application Kokai Publication No. 2002-298909
Patent Literature 8: WO 2002/59999

DISCLOSURE OF INVENTION

Technical Problem

The use of the electrolytic solutions described in Patent Literatures 1 to 8 which include compounds having an aromatic group and an alkyl group improves safety during overcharging of nonaqueous electrolyte secondary batteries and also enhances durability characteristics such as high-temperature storage characteristics and cycle characteristics. However, this approach increases the initial irreversible capacity and causes a decrease in initial capacity characteristics, failing to satisfy the battery performances required.

The present invention has been made in view of the problems discussed above. It is therefore an object of the invention to provide nonaqueous electrolyte batteries having high initial efficiency and excellent overcharge safety, and nonaqueous electrolytic solutions realizing such batteries. Another object of the invention is to provide nonaqueous electrolyte batteries exhibiting excellent high-temperature durability characteristics such as high-temperature continuous charging characteristics, and nonaqueous electrolytic solutions realizing such batteries.

Solution to Problem

The present inventors have found that the above objects may be achieved by adding a compound with a specific structure to an electrolytic solution, and have completed the present invention based on the finding.

A summary of the present invention is described below.

Invention 1 resides in a nonaqueous electrolytic solution including an electrolyte and a nonaqueous solvent, the nonaqueous electrolytic solution further including an aromatic compound represented by Formula (I):

[Chem. 1]

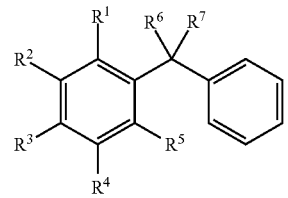

(in the formula,
$R^1$ to $R^5$ are independently hydrogen, a halogen, or an unsubstituted or halogen-substituted hydrocarbon group having 1 to 20 carbon atoms,
$R^6$ and $R^7$ are independently a hydrocarbon group having 1 to 12 carbon atoms,
at least two of $R^1$ to $R^7$ may be bonded together to form a ring, and
Formula (I) satisfies at least one of the requirements (A) and (B):
(A) at least one of $R^1$ to $R^5$ is a halogen, or an unsubstituted or halogen-substituted hydrocarbon group having 1 to 20 carbon atoms,
(B) the total number of carbon atoms in $R^1$ to $R^7$ is 3 to 20).

Invention 2 resides in a nonaqueous electrolytic solution according to Invention 1, wherein two of $R^1$, $R^6$ and $R^7$ in Formula (I) are bonded together to form a ring.

Invention 3 resides in a nonaqueous electrolytic solution according to Invention 2, wherein $R^1$ and $R^6$ in Formula (I) are bonded together to form a ring.

Invention 4 resides in a nonaqueous electrolytic solution according to any of Inventions 1 to 3, wherein at least one of $R^1$ to $R^5$ in Formula (I) is a hydrocarbon group having 1 to 5 carbon atoms.

Invention 5 resides in a nonaqueous electrolytic solution according to Invention 3 or 4, wherein the aromatic compound represented by Formula (I) is 1-phenyl-1,3,3-trimethylindane.

Invention 6 resides in a nonaqueous electrolytic solution according to Invention 2, wherein $R^6$ and $R^7$ in Formula (I) are bonded together to form a ring.

Invention 7 resides in a nonaqueous electrolytic solution according to Invention 6, wherein the aromatic compound represented by Formula (I) is 1,1-diphenylcyclohexane, 1,1-diphenylcyclopentane or 1,1-diphenyl-4-methylcyclohexane.

Invention 8 resides in a nonaqueous electrolytic solution according to any of Inventions 1 to 7, wherein the nonaqueous electrolytic solution contains the aromatic compound of Formula (I) in an amount of 0.001 mass % to 10 mass %.

Invention 9 resides in a nonaqueous electrolytic solution according to any of Inventions 1 to 8, wherein the nonaqueous electrolytic solution contains two or more kinds of electrolytes.

Invention 10 resides in a nonaqueous electrolytic solution according to Invention 9, wherein the two or more kinds of electrolytes include at least one compound selected from the group consisting of monofluorophosphate salts, difluorophosphate salts, borate salts, oxalate salts and fluorosulfonate salts.

Invention 11 resides in a nonaqueous electrolytic solution according to Invention 10, wherein the nonaqueous electrolytic solution contains 0.001 mass % to 20 mass % of the at least one compound selected from the group consisting of monofluorophosphate salts, difluorophosphate salts, borate salts, oxalate salts and fluorosulfonate salts.

Invention 12 resides in a nonaqueous electrolytic solution according to any of Inventions 1 to 11, wherein the nonaqueous electrolytic solution further includes at least one compound selected from the group consisting of fluorine-containing cyclic carbonates, sulfur-containing organic compounds, phosphorus-containing organic compounds, cyano group-containing organic compounds, isocyanate group-containing organic compounds, silicon-containing compounds, aromatic compounds other than those of Formula (I), cyclic carbonates having a carbon-carbon unsaturated bond, fluorine-free carboxylate esters, cyclic ethers and isocyanurate skeleton-containing compounds.

Invention 13 resides in a nonaqueous electrolytic solution according to any of Inventions 1 to 11, wherein the nonaqueous electrolytic solution includes 0.001 mass % to 20 mass % of at least one compound selected from the group consisting of fluorine-containing cyclic carbonates, sulfur-containing organic compounds, phosphorus-containing organic compounds, cyano group-containing organic compounds, isocyanate group-containing organic compounds, silicon-containing compounds, aromatic compounds other than those of Formula (I), cyclic carbonates having a carbon-carbon unsaturated bond, fluorine-free carboxylate esters, cyclic ethers and isocyanurate skeleton-containing compounds.

Invention 14 resides in a nonaqueous electrolyte battery including a negative electrode and a positive electrode capable of storing and releasing lithium ions, and the nonaqueous electrolytic solution described in any of Inventions 1 to 13.

Advantageous Effects of Invention

The nonaqueous electrolyte batteries according to the present invention have high initial efficiency and excellent overcharge safety. Thus, the invention makes it possible to reduce the size and to enhance the performance of nonaqueous electrolyte batteries. Further, the nonaqueous electrolyte batteries of the invention exhibit excellent high-temperature durability characteristics such as high-temperature storage characteristics and high-temperature continuous charging characteristics. The nonaqueous electrolytic solutions of the invention can realize such batteries.

The reasons why the nonaqueous electrolyte batteries using the inventive nonaqueous electrolytic solutions exhibit excellent overcharge safety and further achieve excellent high-temperature durability characteristics are not fully understood but are assumed to be as described below. However, the following estimations such as actions and mechanisms do not intend to limit the scope of the invention.

In general, aromatic compounds having a hydrocarbon group are prone to oxidation. When added to an electrolytic solution for nonaqueous electrolyte batteries, these compounds react on high-potential positive electrodes during overcharging, thus generating an overcharge gas. The overcharge gas increases the inner pressure of the battery so as to actuate a shutoff valve, thus ensuring overcharge safety. Due to their high reactivity, however, such aromatic compounds are irreversibly oxidized even at normal operation voltages of batteries to cause an increase in the irreversible capacity of batteries. As a result, battery characteristics such as capacity and resistance can be deteriorated. Those compounds which have a quaternary carbon in the bond directly between the hydrocarbon group and the aromatic ring exhibit high oxidation resistance and are less likely to cause a deterioration in battery characteristics. However, these compounds have a more cathodic oxidation potential and thus exhibit low reactivity during overcharging, and consequently the overcharge safety may be decreased.

The structure used in the present invention contains a carbon atom that is rendered quaternary by direct bonding of two aromatic rings. The present inventors assume that this configuration increases the activation energy required for oxidation reaction to occur while ensuring the reactivity to be exhibited at the time of overcharging, and thus prevents side reactions from occurring on electrodes during battery durability tests under severe conditions such as at high temperatures, realizing enhanced high-temperature durability characteristics. This will also make it possible to enhance battery storage characteristics.

When, in particular, the compound used in the invention has at least a specific number of carbon atoms in the hydrocarbon groups bonded to the aromatic ring, high effects may be obtained in the stabilization of the benzene ring and the occurrence of side reactions with highly active positive electrodes may be suppressed to a higher degree. By an appropriate control of the characteristics of the substituents in combination with the control of the number of carbon atoms, the compound is allowed to react under high-energy conditions such as those experienced during overcharging. Thus, it is probable that the use of the compound in an electrolytic solution makes it possible to ensure high-temperature durability characteristics while enhancing the overcharge safety of batteries. Further, the compound probably has high effects in suppressing a decrease in battery characteristics after storage at high temperatures.

In contrast, those compounds described in literature such as Patent Literatures 1 to 3 in which the carbon atom directly bonded to the aromatic ring is not quaternary undergo reaction from an initial stage under normal battery operation conditions due to the high reactivity of benzylic hydrogen. Consequently, the initial irreversible capacity is increased.

Those compounds described in literature such as Patent Literatures 4 to 9 in which the carbon atom directly bonded to the aromatic ring is other than quaternary carbon have high oxidation resistance but exhibit low reactivity during overcharging to cause a decrease in safety.

The present inventors have found that the problems discussed above may be solved by adding an aromatic compound represented by Formula (I) to a nonaqueous electrolytic solution. The aromatic compound represented by Formula (I) has a carbon atom rendered quaternary by direct bonding of two aromatic rings, and the number of carbon atoms in the hydrocarbon groups bonded to the aromatic ring is limited to a specific range. With these configurations, the compound is less reactive under normal battery operation conditions but is readily reacted at a potential higher than the normal operation conditions. In particular, the above configurations will suppress the occurrence of oxidation on positive electrodes under normal operation conditions. Thus, the addition of the compound to an electrolytic solution allows a battery to exhibit excellent battery characteristics, specifically, not only excellent initial efficiency and overcharge stability but also good high-temperature durability characteristics.

BEST MODE FOR CARRYING OUT INVENTION

Hereinbelow, embodiments of the invention will be described. However, the scope of the invention is not limited to such embodiments and embraces all modifications without departing from the spirit of the invention.

1. <Nonaqueous Electrolytic Solutions>

1-1 Aromatic Compounds Represented by Formula (I)

The nonaqueous electrolytic solution of the invention is characterized by including an aromatic compound represented by Formula (I). The aromatic compound represented by Formula (I) may be any of optical isomers, that is, may be a single isomer or a mixture of isomers.

[Chem. 2]

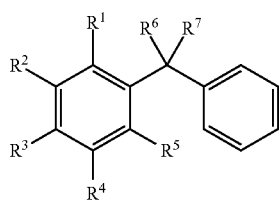

(1)

(In the formula,
$R^1$ to $R^5$ are independently hydrogen, a halogen, or an unsubstituted or halogen-substituted hydrocarbon group having 1 to 20 carbon atoms, $R^6$ and $R^7$ are independently a hydrocarbon group having 1 to 12 carbon atoms, at least two of $R^1$ to $R^7$ may be bonded together to form a ring, and Formula (I) satisfies at least one of the requirements (A) and (B):

(A) at least one of $R^1$ to $R^5$ is a halogen, or an unsubstituted or halogen-substituted hydrocarbon group having 1 to 20 carbon atoms, (B) the total number of carbon atoms in $R^1$ to $R^7$ is 3 to 20.) When at least two of $R^1$ to $R^7$ are bonded together to form a ring, it is preferable that the ring be formed by two of $R^1$ to $R^7$.

$R^6$ and $R^7$ are independently a hydrocarbon group having 1 to 12 carbon atoms (for example, an alkyl group or an aryl group). $R^6$ and $R^7$ may be bonded together to form a ring (for example, a cyclic hydrocarbon group). To obtain enhancements in initial efficiency, solubility and storage characteristics, $R^6$ and $R^7$ are preferably hydrocarbon groups having 1 to 12 carbon atoms or are bonded to each other to form a cyclic hydrocarbon group; $R^6$ and $R^7$ are more preferably each a methyl group, an ethyl group, a propyl group, a butyl group or a tert-butyl group or are bonded together to form a 5- to 8-membered cyclic hydrocarbon group; $R^6$ and $R^7$ are still more preferably each a methyl group or an ethyl group or are bonded together to form a cyclohexyl group or a cyclopentyl group; and $R^6$ and $R^7$ are most preferably each a methyl group or an ethyl group or are bonded together to form a cyclohexyl group.

$R^1$ to $R^5$ are independently hydrogen, a halogen, or an unsubstituted or halogen-substituted hydrocarbon group having 1 to 20 carbon atoms (for example, an alkyl group, an aryl group or an aralkyl group). Two of these substituents may be bonded together to form a ring (for example, a cyclic hydrocarbon group). To obtain enhancements in initial efficiency, solubility and storage characteristics, these substituents are preferably each hydrogen, fluorine, or an unsubstituted or halogen-substituted hydrocarbon group having 1 to 12 carbon atoms, more preferably each hydrogen, fluorine, or an unsubstituted or fluorine-substituted hydrocarbon group having 1 to 10 carbon atoms, still more preferably each hydrogen, fluorine, a tert-butyl group, a tert-pentyl group, a tert-hexyl group, a tert-heptyl group, a methyl group, an ethyl group, a propyl group, a butyl group, a trifluoromethyl group, a nonafluoro-tert-butyl group, a 1-methyl-1-phenyl-ethyl group or a 1-ethyl-1-phenyl-propyl group, particularly preferably each hydrogen, fluorine, a tert-butyl group or a 1-methyl-1-phenyl-ethyl group, and most preferably each hydrogen, a tert-butyl group or a 1-methyl-1-phenyl-ethyl group.

One of $R^1$ to $R^5$, and $R^6$ may be bonded together to form a ring (for example, a cyclic hydrocarbon group). Preferably, $R^1$ and $R^6$ are bonded together to form a ring (for example, a cyclic hydrocarbon group). In this case, $R^7$ is preferably an alkyl group. Examples of the compounds in which $R^7$ is a methyl group, and $R^1$ and $R^6$ form a ring include 1-phenyl-1,3,3-trimethylindane and 2,3-dihydro-1,3-dimethyl-1-(2-methyl-2-phenylpropyl)-3-phenyl-1H-indane.

Formula (I) satisfies at least one of the requirements (A) and (B):

(A) at least one of $R^1$ to $R^5$ is a halogen, or an unsubstituted or halogen-substituted hydrocarbon group having 1 to 20 carbon atoms, (B) the total number of carbon atoms in $R^1$ to $R^7$ is 3 to 20.

From the point of view of the suppression of oxidation on positive electrodes at normal battery operation voltages, it is preferable that Formula (I) satisfy the requirement (A). From the point of view of the solubility in the electrolytic solution, it is preferable that Formula (I) satisfy the requirement (B). Formula (I) may satisfy both the requirements (A) and (B).

As long as the requirement (A) is satisfied, specifically, as long as at least one of $R^1$ to $R^5$ is a halogen, or an unsubstituted or halogen-substituted hydrocarbon group having 1 to 20 carbon atoms, the other substituents may be hydrogen atoms or may form a ring. From the point of view of the solubility in the electrolytic solution, the unsubstituted or halogen-substituted hydrocarbon group preferably has 1 to 10 carbon atoms, more preferably 1 to 5 carbon atoms, still more preferably 1 to 3 carbon atoms, further preferably 1 or 2 carbon atoms, and most preferably 1 carbon atom.

As long as the requirement (B) is satisfied, specifically, as long as the total number of carbon atoms in $R^1$ to $R^7$ is 3 to 20, at least two of $R^1$ to $R^7$ may be bonded together to form a ring. When at least two of $R^1$ to $R^7$ are bonded to each other to form a ring, the calculation of the total number of carbon atoms neglects the carbon atoms in the ring that do not correspond to $R^1$ to $R^7$ (the carbon atoms in the benzene ring to which $R^1$ to $R^5$ are bonded, and the benzyl carbon atom to which $R^6$ and $R^7$ are bonded). When at least two of $R^1$ to $R^7$ are bonded together to form a ring, the number of carbon atoms may be counted by breaking the carbon chain that constitutes the ring at an appropriate position without giving rise to a contradiction to the definition of the structural formula, and assigning the parts of the ring to appropriate substituents of $R^1$ to $R^7$. From the point of view of the solubility in the electrolytic solution, the total number of carbon atoms is preferably 3 to 14, and more preferably 3 to 10. Some of the compounds satisfying the requirement (B) are 1-phenyl-1,3,3-trimethylindane and 2,3-dihydro-1,3-dimethyl-1-(2-methyl-2-phenylpropyl)-3-phenyl-1H-indane mentioned above as examples of the compounds in which $R^7$ is a methyl group, and $R^1$ and $R^6$ form a ring.

Examples of the aromatic compounds represented by Formula (I) include the following:

those compounds in which $R^6$ and $R^7$ are independently a hydrocarbon group having 1 to 20 carbon atoms (with the proviso that the total number of carbon atoms in $R^6$ and $R^7$ is 3 to 20), and $R^1$ to $R^5$ are hydrogen (satisfying the requirement (B));

2,2-diphenylbutane, 3,3-diphenylpentane, 3,3-diphenylhexane, 4,4-diphenylheptane, 5,5-diphenyloctane, 6,6-diphenylnonane, 1,1-diphenyl-1,1-di-tert-butyl-methane;

[Chem. 3]

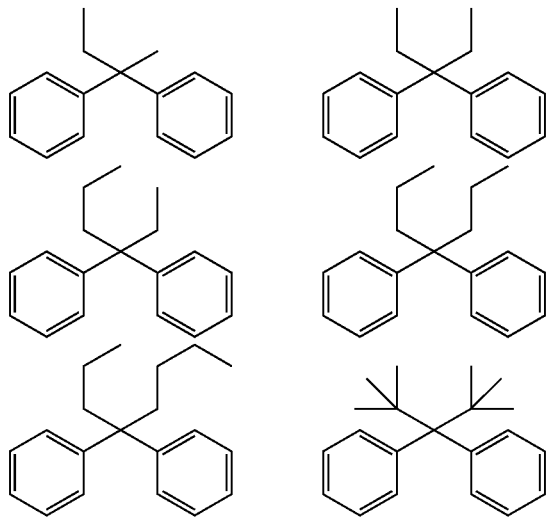

those compounds in which $R^6$ and $R^7$ are bonded together to form a ring, and $R^1$ to $R^5$ are hydrogen (satisfying the requirement (B));

1,1-diphenylcyclohexane, 1,1-diphenylcyclopentane and 1,1-diphenyl-4-methylcyclohexane.

Examples further include the following compounds (some of the compounds illustrated below are the same as those mentioned above):

[Chem. 4]

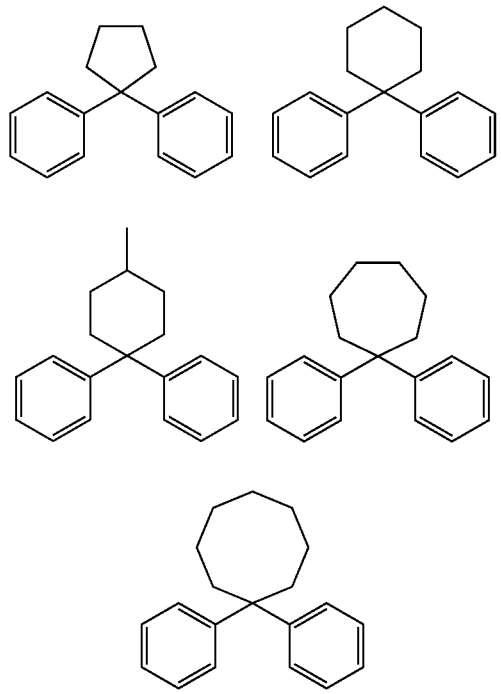

Examples further include those compounds in which at least one of $R^1$ to $R^5$ is a halogen, or an unsubstituted or halogen-substituted hydrocarbon group having 1 to 20 carbon atoms (satisfying the requirement (A));

1,3-bis(1-methyl-1-phenylethyl)-benzene and 1,4-bis(1-methyl-1-phenylethyl)-benzene.

Examples further include the following compounds (some of the compounds illustrated below are the same as those mentioned above):

[Chem. 5]

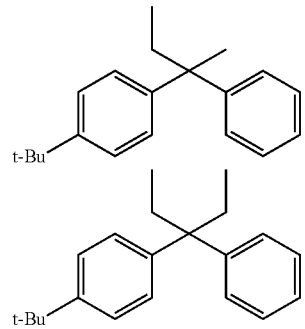

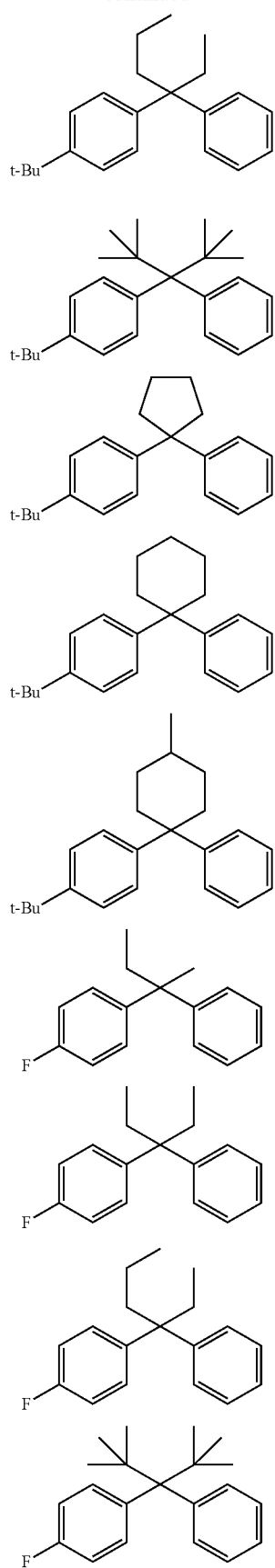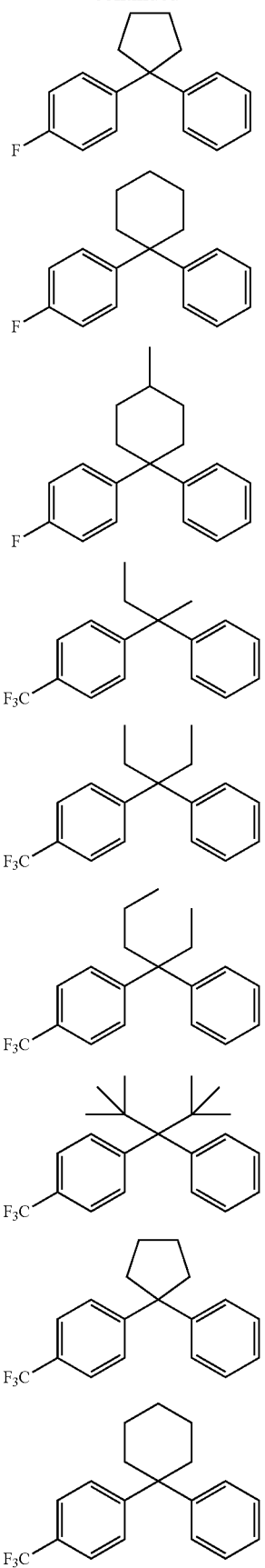

-continued

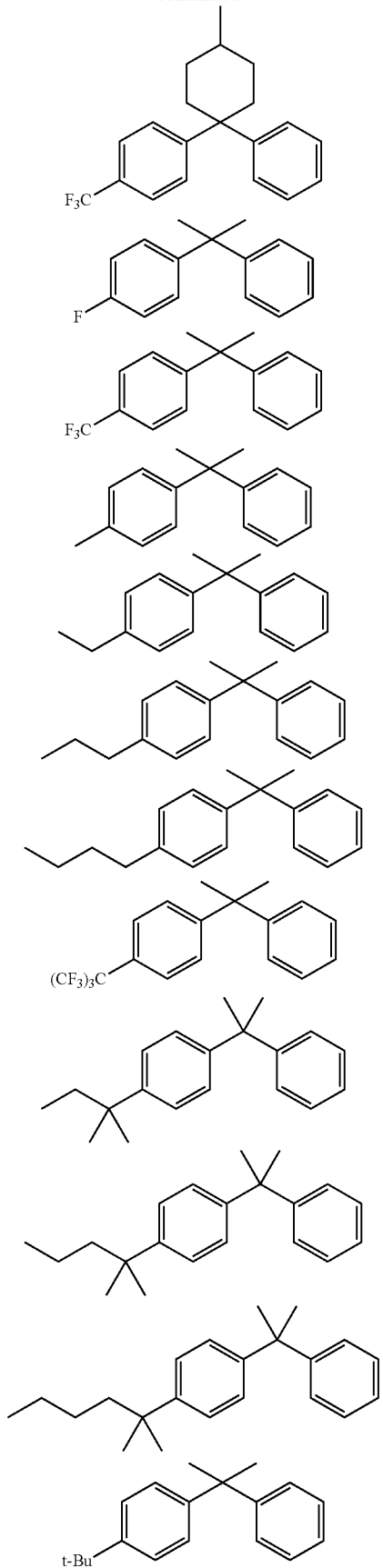

-continued

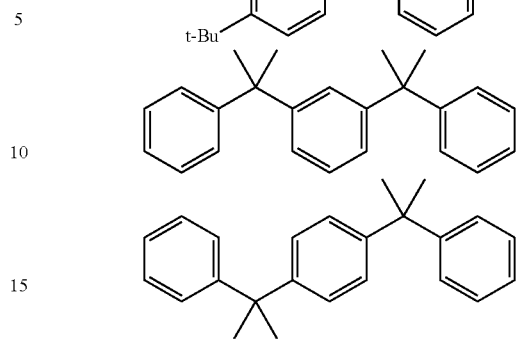

Examples further include those compounds in which $R^7$ is a hydrocarbon group having 1 to 20 carbon atoms (for example, an alkyl group having 1 to 20 carbon atoms, preferably a methyl group), and $R^1$ and $R^6$ are bonded together to form a ring (satisfying the requirement (B)); and 1-phenyl-1,3,3-trimethylindane.

Examples further include the following compounds (some of the compounds illustrated below are the same as those mentioned above):

[Chem. 6]

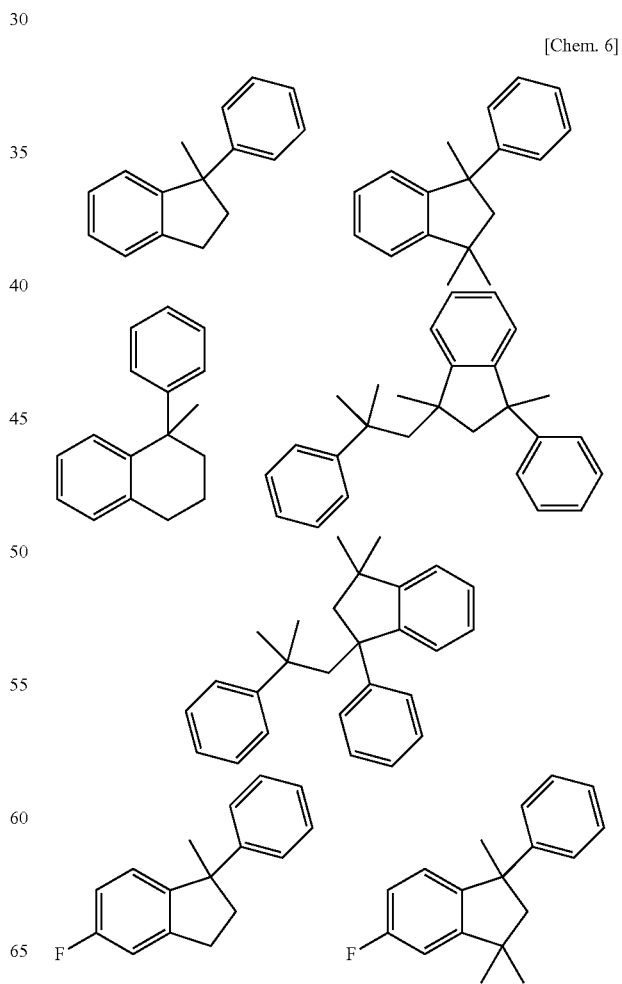

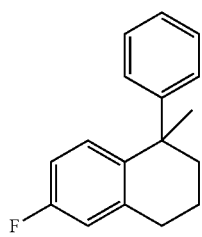

In particular, 2,2-diphenylbutane, 3,3-diphenylpentane, 1,1-diphenyl-1,1-di-tert-butyl-methane, 1,1-diphenylcyclohexane, 1,1-diphenylcyclopentane, 1,1-diphenyl-4-methylcyclohexane, 1,3-bis(1-methyl-1-phenylethyl)-benzene, 1,4-bis(1-methyl-1-phenylethyl)-benzene and 1-phenyl-1,3,3-trimethylindane are preferable from the point of view of the initial reducibility on negative electrodes.

Preferred examples further include the following compounds (some of the compounds illustrated below are the same as the above preferred compounds):

[Chem. 7]

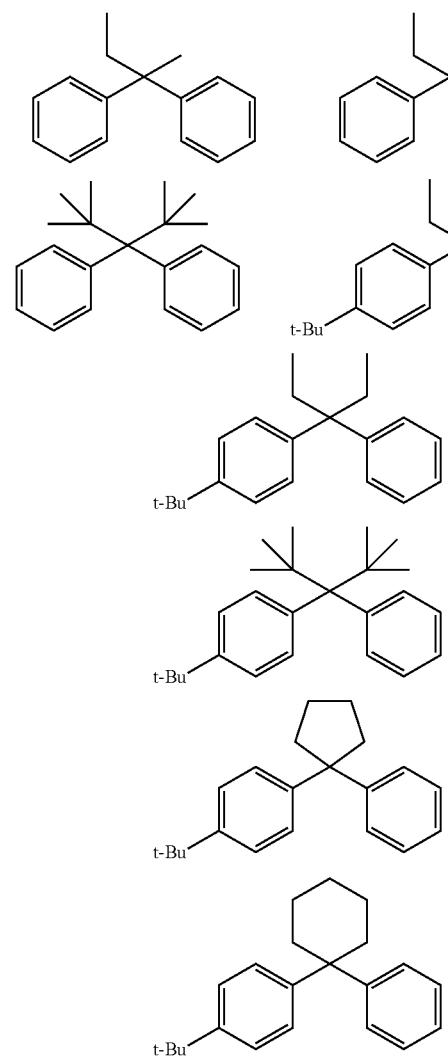

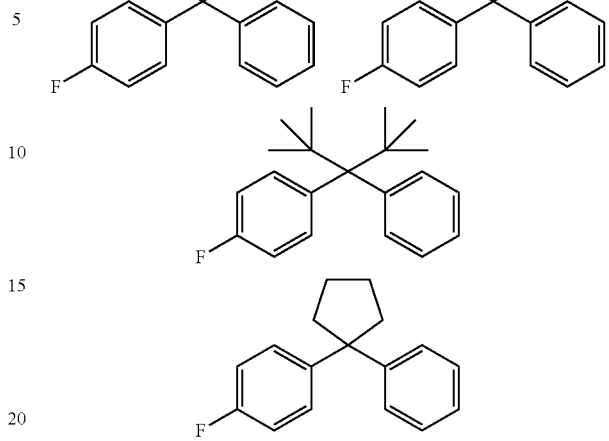

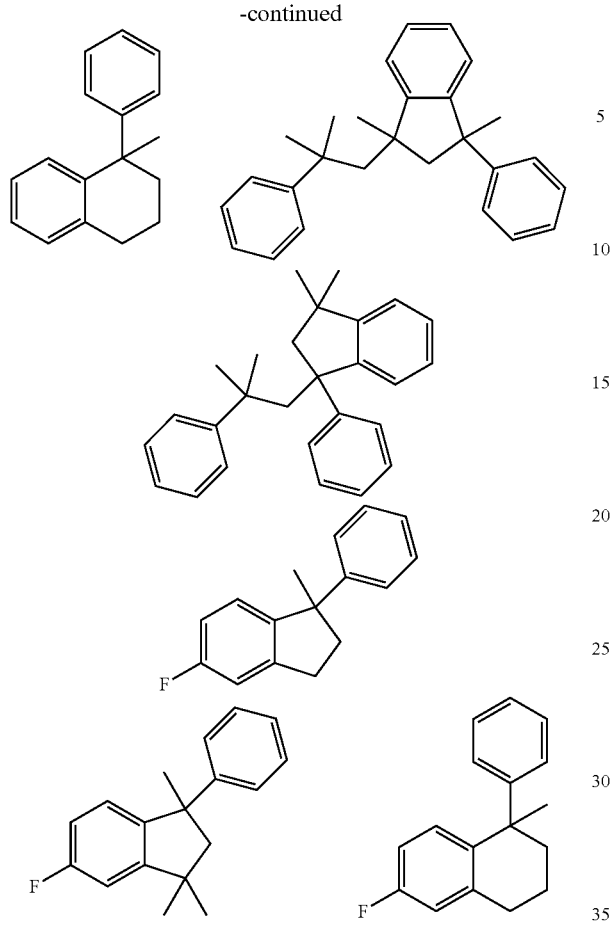
More preferred compounds are 2,2-diphenylbutane, 1,1-diphenylcyclohexane, 1,1-diphenyl-4-methylcyclohexane, 1,3-bis(1-methyl-1-phenylethyl)-benzene, 1,4-bis(1-methyl-1-phenylethyl)-benzene and 1-phenyl-1,3,3-trimethylindane.
More preferred examples further include the following compounds (some of the compounds illustrated below are the same as the above more preferred compounds):
[Chem. 8]
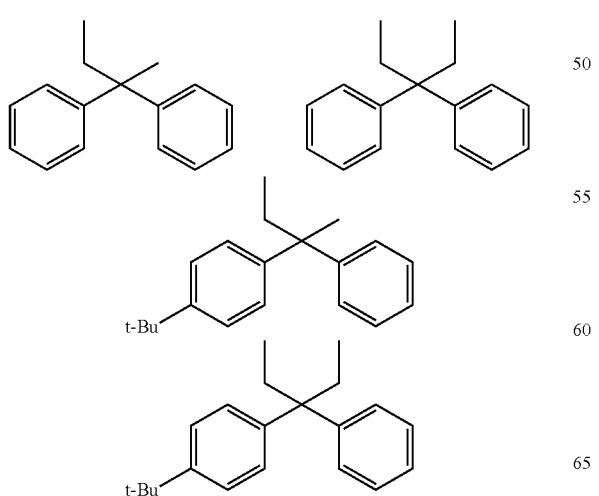
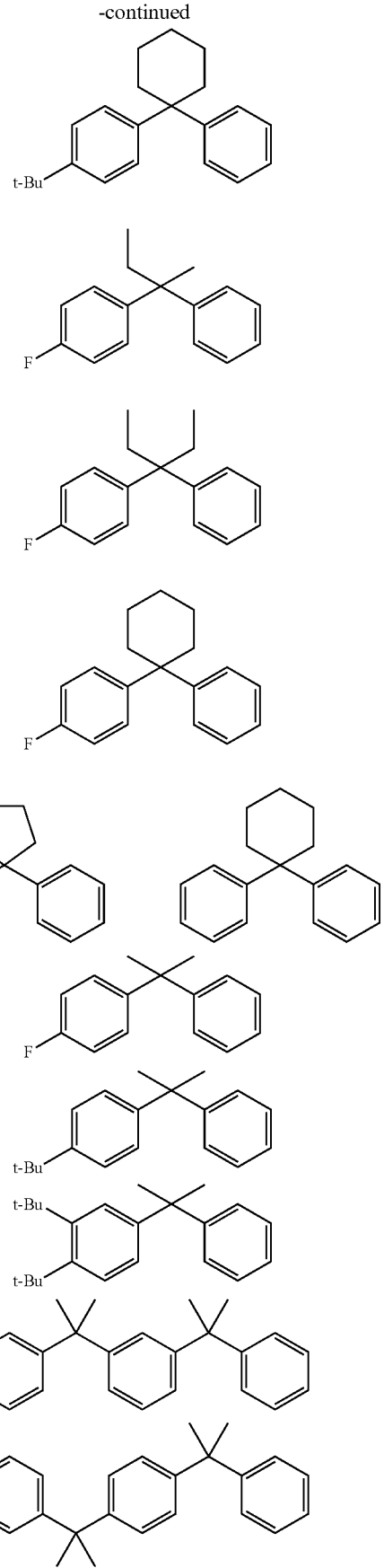

-continued

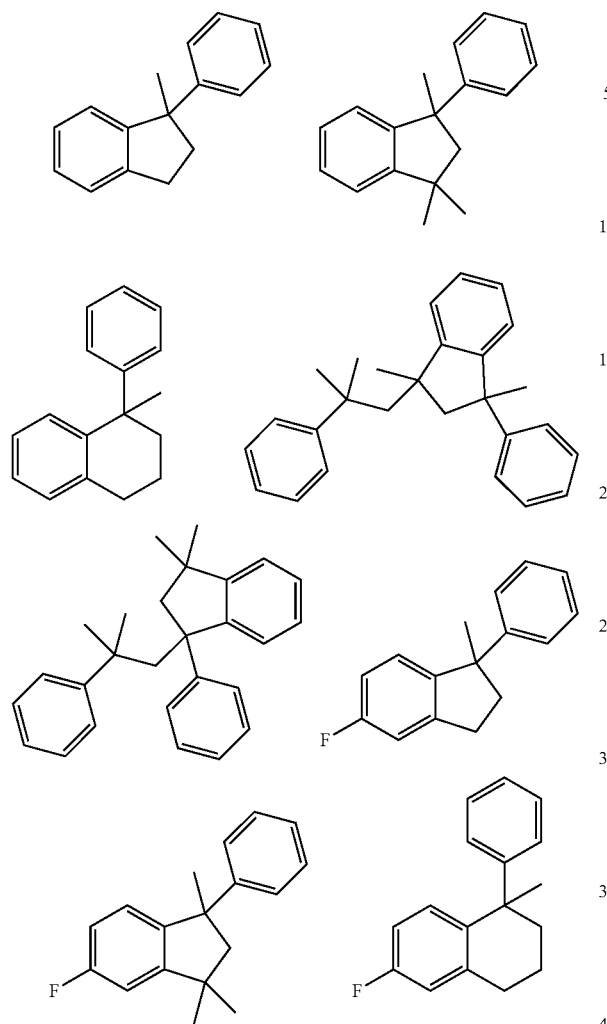

Still more preferred compounds are 1,1-diphenylcyclohexane, 1,1-diphenyl-4-methylcyclohexane, 1,3-bis(1-methyl-1-phenylethyl)-benzene, 1,4-bis(1-methyl-1-phenylethyl)-benzene and 1-phenyl-1,3,3-trimethylindane.

Still more preferred examples further include the following compounds (some of the compounds illustrated below are the same as the above still more preferred compounds):

[Chem. 9]

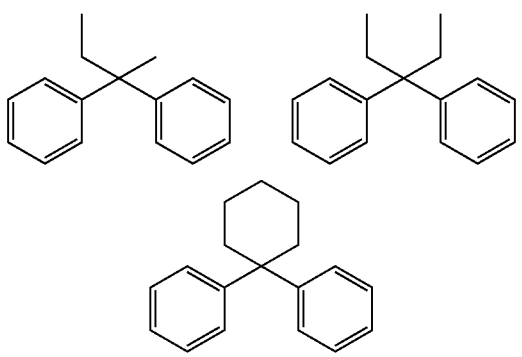

-continued

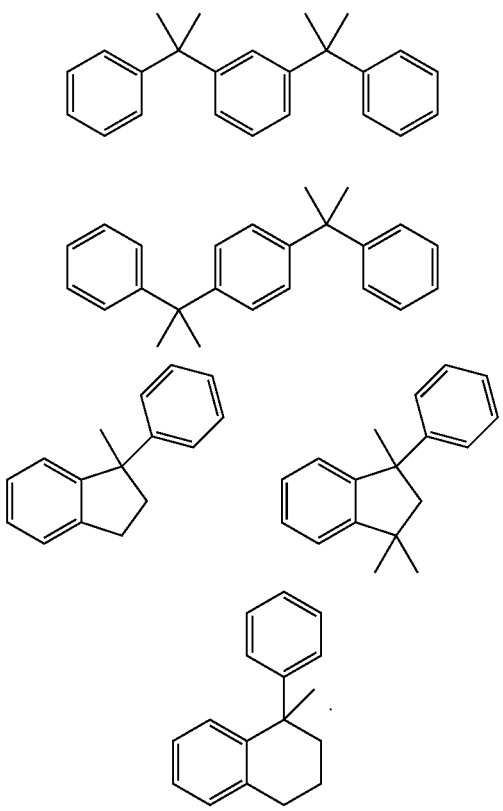

Particularly preferred compounds are 1,1-diphenylcyclohexane, 1,3-bis(1-methyl-1-phenylethyl)-benzene, 1,4-bis(1-methyl-1-phenylethyl)-benzene and 1-phenyl-1,3,3-trimethylindane represented by the following structural formulae:

[Chem. 10]

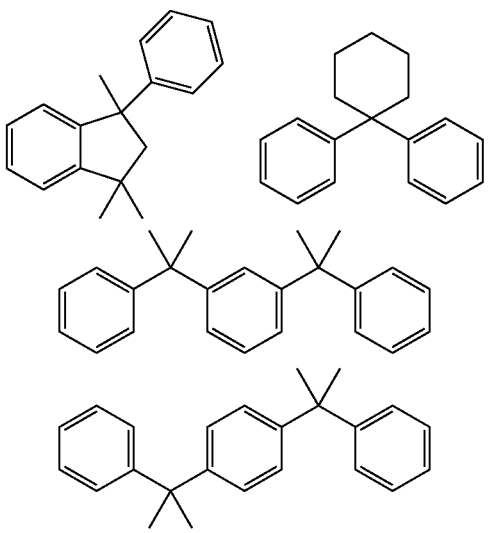

The most preferred compound is 1-phenyl-1,3,3-trimethylindane compound represented by the following structural formula:

[Chem. 11]

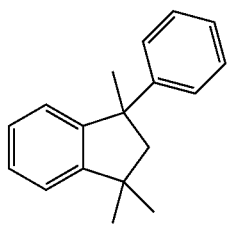

The aromatic compounds of Formula (I) may be used singly, or two or more may be used in combination. In the whole of the nonaqueous electrolytic solution (100 mass %), the amount of the aromatic compound represented by Formula (I) (the total amount when two or more kinds of the compounds are used) may be 0.001 mass % or above, preferably 0.01 mass % or above, more preferably 0.05 mass % or above, and still more preferably 0.1 mass % or above, and may be 10 mass % or less, preferably 8 mass % or less, more preferably 5 mass % or less, still more preferably 3 mass % or less, and particularly preferably 2.5 mass % or less. This amount ensures that the advantageous effects of the invention are achieved easily and the increase in resistance in the batteries is prevented.

1-2 Compounds which May be Added in Addition to Aromatic Compounds Represented by Formula (I)

The nonaqueous electrolytic solution of the invention may further include at least one compound selected from the group consisting of fluorine-containing cyclic carbonates, sulfur-containing organic compounds, phosphorus-containing organic compounds, cyano group-containing organic compounds, isocyanate group-containing organic compounds, silicon-containing compounds, aromatic compounds other than those of Formula (I), cyclic carbonates having a carbon-carbon unsaturated bond, fluorine-free carboxylate esters, cyclic ethers and isocyanurate skeleton-containing compounds.

From the point of view of the balance between initial characteristics and characteristics after long exposure to high temperatures, it is preferable to add at least one compound selected from the group consisting of fluorine-containing cyclic carbonates, sulfur-containing organic compounds, phosphorus-containing organic compounds, cyano group-containing organic compounds, isocyanate group-containing organic compounds, silicon-containing compounds, aromatic compounds other than those of Formula (I), cyclic carbonates having a carbon-carbon unsaturated bond, fluorine-free carboxylate esters and isocyanurate skeleton-containing compounds. These compounds are advantageous in that quality composite films are formed on positive electrodes.

It is more preferable to add at least one compound selected from the group consisting of fluorine-containing cyclic carbonates, sulfur-containing organic compounds, phosphorus-containing organic compounds, cyano group-containing organic compounds, isocyanate group-containing organic compounds, silicon-containing compounds, aromatic compounds other than those of Formula (I), cyclic carbonates having a carbon-carbon unsaturated bond and fluorine-free carboxylate esters. Some of the reasons for this preference are because these additives form relatively low-molecular weight films on negative electrodes with a high density so that the films efficiently prevent degradations due to side reactions of the aromatic compounds of Formula (I), and also because these additives suppress the increase in resistance while effectively preventing the occurrence of side reactions, and the suppression of side reactions suppresses volume changes at an initial stage or during long exposure to high temperatures, ensures safety after long exposure to high temperatures, and enhances rate characteristics.

In particular, it is still more preferable to add at least one compound selected from the group consisting of fluorine-containing cyclic carbonates, sulfur-containing organic compounds, phosphorus-containing organic compounds, cyano group-containing organic compounds, aromatic compounds other than those of Formula (I), cyclic carbonates having a carbon-carbon unsaturated bond and fluorine-free carboxylate esters because films derived from these additives that are formed on negative electrodes electrostatically repel the aromatic compounds of Formula (I) and specifically prevent the aromatic compounds from side reactions.

When added to the electrolytic solution of the invention, the compounds described above may be used singly, or two or more may be used in combination. The compounds may be selected appropriately in accordance with the desired characteristics. In the whole of the nonaqueous electrolytic solution (100 mass %), the amount of the compound (the total amount when two or more kinds of the compounds are used) may be 0.001 mass % or above, preferably 0.01 mass % or above, more preferably 0.1 mass % or above, still more preferably 0.3 mass % or above, and particularly preferably 0.5 mass % or above, and may be 20 mass % or less, preferably 10 mass % or less, more preferably 5 mass % or less, still more preferably 3 mass % or less, and particularly preferably 2 mass % or less. This content of the compounds ensures that the effects of the aromatic compound of Formula (I) are produced sufficiently.

The compounds described above may be added to the electrolytic solution of the invention by any methods without limitation. For example, the compounds may be added directly to the electrolytic solution, or a method may be adopted which generates the compounds in the battery or in the electrolytic solution. For example, the compounds may be generated by adding precursor compounds followed by reaction such as oxidation or hydrolysis of the battery components such as the electrolytic solution. Alternatively, the compounds may be generated in the battery by the application of electric loads such as charging and discharging.

Hereinbelow, embodiments will be illustrated in which the electrolytic solution of the invention includes the compounds described above. Regarding the aromatic compounds represented by Formula (I) that are used in combination with the above compounds, the aforementioned description of the aromatic compounds of Formula (I) including the examples and the preferred examples applies also in the embodiments. In embodiments in which the electrolytic solution includes some of the compounds described above, any of the other compounds may be present in the electrolytic solution.

1-2-1. Fluorine-Containing Cyclic Carbonates

The electrolytic solution of the invention may further include a fluorine-containing cyclic carbonate. The fluorine-containing cyclic carbonates are not particularly limited as long as the cyclic carbonates have a fluorine atom. In the electrolytic solution of the invention, the aromatic compound represented by Formula (I) and the fluorine-containing cyclic carbonate interact with each other to form a composite protective interfacial film on negative electrodes. This is probably the reason why the high-temperature storage characteristics of batteries are enhanced. Further, the film imparts excellent initial rate characteristics to batteries at the same time.

Examples of the fluorine-containing cyclic carbonates include fluorides of cyclic carbonates having an alkylene group with 2 to 6 carbon atoms, and derivatives thereof, such as ethylene carbonate fluoride (hereinafter, also written as "fluorinated ethylene carbonate") and derivatives thereof. Examples of the derivatives of ethylene carbonate fluoride include ethylene carbonate fluorides substituted with an alkyl group (for example, an alkyl group having 1 to 4 carbon atoms). In particular, fluorinated ethylene carbonates and derivatives thereof having 1 to 8 fluorine atoms are preferred.

Examples of the fluorinated ethylene carbonates and the derivatives thereof having 1 to 8 fluorine atoms include monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoro ethylene carbonate, 4-(fluoromethyl)-5-fluoroethylene carbonate, 4-fluoro-4,5-dimethylethylene carbonate, 4,5-difluoro-4,5-dimethylethylene carbonate and 4,4-difluoro-5,5-dimethylethylene carbonate.

In particular, monofluoroethylene carbonate, 4,4-difluoroethylene carbonate and 4,5-difluoroethylene carbonate are preferable because they give high ion conductivity to the electrolytic solution and easily form a stable protective interfacial film.

The fluorinated cyclic carbonates may be used singly, or two or more may be used in combination in an appropriate ratio. In 100 mass % of the electrolytic solution, the amount of the fluorinated cyclic carbonate (the total amount when two or more kinds of the carbonates are used) is preferably 0.001 mass % or above, more preferably 0.01 mass % or above, still more preferably 0.1 mass % or above, even more preferably 0.5 mass % or above, particularly preferably 1 mass % or above, and most preferably 2 mass % or above, and is preferably 10 mass % or less, more preferably 7 mass % or less, and still more preferably 5 mass % or less. In the case where the fluorinated cyclic carbonate is used as a nonaqueous solvent, the amount thereof in 100 vol % of the nonaqueous solvent(s) is preferably 1 vol % or above, more preferably 5 vol % or above, and still more preferably 10 vol % or above, and is preferably 50 vol % or less, more preferably 35 vol % or less, and still more preferably 25 vol % or less.

The fluorine-containing cyclic carbonates may be cyclic carbonates having an unsaturated bond and a fluorine atom (hereinafter, also written as "fluorinated unsaturated cyclic carbonates"). The fluorinated unsaturated cyclic carbonates may have one or more fluorine atoms without limitation. The number of fluorine atoms may be 6 or less, preferably 4 or less, and more preferably 1 or 2.

Examples of the fluorinated unsaturated cyclic carbonates include fluorinated vinylene carbonate derivatives, and fluorinated ethylene carbonate derivatives substituted with a substituent having an aromatic ring or a carbon-carbon double bond.

Examples of the fluorinated vinylene carbonate derivatives include 4-fluorovinylene carbonate, 4-fluoro-5-methylvinylene carbonate, 4-fluoro-5-phenylvinylene carbonate, 4-allyl-5-fluorovinylene carbonate and 4-fluoro-5-vinylvinylene carbonate.

Examples of the fluorinated ethylene carbonate derivatives substituted with a substituent having an aromatic ring or a carbon-carbon double bond include 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, 4,5-difluoro-4,5-diallylethylene carbonate, 4-fluoro-4-phenylethylene carbonate, 4-fluoro-5-phenylethylene carbonate, 4,4-difluoro-5-phenylethylene carbonate and 4,5-difluoro-4-phenylethylene carbonate.

In particular, 4-fluorovinylene carbonate, 4-fluoro-5-methylvinylene carbonate, 4-fluoro-5-vinylvinylene carbonate, 4-allyl-5-fluorovinylene carbonate, 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate and 4,5-difluoro-4,5-diallylethylene carbonate are preferable because these fluorinated unsaturated cyclic carbonates form stable protective interfacial films.

The molecular weight of the fluorinated unsaturated cyclic carbonates is not particularly limited. The molecular weight is preferably 50 or more and is preferably 250 or less. This range of molecular weights ensures that the fluorinated cyclic carbonate will exhibit solubility with respect to the nonaqueous electrolytic solution and the advantageous effects of the invention are achieved easily. The fluorinated unsaturated cyclic carbonates may be produced by any methods without limitation, and known production methods may be selected appropriately. The molecular weight is more preferably 100 or more, and is more preferably 200 or less.

The fluorinated unsaturated cyclic carbonates may be used singly, or two or more may be used in combination in an appropriate ratio.

In 100 mass % of the electrolytic solution, the amount of the fluorinated unsaturated cyclic carbonate (the total amount when two or more kinds of the carbonates are used) is preferably 0.001 mass % or above, more preferably 0.01 mass % or above, still more preferably 0.1 mass % or above, and particularly preferably 0.2 mass % or above, and is preferably 10 mass % or less, more preferably 5 mass % or less, still more preferably 4 mass % or less, and particularly preferably 3 mass % or less. This amount ensures that the obtainable nonaqueous electrolyte batteries will achieve a sufficient enhancement in cycle characteristics and also ensures that the decrease in high-temperature storage characteristics will be prevented and consequently heavy gas generation and poor retention of discharge capacity will be avoided.

In view of the formation of a composite protective interfacial film on negative electrodes, the mass ratio between the aromatic compound represented by Formula (I) and the fluorine-containing cyclic carbonate is preferably 0.4:100 to 100:100, more preferably 1:100 to 50:100, and still more preferably 1.4:100 to 35:100. This ratio ensures that side reactions of the additives on positive and negative electrodes are suppressed efficiently, resulting in an enhancement in battery characteristics. In particular, this ratio is useful in order to improve high-temperature storage characteristics.

1-2-2. Sulfur-Containing Organic Compounds

The electrolytic solution of the invention may further include a sulfur-containing organic compound. The sulfur-containing organic compounds are not particularly limited as long as the compounds are organic and contain at least one sulfur atom in the molecule. Those organic compounds having a S=O group in the molecule are preferable, with examples including chain sulfonate esters, cyclic sulfonate esters, chain sulfate esters, cyclic sulfate esters, chain sulfite esters and cyclic sulfite esters. Fluorosulfonate salts are not categorized as the sulfur-containing organic compounds (1-2-2.) but are categorized as fluorosulfonate salt electrolytes described later.

In particular, chain sulfonate esters, cyclic sulfonate esters, chain sulfate esters, cyclic sulfate esters, chain sulfite esters and cyclic sulfite esters are preferable, and compounds having a $S(=O)_2$ group are more preferable.

These esters may have a substituent. Here, the substituent is a group composed of one or more atoms selected from the group consisting of carbon atoms, hydrogen atoms, nitrogen atoms, oxygen atoms, sulfur atoms, phosphorus atoms and halogen atoms; preferably a group composed of one or more atoms selected from the group consisting of carbon atoms, hydrogen atoms, oxygen atoms and halogen atoms; and more preferably a group composed of one or more atoms selected from the group consisting of carbon atoms, hydrogen atoms and oxygen atoms. Examples of the substituents include halogen atoms; unsubstituted or halogen-substituted alkyl groups, alkenyl groups, alkynyl groups, aryl groups or alkoxy groups; cyano groups; isocyanate groups; alkoxycarbonyloxy groups; acyl groups; carboxyl groups; alkoxycarbonyl groups; acyloxy groups; alkylsulfonyl groups; alkoxysulfonyl groups; dialkoxyphosphanetriyl groups; dialkoxyphosphoryl groups; and dialkoxyphosphoryloxy groups. Of these, preferred substituents are halogen atoms; alkoxy groups; unsubstituted or halogen-substituted alkyl groups, alkenyl groups or alkynyl groups; isocyanate groups; cyano groups; alkoxycarbonyloxy groups; acyl groups; alkoxycarbonyl groups; and acyloxy groups. Halogen atoms; unsubstituted alkyl groups; alkoxycarbonyloxy groups; acyl groups; alkoxycarbonyl groups; and acyloxy groups are more preferable. Halogen atoms, unsubstituted alkyl groups and alkoxycarbonyl groups are still more preferable. These examples and preferred examples of the substituents are also applied to substituents in the definitions of $A^{12}$ and $A^{13}$ in Formula (2-1) and to substituents in the definition of $A^{14}$ in Formula (2-2) described later.

Chain sulfonate esters and cyclic sulfonate esters are more preferable. In particular, chain sulfonate esters represented by Formula (2-1) and cyclic sulfonate esters represented by Formula (2-2) are preferable.

1-2-2-1. Chain Sulfonate Esters Represented by Formula (2-1)

(2-1)

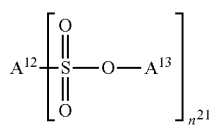

[Chem. 12]

(In the formula, $A^{12}$ is an optionally substituted, $n^{21}$-valent hydrocarbon group having 1 to 12 carbon atoms, $A^{13}$ is an optionally substituted hydrocarbon group having 1 to 12 carbon atoms, $n^{21}$ is an integer of 1 to 4, and when $n^{21}$ is 2, $A^{12}$ and $A^{13}$ may be the same as or different from each other.)

In Formula (2-1), $A^{12}$ and $A^{13}$ do not form a ring together, and hence the sulfonate esters of Formula (2-1) are chain esters.

$n^{21}$ is preferably an integer of 1 to 3, more preferably 1 to 2, and still more preferably 2.

Examples of the $n^{21}$-valent hydrocarbon groups with I to 12 carbon atoms represented by $A^{12}$ include:

monovalent hydrocarbon groups such as alkyl groups, alkenyl groups, alkynyl groups and aryl groups;

divalent hydrocarbon groups such as alkylene groups, alkenylene groups, alkynylene groups and arylene groups;

trivalent hydrocarbon groups such as alkanetriyl groups, alkenetriyl groups, alkynetriyl groups and arenetriyl groups; and tetravalent hydrocarbon groups such as alkanetetrayl groups, alkenetetrayl groups, alkynetetrayl groups and arenetetrayl groups.

Of these, divalent hydrocarbon groups such as alkylene groups, alkenylene groups, alkynylene groups and arylene groups are preferable, and alkylene groups are more preferable. These groups correspond to the formula in which $n^{21}$ is 2.

Of the $n^{21}$-valent hydrocarbon groups having 1 to 12 carbon atoms, examples of the monovalent hydrocarbon groups include alkyl groups having 1 to 5 carbon atoms such as methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group and 1,2-dimethylpropyl group; alkenyl groups having 2 to 5 carbon atoms such as vinyl group, 1-propenyl group, 2-propenyl group, isopropenyl group, 1-butenyl group, 2-butenyl group, 3-butenyl group, 1-pentenyl group, 2-pentenyl group, 3-pentenyl group and 4-pentenyl group; and alkynyl groups having 2 to 5 carbon atoms such as ethynyl group, 1-propynyl group, 2-propynyl group, 1-butynyl group, 2-butynyl group, 3-butynyl group, 1-pentynyl group, 2-pentynyl group, 3-pentynyl group and 4-pentynyl group.

Examples of the divalent hydrocarbon groups include alkylene groups having 1 to 5 carbon atoms such as methylene group, ethylene group, trimethylene group, tetramethylene group and pentamethylene group; alkenylene groups having 2 to 5 carbon atoms such as vinylene group, 1-propenylene group, 2-propenylene group, 1-butenylene group, 2-butenylene group, 1-pentenylene group and 2-pentenylene group; and alkynylene groups having 2 to 5 carbon atoms such as ethynylene group, propynylene group, 1-butynylene group, 2-butynylene group, 1-pentynylene group and 2-pentynylene group. Alkylene groups having 1 to 5 carbon atoms such as methylene group, ethylene group, trimethylene group, tetramethylene group and pentamethylene group are preferable. Alkylene groups having 2 to 5 carbon atoms such as ethylene group, trimethylene group, tetramethylene group and pentamethylene group are more preferable. Alkylene groups having 3 to 5 carbon atoms such as trimethylene group, tetramethylene group and pentamethylene group are still more preferable.

Examples of the trivalent and tetravalent hydrocarbon groups include those trivalent and tetravalent hydrocarbon groups that correspond to the monovalent hydrocarbon groups described above.

The substituted, $n^{21}$-valent hydrocarbon groups with 1 to 12 carbon atoms that are represented by $A^{12}$ are combinations of the substituents described hereinabove and the $n^{21}$-valent hydrocarbon groups having 1 to 12 carbon atoms. $A^{12}$ preferably represents an unsubstituted, $n^{21}$-valent hydrocarbon group having 1 to 5 carbon atoms.

Preferred examples of the hydrocarbon groups with 1 to 12 carbon atoms represented by $A^{13}$ include monovalent hydrocarbon groups such as alkyl groups, alkenyl groups, alkynyl groups and aryl groups, with alkyl groups being more preferable.

Examples of the hydrocarbon groups having 1 to 12 carbon atoms include alkyl groups having 1 to 5 carbon atoms such as methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group and 1,2-dimethylpropyl group. Methyl group, ethyl group, n-propyl group, n-butyl group and n-pentyl group are preferable. Methyl group, ethyl group and n-propyl group are more preferable. Ethyl group and n-propyl group are still more preferable.

The substituted hydrocarbon groups with 1 to 12 carbon atoms represented by $A^{13}$ are combinations of the substituents described hereinabove and the hydrocarbon groups having 1 to 12 carbon atoms. $A^{13}$ preferably represents an optionally substituted hydrocarbon group having 1 to 5 carbon atoms, more preferably a substituted hydrocarbon group having 1 to 5 carbon atoms, and still more preferably an alkyl group having an alkoxycarbonyl group as the substituent. In particular, methoxycarbonylmethyl group, ethoxycarbonylmethyl group, 1-methoxycarbonylethyl group, 1-ethoxycarbonylethyl group, 2-methoxycarbonylethyl group, 2-ethoxycarbonylethyl group, 1-methoxycarbonylpropyl group, 1-ethoxycarbonylpropyl group, 2-methoxycarbonylpropyl group, 2-ethoxycarbonylpropyl group, 3-methoxycarbonylpropyl group and 3-ethoxycarbonylpropyl group are preferable, and 1-methoxycarbonylethyl group and 1-ethoxycarbonylethyl group are more preferable.

Batteries which use the electrolytic solution of the invention additionally including the chain sulfonate ester of Formula (2-1) exhibit excellent effects in the suppression of gas generation at an initial stage and during storage. In 100 mass % of the electrolytic solution, the content of the chain sulfonate ester represented by Formula (2-1) (the total content when two or more kinds of the esters are used) may be 0.001 mass % or above, preferably 0.01 mass % or above, more preferably 0.1 mass % or above, still more preferably 0.3 mass % or above, and particularly preferably 0.5 mass % or above, and may be 10 mass % or less, preferably 5 mass % or less, more preferably 3 mass % or less, still more preferably 2 mass % or less, and particularly preferably 1.5 mass % or less. This content ensures good high-temperature storage characteristics.

1-2-2-2. Cyclic Sulfonate Esters Represented by Formula (2-2)

[Chem. 13]

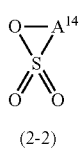

(2-2)

(In the formula, $A^{14}$ is an optionally substituted, divalent hydrocarbon group having 1 to 12 carbon atoms.)

Examples of the divalent hydrocarbon groups with 1 to 12 carbon atoms represented by $A^{14}$ include alkylene groups, alkenylene groups, alkynylene groups and arylene groups, with alkylene groups and alkenylene groups being preferable.

Examples of the divalent hydrocarbon groups having 1 to 12 carbon atoms include alkylene groups having 1 to 5 carbon atoms such as methylene group, ethylene group, trimethylene group, tetramethylene group and pentamethylene group; alkenylene groups having 2 to 5 carbon atoms such as vinylene group, 1-propenylene group, 2-propenylene group, 1-butenylene group, 2-butenylene group, 1-pentenylene group and 2-pentenylene group; and alkynylene groups having 2 to 5 carbon atoms such as ethynylene group, propynylene group, 1-butynylene group, 2-butynylene group, 1-pentynylene group and 2-pentynylene group.

Of these, preferred groups are alkylene groups having 1 to 5 carbon atoms such as methylene group, ethylene group, trimethylene group, tetramethylene group and pentamethylene group, and alkenylene groups having 2 to 5 carbon atoms such as vinylene group, 1-propenylene group, 2-propenylene group, 1-butenylene group, 2-butenylene group, 1-pentenylene group and 2-pentenylene group. More preferred groups are alkylene groups having 3 to 5 carbon atoms such as trimethylene group, tetramethylene group and pentamethylene group, and alkenylene groups having 3 to 5 carbon atoms such as 1-propenylene group, 2-propenylene group, 1-butenylene group, 2-butenylene group, 1-pentenylene group and 2-pentenylene group. Trimethylene group, 1-propenylene group and 2-propenylene group are still more preferable.

The substituted, divalent hydrocarbon groups with 1 to 12 carbon atoms that are represented by $A^{14}$ are combinations of the substituents described hereinabove and the divalent hydrocarbon groups having 1 to 12 carbon atoms. $A^{14}$ preferably represents an unsubstituted, divalent hydrocarbon group having 1 to 5 carbon atoms.

Batteries which use the electrolytic solution of the invention additionally including the cyclic sulfonate ester of Formula (2-2) exhibit a small initial capacity loss and a good capacity recovery after storage at high temperatures, and also achieve a further enhancement in overcharge safety. In 100 mass % of the electrolytic solution, the content of the cyclic sulfonate ester represented by Formula (2-2) (the total content when two or more kinds of the esters are used) may be 0.001 mass % or above, preferably 0.01 mass % or above, more preferably 0.1 mass % or above, still more preferably 0.3 mass % or above, and particularly preferably 0.5 mass % or above, and may be 10 mass % or less, preferably 5 mass % or less, more preferably 3 mass % or less, still more preferably 2 mass % or less, and particularly preferably 1.5 mass % or less.

Examples of the sulfur-containing organic compounds include the following.

<<Chain Sulfonate Esters>>

Examples include fluorosulfonate esters such as methyl fluorosulfonate and ethyl fluorosulfonate;

methanesulfonate esters such as methyl methanesulfonate, ethyl methanesulfonate, 2-propynyl methanesulfonate, 3-butynyl methanesulfonate, busulfan, methyl 2-(methanesulfonyloxy)propionate, ethyl 2-(methanesulfonyloxy)propionate, 2-propynyl 2-(methanesulfonyloxy)propionate, 3-butynyl 2-(methanesulfonyloxy)propionate, methyl methanesulfonyloxyacetate, ethyl methanesulfonyloxyacetate, 2-propynyl methanesulfonyloxyacetate and 3-butynyl methanesulfonyloxyacetate;

alkenylsulfonate esters such as methyl vinylsulfonate, ethyl vinylsulfonate, allyl vinylsulfonate, propargyl vinylsulfonate, methyl allylsulfonate, ethyl allylsulfonate, allyl allylsulfonate, propargyl allylsulfonate and 1,2-bis(vinylsulfonyloxy)ethane; and alkyldisulfonate esters such as methoxycarbonylmethyl methanedisulfonate, ethoxycarbonylmethyl methanedisulfonate, 1-methoxycarbonylethyl methanedisulfonate, 1-ethoxycarbonylethyl methanedisulfonate, methoxycarbonylmethyl 1,2-ethanedisulfonate, ethoxycarbonylmethyl 1,2-ethanedisulfonate, 1-methoxycarbonylethyl 1,2-ethanedisulfonate, 1-ethoxycarbonylethyl 1,2-ethanedisulfonate, methoxycarbonylmethyl 1,3-propanedisulfonate, ethoxycarbonylmethyl 1,3-propanedisulfonate, 1-methoxycarbonylethyl 1,3-propanedisulfonate, 1-ethoxycarbonylethyl 1,3-propanedisulfonate, methoxycarbonylmethyl 1,3-butanedisulfonate, ethoxycarbonylmethyl 1,3-butanedisulfonate, 1-methoxycarbonylethyl 1,3-butanedisulfonate and 1-ethoxycarbonylethyl 1,3-butanedisulfonate.

<<Cyclic Sulfonate Esters>>

Examples include sultone compounds such as 1,3-propanesultone, 1-fluoro-1,3-propanesultone, 2-fluoro-1,3-propanesultone, 3-fluoro-1,3-propanesultone, 1-methyl-1,3-propanesultone, 2-methyl-1,3-propanesultone, 3-methyl-1,3-propanesultone, 1-propene-1,3-sultone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butanesultone and 1,5-pentanesultone;

disulfonate compounds such as methylene methanedisulfonate and ethylene methanedisulfonate;

nitrogen-containing compounds such as 1,2,3-oxathiazolidine-2,2-dioxide, 3-methyl-1,2,3-oxathiazolidine-2,2-dioxide, 3H-1,2,3-oxathiazole-2,2-dioxide, 5H-1,2,3-oxathiazole-2,2-dioxide, 1,2,4-oxathiazolidine-2,2-dioxide, 1,2,5-oxathiazolidine-2,2-dioxide, 1,2,3-oxathiazinane-2,2-dioxide, 3-methyl-1,2,3-oxathiazinane-2,2-dioxide, 5,6-dihydro-1,2,3-oxathiazine-2,2-dioxide and 1,2,4-oxathiazinane-2,2-dioxide; and phosphorus-containing compounds such as 1,2,3-oxathiaphosrane-2,2-dioxide, 3-methyl-1,2,3-oxathiaphosrane-2,2-dioxide, 3-methyl-1,2,3-oxathiaphosrane-2,2,3-trioxide, 3-methoxy-1,2,3-oxathiaphosrane-2,2,3-trioxide, 1,2,4-oxathiaphosrane-2,2-dioxide, 1,2,5-oxathiaphosrane-2,2-dioxide, 1,2,3-oxathiaphosphinane-2,2-dioxide, 3-methyl-1,2,3-oxathiaphosphinane-2,2-dioxide, 3-methyl-1,2,3-oxathiaphosphinane-2,2,3-trioxide, 3-methoxy-1,2,3-oxathiaphosphinane-2,2,3-trioxide, 1,2,4-oxathiaphosphinane-2,2-dioxide, 1,2,5-oxathiaphosphinane-2,2-dioxide and 1,2,6-oxathiaphosphinane-2,2-dioxide.

<<Chain Sulfate Esters>>

Examples include dialkyl sulfate compounds such as dimethyl sulfate, ethylmethyl sulfate and diethyl sulfate.

<<Cyclic Sulfate Esters>>

Examples include alkylene sulfate compounds such as 1,2-ethylene sulfate, 1,2-propylene sulfate, 1,3-propylene sulfate, 1,2-butylene sulfate, 1,3-butylene sulfate, 1,4-butylene sulfate, 1,2-pentylene sulfate, 1,3-pentylene sulfate, 1,4-pentylene sulfate and 1,5-pentylene sulfate.

<<Chain Sulfite Esters>>

Examples include dialkyl sulfite compounds such as dimethyl sulfite, ethylmethyl sulfite and diethyl sulfite.

<<Cyclic Sulfite Esters>>

Examples include alkylene sulfite compounds such as 1,2-ethylene sulfite, 1,2-propylene sulfite, 1,3-propylene sulfite, 1,2-butylene sulfite, 1,3-butylene sulfite, 1,4-butylene sulfite, 1,2-pentylene sulfite, 1,3-pentylene sulfite, 1,4-pentylene sulfite and 1,5-pentylene sulfite.

Of these, methyl 2-(methanesulfonyloxy)propionate, ethyl 2-(methanesulfonyloxy)propionate, 2-propynyl 2-(methanesulfonyloxy)propionate, 1-methoxycarbonylethyl propanedisulfonate, 1-ethoxycarbonylethyl propanedisulfonate, 1-methoxycarbonylethyl butanedisulfonate, 1-ethoxycarbonylethyl butanedisulfonate, 1,3-propanesultone, 1-propene-1,3-sultone, 1,4-butanesultone, 1,2-ethylene sulfate, 1,2-ethylene sulfite, methyl methanesulfonate and ethyl methanesulfonate are preferable from the point of view of enhancing storage characteristics. More preferred compounds are 1-methoxycarbonylethyl propanedisulfonate, 1-ethoxycarbonylethyl propanedisulfonate, 1-methoxycarbonylethyl butanedisulfonate, 1-ethoxycarbonylethyl butanedisulfonate, 1,3-propanesultone, 1-propene-1,3-sultone, 1,2-ethylene sulfate and 1,2-ethylene sulfite. 1,3-Propanesultone and 1-propene-1,3-sultone are still more preferable.

The sulfur-containing organic compounds may be used singly, or two or more may be used in combination in an appropriate ratio.

In 100 mass % of the electrolytic solution, the content of the sulfur-containing organic compound (the total content when two or more kinds of the compounds are used) may be 0.001 mass % or above, preferably 0.01 mass % or above, more preferably 0.1 mass % or above, and particularly preferably 0.3 mass % or above, and may be 10 mass % or less, preferably 5 mass % or less, more preferably 3 mass % or less, and particularly preferably 2 mass % or less. This content ensures easy control of characteristics such as output characteristics, load characteristics, low-temperature characteristics, cycle characteristics and high-temperature storage characteristics.

The mass ratio between the aromatic compound represented by Formula (I) and the sulfur-containing organic compound is preferably 1:99 to 99:1, more preferably 10:90 to 90:10, and particularly preferably 20:80 to 80:20. This ratio ensures that side reactions of the additives on positive and negative electrodes are suppressed efficiently, resulting in an enhancement in battery characteristics. In particular, this ratio is useful in order to improve high-temperature storage characteristics.

1-2-3. Phosphorus-Containing Organic Compounds

The electrolytic solution of the invention may further include a phosphorus-containing organic compound. The phosphorus-containing organic compounds are not particularly limited as long as the compounds are organic and contain at least one phosphorus atom in the molecule. Batteries which use the electrolytic solution of the invention additionally including the phosphorus-containing organic compound generate reduced amounts of gas after storage at high temperatures, and exhibit good recovery and good initial charge-discharge efficiency.

Preferred phosphorus-containing organic compounds are phosphate esters, phosphonate esters, phosphinate esters and phosphite esters. Phosphate esters and phosphonate esters are more preferable, and phosphonate esters are still more preferable. These esters may have a substituent. Here, the substituent is a group composed of one or more atoms selected from the group consisting of carbon atoms, hydrogen atoms, nitrogen atoms, oxygen atoms, sulfur atoms, phosphorus atoms and halogen atoms; and preferably a group composed of one or more atoms selected from the group consisting of carbon atoms, hydrogen atoms, oxygen atoms and halogen atoms. Examples of the substituents include halogen atoms; unsubstituted or halogen-substituted alkyl groups, alkenyl groups, alkynyl groups, aryl groups or alkoxy groups; cyano groups; isocyanate groups; alkoxycarbonyloxy groups; acyl groups; carboxyl groups; alkoxycarbonyl groups; acyloxy groups; alkylsulfonyl groups; alkoxysulfonyl groups; dialkoxyphosphanetriyl groups; dialkoxyphosphoryl groups; and dialkoxyphosphoryloxy groups. Of these, preferred substituents are halogen atoms; alkoxy groups; alkoxycarbonyloxy groups; acyl groups; carboxyl groups; and acyloxy groups. Halogen atoms and acyloxy groups are more preferable. Acyloxy groups are still more preferable. Examples of the acyloxy groups include acetoxy group, propionyloxy group, butyryloxy group, acryloyloxy group, methacryloyloxy group and crotonyloxy group, with acryloyloxy group being preferable. These examples and preferred examples of the substituents are applied to substituents in the definitions of $A^6$ to $A^8$ in Formula (3-1) described later.

Phosphate esters and phosphonate esters are more preferable. In particular, phosphate esters represented by Formula (3-1) and phosphonate esters represented by Formula (3-2) are preferable.

1-2-3-1. Phosphate Esters Represented by Formula (3-1)

[Chem. 14]

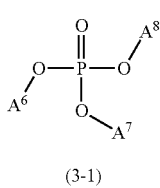

(3-1)

(In the formula, $A^6$, $A^7$ and $A^8$ are independently an optionally substituted alkyl, alkenyl or alkynyl group having 1 to 5 carbon atoms, and at least one of $A^6$ to $A^8$ has a carbon-carbon unsaturated bond.)

Examples of the alkyl, alkenyl or alkynyl groups having 1 to 5 carbon atoms include alkyl groups such as methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group and 1,2-dimethylpropyl group; alkenyl groups such as vinyl group, 1-propenyl group, 2-propenyl group (allyl group), isopropenyl group, 1-butenyl group, 2-butenyl group, 3-butenyl group, 1-pentenyl group, 2-pentenyl group, 3-pentenyl group and 4-pentenyl group; and alkynyl groups such as ethynyl group, 1-propynyl group, 2-propynyl group (propargyl group), 1-butynyl group, 2-butynyl group, 3-butynyl group, 1-pentynyl group, 2-pentynyl group, 3-pentynyl group and 4-pentynyl group. Preferred groups are methyl group, ethyl group, n-propyl group, n-butyl group, n-pentyl group, vinyl group, 2-propenyl group (allyl group), 3-butenyl group, 4-pentenyl group, 2-propynyl group (propargyl group), 3-butynyl group and 4-pentynyl group. Methyl group, ethyl group, 2-propenyl group (allyl group) and 2-propynyl group (propargyl group) are more preferable, and methyl group, ethyl group and 2-propenyl group (allyl group) are still more preferable.

The substituted alkyl, alkenyl or alkynyl groups having 1 to 5 carbon atoms are combinations of the substituents described hereinabove and the alkyl, alkenyl or alkynyl groups having 1 to 5 carbon atoms. 2-Acryloyloxymethyl group and 2-acryloyloxyethyl group are preferable.

Examples of the compounds represented by Formula (3-1) include the following.

<Compounds Having One Carbon-Carbon Unsaturated Bond>

Examples include vinyl group-containing compounds such as dimethylvinyl phosphate, diethylvinyl phosphate, dipropylvinyl phosphate, dibutylvinyl phosphate and dipentylvinyl phosphate;

allyl group-containing compounds such as allyldimethyl phosphate, allyldiethyl phosphate, allyldipropyl phosphate, allyldibutyl phosphate and allyldipentyl phosphate;

propargyl group-containing compounds such as propargyldimethyl phosphate, propargyldiethyl phosphate, propargyldipropyl phosphate, propargyldibutyl phosphate and propargyldipentyl phosphate;

2-acryloyloxymethyl group-containing compounds such as 2-acryloyloxymethyldimethyl phosphate, 2-acryloyloxymethyldiethyl phosphate, 2-acryloyloxymethyldipropyl phosphate, 2-acryloyloxymethyldibutyl phosphate and 2-acryloyloxymethyldipentyl phosphate; and 2-acryloyloxyethyl group-containing compounds such as 2-acryloyloxyethyldimethyl phosphate, 2-acryloyloxyethyldiethyl phosphate, 2-acryloyloxyethyldipropyl phosphate, 2-acryloyloxyethyldibutyl phosphate and 2-acryloyloxyethyldipentyl phosphate.

<Compounds Having Two Carbon-Carbon Unsaturated Bonds>

Examples include vinyl group-containing compounds such as methyldivinyl phosphate, ethyldivinyl phosphate, propyldivinyl phosphate, butyldivinyl phosphate and pentyldivinyl phosphate;

allyl group-containing compounds such as diallylmethyl phosphate, diallylethyl phosphate, diallylpropyl phosphate, diallylbutyl phosphate and diallylpentyl phosphate;

propargyl group-containing compounds such as dipropargylmethyl phosphate, dipropargylethyl phosphate, dipropargylpropyl phosphate, dipropargylbutyl phosphate and dipropargylpentyl phosphate;

2-acryloyloxymethyl group-containing compounds such as bis(2-acryloyloxymethyl)methyl phosphate, bis(2-acryloyloxymethyl)ethyl phosphate, bis(2-acryloyloxymethyl) propyl phosphate, bis(2-acryloyloxymethyl)butyl phosphate and bis(2-acryloyloxymethyl)pentyl phosphate; and 2-acryloyloxyethyl group-containing compounds such as bis(2-acryloyloxyethyl)methyl phosphate, bis(2-acryloyloxyethyl)ethyl phosphate, bis(2-acryloyloxyethyl)propyl phosphate, bis(2-acryloyloxyethyl)butyl phosphate and bis (2-acryloyloxyethyl)pentyl phosphate.

<Compounds Having Three Carbon-Carbon Unsaturated Bonds>

Examples include trivinyl phosphate, triallyl phosphate, tripropargyl phosphate, tris(2-acryloyloxymethyl) phosphate and tris(2-acryloyloxyethyl) phosphate.

In particular, those compounds having three carbon-carbon unsaturated bonds are preferable from the point of view of enhancing battery characteristics, and triallyl phosphate and tris(2-acryloyloxyethyl) phosphate are more preferable.

1-2-3-2. Phosphonate Esters Represented by Formula (3-2)

(3-2)

[Chem. 15]

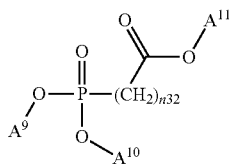

(In the formula, $A^9$, $A^{10}$ and $A^{11}$ are independently an unsubstituted or halogen-substituted alkyl, alkenyl or alkynyl group having 1 to 5 carbon atoms, and $n^{32}$ is an integer of 0 to 6.)

Examples of the alkyl, alkenyl or alkynyl groups having 1 to 5 carbon atoms include alkyl groups such as methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group and 1,2-dimethylpropyl group; alkenyl groups such as vinyl group, 1-propenyl group, 2-propenyl group (allyl group), isopropenyl group, 1-butenyl group, 2-butenyl group, 3-butenyl group, 1-pentenyl group, 2-pentenyl group, 3-pentenyl group and 4-pentenyl group; and alkynyl groups such as ethynyl group, 1-propynyl group, 2-propynyl group (propargyl group), 1-butynyl group, 2-butynyl group, 3-butynyl group, 1-pentynyl group, 2-pentynyl group, 3-pentynyl group and 4-pentynyl group. Preferred groups are methyl group, ethyl group, n-propyl group, n-butyl group, n-pentyl group, vinyl group, 2-propenyl group (allyl group), 3-butenyl group, 4-pentenyl group, 2-propynyl group (propargyl group), 3-butynyl group and 4-pentynyl group. Methyl group, ethyl group, 2-propenyl group (allyl group) and 2-propynyl group (propargyl group) are more preferable, and methyl group, ethyl group and 2-propynyl group (propargyl group) are still more preferable.

Examples of the phosphonate esters represented by Formula (3-2) include the following compounds.

<Compounds of Formula (3-2) in which $n^{32}=0$>

Examples include trimethyl phosphonoformate, methyl diethylphosphonoformate, methyl dipropylphosphonoformate, methyl dibutylphosphonoformate, triethyl phosphonoformate, ethyl dimethylphosphonoformate, ethyl dipropylphosphonoformate, ethyl dibutylphosphonoformate, tripropyl phosphonoformate, propyl dimethylphosphonoformate, propyl diethylphosphonoformate, propyl dibutylphosphonoformate, tributyl phosphonoformate, butyl dimethylphosphonoformate, butyl diethylphosphonoformate, butyl dipropylphosphonoformate, methyl bis(2,2,2-trifluoroethyl)phosphonoformate, ethyl bis(2,2,2-trifluoroethyl)phosphonoformate, propyl bis(2,2,2-trifluoroethyl)phosphonoformate and butyl bis(2,2,2-trifluoroethyl)phosphonoformate.

<Compounds of Formula (3-2) in which $n^{32}=1$>

Examples include trimethyl phosphonoacetate, methyl diethylphosphonoacetate, methyl dipropylphosphonoacetate, methyl dibutylphosphonoacetate, triethyl phosphonoacetate, ethyl dimethylphosphonoacetate, ethyl dipropylphosphonoacetate, ethyl dibutylphosphonoacetate, tripropyl phosphonoacetate, propyl dimethylphosphonoacetate, propyl diethylphosphonoacetate, propyl dibutylphosphonoacetate, tributyl phosphonoacetate, butyl dimethylphosphonoacetate, butyl diethylphosphonoacetate, butyl dipropylphosphonoacetate, methyl bis(2,2,2-trifluoroethyl)phosphonoacetate, ethyl bis(2,2,2-trifluoroethyl)phosphonoacetate, propyl bis(2,2,2-trifluoroethyl)phosphonoacetate, butyl bis(2,2,2-trifluoroethyl)phosphonoacetate, allyl dimethylphosphonoacetate, allyl diethylphosphonoacetate, 2-propynyl dimethylphosphonoacetate and 2-propynyl diethylphosphonoacetate.

<Compounds of Formula (3-2) in which $n^{32}=2$>

Examples include trimethyl 3-phosphonopropionate, methyl 3-(diethylphosphono)propionate, methyl 3-(dipropylphosphono)propionate, methyl 3-(dibutylphosphono)propionate, triethyl 3-phosphonopropionate, ethyl 3-(dimethylphosphono)propionate, ethyl 3-(dipropylphosphono) propionate, ethyl 3-(dibutylphosphono)propionate, tripropyl 3-phosphonopropionate, propyl 3-(dimethylphosphono)propionate, propyl 3-(diethylphosphono)propionate, propyl 3-(dibutylphosphono)propionate, tributyl 3-phosphonopropionate, butyl 3-(dimethylphosphono)propionate, butyl 3-(diethylphosphono)propionate, butyl 3-(dipropylphosphono)propionate, methyl 3-(bis(2,2,2-trifluoroethyl) phosphono)propionate, ethyl 3-(bis(2,2,2-trifluoroethyl) phosphono)propionate, propyl 3-(bis(2,2,2-trifluoroethyl) phosphono)propionate and butyl 3-(bis(2,2,2-trifluoroethyl) phosphono)propionate.

<Compounds of Formula (3-2) in which $n^{32}=3$>

Examples include trimethyl 4-phosphonobutyrate, methyl 4-(diethylphosphono)butyrate, methyl 4-(dipropylphosphono)butyrate, methyl 4-(dibutylphosphono)butyrate, triethyl 4-phosphonobutyrate, ethyl 4-(dimethylphosphono) butyrate, ethyl 4-(dipropylphosphono)butyrate, ethyl 4-(dibutylphosphono)butyrate, tripropyl 4-phosphonobutyrate, propyl 4-(dimethylphosphono)butyrate, propyl 4-(diethylphosphono)butyrate, propyl 4-(dibutylphosphono)butyrate, tributyl 4-phosphonobutyrate, butyl 4-(dimethylphosphono)butyrate, butyl 4-(diethylphosphono)butyrate and butyl 4-(dipropylphosphono)butyrate.

From the point of view of enhancing battery characteristics, those compounds in which $n^{32}=0$, 1 or 2 are preferable, those compounds in which $n^{32}=0$ or 1 are more preferable, and those compounds in which $n^{32}=1$ are still more preferable. Of the compounds in which $n^{32}=1$, those compounds in which $A^9$ to $A^{11}$ are saturated hydrocarbon groups are preferable.

In particular, trimethyl phosphonoacetate, triethyl phosphonoacetate, 2-propynyl dimethylphosphonoacetate and 2-propynyl diethylphosphonoacetate are preferable.

The phosphorus-containing organic compounds may be used singly, or two or more may be used in combination in an appropriate ratio.

In 100 mass % of the electrolytic solution, the amount of the phosphorus-containing organic compound (the total amount when two or more kinds of the compounds are used) may be 0.001 mass % or above, preferably 0.01 mass % or above, and more preferably 0.1 mass % or above, and may be 10 mass % or less, preferably 5 mass % or less, more preferably 3 mass % or less, still more preferably 2 mass % or less, particularly preferably 1 mass % or less, and most preferably 0.5 mass % or less. This amount ensures easy control of characteristics such as output characteristics, load characteristics, low-temperature characteristics, cycle characteristics and high-temperature storage characteristics.

The mass ratio between the aromatic compound represented by Formula (I) and the phosphorus-containing organic compound is preferably 1:99 to 99:1, more preferably 10:90 to 90:10, and particularly preferably 20:80 to 80:20. This ratio ensures that side reactions of the additives on positive and negative electrodes are suppressed efficiently, resulting in an enhancement in battery characteristics. In particular, this ratio is useful in order to improve high-temperature storage characteristics.

1-2-4. Cyano Group-Containing Organic Compounds

The electrolytic solution of the invention may further include a cyano group-containing organic compound. Batteries which use the electrolytic solution of the invention having a cyano group exhibit a small initial capacity loss and excellent suppression of gas generation after storage at high temperatures. The cyano group-containing organic compounds are not particularly limited as long as the compounds are organic and have at least one cyano group in the molecule. Those compounds represented by Formulae (4-1), (4-2) and (4-3) are preferable. Those compounds represented by Formulae (4-1) and (4-2) are more preferable. Those compounds represented by Formula (4-2) are still more preferable.

1-2-4-1. Compounds Represented by Formula (4-1)

$A^1$-CN　　(4-1)

(In the formula, A is a hydrocarbon group having 2 to 20 carbon atoms.)

The molecular weight of the compounds represented by Formula (4-1) is not particularly limited. The molecular weight is preferably 55 or more, more preferably 65 or more, and still more preferably 80 or more, and is preferably 310 or less, more preferably 185 or less, and still more preferably 155 or less. This range of molecular weights ensures that the compound of Formula (4-1) will exhibit solubility with respect to the nonaqueous electrolytic solution and the advantageous effects of the invention are achieved easily. The compounds of Formula (4-1) may be produced by any methods without limitation, and known production methods may be selected appropriately.

Referring to Formula (4-1), examples of the hydrocarbon groups having 2 to 20 carbon atoms include alkyl groups, alkenyl groups, alkynyl groups and aryl groups. Preferred examples include alkyl groups such as ethyl group, n-propyl group, iso-propyl group, iso-propyl group, n-butyl group, sec-butyl group, iso-butyl group, tert-butyl group, n-pentyl group, tert-amyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group and eicosyl group; alkenyl groups such as vinyl group, 1-propenyl group, isopropenyl group, 1-butenyl group and 1-pentenyl group; alkynyl groups such as ethynyl group, 1-propynyl group, 1-butynyl group and 1-pentynyl group; and aryl groups such as phenyl group, tolyl group, ethylphenyl group, n-propylphenyl group, i-propylphenyl group, n-butylphenyl group, sec-butylphenyl group, i-butylphenyl group, tert-butylphenyl group, trifluoromethylphenyl group, xylyl group, benzyl group, phenethyl group, methoxyphenyl group, ethoxyphenyl group and trifluoromethoxyphenyl group.

In particular, linear or branched alkyl groups having 2 to 15 carbon atoms and alkenyl groups having 2 to 4 carbon atoms are more preferable, linear or branched alkyl groups having 2 to 12 carbon atoms are still more preferable, and linear or branched alkyl groups having 4 to 11 carbon atoms are particularly preferable in view of the facts that such compounds have the cyano groups in a high proportion relative to the whole of the molecule and provide high effects in the enhancement of battery characteristics.

Examples of the compounds represented by Formula (4-1) include propionitrile, butyronitrile, pentanenitrile, hexanenitrile, heptanenitrile, octanenitrile, pelargononitrile, decanenitrile, undecanenitrile, dodecanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile and 2-hexenenitrile.

From the points of view of the stability of the compounds, battery characteristics and production availability, pentanenitrile, octanenitrile, decanenitrile, dodecanenitrile and crotononitrile are preferable, pentanenitrile, decanenitrile, dodecanenitrile and crotononitrile are more preferable, and pentanenitrile, decanenitrile and crotononitrile are preferable.

The compounds of Formula (4-1) may be used singly, or two or more may be used in combination in an appropriate ratio. In 100 mass % of the nonaqueous electrolytic solution, the amount of the compound represented by Formula (4-1) (the total amount when two or more kinds of the compounds are used) may be 0.001 mass % or above, preferably 0.01 mass % or above, and more preferably 0.1 mass % or above, and may be 10 mass % or less, preferably 5 mass % or less, more preferably 3 mass % or less, still more preferably 2 mass % or less, particularly preferably 1 mass % or less, and most preferably 0.5 mass % or less. This content ensures easy control of characteristics such as output characteristics, load characteristics, low-temperature characteristics, cycle characteristics and high-temperature storage characteristics.

1-2-4-2. Compounds Represented by Formula (4-2)

NC-$A^2$-CN　　(4-2)

(In the formula, $A^2$ is an organic group with 1 to 10 carbon atoms that is composed of one or more kinds of atoms selected from the group consisting of hydrogen atoms, carbon atoms, nitrogen atoms, oxygen atoms, sulfur atoms, phosphorus atoms and halogen atoms.)

The organic groups with 1 to 10 carbon atoms that are composed of one or more kinds of atoms selected from the group consisting of hydrogen atoms, carbon atoms, nitrogen atoms, oxygen atoms, sulfur atoms, phosphorus atoms and halogen atoms include not only those organic groups which are composed of carbon and hydrogen atoms, but also those organic groups which optionally further contain nitrogen, oxygen, sulfur, phosphorus or halogen atoms. Those organic groups which optionally further contain nitrogen, oxygen, sulfur, phosphorus or halogen atoms include those organic groups in which the carbon atoms in the hydrocarbon skeleton are partially substituted by such atoms, and those organic groups which have a substituent composed of such atoms.

The molecular weight of the compounds represented by Formula (4-2) is not particularly limited. The molecular weight is preferably 65 or more, more preferably 80 or more, and still more preferably 90 or more, and is preferably 270 or less, more preferably 160 or less, and still more preferably 135 or less. This range of molecular weights ensures that the compound of Formula (4-2) will exhibit solubility with respect to the nonaqueous electrolytic solution and the advantageous effects of the invention are achieved easily. The compounds of Formula (4-2) may be produced by any methods without limitation, and known production methods may be selected appropriately.

Examples of $A^2$ in the compounds of Formula (4-2) include alkylene groups and derivatives thereof, alkenylene groups and derivatives thereof, cycloalkylene groups and derivatives thereof, alkynylene groups and derivatives thereof, cycloalkenylene groups and derivatives thereof, arylene groups and derivatives thereof, carbonyl groups and derivatives thereof, sulfonyl groups and derivatives thereof, sulfinyl groups and derivatives thereof, phosphonyl groups and derivatives thereof; phosphinyl groups and derivatives thereof, amide groups and derivatives thereof, imide groups and derivatives thereof, ether groups and derivatives thereof, thioether groups and derivatives thereof, borinate groups and derivatives thereof, and borane groups and derivatives thereof.

From the point of view of enhancing battery characteristics, preferred groups are alkylene groups and derivatives thereof, alkenylene groups and derivatives thereof, cycloalkylene groups and derivatives thereof, alkynylene groups and derivatives thereof, and arylene groups and derivatives thereof. More preferably, $A^2$ is an optionally substituted alkylene group having 2 to 5 carbon atoms.

Examples of the compounds represented by Formula (4-2) include malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitffle, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, 3,3'-(ethylenedithio)dipropionitrile and 3,9-bis(2-cyanoethyl)-2,4,8,10-tetraoxaspiro[5,5]undecane.

Of these, malononitrile, succinonitrile, glutaronitrile, adiponitrile, pimelonitrile, suberonitrile, azelanitrile, sebaconitrile, undecanedinitrile, dodecanedinitrile, 3,9-bis(2-cyanoethyl)-2,4,8,10-tetraoxaspiro[5,5]undecane and fumaronitrile are preferable from the point of view of enhancing storage characteristics. Further, succinonitrile, glutaronitrile, adiponitrile, pimelonitrile, suberonitrile, glutaronitrile and 3,9-bis(2-cyanoethyl)-2,4,8,10-tetraoxaspiro[5,5]undecane are more preferable because these compounds have particularly high effects in the enhancement of storage characteristics and are less prone to degradation by side reactions on electrodes. In the dinitrile compounds, the proportion of the cyano groups in the molecule is usually increased with decreasing molecular weight and consequently the molecules exhibit a higher viscosity, whilst the increase in molecular weight increases the boiling point of the compounds. Thus, succinosuccinonitrile, glutaronitrile, adiponitrile and pimelonitrile are more preferable from the point of view of enhancing the work efficiency.

The compounds of Formula (4-2) may be used singly, or two or more may be used in combination in an appropriate ratio. In 100 mass % of the electrolytic solution, the concentration of the compound represented by Formula (4-2) (the total concentration when two or more kinds of the compounds are used) may be 0.001 mass % or above, preferably 0.01 mass % or above, more preferably 0.1 mass % or above, and particularly preferably 0.3 mass % or above, and may be 10 mass % or less, preferably 5 mass % or less, and more preferably 3 mass % or less. The satisfaction of this concentration increases the effects in the enhancements of characteristics such as output characteristics, load characteristics, low-temperature characteristics, cycle characteristics and high-temperature storage characteristics.

1-2-4-3. Compounds Represented by Formula (4-3)

(4-3)

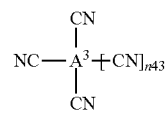
[Chem. 16]

(In the formula,
$A^3$ is an organic group with 1 to 12 carbon atoms that is composed of one or more kinds of atoms selected from the group consisting of hydrogen atoms, carbon atoms, nitrogen atoms, oxygen atoms, sulfur atoms, phosphorus atoms and halogen atoms, and $n^{43}$ is an integer of 0 to 5.)

The organic groups with 1 to 12 carbon atoms that are composed of one or more kinds of atoms selected from the group consisting of hydrogen atoms, carbon atoms, nitrogen atoms, oxygen atoms, sulfur atoms, phosphorus atoms and halogen atoms include not only those organic groups which are composed of carbon and hydrogen atoms, but also those organic groups which optionally further contain nitrogen, oxygen, sulfur, phosphorus or halogen atoms. Those organic groups which optionally further contain nitrogen, oxygen, sulfur, phosphorus or halogen atoms include those organic groups in which the carbon atoms in the hydrocarbon skeleton are partially substituted by such atoms, and those organic groups which have a substituent composed of such atoms.

$n^{43}$ is an integer of 0 to 5, preferably 0 to 3, more preferably 0 to 1, and particularly preferably 0.

Preferably, $A^3$ is an organic group with 1 to 12 carbon atoms that is composed of one or more kinds of atoms selected from the group consisting of hydrogen atoms, carbon atoms, nitrogen atoms, oxygen atoms and sulfur atoms. More preferably, $A^3$ is an organic group with 1 to 12 carbon atoms that is composed of one or more kinds of atoms selected from the group consisting of hydrogen atoms, carbon atoms and oxygen atoms. Still more preferably, $A^3$ is an optionally substituted aliphatic hydrocarbon group having 1 to 12 carbon atoms.

Here, the substituent is a group composed of one or more atoms selected from the group consisting of carbon atoms, hydrogen atoms, nitrogen atoms, oxygen atoms, sulfur atoms, phosphorus atoms and halogen atoms.

Examples of the substituents include halogen atoms; unsubstituted or halogen-substituted alkyl groups, alkenyl groups, alkynyl groups, aryl groups or alkoxy groups; isocyanate groups; alkoxycarbonyloxy groups; acyl groups; carboxyl groups; alkoxycarbonyl groups; acyloxy groups; alkylsulfonyl groups; alkoxysulfonyl groups; dialkoxyphosphanetriyl groups; dialkoxyphosphoryl groups; and dialkoxyphosphoryloxy groups. Preferred substituents are halogen atoms; alkoxy groups; and unsubstituted or halogen-substituted alkyl groups. Halogen atoms, and unsubstituted or halogen-substituted alkyl groups are more preferable. Unsubstituted alkyl groups are still more preferable.

The aliphatic hydrocarbon groups are not particularly limited. The number of carbon atoms in the groups may be 1 or more, preferably 2 or more, and more preferably 3 or more, and may be 12 or less, preferably 8 or less, and more preferably 6 or less.

Examples of the aliphatic hydrocarbon groups, in accordance with $n^{43}$, include alkanetriyl groups, alkanetetrayl groups, alkanepentayl groups, alkanetetrayl groups, alkenetriyl groups, alkenetetrayl groups, alkenepentayl groups, alkenetetrayl groups, alkynetriyl groups, alkynetetrayl groups, alkynepentayl groups and alkynetetrayl groups.

Of these, saturated hydrocarbon groups such as alkanetriyl groups, alkanetetrayl groups, alkanepentayl groups and alkanetetrayl groups are more preferable, and alkanetriyl groups are still more preferable.

Further, the compounds represented by Formula (4-3) are more preferably represented by Formula (4-3').

(4-3')

[Chem. 17]

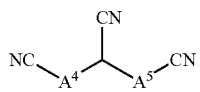

(In the formula, $A^4$ and $A^5$ have the same definition as $A^3$.)

More preferably, $A^4$ and $A^5$ are optionally substituted hydrocarbon groups having 1 to 5 carbon atoms.

Examples of the hydrocarbon groups include methylene group, ethylene group, trimethylene group, tetraethylene group, pentamethylene group, vinylene group, 1-propenylene group, 2-propenylene group, 1-butenylene group, 2-butenylene group, 1-pentenylene group, 2-pentenylene group, ethynylene group, propynylene group, 1-butynylene group, 2-butynylene group, 1-pentynylene group and 2-pentynylene group.

Of these, methylene group, ethylene group, trimethylene group, tetraethylene group and pentamethylene group are preferable, and methylene group, ethylene group and trimethylene group are more preferable.

It is preferable that $A^4$ and $A^5$ be not the same and differ from each other.

The molecular weight of the compounds represented by Formula (4-3) is not particularly limited. The molecular weight is preferably 90 or more, more preferably 120 or more, and still more preferably 150 or more, and is preferably 450 or less, more preferably 300 or less, and still more preferably 250 or less. This range of molecular weights ensures that the compound of Formula (4-3) will exhibit solubility with respect to the nonaqueous electrolytic solution and the advantageous effects of the invention are achieved easily. The compounds of Formula (4-3) may be produced by any methods without limitation, and known production methods may be selected appropriately.

Examples of the compounds represented by Formula (4-3) include the following compounds:

[Chem. 18]

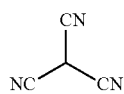 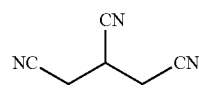

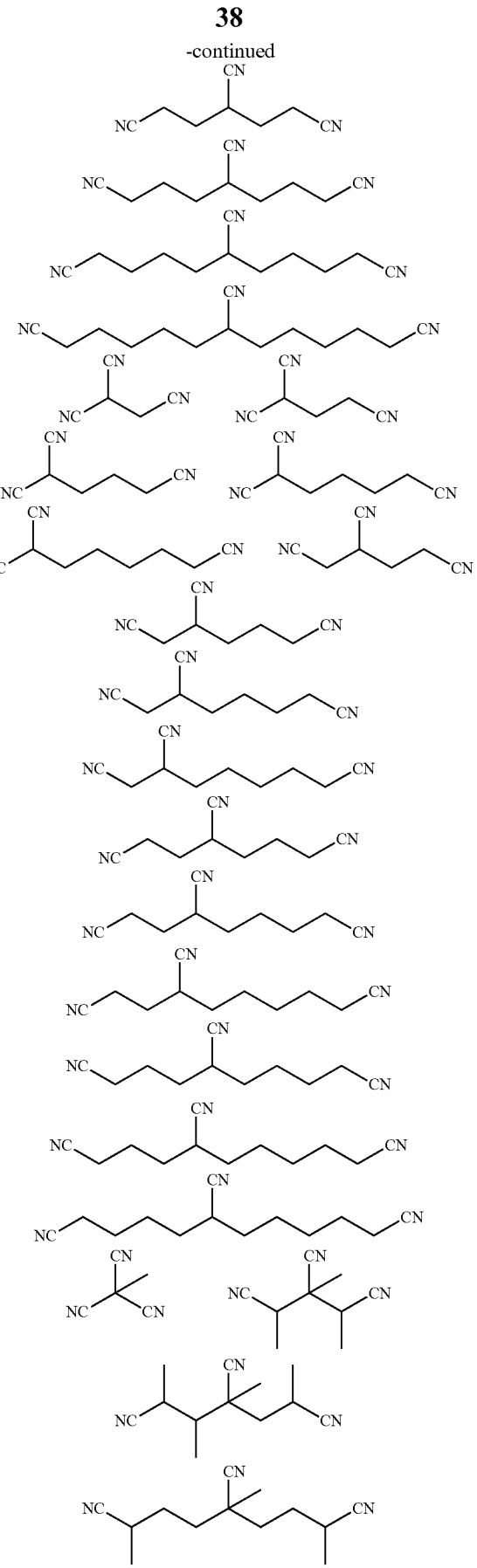

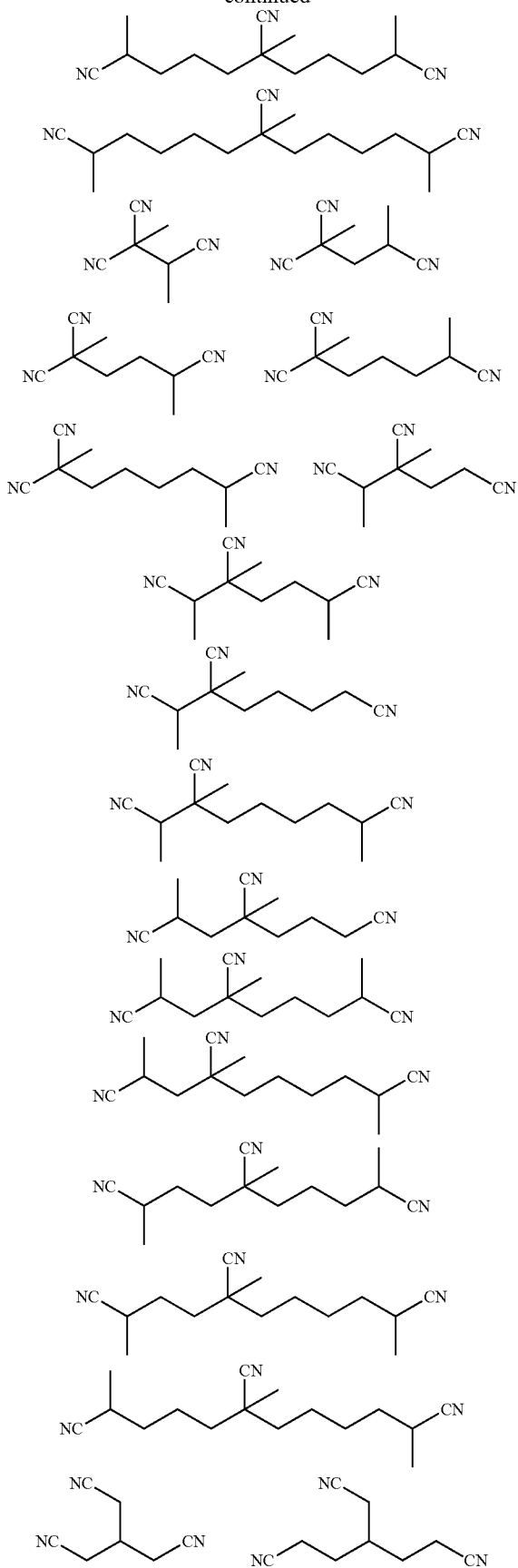
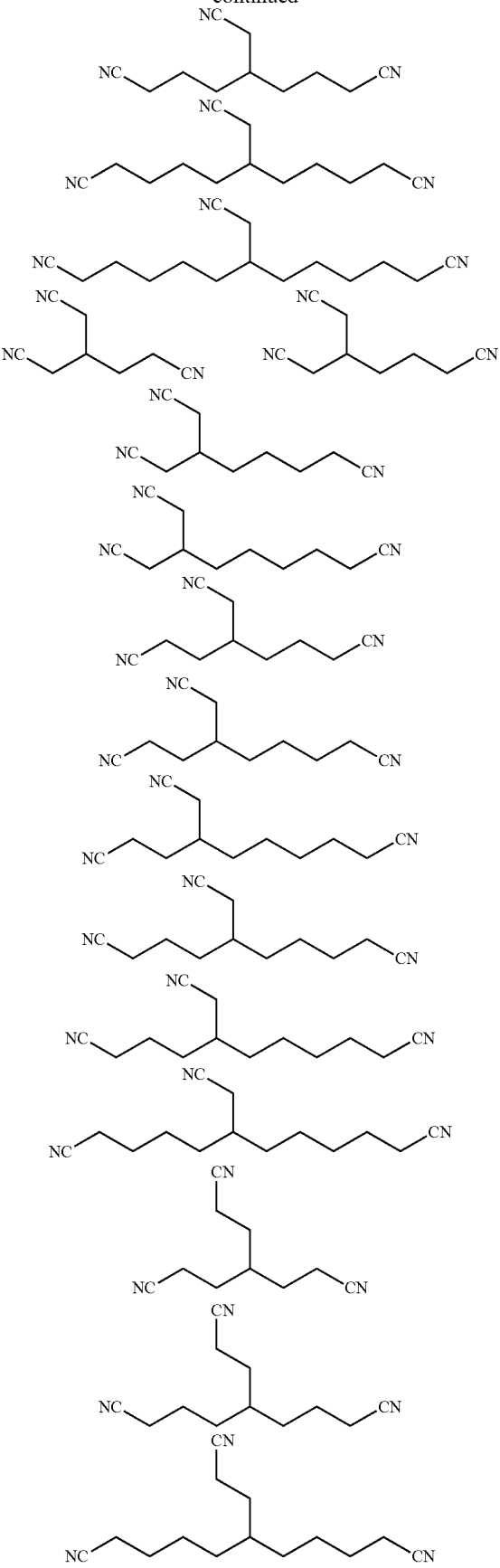

-continued
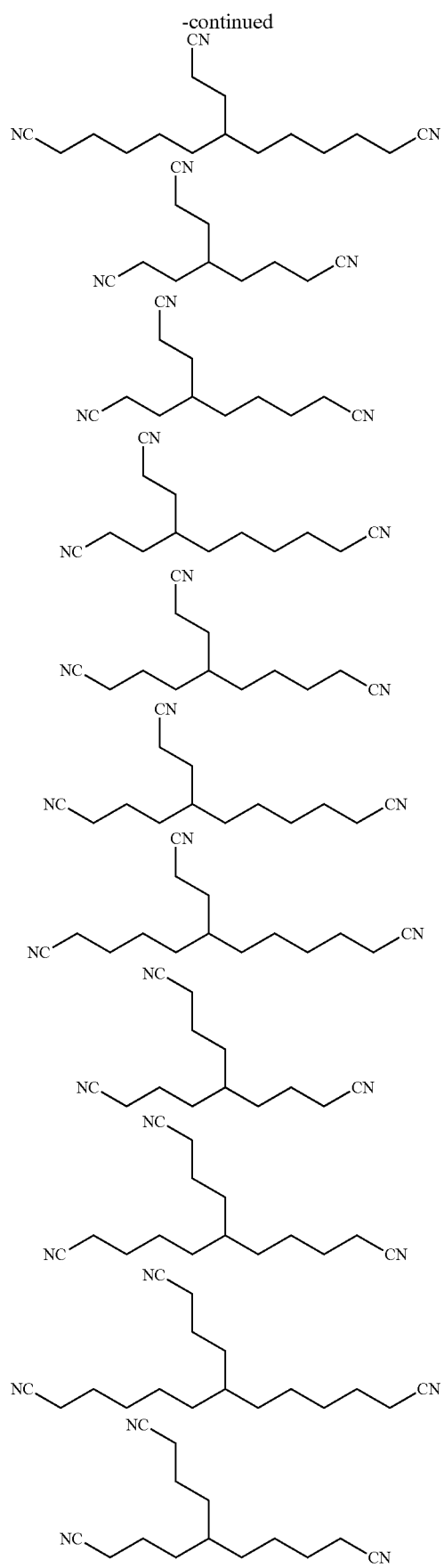
-continued
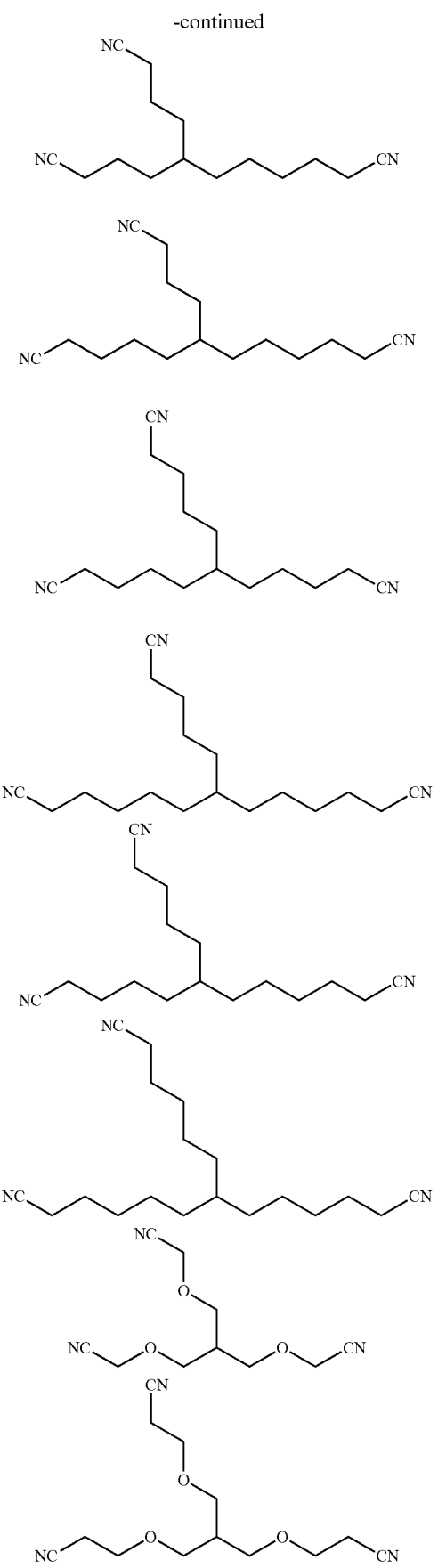

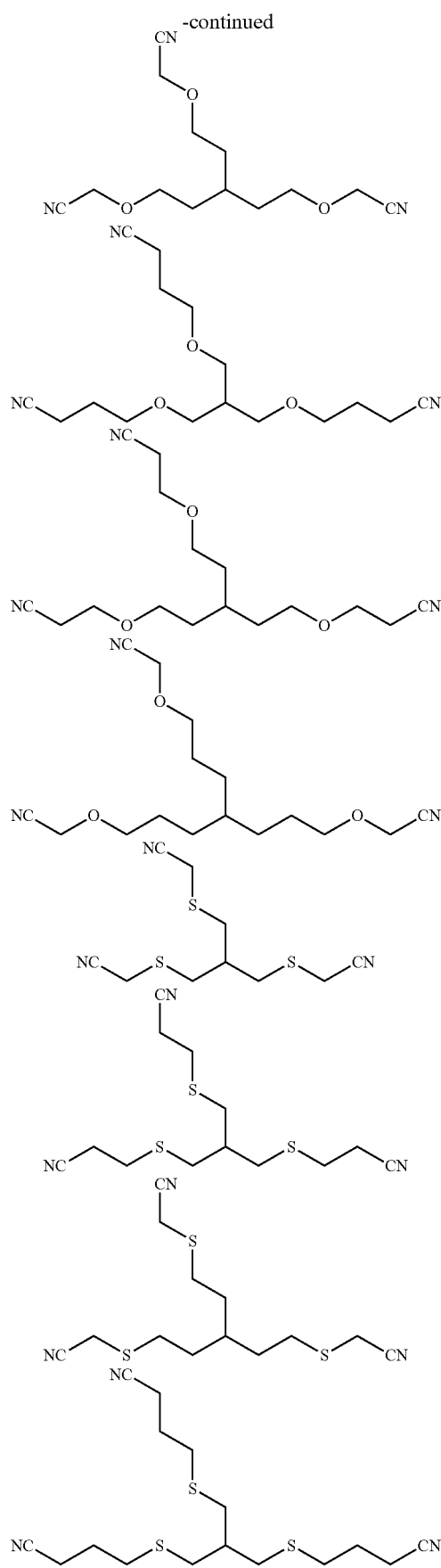
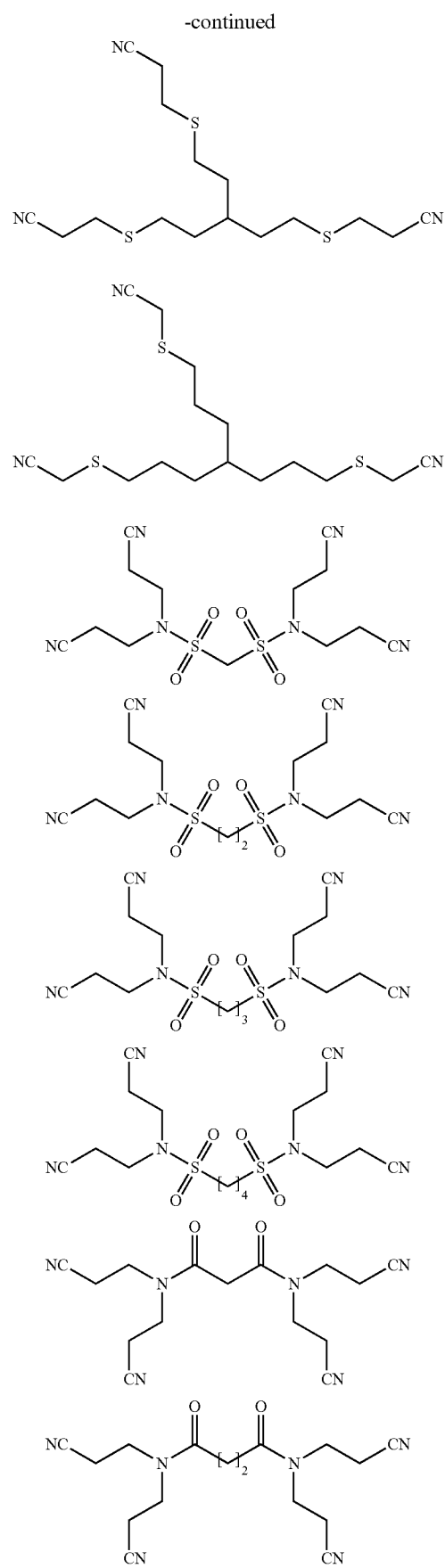

-continued
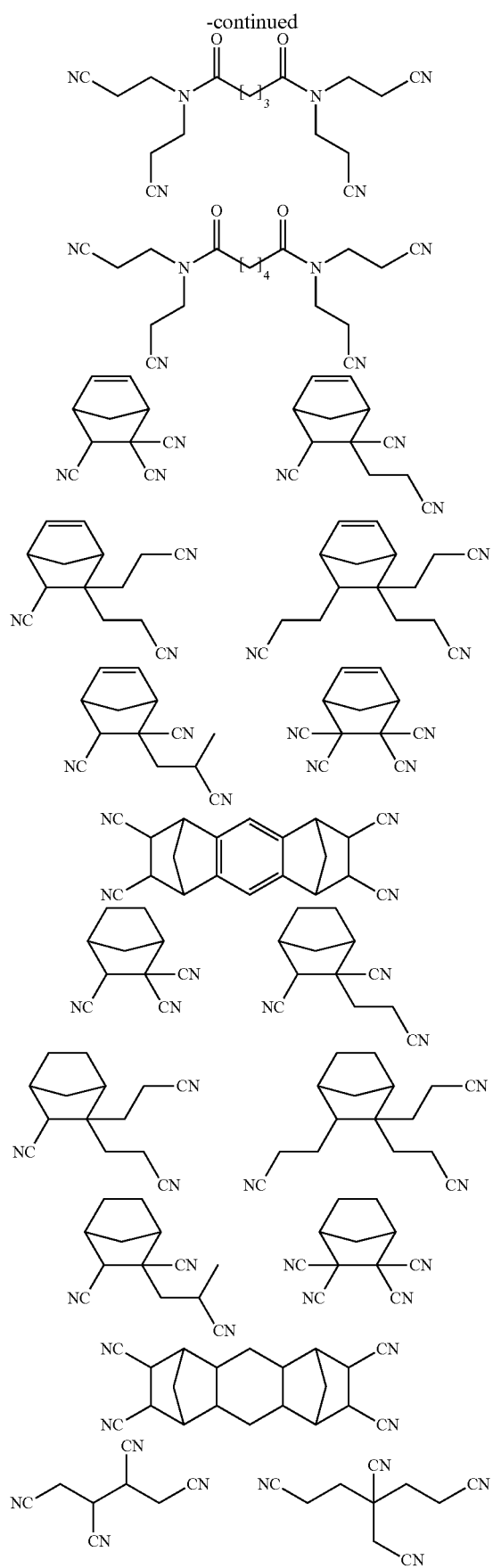
-continued
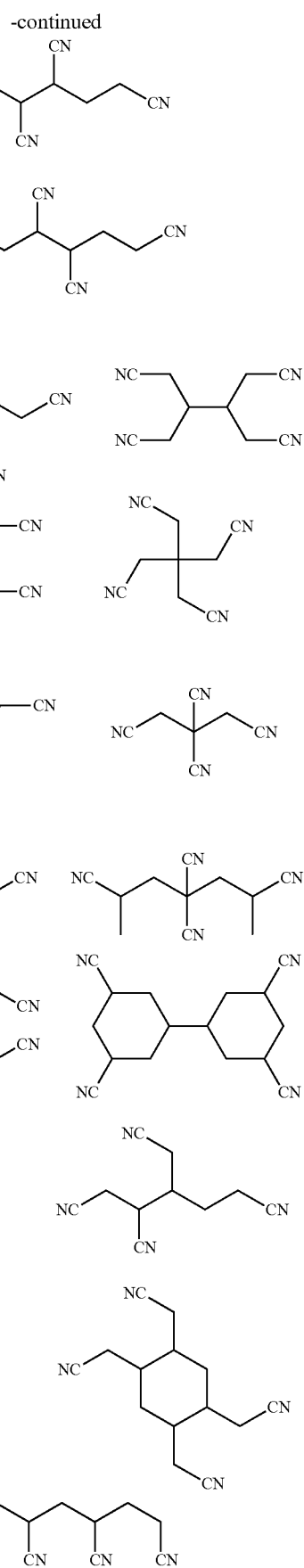

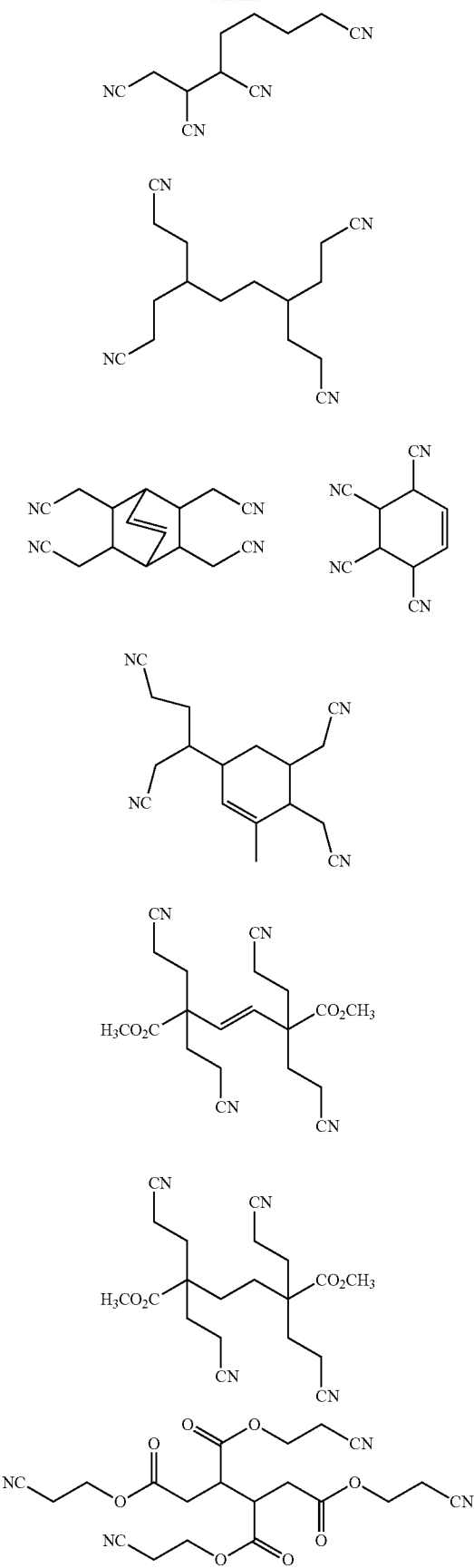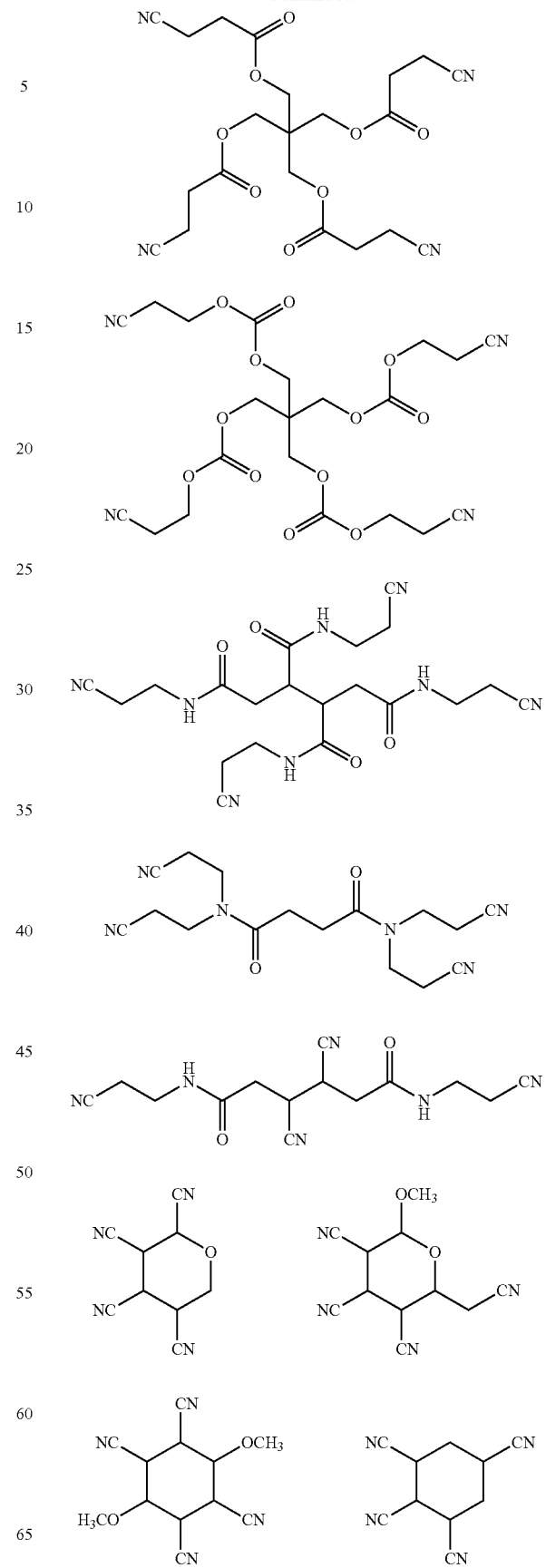

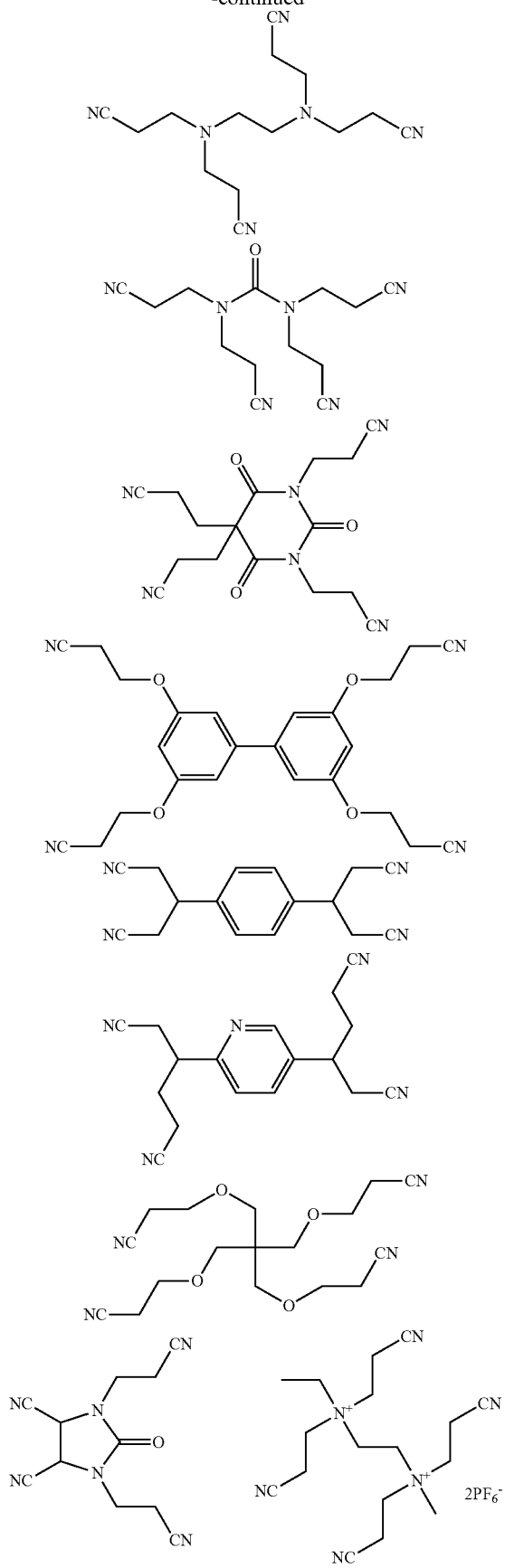
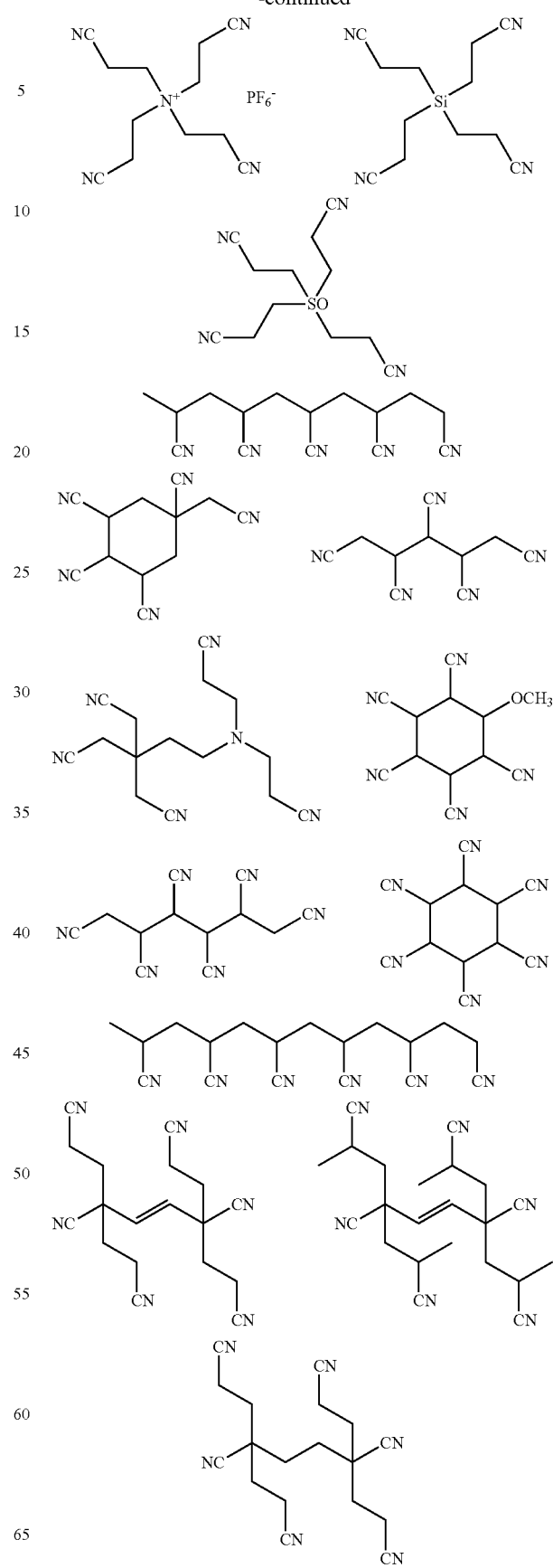

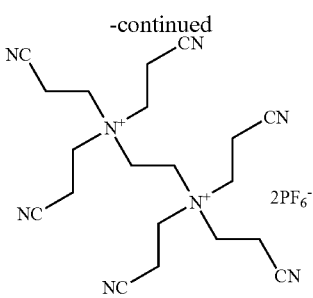

Of these, the following compounds are preferable from the point of view of enhancing storage characteristics.

[Chem. 19]

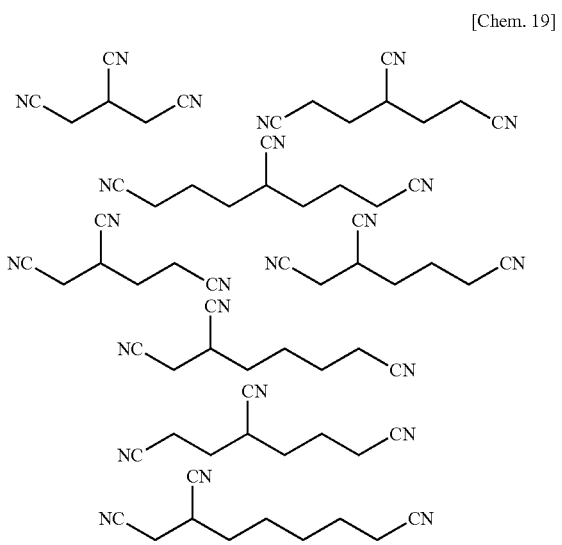

The cyano group-containing organic compounds may be used singly, or two or more may be used in combination in an appropriate ratio.

In 100 mass % of the electrolytic solution, the concentration of the compound represented by Formula (4-3) (the total concentration when two or more kinds of the compounds are used) may be 0.001 mass % or above, preferably 0.01 mass % or above, more preferably 0.1 mass % or above, and particularly preferably 0.3 mass % or above, and may be 10 mass % or less, preferably 5 mass % or less, more preferably 3 mass % or less, and particularly preferably 2 mass % or less. This concentration ensures easy control of characteristics such as output characteristics, load characteristics, low-temperature characteristics, cycle characteristics and high-temperature storage characteristics.

The mass ratio between the aromatic compound represented by Formula (I) and the cyano group-containing organic compound, namely, cyano group-containing organic compound:aromatic compound of Formula (I), may be 50:50 or more, preferably 40:60 or more, and more preferably 35:65 or more, and may be 1:99 or less, preferably 10:90 or less, and more preferably 20:80 or less. This ratio ensures that battery characteristics, in particular, storage characteristics can be markedly enhanced. Although the mechanism of this effect is not clear, it is probable that the additives mixed in the above ratio are prevented from side reactions on electrodes to the minimum degree.

1-2-5. Isocyanate Group-Containing Organic Compounds

The electrolytic solution of the invention may further include an isocyanate group-containing organic compound. The isocyanate group-containing organic compounds are not particularly limited as long as the compounds are organic and contain at least one isocyanate group in the molecule. The number of the isocyanate groups in the molecule is preferably 1 to 4, more preferably 2 to 3, and still more preferably 2.

When the electrolytic solution of the invention includes the aromatic compound of Formula (I) in combination with the isocyanate group-containing compound, the obtainable batteries using the electrolytic solution achieve a reduction of gas generation during storage at high temperatures while maintaining load characteristics, and can still generate a gas in case of overcharging to ensure safety. The isocyanate group-containing organic compounds are preferably such that the isocyanate groups are bonded to compounds having a linear or branched alkylene group, a cycloalkylene group, a structure in which a cycloalkylene group and an alkylene group are linked together, an aromatic hydrocarbon group, a structure in which an aromatic hydrocarbon group and an alkylene group are linked together, an ether structure (—O—), a structure in which an ether structure (—O—) and an alkylene group are linked together, a carbonyl group (—C(=O)—), a structure in which a carbonyl group and an alkylene group are linked together, a sulfonyl group (—S(=O)—), a structure in which a sulfonyl group and an alkylene group are linked together, or a structure resulting from the halogenation of any of the groups and structures described above. The isocyanate group-containing organic compounds are more preferably such that the isocyanate groups are bonded to a linear or branched alkylene group, a cycloalkylene group, a structure in which a cycloalkylene group and an alkylene group are linked together, an aromatic hydrocarbon group, or a structure in which an aromatic hydrocarbon group and an alkylene group are linked together; and are still more preferably such that the isocyanate groups are bonded to a structure in which a cycloalkylene group and an alkylene group are linked together. The molecular weight of the isocyanate group-containing organic compounds is not particularly limited. The molecular weight is preferably 80 or more, more preferably 115 or more, and still more preferably 170 or more, and is preferably 300 or less, and more preferably 230 or less. This range of molecular weights ensures that the isocyanate group-containing organic compound will exhibit solubility with respect to the nonaqueous electrolytic solution and the advantageous effects of the invention are achieved easily. The isocyanate group-containing organic compounds may be produced by any methods without limitation, and known production methods may be selected appropriately. Further, commercial products may be used.

Examples of the isocyanate group-containing organic compounds include organic compounds having one isocyanate group such as methyl isocyanate, ethyl isocyanate, propyl isocyanate, isopropyl isocyanate, butyl isocyanate, tert-butyl isocyanate, pentyl isocyanate hexyl isocyanate, cyclohexyl isocyanate, vinyl isocyanate, allyl isocyanate, ethynyl isocyanate, propargyl isocyanate, phenyl isocyanate and fluorophenyl isocyanate; and organic compounds having two isocyanate groups such as monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-diisocyanatopropane, 1,4-diisocyanato-2-butene, 1,4-diisocyanato-2-fluorobutane, 1,4-diisocyanato-2,3-difluorobutane, 1,5-diisocyanato-2-pentene, 1,5-diisocyanato-2-methylpentane, 1,6-diisocyanato-2-hexene, 1,6-diisocyanato-3-hexene, 1,6-diisocyanato-3-fluorohexane, 1,6-diisocyanato-3,4-difluorohexane, toluene diisocyanate, xylene diisocyanate, tolylene diisocyanate, 1,2-bis(isocyanatomethyl)cyclohexane, 1,3-bis(isocyanatomethyl)cyclohexane, 1,4-bis(isocyanatomethyl)cyclohexane, 1,2-diisocyanatocyclohexane, 1,3-diisocyanatocyclohexane, 1,4-diisocyanatocyclohexane, dicyclohexylmethane-1,1'-diisocyanate, dicyclohexylmethane-2,2'-diisocyanate, dicyclohexylmethane-3,3'-diisocyanate, dicyclohexylmethane-4,4'-diisocyanate, bicyclo[2.2.1]heptane-2,5-diylbis(methyl isocyanate), bicyclo[2.2.1]heptane-2,6-diylbis(methyl isocyanate), isophorone diisocyanate, carbonyl diisocyanate, 1,4-diisocyanatobutane-1,4-dione, 1,5-diisocyanatopentane-1,5-dione, 2,2,4-trimethylhexamethylene diisocyanate and 2,4,4-trimethylhexamethylene diisocyanate.

Of these, those organic compounds having two isocyanate groups are preferable from the point of view of enhancing storage characteristics, with specific examples including monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-bis(isocyanatomethyl)cyclohexane, dicyclohexylmethane-4,4'-diisocyanate, bicyclo[2.2.1]heptane-2,5-diylbis(methyl isocyanate), bicyclo[2.2.1]heptane-2,6-diylbis(methyl isocyanate), isophorone diisocyanate, 2,2,4-trimethylhexamethylene diisocyanate and 2,4,4-trimethylhexamethylene diisocyanate. More preferred compounds are hexamethylene diisocyanate, 1,3-bis(isocyanatomethyl)cyclohexane, dicyclohexylmethane-4,4'-diisocyanate, bicyclo[2.2.1]heptane-2,5-diylbis(methyl isocyanate), bicyclo[2.2.1]heptane-2,6-diylbis(methyl isocyanate), isophorone diisocyanate, 2,2,4-trimethylhexamethylene diisocyanate and 2,4,4-trimethylhexamethylene diisocyanate. 1,3-Bis(isocyanatomethyl)cyclohexane, dicyclohexylmethane-4,4'-diisocyanate, bicyclo[2.2.1]heptane-2,5-diylbis(methyl isocyanate) and bicyclo[2.2.1]heptane-2,6-diylbis(methyl isocyanate) are still more preferable.

The isocyanate group-containing organic compounds may be trimer compounds that are derived from compounds having at least two isocyanate groups in the molecule, or may be aliphatic polyisocyanates that are adducts of the trimer compounds with polyvalent alcohols. Examples include biurets, isocyanurates, adducts and bifunctional modified polyisocyanates having the basic structures represented by Formulae (5-1) to (5-4) below.

[Chem. 20]

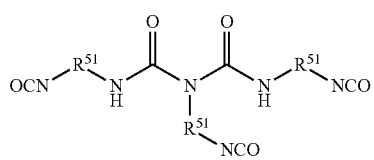

(5-1)

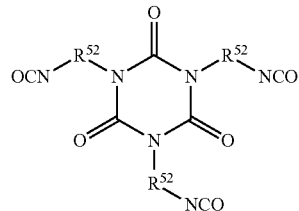

(5-2)

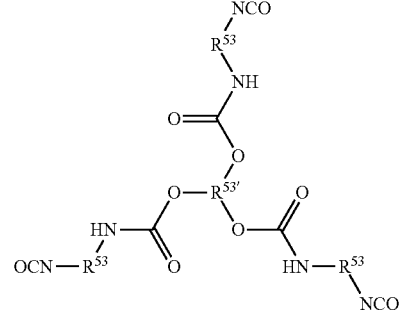

(5-3)

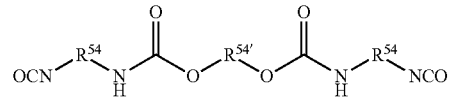

(5-4)

(In the formula, $R^{51}$ to $R^{54}$ and $R^{54'}$ independently at each occurrence are a divalent hydrocarbon group (for example, a tetramethylene group or a hexamethylene group), and $R^{53'}$ independently at each occurrence is a trivalent hydrocarbon group.)

The organic compounds having at least two isocyanate groups in the molecule include so-called blocked isocyanates in which functional groups are blocked with a blocking agent to increase storage stability. Examples of the blocking agents include alcohols, phenols, organic amines, oximes and lactams. Specific examples include n-butanol, phenol, tributylamine, diethylethanolamine, methyl ethyl ketoxime and ε-caprolactam.

To facilitate the reaction associated with the isocyanate group-containing organic compound and to obtain higher effects, it is preferable to use catalysts, for example, metal catalysts such as dibutyltin dilaurate, and amine catalysts such as 1,8-diazabicyclo[5.4.0]undecene-7.

The isocyanate group-containing organic compounds may be used singly, or two or more may be used in combination in an appropriate ratio.

In 100 mass % of the electrolytic solution, the amount of the isocyanate group-containing organic compound (the total amount when two or more kinds of the compounds are used) may be 0.001 mass % or above, preferably 0.1 mass % or above, and more preferably 0.3 mass % or above, and may be 10 mass % or less, preferably 5 mass % or less, and more preferably 3 mass % or less. This amount ensures easy control of characteristics such as output characteristics, load characteristics, low-temperature characteristics, cycle characteristics and high-temperature storage characteristics.

The mass ratio between the aromatic compound represented by Formula (I) and the isocyanate group-containing organic compound, namely, isocyanate group-containing organic compound:aromatic compound of Formula (I), may be 50:50 or more, preferably 40:60 or more, and more preferably 25:75 or more, and may be 1:99 or less, preferably 5:95 or less, and more preferably 10:90 or less. This ratio ensures that battery characteristics, in particular, storage characteristics can be markedly enhanced. Although the mechanism of this effect is not clear, it is probable that the additives mixed in the above ratio are prevented from side reactions on electrodes to the minimum degree.

1-2-6. Silicon-Containing Compounds

The electrolytic solution of the invention may further include a silicon-containing compound. The silicon-containing compounds are not particularly limited as long as the compounds have at least one silicon atom in the molecule. In the electrolytic solution of the invention, the combined use of the aromatic compound of Formula (I) with the silicon-containing compound makes it possible to further reduce the initial volume change and to enhance the rate capacity ratio after storage at high temperatures and the overcharge safety.

The silicon-containing compounds are preferably represented by Formula (6) below:

(6)

[Chem. 21]

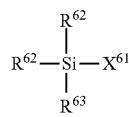

(In the formula, $R^{61}$, $R^{62}$ and $R^{63}$ are independently a hydrogen atom, a halogen atom or a hydrocarbon group having 10 or less carbon atoms, and $X^{61}$ is an organic group containing at least one atom selected from the group consisting of oxygen atoms, nitrogen atoms and silicon atoms.)

Examples and preferred examples of the hydrocarbon groups are similar to those of the hydrocarbon groups in Formula (I). $R^{61}$, $R^{62}$ and $R^{63}$ are preferably each a hydrogen atom, a fluorine atom, a methyl group, an ethyl group, an n-propyl group, an i-propyl group, an n-butyl group, a sec-butyl group, an i-butyl group, a tertert-butyl group or a phenyl group, and more preferably a methyl group.

$X^{61}$ is an organic group containing at least one atom selected from the group consisting of oxygen atoms, nitrogen atoms and silicon atoms, and is preferably an organic group containing at least an oxygen atom or a silicon atom. Here, the organic group is a group composed of one or more atoms selected from the group consisting of carbon atoms, hydrogen atoms, nitrogen atoms, oxygen atoms, silicon atoms, sulfur atoms, phosphorus atoms and halogen atoms. Examples of the organic groups include alkyl groups, alkenyl groups, alkynyl groups, aryl groups, alkoxy groups, CN groups, isocyanate groups, fluoro groups, alkylsulfonate groups and trialkylsilyl groups. The monovalent organic group may be partially substituted with a halogen atom. The number of carbon atoms in the organic group may be 1 or more, preferably 3 or more, and more preferably 5 or more, and may be 15 or less, preferably 12 or less, and more preferably 8 or less.

Of the organic groups, alkylsulfonate groups, trialkylsilyl groups, borate groups, phosphate groups and phosphite groups are preferable.

Examples of the silicon-containing compounds include the following compounds:

borate compounds such as tris(trimethylsilyl) borate, tris (trimethoxysilyl) borate, tris(triethylsilyl) borate, tris(triethoxysilyl) borate, tris(dimethylvinylsilyl) borate and tris (diethylvinylsilyl) borate; phosphate compounds such as tris(trimethylsilyl) phosphate, tris(triethylsilyl) phosphate, tris(tripropylsilyl) phosphate, tris(triphenylsilyl) phosphate, tris(trimethoxysilyl) phosphate, tris(triethoxysilyl) phosphate, tris(triphenoxysilyl) phosphate, tris(dimethylvinylsilyl) phosphate and tris(diethylvinylsilyl) phosphate;

phosphite compounds such as tris(trimethylsilyl) phosphite, tris(triethylsilyl) phosphite, tris(tripropylsilyl) phosphite, tris(triphenylsilyl) phosphite, tris(trimethoxysilyl) phosphite, tris(triethoxysilyl) phosphite, tris(triphenoxysilyl) phosphite, tris(dimethylvinylsilyl) phosphite and tris (diethylvinylsilyl) phosphite;

sulfonate compounds such as trimethylsilyl methanesulfonate and trimethylsilyl tetrafluoromethanesulfonate; and disilane compounds such as hexamethyldisilane, hexaethyldisilane, 1,1,2,2-tetramethyldisilane, 1,1,2,2-tetraethyldisilane, 1,2-diphenyltetramethyldisilane and 1,1,2,2-tetraphenyldisilane.

Of these, tris(trimethylsilyl) borate, tris(trimethylsilyl) phosphate, tris(trimethylsilyl) phosphite, trimethylsilyl methanesulfonate, trimethylsilyl tetrafluoromethanesulfonate, hexamethyldisilane, hexaethyldisilane, 1,2-diphenyltetramethyldisilane and 1,1,2,2-tetraphenyldisilane are preferable, and tris(trimethylsilyl) borate, tris(trimethylsilyl) phosphate, tris(trimethylsilyl) phosphite and hexamethyldisilane are more preferable.

The silicon-containing compounds may be used singly, or two or more may be used in combination in an appropriate ratio.

In 100 mass % of the electrolytic solution, the amount of the silicon-containing compound (the total amount when two or more kinds of the compounds are used) may be 0.001 mass % or above, preferably 0.1 mass % or above, and more preferably 0.3 mass % or above, and may be 10 mass % or less, preferably 5 mass % or less, and more preferably 3 mass % or less. This amount ensures easy control of characteristics such as output characteristics, load characteristics, low-temperature characteristics, cycle characteristics and high-temperature storage characteristics.

The mass ratio between the aromatic compound represented by Formula (I) and the silicon-containing compound (the total mass when two or more kinds of the compounds are used) is preferably 99:1 to 1:99, more preferably 10:90 to 90:10, and particularly preferably 20:80 to 80:20. This ratio ensures a good balance of characteristics such as output characteristics and high-temperature durability.

1-2-7. Aromatic Compounds Other than Those of Formula (I)

The electrolytic solution of the invention may further include an aromatic compound other than those represented by Formula (I).

The aromatic compounds other than those of Formula (I) are not particularly limited as long as the compounds are organic compounds having an aromatic ring in the molecule and represented by other than Formula (I). Those aromatic compounds having at least one substituent which are represented by Formula (7) below are preferable. The addition of the aromatic compound other than those of Formula (I) to the electrolytic solution of the invention results in a further enhancement in overcharge safety of batteries using the electrolytic solution and can impart good high-temperature storage characteristics to the batteries.

(7)

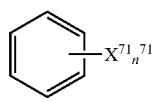

(In the formula, the substituent $X^{71}$ is a halogen atom or an organic group optionally having a halogen atom or a heteroatom. The organic group optionally having a heteroatom is a linear, branched or cyclic, saturated hydrocarbon group having 1 to 12 carbon atoms, a group having a carboxylate ester structure, a group having a carbonate structure, a phosphorus-containing group, a sulfur-containing group or a silicon-containing group. These substituents may be further substituted with a substituent such as a halogen atom, a hydrocarbon group, an aromatic group, a halogen-containing hydrocarbon group or a halogen-containing aromatic group. $n^{71}$ that indicates the number of the substituents $X^{71}$ is 1 to 6. When the compound has a plurality of substituents, the substituents may be the same as or different from one another and may form a ring.)

From the point of view of battery characteristics, linear, branched or cyclic, saturated hydrocarbon groups having 1 to 12 carbon atoms, groups having a carboxylate ester structure and groups having a carbonate structure are preferable. Linear, branched or cyclic, saturated hydrocarbon groups having 3 to 12 carbon atoms, and groups having a carboxylate ester structure are more preferable.

The number of the substituents $X^{71}$ indicated by $n^{71}$ is preferably 1 to 5, more preferably 1 to 3, still more preferably 1 to 2, and particularly preferably 1.

$X^{71}$ represents a halogen atom, or an organic group optionally having a halogen atom or a heteroatom.

Examples of the halogen atoms include chlorine and fluorine, with fluorine being preferable.

Examples of the organic groups having no heteroatoms include linear, branched or cyclic, saturated hydrocarbon groups having 3 to 12 carbon atoms. Such linear or branched groups may have a ring structure. Specific examples of the linear, branched or cyclic, saturated hydrocarbon groups having 1 to 12 carbon atoms include methyl group, ethyl group, propyl group, isopropyl group, butyl group, isobutyl group, tert-butyl group, pentyl group, tert-pentyl group, cyclopentyl group, cyclohexyl group and butylcyclohexyl group. The number of carbon atoms is preferably 3 to 12, more preferably 3 to 10, still more preferably 3 to 8, further preferably 3 to 6, and most preferably 3 to 5.

Examples of the heteroatoms present in the organic groups having a heteroatom include oxygen atoms, sulfur atoms, phosphorus atoms and silicon atoms. Examples of the oxygen-containing organic groups include groups having a carboxylate ester structure, and groups having a carbonate structure. Examples of the sulfur-containing organic groups include groups having a sulfonate ester structure. Examples of the phosphorus-containing organic groups include groups having a phosphate ester structure and groups having a phosphonate ester structure. Examples of the silicon-containing organic groups include groups having a silicon-carbon structure.

Specific examples of the aromatic compounds represented by Formula (7) include the following compounds.

Examples of the compounds in which $X^{71}$ is a halogen atom or an organic group optionally having a halogen atom include:

chlorobenzene, fluorobenzene, difluorobenzene, trifluorobenzene, tetrafluorobenzene, pentafluorobenzene, hexafluorobenzene and benzotrifluoride. Fluorobenzene and hexafluorobenzene are preferable. Fluorobenzene is more preferable.

Examples of the compounds in which $X^{71}$ is a hydrocarbon group having 1 to 12 carbon atoms include:

2,2-diphenylpropane, 1,4-diphenylcyclohexane, cyclopentylbenzene, cyclohexylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, propylbenzene, butylbenzene, tert-butylbenzene and tert-amylbenzene. Preferred compounds are 2,2-diphenylpropane, 1,4-diphenylcyclohexane, cyclopentylbenzene, cyclohexylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, toluene, ethylbenzene, propylbenzene, butylbenzene, tert-butylbenzene and tert-amylbenzene. More preferred compounds are 2,2-diphenylpropane, cyclopentylbenzene, cyclohexylbenzene, 1,1-diphenylcyclohexane, tert-butylbenzene and tert-amylbenzene. Cyclohexylbenzene, tert-butylbenzene and tert-amylbenzene are still more preferable.

Examples of the compounds in which $X^{71}$ is a group having a carboxylate ester structure include:

phenyl acetate, benzyl acetate, 2-phenylethyl acetate, 3-phenylpropyl acetate, 4-phenylbutyl acetate, phenyl propionate, benzyl propionate, 2-phenylethyl propionate, 3-phenylpropyl propionate, 4-phenylbutyl propionate, phenyl butyrate, benzyl butyrate, 2-phenylethyl butyrate, 3-phenylpropyl butyrate, 4-phenylbutyl butyrate and 2,2-bis(4-acetoxyphenyl)propane. Preferred compounds are 2-phenylethyl acetate, 3-phenylpropyl acetate, 2-phenylethyl propionate, 3-phenylpropyl propionate and 2,2-bis(4-acetoxyphenyl)propane. 2-Phenylethyl acetate and 3-phenylpropyl acetate are more preferable.

Examples of the compounds in which $X^{71}$ is a group having a carbonate structure include:

2,2-bis(4-methoxycarbonyloxyphenyl)propane, 1,1-bis(4-methoxycarbonyloxyphenyl)cyclohexane, diphenyl carbonate, methyl phenyl carbonate, ethyl phenyl carbonate, 2-tert-butylphenyl methyl carbonate, 2-tert-butylphenyl ethyl carbonate, bis(2-tert-butylphenyl) carbonate, 4-tert-butylphenyl methyl carbonate, 4-tert-butylphenyl ethyl carbonate, bis(4-tert-butylphenyl) carbonate, benzyl methyl carbonate, benzyl ethyl carbonate and dibenzyl carbonate. Preferred compounds are 2,2-bis(4-methoxycarbonyloxyphenyl)propane, 1,1-bis(4-methoxycarbonyloxyphenyl)cyclohexane, diphenyl carbonate and methyl phenyl carbonate. Diphenyl carbonate and methyl phenyl carbonate are more preferable. Methyl phenyl carbonate is still more preferable.

Examples of the compounds in which $X^{71}$ is a group having a sulfonate ester structure include:

methyl phenylsulfonate, ethyl phenylsulfonate, diphenyl sulfonate, phenyl methylsulfonate, 2-tert-butylphenyl methylsulfonate, 4-tert-butylphenyl methylsulfonate and cyclohexylphenyl methylsulfonate. Preferred compounds are methyl phenylsulfonate, diphenyl sulfonate, 2-tert-butylphenyl methylsulfonate, 4-tert-butylphenyl methylsulfonate and cyclohexylphenyl methylsulfonate. More preferred compounds are methyl phenylsulfonate, 2-tert-butylphenyl methylsulfonate, 4-tert-butylphenyl methylsulfonate and cyclohexylphenyl methylsulfonate.

Examples of the compounds in which $X^{71}$ is a group having a silicon-carbon structure include:

trimethylphenylsilane, diphenylsilane and diphenyltetramethyldisilane. Trimethylphenylsilane is preferable.

Examples of the compounds in which $X^{71}$ is a group having a phosphate ester structure include:

triphenyl phosphate, tris(2-tert-butylphenyl) phosphate, tris(3-tert-butylphenyl) phosphate, tris(4-tert-butylphenyl) phosphate, tris(2-tert-amylphenyl) phosphate, tris(3-tert-amylphenyl) phosphate, tris(4-tert-amylphenyl) phosphate, tris(2-cyclohexylphenyl) phosphate, tris(3-cyclohexylphenyl) phosphate, tris(4-cyclohexylphenyl) phosphate and diethyl(4-methylbenzyl) phosphonate. Preferred compounds are triphenyl phosphate, tris(2-tert-butylphenyl) phosphate, tris(3-tert-butylphenyl) phosphate, tris(4-tert-butylphenyl) phosphate, tris(2-tert-amylphenyl) phosphate, tris(3-tert-amylphenyl) phosphate, tris(4-tert-amylphenyl) phosphate, tris(2-cyclohexylphenyl) phosphate, tris(3-cyclohexylphenyl) phosphate and tris(4-cyclohexylphenyl) phosphate. More preferred compounds are tris(2-tert-butylphenyl) phosphate, tris(4-tert-butylphenyl) phosphate, tris(2-cyclohexylphenyl) phosphate and tris(4-cyclohexylphenyl) phosphate.

Examples of the compounds in which $X^{71}$ is a group having a phosphonate ester structure include:

dimethyl phenylphosphonate, diethyl phenylphosphonate, methyl phenyl phenylphosphonate, ethyl phenyl phenylphosphonate, diphenyl phenylphosphonate, dimethyl-(4-fluorophenyl)-phosphonate, dimethyl benzylphosphonate, diethyl benzylphosphonate, methyl phenyl benzylphosphonate, ethyl phenyl benzylphosphonate, diphenyl benzylphosphonate, dimethyl-(4-fluorobenzyl)phosphonate and diethyl-(4-fluorobenzyl)phosphonate. Preferred compounds are dimethyl phenylphosphonate, diethyl phenylphosphonate, dimethyl-(4-fluorophenyl)-phosphonate, dimethyl benzylphosphonate, diethyl benzylphosphonate, dimethyl-(4-fluorobenzyl)phosphonate and diethyl-(4-fluorobenzyl) phosphonate. More preferred compounds are dimethyl phenylphosphonate, diethyl phenylphosphonate, dimethyl benzylphosphonate, diethyl benzylphosphonate, dimethyl-(4-fluorobenzyl)phosphonate and diethyl-(4-fluorobenzyl) phosphonate.

Examples of the aromatic compounds other than those of Formula (I) further include fluorides of the above aromatic compounds. Specific examples include:

partial fluorides of the compounds having a hydrocarbon group such as trifluoromethylbenzene, 2-fluorotoluene, 3-fluorotoluene, 4-fluorotoluene, trifluoromethylbenzene, o-cyclohexylfluorobenzene and p-cyclohexylfluorobenzene; partial fluorides of the compounds having a carboxylate ester structure such as 2-fluorophenyl acetate and 4-fluorophenyl acetate; and partial fluorides of the compounds having an ether structure such as trifluoromethoxybenzene, 2-fluoroanisole, 3-fluoroanisole, 4-fluoroanisole, 2,4-difluoroanisole, 2,5-difluoroanisole, 2,6-difluoroanisole, 3,5-difluoroanisole and 4-trifluoromethoxyanisole. Preferred compounds are partial fluorides of the compounds having a hydrocarbon group such as trifluoromethylbenzene, 2-fluorotoluene, 3-fluorotoluene, 4-fluorotoluene, o-cyclohexylfluorobenzene and p-cyclohexylfluorobenzene; partial fluorides of the compounds having a carboxylate ester structure such as 2-fluorophenyl acetate and 4-fluorophenyl acetate; and partial fluorides of the compounds having an ether structure such as trifluoromethoxybenzene 2-fluoroanisole, 4-fluoroanisole, 2,4-difluoroanisole and 4-trifluoromethoxyanisole. More preferred compounds are partial fluorides of the compounds having a hydrocarbon group such as 2-fluorotoluene, 3-fluorotoluene and 4-fluorotoluene; partial fluorides of the compounds having a carboxylate ester structure such as 2-fluorophenyl acetate and 4-fluorophenyl acetate; and partial fluorides of the compounds having an ether structure such as trifluoromethoxybenzene, 2-fluoroanisole, 4-fluoroanisole, 2,4-difluoroanisole and 4-trifluoromethoxyanisole.

The aromatic compounds other than those of Formula (I) may be used singly, or two or more may be used in combination in an appropriate ratio. In 100 mass % of the electrolytic solution, the amount of the aromatic compound other than those of Formula (I) (the total amount when two or more kinds of the compounds are used) may be 0.001 mass % or above, preferably 0.01 mass % or above, more preferably 0.1 mass % or above, still more preferably 0.5 mass % or above, further preferably 1 mass % or above, particularly preferably 2 mass % or above, and still further preferably 3 mass % or above, and may be 10 mass % or less, preferably 8 mass % or less, more preferably 5 mass % or less, and still more preferably 4 mass % or less. This amount ensures that the advantageous effects of the invention are achieved easily and the increase in battery resistance will be prevented.

The mass ratio between the aromatic compound represented by Formula (I) and the aromatic compound other than those of Formula (I) (the total mass when two or more kinds of the compounds are used) is preferably 1:99 to 99:1, more preferably 10:90 to 90:10, and particularly preferably 20:80 to 80:20. This ratio ensures that overcharge characteristics may be enhanced without a decrease in battery characteristics.

1-2-8. Cyclic Carbonates Having Carbon-Carbon Unsaturated Bond

The cyclic carbonates having a carbon-carbon unsaturated bond (hereinafter, also written as "unsaturated cyclic carbonates") are not particularly limited as long as the cyclic carbonates have a carbon-carbon double bond or a carbon-carbon triple bond. The unsaturated cyclic carbonates also include cyclic carbonates having an aromatic ring. Batteries which use the electrolytic solution of the invention containing the unsaturated cyclic carbonate exhibit excellent initial irreversible capacity and OCV after discharge storage. Fluorinated cyclic carbonates having a carbon-carbon unsaturated bond are categorized as the fluorine-containing cyclic carbonates.

Examples of the unsaturated cyclic carbonates include cyclic carbonates having a carbon-carbon unsaturated bond and a 5-membered ring structure, and cyclic carbonates having a carbon-carbon unsaturated bond and a 6-membered ring structure. Cyclic carbonates having a carbon-carbon unsaturated bond and a 5-membered ring structure are preferable.

Examples of the cyclic carbonates having a carbon-carbon unsaturated bond and a 5-membered ring structure include vinylene carbonates, ethylene carbonates substituted with a substituent having an aromatic ring or a carbon-carbon double or triple bond, and catechol carbonates. Examples of the cyclic carbonates having a carbon-carbon unsaturated bond and a 6-membered ring structure include 4H-1,3-dioxin-2-ones.

Examples of the vinylene carbonates include vinylene carbonate, methylvinylene carbonate, 4,5-dimethylvinylene carbonate, phenylvinylene carbonate, 4,5-diphenylvinylene carbonate, vinylvinylene carbonate, 4,5-vinylvinylene carbonate, allylvinylene carbonate and 4,5-diallylvinylene carbonate.

Examples of the ethylene carbonates substituted with a substituent having an aromatic ring or a carbon-carbon double or triple bond include vinylethylene carbonate, 4,5-divinylethylene carbonate, 4-methyl-5-vinylethylene carbonate, 4-allyl-5-vinylethylene carbonate, ethynylethylene carbonate, 4,5-diethynylethylene carbonate, 4-methyl-5-ethynylethylene carbonate, 4-vinyl-5-ethynylethylene carbonate, 4-allyl-5-ethynylethylene carbonate, phenylethylene carbonate, 4,5-diphenylethylene carbonate, 4-phenyl-5-vinylethylene carbonate, 4-allyl-5-phenylethylene carbonate, allylethylene carbonate, 4,5-diallylethylene carbonate and 4-methyl-5-allylethylene carbonate.

Specific examples of the 4H-1,3-dioxin-2-ones include: 4H-1,3-dioxin-2-one, 4-methyl-4H-1,3-dioxin-2-one, 5-methyl-4H-1,3-dioxin-2-one, 6-methyl-4H-1,3-dioxin-2-one, 4,5-dimethyl-4H-1,3-dioxin-2-one, 4,6-dimethyl-4H-1,3-dioxin-2-one, 5,6-dimethyl-4H-1,3-dioxin-2-one, 4-phenyl-4H-1,3-dioxin-2-one, 5-phenyl-4H-1,3-dioxin-2-one and 6-phenyl-4H-1,3-dioxin-2-one.

Specific examples of the trimethylene carbonates substituted with a substituent having an aromatic ring or a carbon-carbon double or triple bond include:
4-vinyl-1,3-dioxan-2-one, 4,5-divinyl-1,3-dioxan-2-one, 4-methyl-5-vinyl-1,3-dioxan-2-one, 4-allyl-5-vinyl-1,3-dioxan-2-one, ethynyl-1,3-dioxan-2-one, 4,5-diethynyl-1,3-dioxan-2-one, 4-methyl-5-ethynyl-1,3-dioxan-2-one, 4-vinyl-5-ethynyl-1,3-dioxan-2-one, 4-allyl-5-ethynyl-1,3-dioxan-2-one, 4-phenyl-1,3-dioxan-2-one, 4,5-diphenyl-1,3-dioxan-2-one, 4-phenyl-5-vinyl-1,3-dioxan-2-one, 4-allyl-5-phenyl-1,3-dioxan-2-one, 4-allyl-1,3-dioxan-2-one, 4,5-diallyl-1,3-dioxan-2-one and 4-methyl-5-allyl-1,3-dioxan-2-one.

Of these, particularly preferred unsaturated cyclic carbonates for use in combination with the aromatic compounds of Formula (I) are vinylene carbonate, methylvinylene carbonate, 4,5-dimethylvinylene carbonate, vinylvinylene carbonate, 4,5-vinylvinylene carbonate, allylvinylene carbonate, 4,5-diallylvinylene carbonate, vinylethylene carbonate, 4,5-divinylethylene carbonate, 4-methyl-5-vinylethylene carbonate, allylethylene carbonate, 4,5-diallylethylene carbonate, 4-methyl-5-allylethylene carbonate, 4-allyl-5-vinylethylene carbonate, ethynylethylene carbonate, 4,5-diethynylethylene carbonate, 4-methyl-5-ethynylethylene carbonate and 4-vinyl-5-ethynyl ethylene carbonate. Vinylene carbonate, vinylethylene carbonate and ethynylethylene carbonate are particularly preferable because they form a highly stable protective interfacial film.

The molecular weight of the unsaturated cyclic carbonates is preferably 86 or more, and is preferably 250 or less, and more preferably 150 or less. This range of molecular weights ensures that the unsaturated cyclic carbonate will exhibit solubility with respect to the nonaqueous electrolytic solution and the advantageous effects of the invention are achieved easily. The unsaturated cyclic carbonates may be produced by any methods without limitation, and known production methods may be selected appropriately.

The unsaturated cyclic carbonates may be used singly, or two or more may be used in combination in an appropriate ratio.

In 100 mass % of the electrolytic solution, the amount of the unsaturated cyclic carbonate (the total amount when two or more kinds of the carbonates are used) may be 0.001 mass % or above, preferably 0.01 mass % or above, and more preferably 0.1 mass % or above, and may be preferably 5 mass %, more preferably 4 mass % or less, and still more preferably 3 mass % or less. This amount ensures that the obtainable nonaqueous electrolyte batteries will achieve a sufficient enhancement in cycle characteristics and also ensures that the decrease in high-temperature storage characteristics will be prevented and consequently heavy gas generation and poor retention of discharge capacity will be avoided.

The mass ratio between the aromatic compound represented by Formula (I) and the unsaturated cyclic carbonate (the total mass when two or more kinds of the carbonates are used) is preferably 1:99 to 99:1, more preferably 10:90 to 90:10, and particularly preferably 20:80 to 80:20. This ratio ensures that OCV after discharge storage may be enhanced without a decrease in battery characteristics.

1-2-9. Fluorine-Free Carboxylate Esters

The electrolytic solution of the invention may further include a fluorine-free carboxylate ester. In the electrolytic solution of the invention, the combined use of the aromatic compound represented by Formula (I) and the fluorine-free carboxylate ester improves high-temperature storage characteristics of batteries. The fluorine-free carboxylate esters are not particularly limited as long as the carboxylate esters have no fluorine atoms in the molecule. Fluorine-free chain carboxylate esters are preferable. The total number of carbon atoms in the fluorine-free chain carboxylate esters is preferably 3 to 7, more preferably 4 to 6, and still more preferably 5.

Examples of the fluorine-free chain carboxylate esters include the following:

methyl acetate, ethyl acetate, n-propyl acetate, isopropyl acetate, n-butyl acetate, isobutyl acetate, tert-butyl acetate, methyl propionate, ethyl propionate, n-propyl propionate, isopropyl propionate, n-butyl propionate, isobutyl propionate, tert-butyl propionate, methyl butyrate, ethyl butyrate, n-propyl butyrate, isopropyl butyrate, methyl isobutyrate, ethyl isobutyrate, n-propyl isobutyrate and isopropyl isobutyrate.

From the points of view of low viscosity and consequent enhancement in ion conductivity, for example, methyl acetate, ethyl acetate, n-propyl acetate, n-butyl acetate, methyl propionate, ethyl propionate, n-propyl propionate, isopropyl propionate, methyl butyrate, ethyl butyrate, n-propyl butyrate and n-butyl butyrate are preferable. Methyl acetate, ethyl acetate, methyl propionate, ethyl propionate, n-propyl propionate and isopropyl propionate are more preferable. Methyl propionate and ethyl propionate are still more preferable.

The fluorine-free carboxylate esters may be used singly, or two or more may be used in combination in an appropriate ratio.

The amount of the fluorine-free carboxylate ester (the total amount when two or more kinds of the esters are used) may be 0.1 mass % or above, preferably 0.5 mass % or above, and more preferably 1 mass % or above, and may be preferably 10 mass % or less, more preferably 5 mass % or less, and still more preferably 3 mass % or less. In 100 vol % of the nonaqueous solvent, the content thereof may be 1 vol % or above, preferably 5 vol % or above, more preferably 10 vol % or above, and still more preferably 20 vol % or above, and may be 50 vol % or less, more preferably 45 vol % or less, and still more preferably 40 vol % or less. This amount ensures that the increase in negative electrode resistance is suppressed and characteristics such as output characteristics, load characteristics, low-temperature characteristics, cycle characteristics and high-temperature storage characteristics are controlled with ease.

1-2-10. Cyclic Ethers

The cyclic ethers are not particularly limited as long as the ethers have a ring structure in the molecule. Compounds represented by Formula (10) are preferable. The cyclic ethers contribute to the improvement in high-temperature storage characteristics of batteries. In the electrolytic solution of the invention, the combined use thereof with the aromatic compound of Formula (I) also provides good initial characteristics.

(10) [Chem. 23]

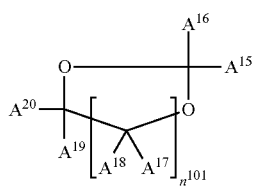

(In the formula, $A^{15}$ to $A^{20}$ are independently a hydrogen atom, a fluorine atom or an optionally substituted hydrocarbon group having 1 to 5 carbon atoms, and $n^{101}$ is an integer of 1 to 4. When $n^{101}$ is an integer of 2 or greater, the pluralities of $A^{17}$ and $A^{18}$ may be the same as or different from one another.)

Any two selected from $A^{15}$ to $A^{20}$ may be bonded together to form a ring. In this case, it is preferable that $A^{17}$ and $A^{18}$ form a ring structure. The total number of carbon atoms in $A^{15}$ to $A^{20}$ is preferably 0 to 8, more preferably 0 to 4, still more preferably 0 to 2, and particularly preferably 0 to 1.

Specific examples of the substituents include halogen atoms, optionally halogenated alkyl, alkenyl, alkynyl, aryl and alkoxy groups, cyano groups, isocyanate groups, ether groups, carbonate groups, carbonyl groups, carboxyl groups, alkoxycarbonyl groups, acyloxy groups, sulfonyl groups, phosphanetriyl groups and phosphoryl groups. Of these, halogen atoms, alkoxy groups, optionally halogenated alkyl, alkenyl and alkynyl groups, isocyanate groups, cyano groups, ether groups, carbonyl groups, alkoxycarbonyl groups and acyloxy groups are preferable. Unhalogenated alkyl groups, cyano groups and ether groups are more preferable.

In Formula (10), $n^{101}$ is preferably an integer of 1 to 3, and more preferably an integer of 1 to 2. Still more preferably, $n^{101}$ is 2.

Examples of the hydrocarbon groups with 1 to 5 carbon atoms represented by $A^{15}$ to $A^{20}$ include monovalent hydrocarbon groups such as alkyl groups, alkenyl groups, alkynyl groups and aryl groups; and divalent hydrocarbon groups such as alkylene groups, alkenylene groups, alkynylene groups and arylene groups. Of these, alkyl groups and alkylene groups are preferable, and alkyl groups are more preferable.

Specific examples of the hydrocarbon groups having 1 to 5 carbon atoms include:

alkyl groups having 1 to 5 carbon atoms such as methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group and 1,2-dimethylpropyl group;

alkenyl groups having 2 to 5 carbon atoms such as vinyl group, 1-propenyl group, 2-propenyl group, isopropenyl group, 1-butenyl group, 2-butenyl group, 3-butenyl group, 1-pentenyl group, 2-pentenyl group, 3-pentenyl group and 4-pentenyl group;

alkynyl groups having 2 to 5 carbon atoms such as ethynyl group, 1-propynyl group, 2-propynyl group, 1-butynyl group, 2-butynyl group, 3-butynyl group, 1-pentynyl group, 2-pentynyl group, 3-pentynyl group and 4-pentynyl group;

alkylene groups having 1 to 5 carbon atoms such as methylene group, ethylene group, trimethylene group, tetramethylene group and pentamethylene group;

alkenylene groups having 2 to 5 carbon atoms such as vinylene group, 1-propenylene group, 2-propenylene group, 1-butenylene group, 2-butenylene group, 1-pentenylene group and 2-pentenylene group; and alkynylene groups having 2 to 5 carbon atoms such as ethynylene group, propynylene group, 1-butynylene group, 2-butynylene group, 1-pentynylene group and 2-pentynylene group. Of these, preferred groups are alkylene groups having 1 to 5 carbon atoms such as methylene group, ethylene group, trimethylene group, tetramethylene group and pentamethylene group. Alkylene groups having 2 to 5 carbon atoms such as ethylene group, trimethylene group, tetramethylene group and pentamethylene group are more preferable. Alkylene groups having 3 to 5 carbon atoms such as trimethylene group, tetramethylene group and pentamethylene group are still more preferable.

$A^{15}$ to $A^{20}$ represent hydrogen atoms, fluorine atoms or hydrocarbon groups having 1 to 5 carbon atoms, specifically, hydrogen atoms, fluorine atoms or combinations of the aforementioned substituents and the above hydrocarbon groups having 1 to 5 carbon atoms. They preferably represent hydrogen atoms, unsubstituted hydrocarbon groups having 1 to 5 carbon atoms or etherified alkylene groups in which the carbon chains of the alkylene groups are partially substituted by ether groups, and more preferably represent hydrogen atoms.

Examples of the compounds represented by Formula (10) include the following compounds:

[Chem. 24]

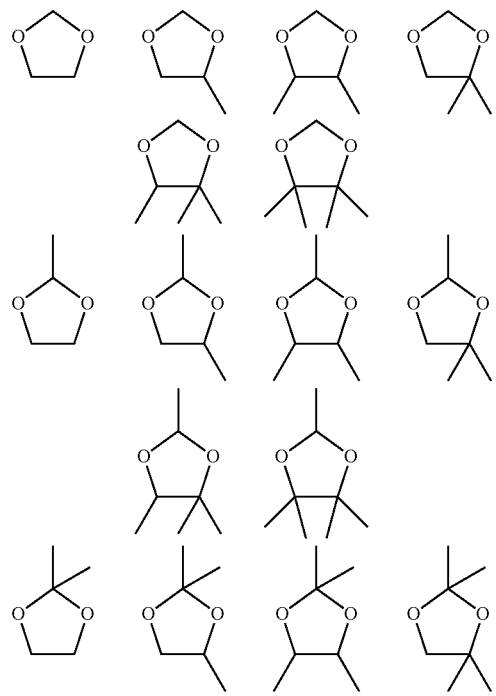

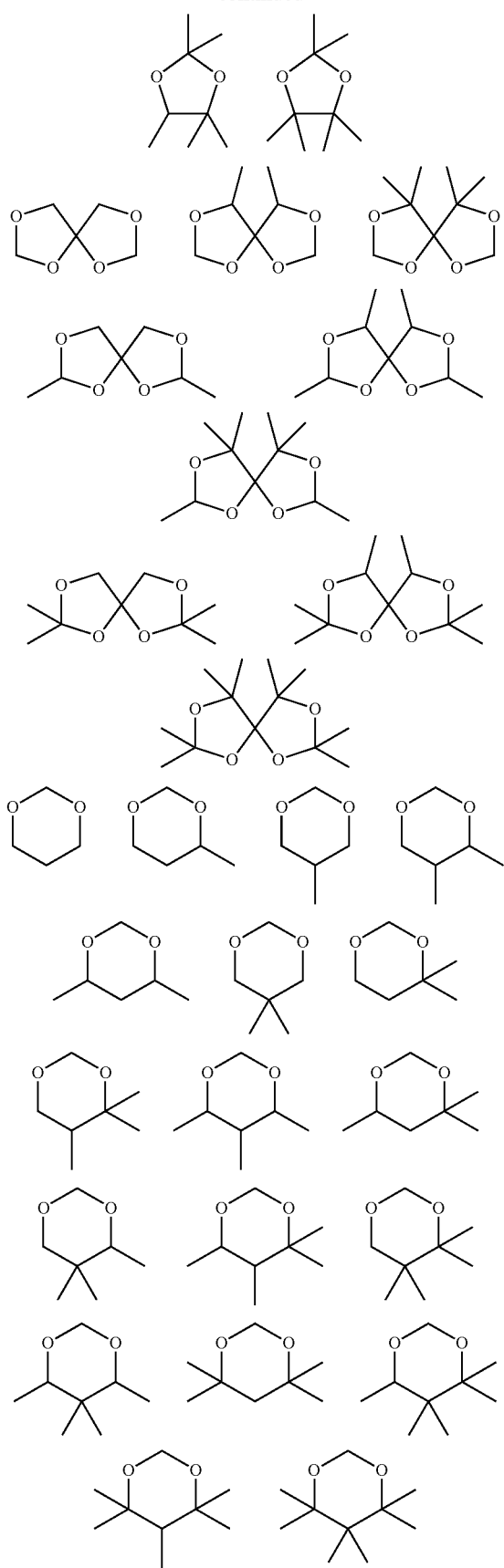
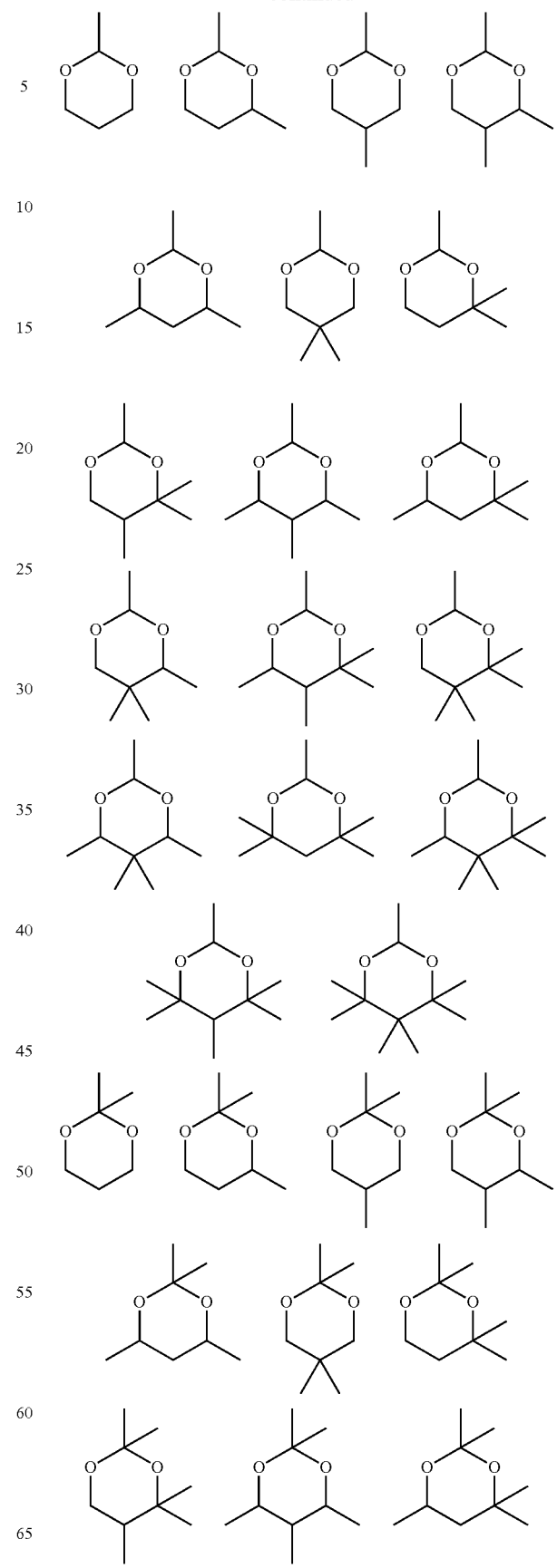

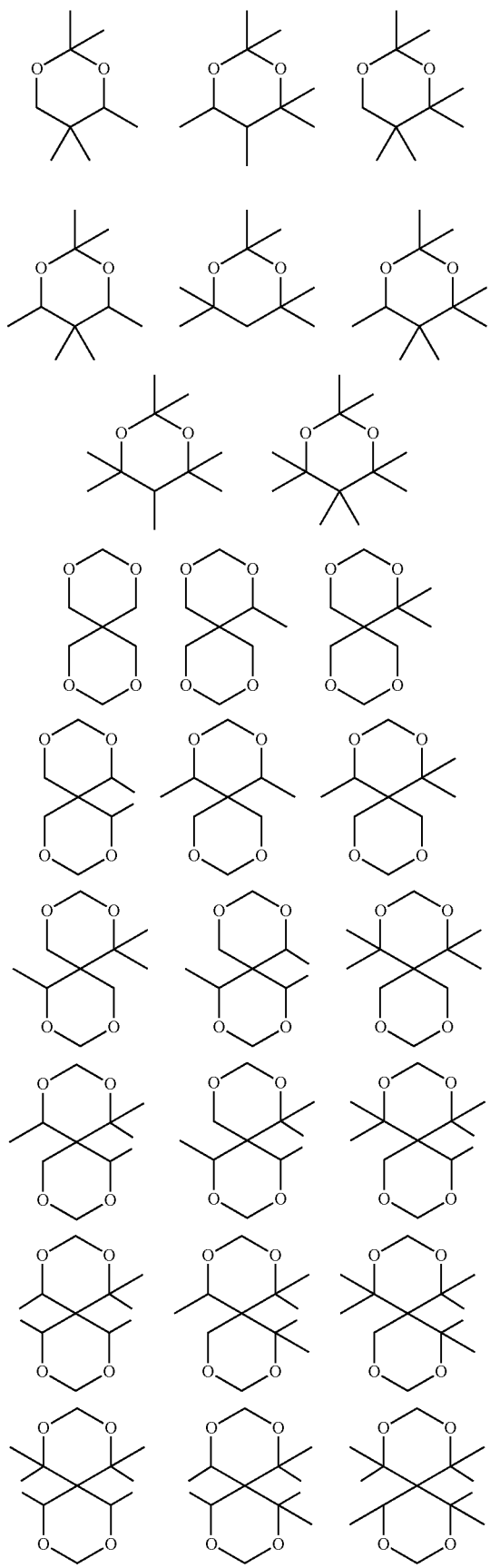
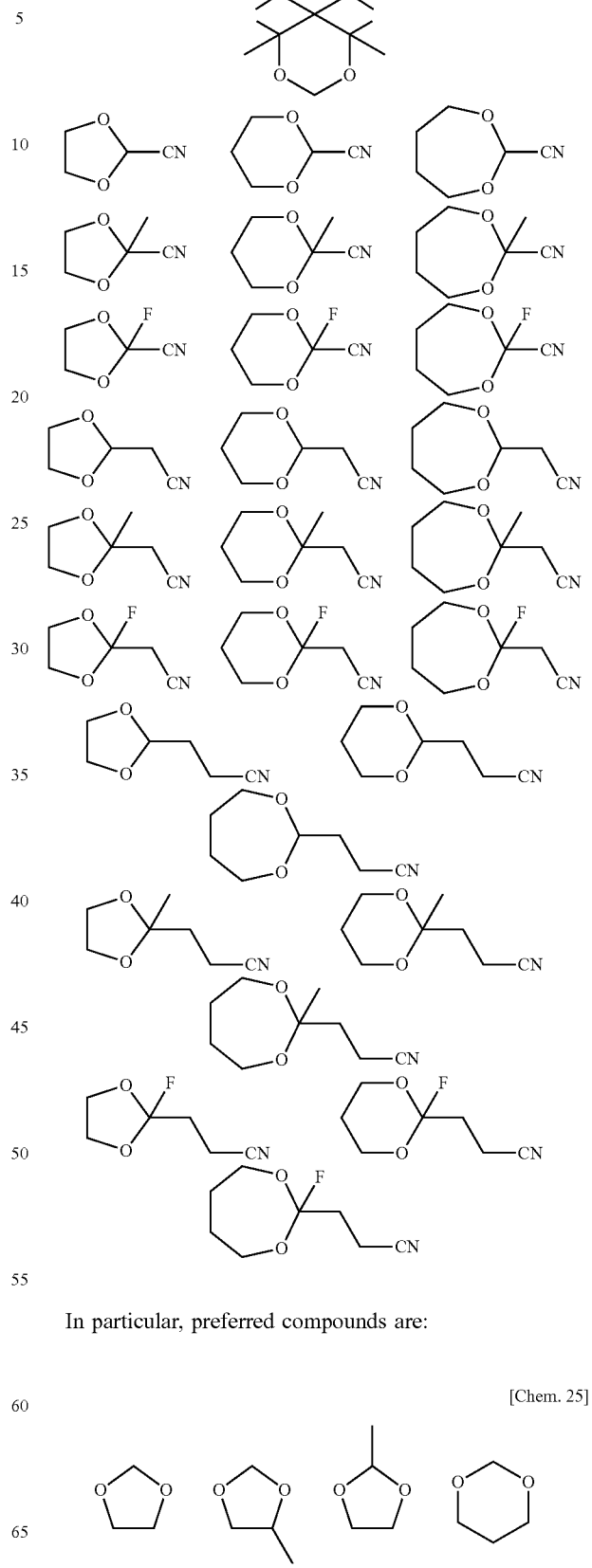
In particular, preferred compounds are:
[Chem. 25]

-continued

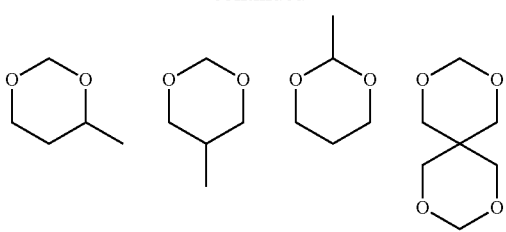

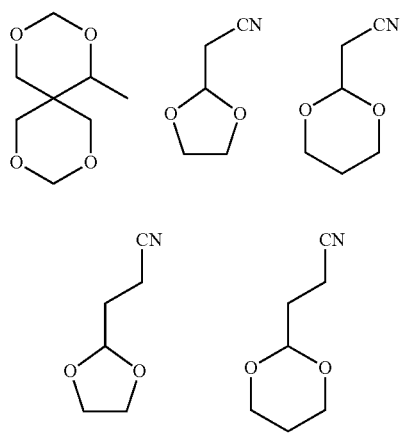

More preferred compounds are:

[Chem. 26]

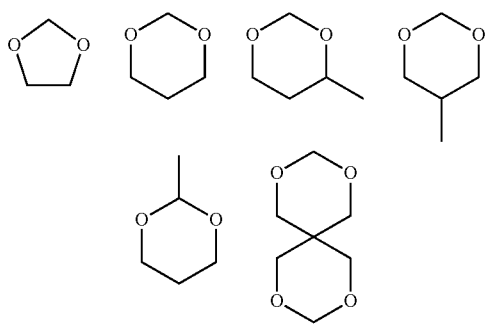

The cyclic ethers may be used singly, or two or more may be used in combination in an appropriate ratio. In 100 mass % of the electrolytic solution, the amount of the cyclic ether (the total amount when two or more kinds of the ethers are used) may be 0.001 mass % or above, preferably 0.01 mass % or above, more preferably 0.1 mass % or above, and particularly preferably 0.3 mass % or above, and may be 10 mass % or less, preferably 5 mass % or less, more preferably 3 mass % or less, and still more preferably 2 mass % or less. This amount ensures easy control of characteristics such as output characteristics, load characteristics, low-temperature characteristics, cycle characteristics and high-temperature storage characteristics.

1-2-11. Isocyanurate Skeleton-Containing Compounds

The isocyanurate skeleton-containing compounds are not particularly limited as long as the compounds have an isocyanurate skeleton. Compounds represented by Formula (11) below are preferable.

(11)

[Chem. 27]

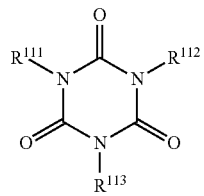

(In the formula, $R^{111}$ to $R^{113}$ are independently an organic group with 1 to 12 carbon atoms that is composed of one or more kinds of atoms selected from the group consisting of hydrogen atoms, carbon atoms, nitrogen atoms, oxygen atoms, sulfur atoms, phosphorus atoms, silicon atoms and halogen atoms.)

No rings are formed by the bonding of any of $R^{111}$ to $R^{113}$.

Here, the organic groups with 1 to 12 carbon atoms that are composed of one or more kinds of atoms selected from the group consisting of hydrogen atoms, carbon atoms, nitrogen atoms, oxygen atoms, sulfur atoms, phosphorus atoms, silicon atoms and halogen atoms include not only those organic groups which are composed of carbon and hydrogen atoms, but also those organic groups which optionally further contain nitrogen, oxygen, sulfur, phosphorus, silicon or halogen atoms. Those organic groups which optionally further contain nitrogen, oxygen, sulfur, phosphorus, silicon or halogen atoms include those organic groups in which the carbon atoms in the skeleton are partially substituted by such atoms, and those organic groups which have a substituent composed of such atoms.

$R^{111}$ to $R^{113}$ are preferably optionally substituted hydrocarbon groups having 1 to 10 carbon atoms, and more preferably optionally substituted hydrocarbon groups having 1 to 5 carbon atoms.

Specific examples of the substituents include halogen atoms, optionally halogenated alkyl, alkenyl, alkynyl, aryl and alkoxy groups, cyano groups, isocyanate groups, ether groups, carbonate groups, carbonyl groups, carboxyl groups, alkoxycarbonyl groups, alkoxycarbonyl groups, acyloxy groups, sulfonyl groups, phosphanetriyl groups and phosphoryl groups. Of these, preferred groups are halogen atoms, alkyl groups, cyano groups, ether groups, carbonate groups, carbonyl groups, carboxyl groups and acyloxy groups. Halogen atoms, alkyl groups, cyano groups and acyloxy groups are more preferable. Alkyl groups, cyano groups and acyloxy groups are still more preferable. Alkyl groups are particularly preferable.

Preferably, at least one of $R^{111}$ to $R^{113}$ is an organic group having a carbon-carbon unsaturated bond or a cyano group. More preferably, at least one of $R^{111}$ to $R^{113}$ is an organic group having a carbon-carbon unsaturated bond.

The hydrocarbon groups are preferably alkyl groups, alkenyl groups, alkynyl groups or aryl groups, and are more preferably alkyl groups or alkenyl groups.

Specific examples of the hydrocarbon groups having 1 to 10 carbon atoms include:

alkyl groups such as methyl group, ethyl group, n-propyl group, n-butyl group, n-pentyl group, cyclopropyl group, cyclopentyl group and cyclohexyl group;

alkenyl groups such as vinyl group, 1-propenyl group, 2-propenyl group (allyl group), 1-butenyl group, 2-butenyl group, 3-butenyl group, 1-pentenyl group, 2-pentenyl group, 3-pentenyl group and 4-pentenyl group;

alkynyl groups such as ethynyl group, 1-propynyl group, 2-propynyl group, 1-butynyl group, 2-butynyl group, 3-butynyl group, 1-pentynyl group, 2-pentynyl group, 3-pentynyl group and 4-pentynyl group; and aryl groups such as phenyl group, tolyl group, benzyl group and phenethyl group.

Of these, preferred groups are alkyl groups such as methyl group, ethyl group, n-propyl group, n-butyl group, n-pentyl group, cyclopropyl group, cyclopentyl group and cyclohexyl group, and alkenyl groups such as vinyl group, 1-propenyl group, 2-propenyl group (allyl group), 1-butenyl group, 2-butenyl group, 3-butenyl group, 1-pentenyl group, 2-pentenyl group, 3-pentenyl group and 4-pentenyl group. Methyl group, ethyl group, n-propyl group, n-butyl group, vinyl group, 1-propenyl group, 2-propenyl group (allyl group), 1-butenyl group, 2-butenyl group and 3-butenyl group are more preferable. Ethyl group, n-propyl group and 2-propenyl group (allyl group) are still more preferable.

The optionally substituted hydrocarbon groups having 1 to 10 carbon atoms are combinations of the aforementioned substituents and the above hydrocarbon groups having 1 to 10 carbon atoms. Examples thereof include 2-methylallyl group (methallyl group), 2-cyanoethyl group, 2-acryloyloxyethyl group and 2-methacryloyloxyethyl group, with 2-methylallyl group (methallyl group) and 2-acryloyloxyethyl group being preferable, and 2-propenyl group (allyl group) being more preferable. Unsubstituted hydrocarbon groups having 1 to 10 carbon atoms are preferable.

Specific examples of the compounds of Formula (11) for use in the present invention include those compounds having the following structures:

[Chem. 28]

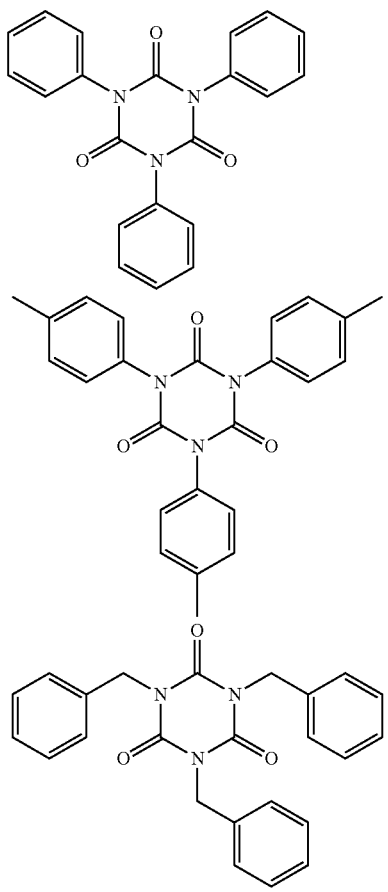

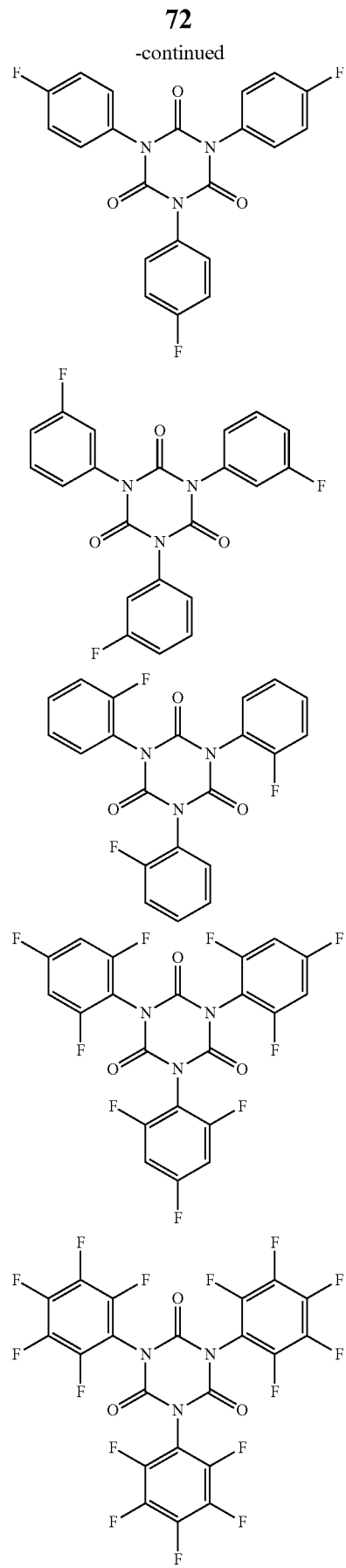

-continued
73
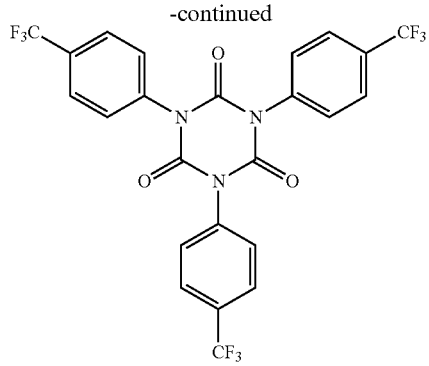
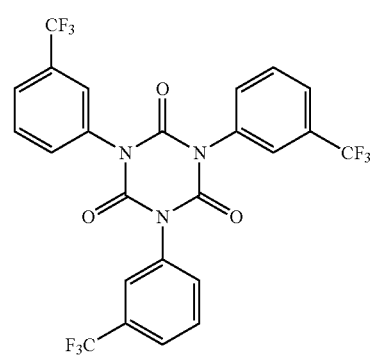
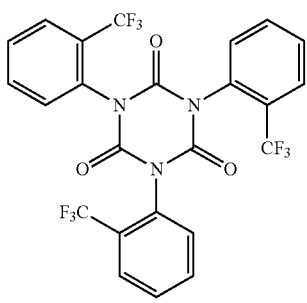
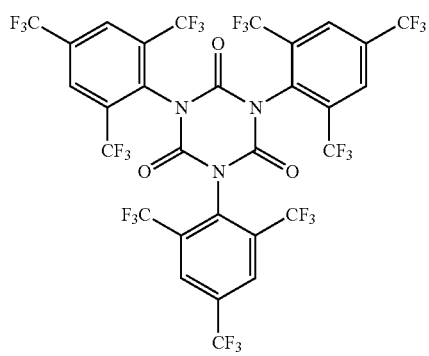
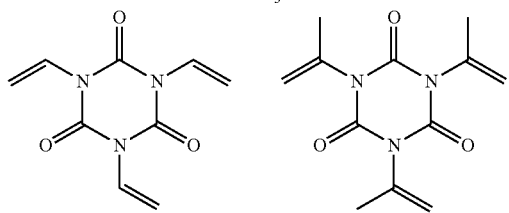
74
-continued
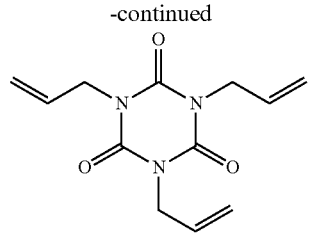
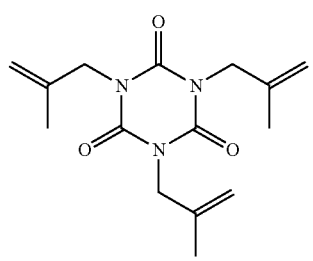
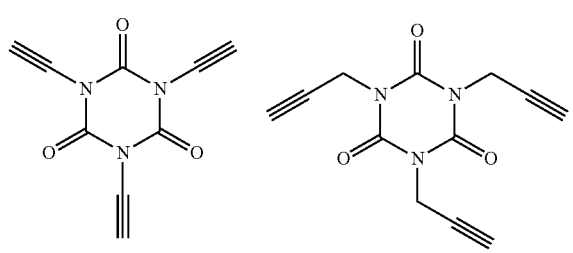
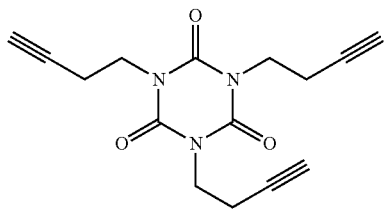
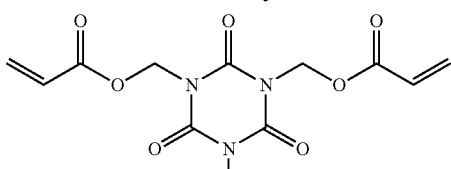
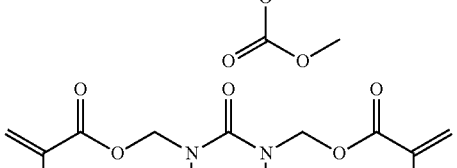
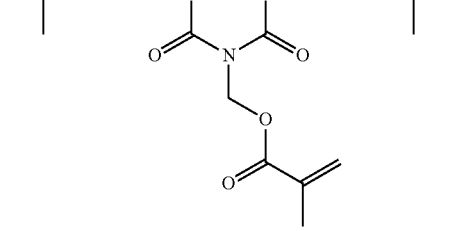

75
-continued
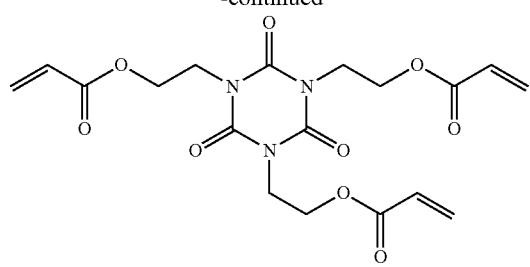
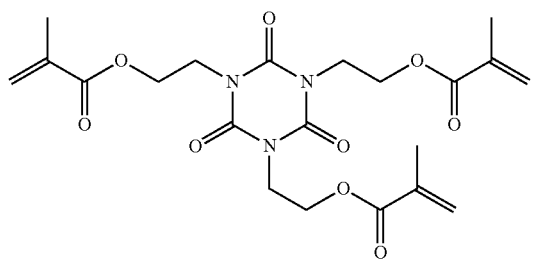
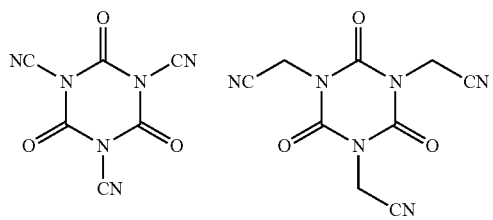
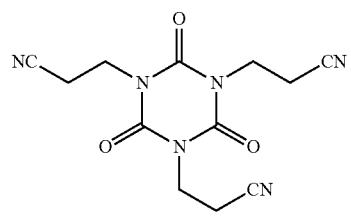
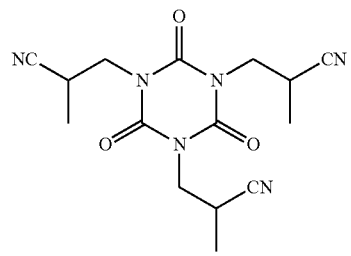
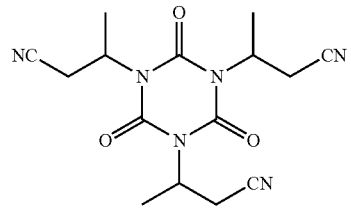
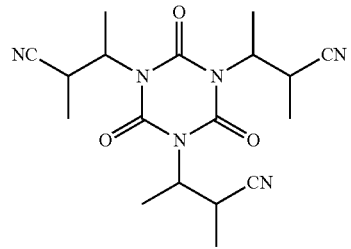
76
-continued
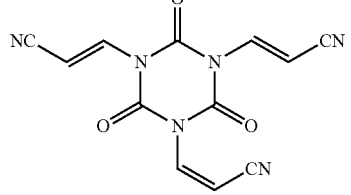
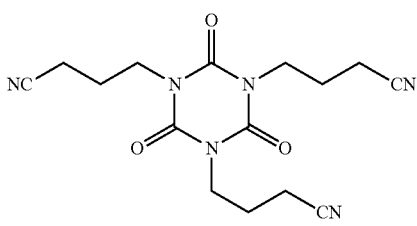
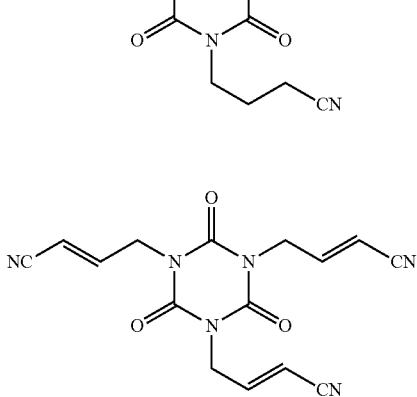
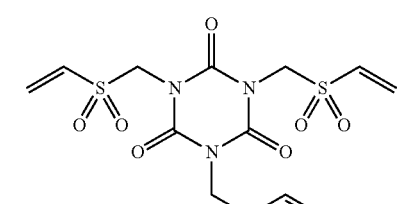
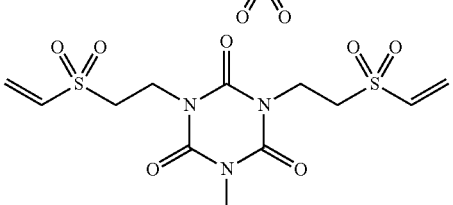
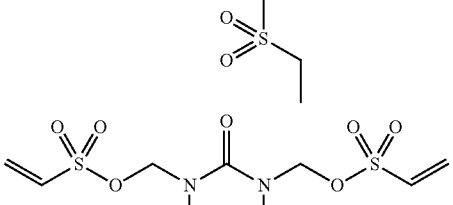
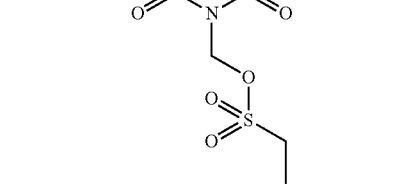

77
-continued
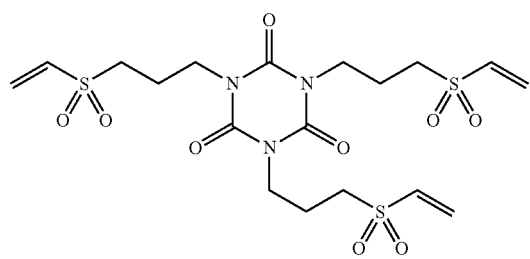
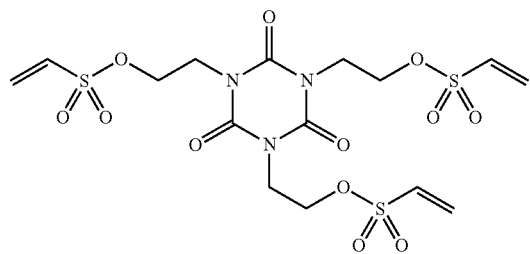
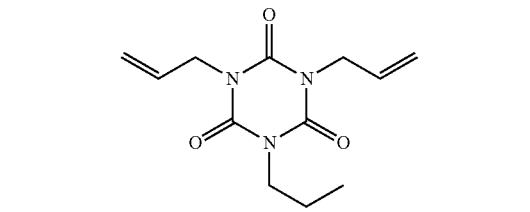
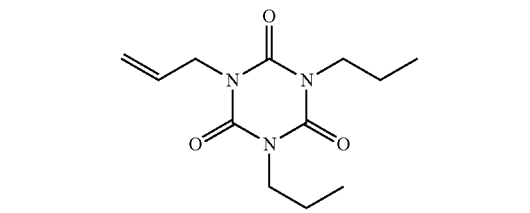
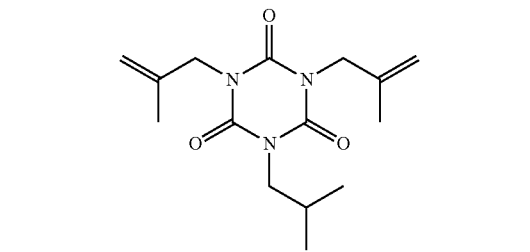
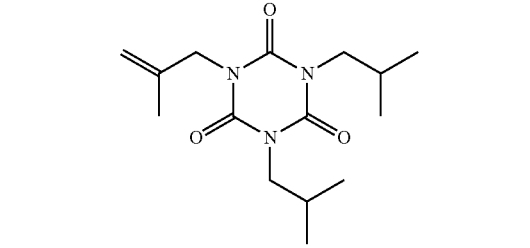
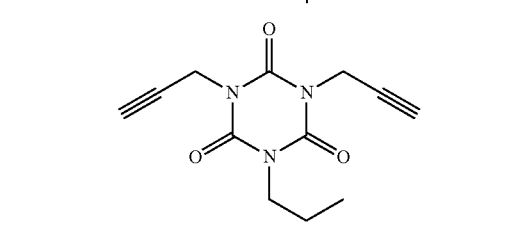
78
-continued
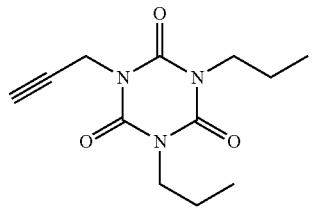
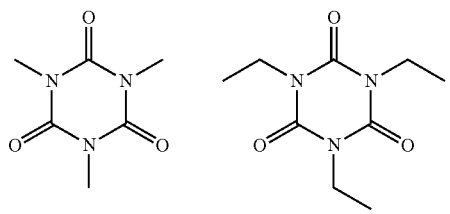
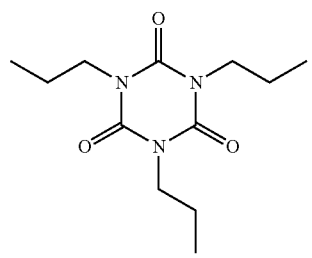
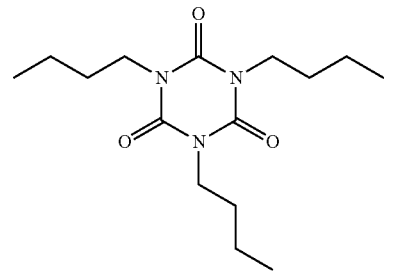
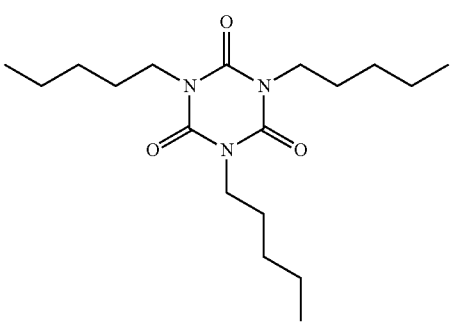
Preferred examples include those compounds having the following structures:

[Chem. 29]
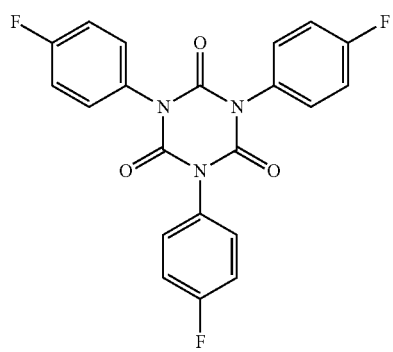
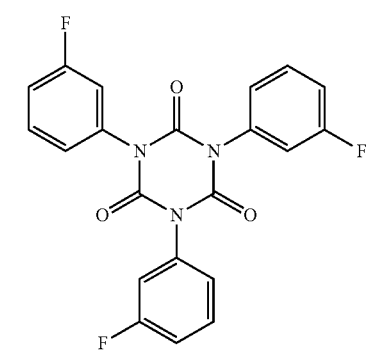
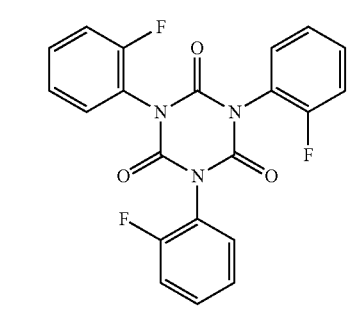
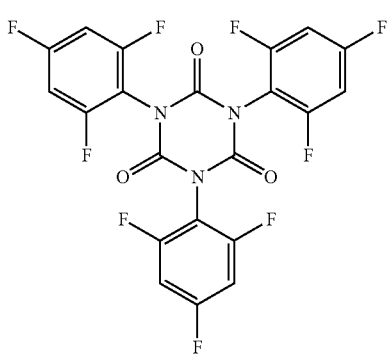
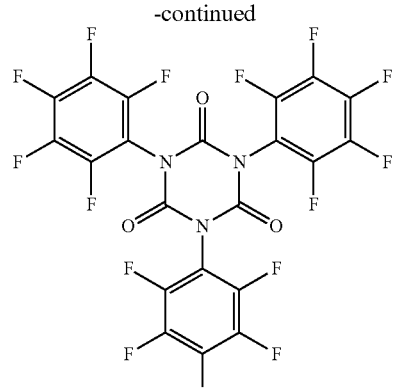
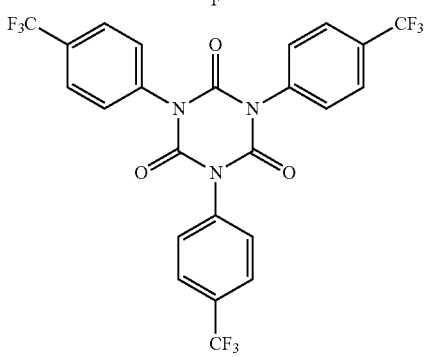
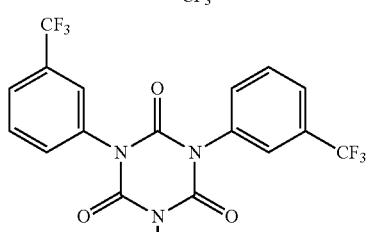
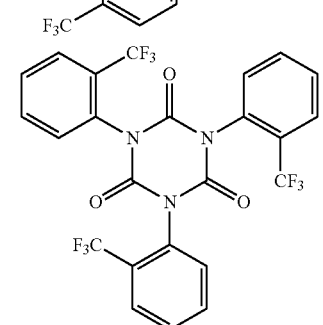
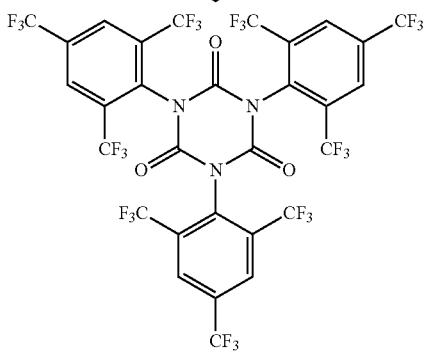

81
-continued
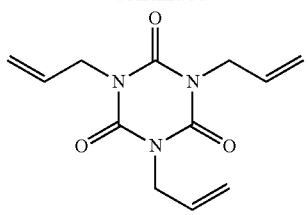
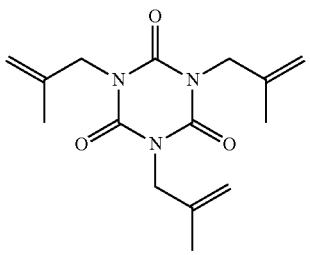
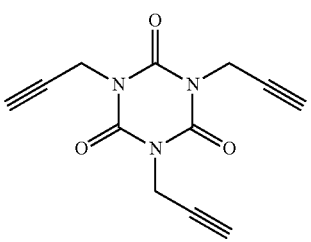
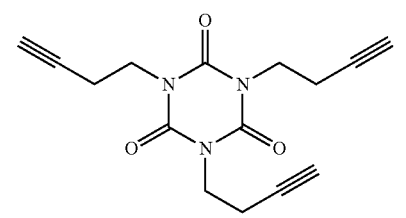
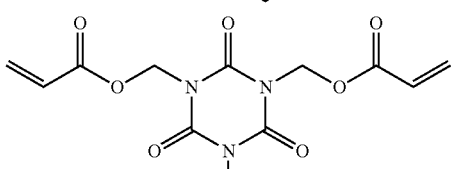
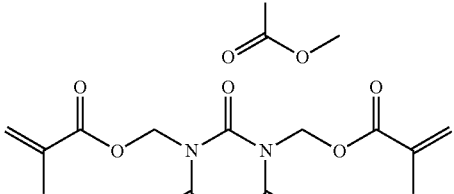
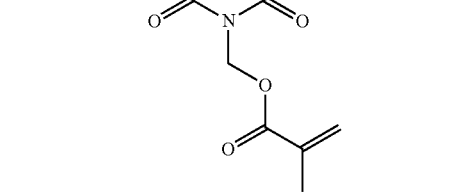
82
-continued
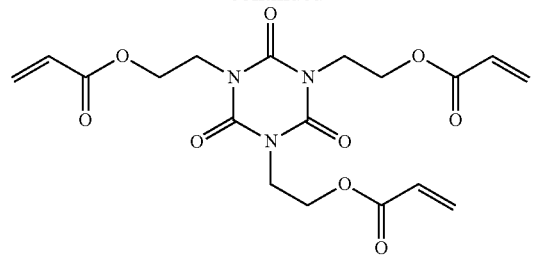
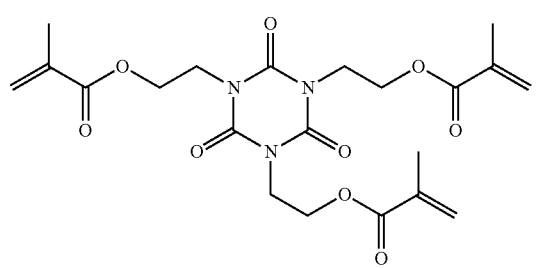
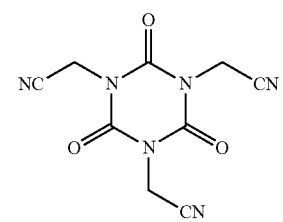
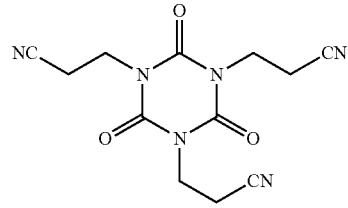
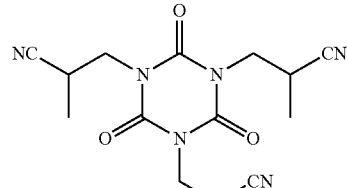
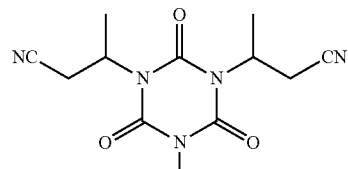

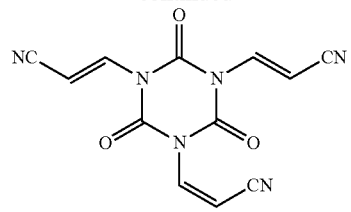
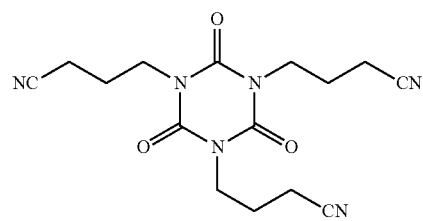
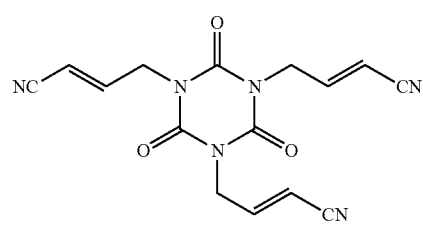
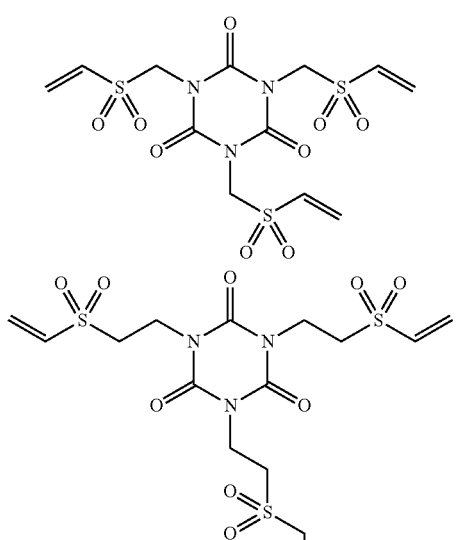
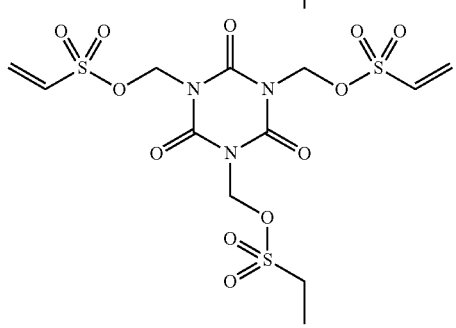
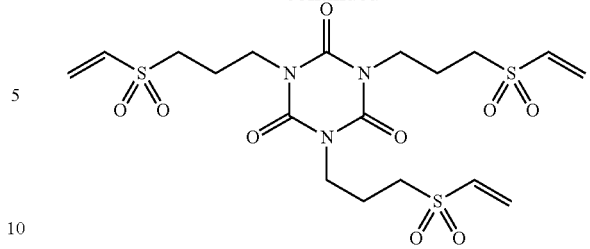
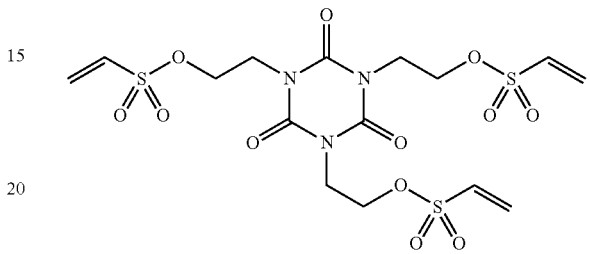
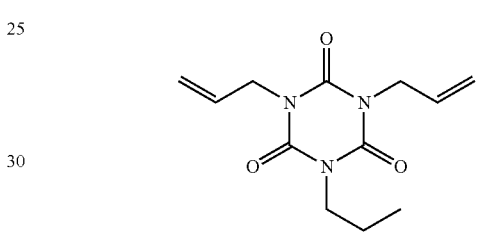
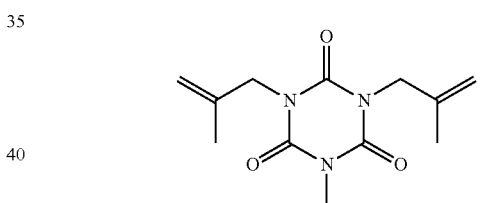
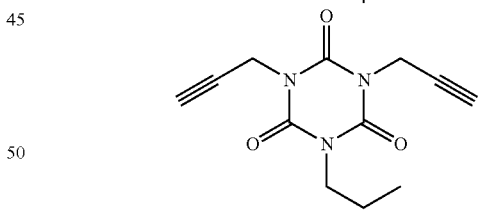
More preferred examples include those compounds having the following structures:
[Chem. 30]
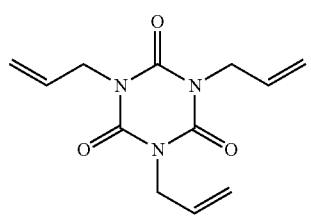

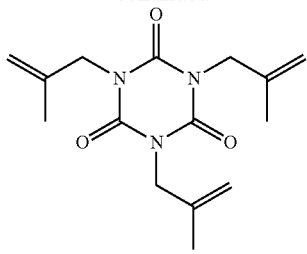
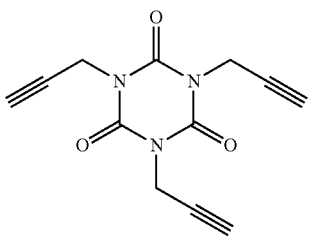
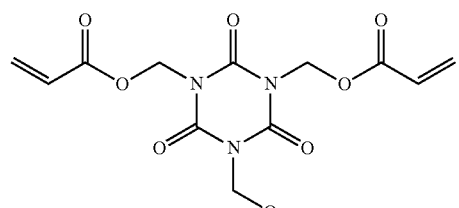
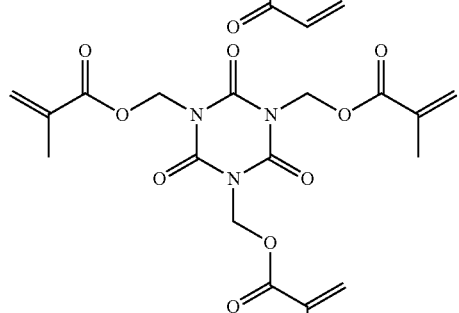
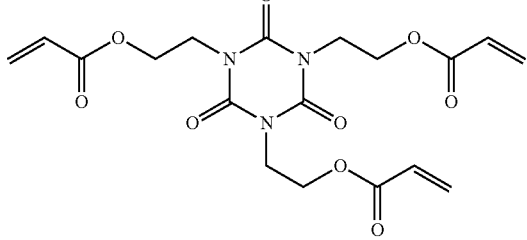
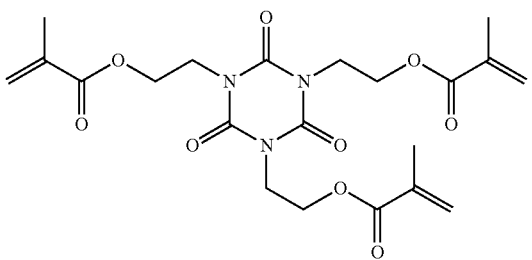
Particularly preferred examples include those compounds having the following structures:
[Chem. 31]
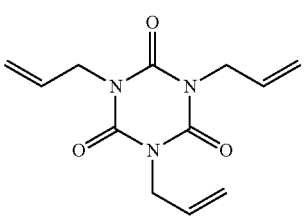

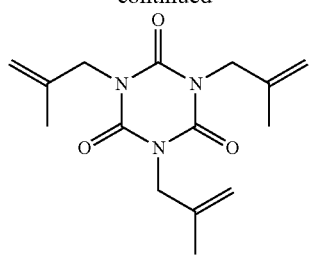
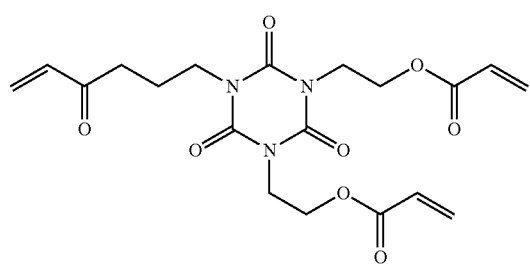
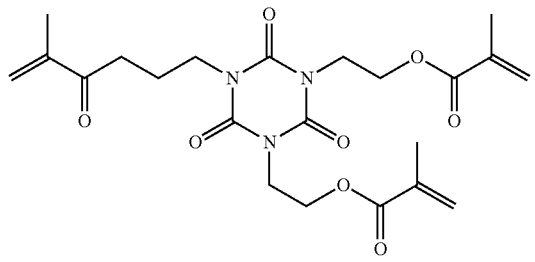
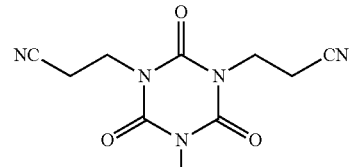
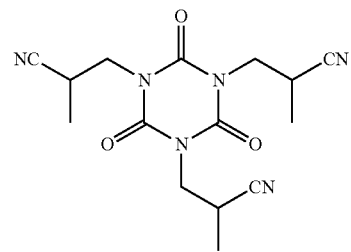
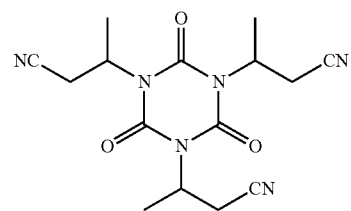
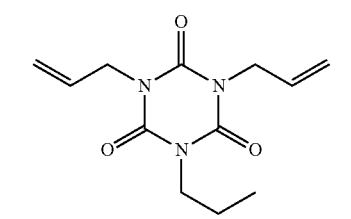
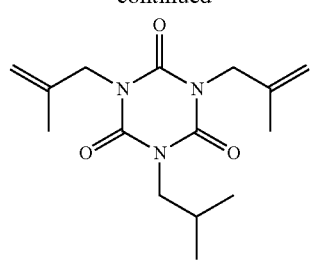
The most preferred examples include those compounds having the following structures:
[Chem. 32]
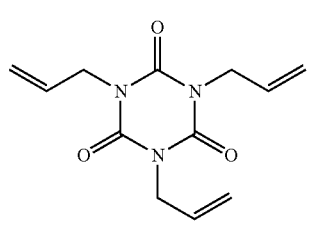
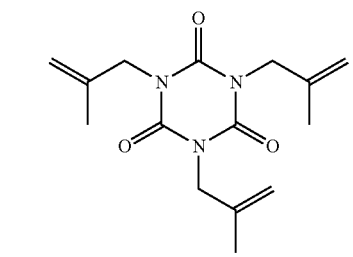
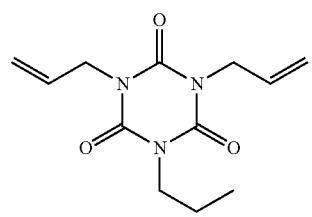
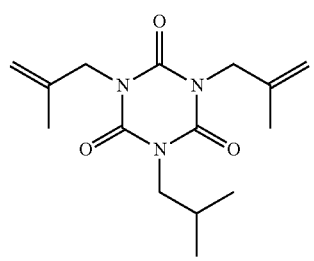
Of the most preferred compounds, those compounds having the following structure are preferable from the point of view of the capability of forming films on negative electrodes.

[Chem. 33]

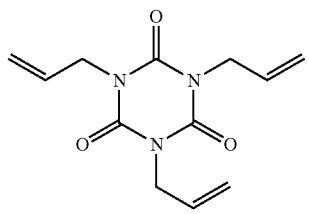

The isocyanurate skeleton-containing compounds may be produced by any methods without limitation, and known production methods may be selected appropriately.

The compounds described as having an isocyanurate skeleton may be used singly, or two or more may be used in combination in an appropriate ratio. In 100 mass % of the electrolytic solution, the amount of the isocyanurate skeleton-containing compound (the total amount when two or more kinds of the compounds are used) may be 0.001 mass % or above, preferably 0.01 mass % or above, more preferably 0.1 mass % or above, and still more preferably 0.2 mass % or above, and may be 10 mass % or less, preferably 5 mass % or less, more preferably 3 mass % or less, still more preferably 2 mass % or less, particularly preferably 1 mass % or less, and most preferably 0.5 mass % or less. This amount ensures that the electrode reaction is prevented from inhibition due to the excessive coverage of the negative electrode surface with reduction products, and also ensures that the compound acts at the electrode interface more favorably to make it possible to optimize battery characteristics.

When a nonaqueous electrolyte secondary battery manufactured using a nonaqueous electrolytic solution which includes an isocyanurate skeleton-containing compound is disassembled and the nonaqueous electrolytic solution is recovered, it is frequently the case that the content of the compound in the electrolytic solution has been significantly decreased from the original. Thus, the scope of the present invention includes any nonaqueous electrolytic solutions that contain an isocyanurate skeleton-containing compound after being withdrawn from batteries, no matter how trace the amount being detected. Further, when a nonaqueous electrolyte secondary battery manufactured using a non-aqueous electrolytic solution which includes an isocyanurate skeleton-containing compound is disassembled and the nonaqueous electrolytic solution is recovered, it is frequently the case that the isocyanurate skeleton-containing compound is scarcely found in the nonaqueous electrolytic solution but is detected on members constituting the nonaqueous electrolyte secondary battery, specifically, on a positive electrode, a negative electrode or a separator. Thus, the total amount of the isocyanurate skeleton-containing compound detected on the positive electrode, the negative electrode and the separator may be assumed to have come from the nonaqueous electrolytic solution. It is preferable that the specific compound be present in a content falling in the aforementioned range based on this assumption.

1-3. Electrolytes

The electrolytes are not particularly limited, and known electrolytes may be used appropriately. In the case of lithium secondary batteries, lithium salts are usually used. Specific examples include inorganic lithium salts such as $LiPF_6$, $LiBF_4$, $LiClO_4$, $LiAlF_4$, $LiSbF_6$, $LiTaF_6$ and $LiWF_7$; lithium tungstates such as $LiWOF_5$; lithium carboxylate salts such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$ and $CF_3CF_2CF_2CF_2CO_2Li$; lithium sulfonate salts such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$ and $CF_3CF_2CF_2CF_2SO_3Li$; lithium imide salts such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide and $LiN(CF_3SO_2)(C_4F_9SO_2)$; lithium methide salts such as $LiC(FSO_2)_3$, $LiC(CF_3SO_2)_3$ and $LiC(C_2F_5SO_2)_3$; lithium (malonato)borate salts such as lithium bis(malonato)borate and lithium difluoro(malonato)borate; lithium (malonato)phosphate salts such as lithium tris(malonato)phosphate, lithium difluorobis(malonato)phosphate and lithium tetrafluoro(malonato)phosphate; fluorine-containing organolithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$ and $LiBF_2(C_2F_5SO_2)_2$; lithium oxalatoborate salts such as lithium difluorooxalatoborate and lithium bis(oxalato)borate; and lithium oxalatophosphate salts such as lithium tetrafluorooxalatophosphate, lithium difluorobis(oxalato)phosphate and lithium tris(oxalato)phosphate.

In particular, for example, $LiPF_6$, $LiSbF_6$, $LiTaF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$, $LiPF_3(C_2F_5)_3$, lithium difluorooxalatoborate, lithium bis(oxalato)borate and lithium difluorobis(oxalato)phosphate are particularly preferable because of their effects of enhancing characteristics such as output characteristics, high-rate charge/discharge characteristics, high-temperature storage characteristics and cycle characteristics.

The concentration of these electrolytes in the nonaqueous electrolytic solution is not particularly limited as long as the advantageous effects of the invention are not impaired. In order to ensure good electric conductivity of the electrolytic solution and to ensure good battery performance, the total molar concentration of lithium in the nonaqueous electrolytic solution is preferably 0.3 mol/L or above, more preferably 0.4 mol/L or above, and still more preferably 0.5 mol/L or above, and is preferably 3 mol/L or less, more preferably 2.5 mol/L or less, and still more preferably 2.0 mol/L or less. With this concentration, the electrolytic solution contains an appropriate amount of lithium ions as charged particles and also exhibits an appropriate viscosity. Thus, good electric conductivity is easily ensured.

When two or more kinds of the electrolytes are used in combination, it is preferable that at least one be a salt selected from the group consisting of monofluorophosphate salts, difluorophosphate salts, borate salts, oxalate salts and fluorosulfonate salts. Of these, lithium salts are preferred. The amount of the salt selected from the group consisting of monofluorophosphate salts, difluorophosphate salts, borate salts, oxalate salts and fluorosulfonate salts may be 0.01 mass % or above, and preferably 0.1 mass % or above, and may be 20 mass % or less, and preferably 10 mass % or less.

It is preferable that the electrolytes include one or more salts selected from the group consisting of monofluorophosphate salts, difluorophosphate salts, borate salts, oxalate salts and fluorosulfonate salts, and one or more additional salts. Examples of the additional salts include the lithium salts described above. In particular, preferred salts are $LiPF_6$, $LiN(FSO_2)(CF_3SO_2)$, $LiN(CF_3SO_2)_2$, LiN $(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$ and $LiPF_3(C_2F_5)_3$, with $LiPF_6$ being more preferable. In order to ensure an appropriate balance between the conductivity and the viscosity of the electrolytic solution, the amount of the additional salt may be 0.01 mass % or above, and preferably 0.1 mass % or above, and may be 20 mass % or less, preferably 15 mass % or less, and more preferably 10 mass % or less.

To ensure good battery performance, the total amount of the electrolyte(s) in the nonaqueous electrolytic solution is preferably 0.3 mol/L or above, more preferably 0.4 mol/L or above, and still more preferably 0.5 mol/L or above, and is preferably 3 mol/L or less, more preferably 2.5 mol/L or less, still more preferably 2.0 mol/L or less, and particularly preferably 1.5 mol/L or less.

1-3-1. Monofluorophosphate Salts and Difluorophosphate Salts

The monofluorophosphate salts and the difluorophosphate salts are not particularly limited as long as the salts have at least one monofluorophosphate or difluorophosphate structure in the molecule. In the electrolytic solution of the invention, the combined use of the aromatic compound of Formula (I) and one or more of the monofluorophosphate salts and the difluorophosphate salts results in a marked reduction in volume change after initial charging and discharging of batteries, and a further enhancement in overcharge safety. Further, the combined use makes it possible to reduce the initial irreversible capacity of batteries and to enhance discharge storage characteristics. At the same time, the batteries exhibit excellent high-temperature cycle characteristics.

The counter cations in the monofluorophosphate salts and the difluorophosphate salts are not particularly limited. Examples thereof include lithium, sodium, potassium, magnesium, calcium and ammonium represented by $NR^{121}R^{122}R^{123}R^{124}$ (wherein $R^{121}$ to $R^{124}$ are independently a hydrogen atom or an organic group having 1 to 12 carbon atoms). The organic groups with 1 to 12 carbon atoms represented by $R^{121}$ to $R^{124}$ in the ammonium are not particularly limited. Examples thereof include optionally halogenated alkyl groups, optionally halogenated or alkylated cycloalkyl groups, optionally halogenated or alkylated aryl groups, and optionally substituted, nitrogen-containing heterocyclic groups. In particular, it is preferable that $R^{121}$ to $R^{124}$ be independently, for example, a hydrogen atom, an alkyl group, a cycloalkyl group, a nitrogen-containing heterocyclic group or the like. Preferred counter cations are lithium, sodium and potassium. Lithium is particularly preferable.

Examples of the monofluorophosphate salts and the difluorophosphate salts include lithium monofluorophosphate, sodium monofluorophosphate, potassium monofluorophosphate, lithium difluorophosphate, sodium difluorophosphate and potassium difluorophosphate. Lithium monofluorophosphate and lithium difluorophosphate are preferable, and lithium difluorophosphate is more preferable.

The monofluorophosphate salts and the difluorophosphate salts may be used singly, or two or more may be used in combination in an appropriate ratio.

The amount of one or more salts selected from the monofluorophosphate salts and the difluorophosphate salts (the total amount when two or more kinds of the salts are used) may be 0.001 mass % or above, preferably 0.01 mass % or above, more preferably 0.1 mass % or above, still more preferably 0.2 mass % or above, and particularly preferably 0.3 mass % or above, and may be 5 mass % or less, preferably 3 mass % or less, more preferably 2 mass % or less, still more preferably 1.5 mass % or less, and particularly preferably 1 mass % or less. This amount ensures that the salts produce significant effects in the enhancement of initial irreversible capacity.

The mass ratio between the aromatic compound represented by Formula (I) and one or more selected from the monofluorophosphate salts and the salts (the total mass when two or more kinds of the salts are used) is preferably 1:99 to 99:1, more preferably 10:90 to 90:10, and particularly preferably 20:80 to 80:20. This ratio ensures that the target characteristics may be enhanced without causing a decrease in other battery characteristics.

1-3-2. Borate Salts

The borate salts are not particularly limited as long as the salts have at least one boron atom in the molecule. Those salts that correspond to oxalate salts are not categorized as the borate salts (1-3-2.) but are categorized as the oxalate salts (1-3-3.) described later.

In the electrolytic solution of the invention, the combined use of the aromatic compound of Formula (I) with the borate salt results in a reduction of volume change after initial charging and discharging, and allows batteries to exhibit good high-temperature cycle characteristics. At the same time, the batteries can exhibit good overcharge safety.

Examples of the counter cations in the borate salts include lithium, sodium, potassium, magnesium, calcium, rubidium, cesium and barium, with lithium being preferable.

Preferred borate salts are lithium salts. Lithium borate-containing salts may be also suitably used. Examples include $LiBF_4$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$ and $LiBF_2(C_2F_5SO_2)_2$. In particular, $LiBF_4$ is more preferable because of its effect of enhancing characteristics such as initial charge-discharge efficiency and high-temperature cycle characteristics.

The borate salts may be used singly, or two or more may be used in combination in an appropriate ratio.

The amount of the borate salt (the total amount when two or more kinds of the salts are used) may be 0.05 mass % or above, preferably 0.1 mass % or above, more preferably 0.2 mass % or above, still more preferably 0.3 mass % or above, and particularly preferably 0.5 mass % or above, and may be 10.0 mass % or less, preferably 5.0 mass % or less, more preferably 3.0 mass % or less, still more preferably 2.0 mass % or less, and particularly preferably 1.0 mass % or less. This amount ensures that side reactions on negative electrodes are suppressed and the increase in battery resistance is unlikely to occur.

The mass ratio between the aromatic compound represented by Formula (I) and the borate salt is preferably 1:99 to 99:1, more preferably 10:90 to 90:10, and particularly preferably 20:80 to 80:20. This ratio ensures that side reactions on positive and negative electrodes in batteries are suppressed and the increase in battery resistance is unlikely to occur.

1-3-3. Oxalate Salts

The oxalate salts are not particularly limited as long as the compounds have at least one oxalate structure in the molecule. Batteries which use the electrolytic solution of the invention including the oxalate salt exhibit small volume changes during initial charging and discharging and are prevented from swelling after cycles at high temperatures.

Preferred oxalate salts are metal salts represented by Formula (9) below which have an oxalate complex as the anion.

[Chem. 34]

(In the formula, $M^1$ is an element selected from the group consisting of Group 1 and Group 2 in the periodic table and aluminum (Al), $M^2$ is an element selected from the group consisting of transition metals, and Group 13, Group 14 and Group 15 in the periodic table, $R^{91}$ is a group selected from the group consisting of halogens, alkyl groups having 1 to 11 carbon atoms and halogen-substituted alkyl groups having 1 to 11 carbon atoms, a and b are positive integers, c is 0 or a positive integer, and d is an integer of 1 to 3.)

From the point of view of battery characteristics obtained when the electrolytic solution of the invention is used for lithium secondary batteries, $M^1$ is preferably lithium, sodium, potassium, magnesium or calcium, and is particularly preferably lithium.

In terms of electrochemical stability in lithium secondary batteries, $M^2$ is particularly preferably boron or phosphorus.

Examples of $R^{91}$ include fluorine, chlorine, methyl group, trifluoromethyl group, ethyl group, pentafluoroethyl group, propyl group, isopropyl group, butyl group, sec-butyl group and tert-butyl group, with fluorine and trifluoromethyl group being preferable.

Examples of the metal salts represented by Formula (9) include the following:

lithium oxalatoborate salts such as lithium difluorooxalatoborate and lithium bis(oxalato)borate; and lithium oxalatophosphate salts such as lithium tetrafluorooxalatophosphate, lithium difluorobis(oxalato)phosphate and lithium tris(oxalato)phosphate.

Of these, lithium bis(oxalato)borate and lithium difluorobis(oxalato)phosphate are preferable, and lithium bis(oxalato)borate is more preferable.

The oxalate salts may be used singly, or two or more may be used in combination in an appropriate ratio.

The amount of the oxalate salt (the total amount when two or more kinds of the salts are used) may be 0.001 mass % or above, preferably 0.01 mass % or above, more preferably 0.1 mass % or above, and particularly preferably 0.3 mass % or above, and may be 10 mass % or less, preferably 5 mass % or less, more preferably 3 mass % or less, still more preferably 2 mass % or less, and particularly preferably 1 mass % or less. This amount ensures easy control of characteristics such as output characteristics, load characteristics, low-temperature characteristics, cycle characteristics and high-temperature storage characteristics.

The mass ratio between the aromatic compound represented by Formula (I) and the oxalate salt is preferably 1:99 to 99:1, more preferably 10:90 to 90:10, and particularly preferably 20:80 to 80:20. This ratio ensures that side reactions on positive and negative electrodes of batteries are suppressed with a good balance, and battery characteristics are enhanced easily.

1-3-4. Fluorosulfonate Salts

The fluorosulfonate salts are not particularly limited as long as the salts have at least one fluorosulfonate structure in the molecule. In the electrolytic solution of the invention, the combined use of the aromatic compound represented by Formula (I) and the fluorosulfonate salt results in a reduction of the initial irreversible capacity of batteries and an enhancement in high-temperature cycle characteristics. Further, the overcharge safety of batteries is ensured.

The counter cations in the fluorosulfonate salts are not particularly limited. Examples thereof include lithium, sodium, potassium, rubidium, cesium, magnesium, calcium, barium and ammonium represented by $NR^{131}R^{132}R^{133}R^{134}$ (wherein $R^{131}$ to $R^{134}$ are independently a hydrogen atom or an organic group having 1 to 12 carbon atoms). Examples and preferred examples of $R^{131}$ to $R^{134}$ are similar to those of $R^{131}$ to $R^{134}$ described in 1-2-2. Preferred counter cations are lithium, sodium and potassium. Lithium is particularly preferable.

Examples of the fluorosulfonate salts include lithium fluorosulfonate, sodium fluorosulfonate, potassium fluorosulfonate, rubidium fluorosulfonate and cesium fluorosulfonate, with lithium fluorosulfonate being preferable. Imide salts having a fluorosulfonate structure such as lithium bis(fluorosulfonyl)imide may also be used as the fluorosulfonate salts.

The fluorosulfonate salts may be used singly, or two or more may be used in combination in an appropriate ratio.

The content of the fluorosulfonate salt (the total content when two or more kinds of the salts are used) may be 0.05 mass % or above, preferably 0.1 mass % or above, more preferably 0.2 mass % or above, still more preferably 0.3 mass % or above, and particularly preferably 0.5 mass % or above, and may be 10 mass % or less, preferably 8 mass % or less, more preferably 5 mass % or less, still more preferably 2 mass % or less, and particularly preferably 1 mass % or less. This content ensures that the occurrence of side reactions in batteries is reduced and the increase in resistance is unlikely to occur.

The mass ratio between the aromatic compound represented by Formula (I) and the fluorosulfonate salt is preferably 1:99 to 99:1, more preferably 10:90 to 90:10, and particularly preferably 20:80 to 80:20. This ratio ensures that side reactions in batteries are appropriately suppressed and the decrease in high-temperature durability characteristics is unlikely to occur.

1-4. Nonaqueous Solvents

The nonaqueous solvents in the present invention are not particularly limited, and any known organic solvents may be used. Specific examples include fluorine-free cyclic carbonates, chain carbonates, cyclic and chain carboxylate esters, ether compounds and sulfone compounds.

In the specification, the volumes of the nonaqueous solvents are values measured at 25° C. For those solvents which are solid at 25° C. such as ethylene carbonate, volumes measured at the melting point are used.

1-4-1. Fluorine-Free Cyclic Carbonates

Examples of the fluorine-free cyclic carbonates include cyclic carbonates having an alkylene group with 2 to 4 carbon atoms.

Specific examples of the fluorine-free cyclic carbonates having an alkylene group with 2 to 4 carbon atoms include ethylene carbonate, propylene carbonate and butylene carbonate. Of these, ethylene carbonate and propylene carbonate are particularly preferable because using these solvents enhances the degree of the dissociation of lithium ions and results in an enhancement in battery characteristics.

The fluorine-free cyclic carbonates may be used singly, or two or more may be used in combination in an appropriate ratio.

The amount of the fluorine-free cyclic carbonates is not particularly limited and may be determined appropriately as long as the advantageous effects of the present invention are not significantly impaired. When used singly, the amount of the carbonate is 5 vol % or above, and more preferably 10 vol % or above in 100 vol % of the nonaqueous solvent. This amount makes it possible to avoid a decrease in electric conductivity due to the dielectric constant of the nonaqueous electrolytic solution being low, and makes it easy for nonaqueous electrolyte batteries to achieve good characteristics such as high-current discharge characteristics, stability on negative electrodes and cycle characteristics. Further, the volume is 95 vol % or less, more preferably 90 vol % or less, and still more preferably 85 vol % or less. This amount ensures that the nonaqueous electrolytic solution will exhibit an appropriate viscosity to prevent the decrease in ion conductivity, and that the nonaqueous electrolyte batteries will achieve good load characteristics.

1-4-2. Chain Carbonates

Preferred chain carbonates are those chain carbonates having 3 to 7 carbon atoms. Dialkyl carbonates having 3 to 7 carbon atoms are more preferable.

Examples of the chain carbonates include dimethyl carbonate, diethyl carbonate, di-n-propyl carbonate, diisopropyl carbonate, n-propyl isopropyl carbonate, ethyl methyl carbonate, methyl-n-propyl carbonate, n-butyl methyl carbonate, isobutyl methyl carbonate, tert-butyl methyl carbonate, ethyl-n-propyl carbonate, n-butyl ethyl carbonate, isobutyl ethyl carbonate and tert-butyl ethyl carbonate.

Of these, dimethyl carbonate, diethyl carbonate, di-n-propyl carbonate, diisopropyl carbonate, n-propyl isopropyl carbonate, ethyl methyl carbonate and methyl-n-propyl carbonate are preferable. Dimethyl carbonate, diethyl carbonate and ethyl methyl carbonate are particularly preferable.

Further, chain carbonates having a fluorine atom (hereinafter, also written as "fluorinated chain carbonates") may also be suitably used.

The fluorinated chain carbonates may have one or more fluorine atoms without limitation. The number of fluorine atoms is usually 6 or less, and preferably 4 or less. When the fluorinated chain carbonate has a plurality of fluorine atoms, the fluorine atoms may be bonded to the same carbon atom or to different carbon atoms.

Examples of the fluorinated chain carbonates include fluorinated dimethyl carbonate and derivatives thereof, fluorinated ethyl methyl carbonate and derivatives thereof, and fluorinated diethyl carbonate and derivatives thereof.

Examples of the fluorinated dimethyl carbonate and the derivatives thereof include fluoromethyl methyl carbonate, difluoromethyl methyl carbonate, trifluoromethyl methyl carbonate, bis(fluoromethyl) carbonate, bis(difluoro)methyl carbonate and bis(trifluoromethyl) carbonate.

Examples of the fluorinated ethyl methyl carbonate and the derivatives thereof include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate and ethyl trifluoromethyl carbonate.

Examples of the fluorinated diethyl carbonate and the derivatives thereof include ethyl-(2-fluoroethyl) carbonate, ethyl-(2,2-difluoroethyl) carbonate, bis(2-fluoroethyl) carbonate, ethyl-(2,2,2-trifluoroethyl) carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate and bis(2,2,2-trifluoroethyl) carbonate.

The chain carbonates may be used singly, or two or more may be used in combination in an appropriate ratio. In 100 vol % of the nonaqueous solvent, the amount of the chain carbonate(s) is preferably 5 vol % or above, more preferably 10 vol % or above, and still more preferably 15 vol % or above. This lower limit ensures that the nonaqueous electrolytic solution exhibits an appropriate viscosity and thus the decrease in ion conductivity is prevented, making it easy for nonaqueous electrolyte batteries to achieve excellent high-current discharge characteristics. Further, the volume of the chain carbonate(s) in 100 vol % of the nonaqueous solvent is preferably 90 vol % or less, and more preferably 85 vol % or less. This upper limit makes it possible to avoid a decrease in electric conductivity due to the dielectric constant of the nonaqueous electrolytic solution being low, and makes it easy for nonaqueous electrolyte batteries to achieve excellent high-current discharge characteristics.

1-4-3. Cyclic Carboxylate Esters

Preferred cyclic carboxylate esters are those having 3 to 12 carbon atoms.

Specific examples include gamma-butyrolactone, gamma-valerolactone, gamma-caprolactone and epsilon-caprolactone. Of these, gamma-butyrolactone is particularly preferable because the use thereof enhances the degree of the dissociation of lithium ions and results in an enhancement in battery characteristics.

The cyclic carboxylate esters may be used singly, or two or more may be used in combination in an appropriate ratio.

In 100 vol % of the nonaqueous solvent, the amount of the cyclic carboxylate ester(s) is preferably 5 vol % or above, and more preferably 10 vol % or above. This amount ensures that the electric conductivity of the nonaqueous electrolytic solution is improved to make it easy for nonaqueous electrolyte batteries to achieve an enhancement in high-current discharge characteristics. The amount of the cyclic carboxylate ester(s) is preferably 50 vol % or less, and more preferably 40 vol % or less. This upper limit ensures that the nonaqueous electrolytic solution exhibits an appropriate viscosity, and the decrease in electric conductivity is avoided and the increase in negative electrode resistance is suppressed, making it easy for nonaqueous electrolyte secondary batteries to achieve excellent high-current discharge characteristics.

1-4-4. Ether Compounds

Preferred ether compounds are chain ethers having 3 to 10 carbon atoms and cyclic ethers having 3 to 6 carbon atoms. Part of the hydrogen atoms in the ether compounds may be substituted by fluorine atoms.

Examples of the chain ethers having 3 to 10 carbon atoms include:

diethyl ether, di(2-fluoroethyl) ether, di(2,2-difluoroethyl) ether, di(2,2,2-trifluoroethyl) ether, ethyl (2-fluoroethyl) ether, ethyl (2,2,2-trifluoroethyl) ether, ethyl (1,1,2,2-tetrafluoroethyl) ether, (2-fluoroethyl) (2,2,2-trifluoroethyl) ether, (2-fluoroethyl) (1,1,2,2-tetrafluoroethyl) ether, (2,2,2-trifluoroethyl) (1,1,2,2-tetrafluoroethyl) ether, ethyl-n-propyl ether, ethyl (3-fluoro-n-propyl) ether, ethyl (3,3,3-trifluoro-n-propyl) ether, ethyl (2,2,3,3-tetrafluoro-n-propyl) ether, ethyl (2,2,3,3,3-pentafluoro-n-propyl) ether, 2-fluoroethyl-n-propyl ether, (2-fluoroethyl) (3-fluoro-n-propyl) ether, (2-fluoroethyl) (3,3,3-trifluoro-n-propyl) ether, (2-fluoroethyl) (2,2,3,3-tetrafluoro-n-propyl) ether, (2-fluoroethyl) (2,2,3,3,3-pentafluoro-n-propyl) ether, 2,2,2-trifluoroethyl-n-propyl ether, (2,2,2-trifluoroethyl) (3-fluoro-n-propyl) ether, (2,2,2-trifluoroethyl) (3,3,3-trifluoro-n-propyl) ether, (2,2,2-trifluoroethyl) (2,2,3,3-tetrafluoro-n-propyl) ether, (2,2,2-trifluoroethyl) (2,2,3,3,3-pentafluoro-n-propyl) ether, 1,1,2,2-tetrafluoroethyl-n-propyl ether, (1,1,2,2-tetrafluoroethyl) (3-fluoro-n-propyl) ether, (1,1,2,2-tetrafluoroethyl) (3,3,3-trifluoro-n-propyl) ether, (1,1,2,2- tetrafluoroethyl) (2,2,3,3-tetrafluoro-n-propyl) ether, (1,1,2,2-tetrafluoroethyl) (2,2,3,3,3-pentafluoro-n-propyl) ether, di-n-propyl ether, (n-propyl) (3-fluoro-n-propyl) ether, (n-propyl) (3,3,3-trifluoro-n-propyl) ether, (n-propyl) (2,2,3,3-tetrafluoro-n-propyl) ether, (n-propyl) (2,2,3,3,3-pentafluoro-n-propyl) ether, di(3-fluoro-n-propyl) ether, (3-fluoro-n-propyl) (3,3,3-trifluoro-n-propyl) ether, (3-fluoro-n-propyl) (2,2,3,3-tetrafluoro-n-propyl) ether, (3-fluoro-n-propyl) (2,2,3,3,3-pentafluoro-n-propyl) ether, di(3,3,3-trifluoro-n-propyl) ether, (3,3,3-trifluoro-n-propyl) (2,2,3,3-tetrafluoro-n-propyl) ether, (3,3,3-trifluoro-n-propyl) (2,2,3,3,3-pentafluoro-n-propyl) ether, di(2,2,3,3-tetrafluoro-n-propyl) ether, (2,2,3,3-tetrafluoro-n-propyl) (2,2,3,3,3-pentafluoro-n-propyl) ether, di(2,2,3,3,3-pentafluoro-n-propyl) ether, di-n-butyl ether, dimethoxymethane, methoxyethoxymethane, methoxy(2-fluoroethoxy)methane, methoxy(2,2,2-trifluoroethoxy)methane methoxy(1,1,2,2-tetrafluoroethoxy)methane, diethoxymethane, ethoxy(2-fluoroethoxy)methane, ethoxy(2,2,2-trifluoroethoxy)methane, ethoxy(1,1,2,2-tetrafluoroethoxy)methane, di(2-fluoroethoxy)methane, (2-fluoroethoxy)(2,2,2-trifluoroethoxy)methane, (2-fluoroethoxy)(1,1,2,2-tetrafluoroethoxy)methane di(2,2,2-trifluoroethoxy) methane, (2,2,2-trifluoroethoxy)(1,1,2,2-tetrafluoroethoxy) methane, di(1,1,2,2-tetrafluoroethoxy)methane, dimethoxyethane, methoxyethoxyethane, methoxy(2-fluoroethoxy)ethane, methoxy(2,2,2-trifluoroethoxy)ethane, methoxy(1,1,2,2-tetrafluoroethoxy)ethane, diethoxyethane, ethoxy(2-fluoroethoxy)ethane, ethoxy(2,2,2-trifluoroethoxy)ethane, ethoxy(1,1,2,2-tetrafluoroethoxy)ethane, di(2-fluoroethoxy)ethane, (2-fluoroethoxy)(2,2,2-trifluoroethoxy)ethane, (2-fluoroethoxy)(1,1,2,2-tetrafluoroethoxy) ethane, di(2,2,2-trifluoroethoxy)ethane, (2,2,2-trifluoroethoxy)(1,1,2,2-tetrafluoroethoxy)ethane, di(1,1,2,2-tetrafluoroethoxy)ethane, ethylene glycol di-n-propyl ether, ethylene glycol di-n-butyl ether and diethylene glycol dimethyl ether.

Examples of the cyclic ethers having 3 to 6 carbon atoms include tetrahydrofuran, 2-methyltetrahydrofuran, 3-methyltetrahydrofuran, 1,3-dioxane, 2-methyl-1,3-dioxane, 4-methyl-1,3-dioxane, 1,4-dioxane and fluorides of these compounds.

In particular, dimethoxymethane, diethoxymethane, ethoxymethoxymethane, ethylene glycol di-n-propyl ether, ethylene glycol di-n-butyl ether and diethylene glycol dimethyl ether are preferable because of their high abilities to solvate lithium ions and to enhance the dissociation of the ions. Dimethoxymethane, diethoxymethane and ethoxymethoxymethane are particularly preferable because these solvents exhibit a low viscosity and provide high ion conductivity.

The ether compounds may be used singly, or two or more may be used in combination in an appropriate ratio.

In 100 vol % of the nonaqueous solvent, the amount of the ether compound(s) is preferably 5 vol % or above, more preferably 10 vol % or above, and still more preferably 15 vol % or above, and is preferably 70 vol % or less, more preferably 60 vol % or less, and still more preferably 50 vol % or less. This amount ensures that the ion conductivity will be enhanced due to the enhancement of the degree of lithium ion dissociation and the reduction in viscosity by virtue of the use of the chain ether. Further, the above amount ensures that in the case where the negative electrode active material is a carbonaceous material, the decrease in capacity due to the co-intercalation of the chain ether together with lithium ions will be avoided.

1-4-5. Sulfone Compounds

Preferred sulfone compounds are cyclic sulfones having 3 to 6 carbon atoms, and chain sulfones having 2 to 6 carbon atoms. The number of the sulfonyl groups in the molecule is preferably 1 or 2.

Examples of the cyclic sulfones having 3 to 6 carbon atoms include monosulfone compounds such as trimethylenesulfones, tetramethylenesulfones and hexamethylenesulfones; and disulfone compounds such as trimethylenedisulfones, tetramethylenedisulfones and hexamethylenedisulfones.

From the points of view of dielectric constant and viscosity, tetramethylenesulfones, tetramethylenedisulfones, hexamethylenesulfones and hexamethylenedisulfones are more preferable, and tetramethylenesulfones (sulfolanes) are particularly preferable.

Preferred sulfolanes are sulfolane and/or sulfolane derivatives (hereinafter, derivatives including sulfolane itself are sometimes written as "sulfolanes"). Preferred sulfolane derivatives are those in which one or more hydrogen atoms bonded to the carbon atoms constituting the sulfolane ring are substituted by fluorine atoms or alkyl groups.

In particular, some preferred sulfolanes having high ion conductivity and realizing high input and output characteristics are 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-difluoromethylsulfolane, 2-trifluoromethylsulfolane, 3-trifluoromethylsulfolane, 2-fluoro-3-(trifluoromethyl)sulfolane, 3-fluoro-3-(trifluoromethyl)sulfolane, 4-fluoro-3-(trifluoromethyl)sulfolane and 5-fluoro-3-(trifluoromethyl)sulfolane.

Examples of the chain sulfones having 2 to 6 carbon atoms include:

dimethyl sulfone, ethyl methyl sulfone, diethyl sulfone, n-propyl methyl sulfone, n-propyl ethyl sulfone, di-n-propyl sulfone, isopropyl methyl sulfone, isopropyl ethyl sulfone, diisopropyl sulfone, n-butyl methyl sulfone, n-butyl ethyl sulfone, tert-butyl methyl sulfone, tert-butyl ethyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, perfluoroethyl methyl sulfone, ethyl trifluoroethyl sulfone, ethyl pentafluoroethyl sulfone, di(trifluoroethyl) sulfone, perfluorodiethyl sulfone, fluoromethyl-n-propyl sulfone, difluoromethyl-n-propyl sulfone, trifluoromethyl-n-propyl sulfone, fluoromethyl isopropyl sulfone, difluoromethyl isopropyl sulfone, trifluoromethyl isopropyl sulfone, trifluoroethyl-n-propyl sulfone, trifluoroethyl isopropyl sulfone, pentafluoroethyl-n-propyl sulfone, pentafluoroethyl isopropyl sulfone, trifluoroethyl-n-butyl sulfone, trifluoroethyl-tert-butyl sulfone, pentafluoroethyl-n-butyl sulfone and pentafluoroethyl-tert-butyl sulfone.

In particular, some preferred sulfones having high ion conductivity and realizing high input and output characteristics are dimethyl sulfone, ethyl methyl sulfone, diethyl sulfone, n-propyl methyl sulfone, isopropyl methyl sulfone, n-butyl methyl sulfone, tert-butyl methyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl mono fluoromethyl sulfone, ethyl difluoromethyl sulfone, ethyl trifluoromethyl sulfone, ethyl trifluoroethyl sulfone, ethyl pentafluoroethyl sulfone, trifluoromethyl-n-propyl sulfone, trifluoromethyl isopropyl sulfone, trifluoroethyl-n-butyl sulfone, trifluoroethyl-tert-butyl sulfone, trifluoromethyl-n-butyl sulfone and trifluoromethyl-tert-butyl sulfone.

The sulfone compounds may be used singly, or two or more may be used in combination in an appropriate ratio.

In 100 vol % of the nonaqueous solvent, the amount of the sulfone compound(s) is preferably 0.3 vol % or above, more preferably 1 vol % or above, and still more preferably 5 vol % or above, and is preferably 40 vol % or less, more preferably 35 vol % or less, and still more preferably 30 vol % or less. This amount ensures that durability such as cycle characteristics and storage characteristics will be enhanced, and that the nonaqueous electrolytic solution exhibits an appropriate viscosity and makes it possible to avoid a decrease in electric conductivity. Thus, nonaqueous electrolyte batteries may be charged and discharged with a high current density while avoiding a decrease in the retention of charge and discharge capacities.

1-4-6. Compositions of Nonaqueous Solvents

The nonaqueous solvent in the invention may be any one solvent selected from the nonaqueous solvents described above, or may be a combination of two or more kinds of the solvents in an appropriate ratio.

For example, a preferred combination of the nonaqueous solvents is one based on a fluorine-free cyclic carbonate and a chain carbonate.

In particular, the total of the fluorine-free cyclic carbonate and the chain carbonate is preferably 70 vol % or above, more preferably 80 vol % or above, and still more preferably 90 vol % or above of the whole nonaqueous solvent, and the proportion of the fluorine-free cyclic carbonate to the total of the cyclic carbonate and the chain carbonate is preferably 5 vol % or above, more preferably 10 vol % or above, and still more preferably 15 vol % or above, and is preferably 50 vol % or less, more preferably 35 vol % or less, still more preferably 30 vol % or less, and particularly preferably 25 vol % or less.

In some cases, the use of this combination of the nonaqueous solvents results in a good balance between cycle characteristics and high-temperature storage characteristics (in particular, retention of capacity after storage at high temperatures, and high-load discharge capacity) of batteries manufactured with the nonaqueous solvents.

Preferred examples of the combinations of the fluorine-free cyclic carbonates and the chain carbonates include:

ethylene carbonate and dimethyl carbonate; ethylene carbonate and diethyl carbonate; ethylene carbonate and ethyl methyl carbonate; ethylene carbonate, dimethyl carbonate and diethyl carbonate; ethylene carbonate, dimethyl carbonate and ethyl methyl carbonate; ethylene carbonate, diethyl carbonate and ethyl methyl carbonate; and ethylene carbonate, dimethyl carbonate, diethyl carbonate and ethyl methyl carbonate.

Of the combinations of the fluorine-free cyclic carbonates and the chain carbonates, those which include an asymmetric chain alkyl carbonate as the chain carbonate are more preferable. In particular, those which include ethylene carbonate, a symmetric chain carbonate and an asymmetric chain carbonate are preferable because a good balance is obtained between cycle characteristics and high-current discharge characteristics, with examples of such combinations including ethylene carbonate, dimethyl carbonate and ethyl methyl carbonate; ethylene carbonate, diethyl carbonate and ethyl methyl carbonate; and ethylene carbonate, dimethyl carbonate, diethyl carbonate and ethyl methyl carbonate.

In particular, those combinations in which the asymmetric chain carbonate is ethyl methyl carbonate are preferable, and the alkyl groups in the chain carbonate preferably have 1 to 2 carbon atoms.

Examples of the preferred combinations further include those combinations including propylene carbonate in the aforementioned combinations of ethylene carbonate and the chain carbonate(s).

When propylene carbonate is used, the volume ratio between ethylene carbonate and propylene carbonate is preferably 99:1 to 40:60, and particularly preferably 95:5 to 50:50. Further, the proportion of propylene carbonate in the whole nonaqueous solvent is preferably 0.1 vol % or above, more preferably 1 vol % or above, and still more preferably 2 vol % or above, and is preferably 20 vol % or less, more preferably 8 vol % or less, and still more preferably 5 vol % or less.

This concentration of propylene carbonate is advantageous in that low-temperature characteristics may be further enhanced at times while maintaining the characteristics obtained by the combination of ethylene carbonate and the chain carbonate.

When the nonaqueous solvent includes dimethyl carbonate, the proportion of dimethyl carbonate in the whole nonaqueous solvent is preferably 10 vol % or above, more preferably 20 vol % or above, still more preferably 25 vol % or above, and particularly preferably 30 vol % or above, and is preferably 90 vol % or less, more preferably 80 vol % or less, still more preferably 75 vol % or less, and particularly preferably 70 vol % or less. This concentration leads to an enhancement in load characteristics of batteries at times.

In particular, the use of a nonaqueous solvent which includes dimethyl carbonate and ethyl methyl carbonate and in which the content of dimethyl carbonate is higher than the content of ethyl methyl carbonate is preferable because battery characteristics after high-temperature storage are enhanced at times while maintaining the electric conductivity of the electrolytic solution.

In the whole nonaqueous solvent, the volume ratio of dimethyl carbonate to ethyl methyl carbonate (dimethyl carbonate/ethyl methyl carbonate) is preferably 1.1 or above, more preferably 1.5 or above, and still more preferably 2.5 or above in order to enhance the electric conductivity of the electrolytic solution and battery characteristics after storage. The above volume ratio (dimethyl carbonate/ethyl methyl carbonate) is preferably 40 or less, more preferably 20 or less, still more preferably 10 or less, and particularly preferably 8 or less in order to enhance battery characteristics at low temperatures.

The combinations based on the fluorine-free cyclic carbonates and the chain carbonates may include other solvents such as cyclic carboxylate esters, chain carboxylate esters, cyclic ethers, chain ethers, sulfur-containing organic solvents, phosphorus-containing organic solvents and fluorine-containing aromatic solvents.

1-5. Auxiliaries

In the electrolyte batteries according to the invention, auxiliaries may be used appropriately in accordance with the purpose in addition to the compounds described hereinabove. Examples of the auxiliaries include those auxiliaries described below.

The electrolytic solution of the invention may contain known auxiliaries. Examples of the auxiliaries include carbonate compounds such as erythritan carbonate, spiro-bis-dimethylene carbonate and methoxyethyl-methyl carbonate; carboxylic anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride and phenylsuccinic anhydride; Spiro compounds such as 2,4,8,10-tetraoxaspiro[5.5]undecane and 3,9-divinyl-2,4,8,10-tetraoxaspiro[5.5]undecane; sulfur-containing compounds such as N,N-dimethylmethanesulfonamide and N,N-diethylmethanesulfonamide; phosphorus-containing compounds such as trimethyl phosphite, triethyl phosphite, triphenyl phosphite, trimethyl phosphate, triethyl phosphate, triphenyl phosphate, dimethyl methylphosphonate, diethyl ethylphosphonate, dimethyl vinylphosphonate, diethyl vinylphosphonate, ethyl diethylphosphonoacetate, methyl dimethylphosphinate, ethyl diethylphosphinate, trimethylphosphine oxide and triethylphosphine oxide; nitrogen-containing compounds such as 1-methyl-2-pyrrolidinone, 1-methyl-2-piperidone, 3-methyl-2-oxazolidinone, 1,3-dimethyl-2-imidazolidinone and N-methylsuccinimide; and hydrocarbon compounds such as heptane, octane, nonane, decane and cycloheptane. These auxiliaries may be used singly, or two or more may be used in combination. The addition of these auxiliaries enhances the retention of capacity after high-temperature storage and cycle characteristics.

The amount of the additional auxiliaries is not particularly limited and may be determined appropriately as long as the advantageous effects of the invention are not significantly impaired. In 100 mass % of the nonaqueous electrolytic solution, the amount of the additional auxiliaries is preferably 0.01 mass % to 5 mass %. When added in this amount, the additional auxiliaries will sufficiently produce their effects while the decrease in battery characteristics such as high-load discharge characteristics will be avoided. The amount of the additional auxiliaries is more preferably 0.1 mass % or above, and still more preferably 0.2 mass % or above, and is more preferably 3 mass % or less, and still more preferably 1 mass % or less.

2. Battery Configurations

The electrolytic solution for nonaqueous electrolyte batteries according to the present invention is suitably used for secondary batteries, for example, lithium secondary batteries. Hereinbelow, nonaqueous electrolyte batteries involving the electrolytic solution of the invention will be described.

The electrolyte batteries of the invention may have a known structure. Typically, the electrolyte batteries include a negative electrode and a positive electrode capable of storing and releasing ions (for example, lithium ions), and the inventive electrolytic solution described above.

2-1. Negative Electrodes

Hereinbelow, negative electrode active materials used in the negative electrodes will be described. The negative electrode active materials are not particularly limited as long as the materials can electrochemically store and release lithium ions. Specific examples include carbonaceous materials, alloy materials and lithium-metal composite oxide materials. These materials may be used singly, or two or more may be used in combination.

<Negative Electrode Active Materials>

Examples of the negative electrode active materials include carbonaceous materials, alloy materials and lithium-metal composite oxide materials.

In terms of the balance between initial irreversible capacity and high-current density charge/discharge characteristics, the carbonaceous material used as the negative electrode active material is preferably selected from:

(1) natural graphites;

(2) carbonaceous materials obtained by heat treating artificial carbonaceous substances and artificial graphitic substances one or more times at 400 to 3200° C.;

(3) carbonaceous materials that form a negative electrode active material layer which is composed of at least two kinds of carbonaceous substances having different crystallinities and/or which has an interface formed by such different crystalline carbonaceous substances; and (4) carbonaceous materials that form a negative electrode active material layer which is composed of at least two kinds of carbonaceous substances having different orientations and/or which has an interface formed by such carbonaceous substances having different orientations.

The carbonaceous materials (1) to (4) may be used singly, or two or more may be used in combination in an appropriate ratio.

Examples of the artificial carbonaceous substances and the artificial graphitic substances used in (2) above include natural graphites, coal cokes, petroleum cokes, coal pitches, petroleum pitches, oxidation products of these pitches, needle cokes, pitch cokes, carbon materials obtained by the partial graphitization of these pitches, furnace blacks, acetylene blacks, pyrolysates of organic substances such as pitch-based carbon fibers, carbonizable organic substances, carbides of such substances, solutions of carbonizable organic substances in low-molecular organic solvents such as benzene, toluene, xylene, quinoline and n-hexane, and carbides obtained from such solutions.

The alloy materials used as the negative electrode active materials are not particularly limited as long as the materials can store and release lithium, and may be any of elemental lithium, elemental metals and alloys capable of forming lithium alloys, and compounds of these metals such as oxides, carbides, nitrides, silicides, sulfides and phosphides. The elemental metals and the alloys capable of forming lithium alloys are preferably materials including Group 13 and Group 14 metals and semimetals (except carbon), and are more preferably aluminum, silicon and tin (hereinafter, these metals are sometimes described as "specific metal elements"), and alloys and compounds including atoms of these elemental metals. These materials may be used singly, or two or more may be used in combination in an appropriate ratio.

Examples of the negative electrode active materials having atoms of at least one selected from the specific metal elements include individual elemental metals of the specific metal elements, alloys of two or more of the specific metal elements, alloys of one, or two or more of the specific metal elements and one, or two or more other metal elements, compounds containing one, or two or more of the specific metal elements, and composites such as oxides, carbides, nitrides, silicides, sulfides and phosphides of the above compounds. The use of these elemental metals, alloys or metal compounds as the negative electrode active materials realizes a high capacity of the batteries.

Examples further include compounds in which the above composites form complex bonds with elemental metals, alloys or several elements such as nonmetal elements. Specific examples include alloys of silicon and/or tin, with a metal having no negative electrode action. For example, use may be made of complex compounds which contain as many kinds of elements as 5 to 6 including tin, a metal(s) other than tin and silicon that serves as a negative electrode, a metal(s) having no negative electrode action, and a nonmetal element(s).

Of these negative electrode active materials, for example, individual elemental metals of the specific metal elements, alloys of two or more of the specific metal elements, and compounds of the specific metal elements such as oxides, carbides and nitrides are preferable because the obtainable batteries exhibit a high capacity per unit mass. In particular, for example, elemental silicon and/or tin, alloys of these elemental metals, and compounds such as oxides, carbides and nitrides are preferable from the points of view of the capacity per unit mass and the environmental load.

The lithium-metal composite oxide materials used as the negative electrode active materials are not particularly limited as long as the materials can store and release lithium. From the point of view of high-current density charge/discharge characteristics, those materials containing titanium and lithium are preferable, lithium-metal composite oxide materials that contain titanium are more preferable, and composite oxides of lithium and titanium (hereinafter, also written as "lithium-titanium composite oxides") are still more preferable. That is, the use of the negative electrode active material including a lithium-titanium composite oxide with a spinel structure is particularly preferable in that the output resistance of the obtainable nonaqueous electrolyte batteries is significantly reduced.

It is also preferable that lithium and titanium in the lithium-titanium composite oxide be substituted by other metal element, for example, at least one element selected from the group consisting of Na, K, Co, Al, Fe, Ti, Mg, Cr, Ga, Cu, Zn and Nb.

It is preferable that the metal oxide be a lithium-titanium composite oxide represented by Formula (A) and in Formula (A), $0.7 \leq x \leq 1.5$, $1.5 \leq y \leq 2.3$, and $0 \leq z \leq 1.6$. The structure of such an oxide is stable during the doping and the dedoping of lithium ions.

$$Li_x Ti_y M_z O_4 \quad (A)$$

[In Formula (A), M is at least one element selected from the group consisting of Na, K, Co, Al, Fe, Ti, Mg, Cr, Ga, Cu, Zn and Nb.]

Of the compositions represented by Formula (A), those in which:

$1.2 \leq x \leq 1.4$, $1.5 \leq y \leq 1.7$, and $z=0$, (a)

$0.9 \leq x \leq 1.1$, $1.9 \leq y \leq 2.1$, and $z=0$, (b)

or $0.7 \leq x \leq 0.9$, $2.1 \leq y \leq 2.3$, and $z=0$ (c)

are particularly preferable because a good balance in battery characteristics is obtained.

Particularly preferred typical compositions of the compounds are $Li_{4/3}Ti_{5/3}O_4$ for (a), $Li_1Ti_2O_4$ for (b), and $Li_{4/5}Ti_{11/5}O_4$ for (c). Preferred examples of the structures in which $Z \neq 0$ include $Li_{4/3}Ti_{4/3}Al_{1/3}O_4$.

<Properties of Carbonaceous Materials>

The carbonaceous materials which may be used as the negative electrode active materials preferably have the following properties.

(X-Ray Parameters)

The d value (the interlayer distance) between lattice planes (002 planes) obtained by X-ray diffractometry according to GAKUSHIN method with respect to the carbonaceous material is preferably 0.335 nm or more, and is usually 0.360 nm or less, preferably 0.350 rim or less, and more preferably 0.345 nm or less. Further, the crystallite size (Lc) of the carbonaceous material determined by X-ray diffractometry according to GAKUSHIN method is preferably 1.0 rim or more, and more preferably 1.5 nm or more.

(Volume-Based Average Particle Diameter)

The mass-based average particle diameter of the carbonaceous material is the average particle diameter (the median diameter) on volume basis determined by a laser diffraction/scattering method, and is usually 1 μm or more, preferably 3 μm or more, still more preferably 5 μm or more, and particularly preferably 7 μm or more, and is usually 100 μm or less, preferably 50 μm or less, more preferably 40 μm or less, still more preferably 30 μm or less, and particularly preferably 25 μm or less.

If the volume-based average particle diameter is below the above range, the irreversible capacity is so increased that the batteries may suffer an initial capacity loss at times. In terms of battery production steps, any average particle diameter exceeding the above range is not desirable at times because the application of an electrode-forming liquid containing such particles tends to result in uneven coatings.

The volume-based average particle diameter is measured in such a manner that the carbon powder is dispersed in a 0.2 mass % aqueous solution (approximately 10 mL) of polyoxyethylene (20) sorbitan monolaurate as a surfactant, and analyzing the dispersion with a laser diffraction/scattering grain size distribution analyzer (LA-700 manufactured by Horiba, Ltd.).

(Raman R Value and Raman Half Width)

The Raman R value of the carbonaceous material is a value measured by an argon ion laser Raman spectroscopy method, and is usually 0.01 or more, preferably 0.03 or more, and more preferably 0.1 or more, and is usually 1.5 or less, preferably 1.2 or less, more preferably 1 or less, and particularly preferably 0.5 or less.

The Raman half width at near 1580 cm$^{-1}$ of the carbonaceous material is, although not particularly limited to, usually 10 cm$^{-1}$ or more, and preferably 15 cm$^{-1}$ or more, and is usually 100 cm$^{-1}$ or less, preferably 80 cm$^{-1}$ or less, more preferably 60 cm$^{-1}$ or less, and particularly preferably 40 cm$^{-1}$ or less.

The Raman R value and the Raman half width are indexes that indicate the crystallinity of the surface of the carbonaceous material. It is preferable that the carbonaceous material have appropriate crystallinity from the point of view of chemical stability, and that the crystallinity still provide interlayer sites for the intercalation and the deintercalation of lithium during charging and discharging, in other words, charge acceptability be not decreased. It is preferable to take into consideration the fact that when the carbonaceous material applied on a current collector is pressed to increase the density of the negative electrode, the crystals tend to be oriented in a direction parallel to the electrode plate. When the Raman R value or the Raman half width is in the above range, the crystals allow a good film to be formed on the surface of the negative electrode and thus make it possible to enhance storage characteristics, cycle characteristics and load characteristics and also make it possible to prevent the decrease in efficiency and the generation of gas associated with the reaction with the nonaqueous electrolytic solution.

A Raman spectrum is obtained using a Raman spectrometer (Raman Spectrometer manufactured by JASCO Corporation) in such a manner that the sample is allowed to fall into the measurement cell to fill the cell and the sample is analyzed while applying an argon ion laser beam to the surface of the sample in the cell and while rotating the cell in a plane perpendicular to the laser beam. With respect to the Raman spectrum obtained, the intensity IA of a peak PA near 1580 cm$^{-1}$ and the intensity IB of a peak PB near 1360 cm$^{-1}$ are measured and the ratio R of the intensities (R=IB/IA) is calculated.

The Raman measurement conditions are as follows:
Argon ion laser wavelength: 514.5 nm
Laser power on sample: 15 to 25 mW
Resolution: 10 to 20 cm$^{-1}$
Measurement range: 1100 cm$^{-1}$ to 1730 cm$^{-1}$
Raman R value and Raman half width analysis: background processing
Smoothing processing: simple averaging, convolution 5 points (BET Specific Surface Area)

The BET specific surface area of the carbonaceous material is a value of specific surface area measured by a BET method, and is usually 0.1 m$^2\cdot$g$^{-1}$ or more, preferably 0.7 m$^2\cdot$g$^{-1}$ or more, more preferably 1.0 m$^2\cdot$g$^{-1}$ or more, and particularly preferably 1.5 m$^2\cdot$g$^{-1}$ or more, and is usually 100 m$^2\cdot$g$^{-1}$ or less, preferably 25 m$^2\cdot$g$^{-1}$ or less, more preferably 15 m$^2\cdot$g$^{-1}$ or less, and particularly preferably 10 m$^2\cdot$g$^{-1}$ or less.

When the BET specific surface area is in the above range, the precipitation of lithium on the electrode surface can be prevented while the generation of gas by the reaction with the nonaqueous electrolytic solution can be suppressed.

The specific surface area is measured by the BET method using a surface area meter (an automatic surface area measuring apparatus manufactured by Okura Riken) in such a manner that the sample is preliminarily dried at 350° C. under a stream of nitrogen for 15 minutes and thereafter the analysis is performed by the nitrogen adsorption BET single point method by flowing a nitrogen-helium mixed gas prepared so that the pressure of nitrogen relative to the atmospheric pressure is exactly 0.3.

(Circularity)

The circularity which indicates how close the carbonaceous material is to a sphere is preferably in the range described below. The circularity is defined as "Circularity=(Circumferential length of equivalent circle having equal area to projection of particle)/(Actual circumferential length of projection of particle)". When the circularity is 1, the particle is theoretically spherical. For particles of the carbonaceous material having diameters in the range of 3 to 40 the circularity is desirably as close to 1 as possible. The circularity is preferably 0.1 or above, more preferably 0.5 or above, still more preferably 0.8 or above, further preferably 0.85 or above, and particularly preferably 0.9 or above. Because particles having a higher circularity can achieve a higher fill factor and the resistance between such particles is small, high-current density charge/discharge characteristics are enhanced with increasing circularity. Thus, particles having a higher circularity in the above range are more preferable.

The circularity is measured with a flow-type particle image analyzer (FPIA manufactured by Sysmex Corporation). Approximately 0.2 g of the sample is dispersed in a 0.2 mass % aqueous solution (approximately 50 mL) of polyoxyethylene (20) sorbitan monolaurate as a surfactant, the dispersion is irradiated with 28 kHz ultrasonic waves at an output of 60 W for 1 minute, and particles having diameters in the range of 3 to 40 μm are analyzed while setting the detection range to 0.6 to 400 μm.

The circularity may be increased by any method without limitation. A spheronization treatment is preferable because the obtainable sphere particles can form an electrode having a uniform shape of the gaps between the particles. Examples of the spheronization treatments include mechanical spheronization methods by the application of shear force or compressive force, and mechanical/physical treatment methods in which fine particles are unified with a binder or by the adhesion of the particles themselves.

(Tap Density)

The tap density of the carbonaceous material is usually 0.1 g·cm$^{-3}$ or above, preferably 0.5 g·cm$^{-3}$ or above, more preferably 0.7 g·cm$^{-3}$ or above, and particularly preferably 1 g·cm$^{-3}$ or above, and is preferably 2 g·cm$^{-3}$ or less, more preferably 1.8 g·cm$^{-3}$ or less, and particularly preferably 1.6 g·cm$^{-3}$ or less. When the tap density is in this range, the battery capacity can be ensured and the increase in the resistance between the particles can be suppressed.

The tap density is measured by allowing the particles to fall into a 20 cm$^3$ tapping cell through a sieve having a mesh opening of 300 μm until the sample reaches the upper end of the cell, and tapping the cell 1000 times with a stroke length of 10 mm with use of a powder density meter (for example, Tap Denser manufactured by Seishin Enterprise Co., Ltd.). The tap density is calculated based on the mass of the whole and the mass of the sample.

(Orientation Ratio)

The orientation ratio of the carbonaceous material is usually 0.005 or above, preferably 0.01 or above, and more preferably 0.015 or above, and is usually 0.67 or less. When the orientation ratio is in this range, excellent high-density charge/discharge characteristics can be ensured. The upper limit of the above range is the theoretical upper limit of the orientation ratio of the carbonaceous materials.

The orientation ratio is measured by X-ray diffractometry with respect to a compact of the sample. The sample weighing 0.47 g is packed into a molding machine 17 mm in diameter and is compressed at 58.8 MN·m$^{-2}$. With use of clay, the resultant compact is set so that the plane of the sample is on the same level as the plane of the measurement sample holder, and an X-ray diffraction spectrum is measured. Based on the peak intensities of (110) diffraction and (004) diffraction of carbon, the (110) diffraction peak intensity/(004) diffraction peak intensity ratio is calculated.

The X-ray diffractometry conditions are as follows. "2θ" indicates the diffraction angle.
Target: Cu (Kα ray) graphite monochromator
Slits:
  Divergence slit=0.5 degrees
  Receiving slit=0.15 mm
  Scattering slit=0.5 degrees
Measurement range and step angle/measurement time:
(110) Plane: 75 degrees≤2θ≤80 degrees, 1 degree/60 seconds
(004) Plane: 52 degrees≤2θ≤57 degrees, 1 degree/60 seconds (Aspect Ratio (Powder))

The aspect ratio of the carbonaceous material is usually 1 or more, and is usually 10 or less, preferably 8 or less, and more preferably 5 or less. This aspect ratio ensures that the material can be applied with enhanced uniformity while suppressing the occurrence of streaks on the electrodes, thus making it possible to ensure excellent high-current density charge/discharge characteristics. The lower limit of the above range is the theoretical lower limit of the aspect ratio of the carbonaceous materials.

The aspect ratio is measured with respect to particles of the carbonaceous material enlarged on a scanning electron microscope. Fifty graphite particles are selected randomly from the particles fixed to an end of a metal having a thickness of 50 μm or less. The stage on which the sample is fixed is rotated and tilted to observe each of the particles three-dimensionally. The largest diameter A of the particle of the carbonaceous material and the smallest diameter B that is perpendicular to the largest diameter A are measured. The average of the A/B ratios is determined.

<Configurations and Methods for Fabrication of Negative Electrodes>

The electrodes may be produced by any known methods as long as the advantageous effects of the invention are not significantly impaired. For example, the electrode may be formed by combining the negative electrode active material with a binder and a solvent and optionally with additives such as a thickener, a conductive material and a filler to give a slurry, and applying the slurry to a current collector followed by drying and pressing.

In the case of using the alloy material, a thin layer containing the negative electrode active material (a negative electrode active material layer) may be formed by a technique such as deposition, sputtering or plating.

(Current Collectors)

The current collectors on which the negative electrode active material is held may be any known collectors. Examples of the negative electrode current collectors include metal materials such as aluminum, copper, nickel, stainless steel and nickel-plated steel. In terms of easy processing and cost, copper is particularly preferable.

Examples of the shapes of the metallic current collectors include metal foils, metal cylinders, metal coils, metal plates, metal thin films, expanded metals, punched metals and porous metals. Metal thin films are preferable, and copper foils are more preferable. Rolled copper foils obtained by a rolling method, and electrolytic copper foils obtained by an electrolytic method are still more preferable for use as the current collectors.

From the points of view of ensuring the battery capacity and handling properties, the thickness of the current collectors is usually 1 µm or more, and preferably 5 µm or more, and is usually 100 µm or less, and preferably 50 µm or less.

(Thickness Ratio of Negative Electrode Active Material Layer to Current Collector)

The thickness ratio of the negative electrode active material layer to the current collector is not particularly limited. It is, however, preferable that the value of "(Thickness of negative electrode active material layer per side immediately before injecting of nonaqueous electrolytic solution)/(Thickness of current collector)" be 150 or less, more preferably 20 or less, and particularly preferably 10 or less, and be 0.1 or more, more preferably 0.4 or more, and particularly preferably 1 or more. When the thickness ratio of the negative electrode active material layer to the current collector is in the above range, the battery capacity can be ensured while the generation of heat from the current collector during charging and discharging at a high current density can be suppressed.

(Binders)

The binders for binding the particles of the negative electrode active material are not particularly limited as long as the binders are stable to the nonaqueous electrolytic solution and the solvents used in the production of the electrodes.

Specific examples include resin polymers such as polyethylene, polypropylene, polyethylene terephthalate, polymethyl methacrylate, aromatic polyamide, polyimide, cellulose and nitrocellulose; rubber polymers such as SBR (styrene-butadiene rubber), isoprene rubber, butadiene rubber, fluororubber, NBR (acrylonitrile-butadiene rubber) and ethylene-propylene rubber; styrene-butadiene-styrene block copolymer and hydrogenated products thereof; thermoplastic elastomeric polymers such as EPDM (ethylene-propylene-diene terpolymer), styrene-ethylene-butadiene-styrene copolymer, styrene-isoprene-styrene block copolymer and hydrogenated products of these polymers; soft resin polymers such as syndiotactic 1,2-polybutadiene, polyvinyl acetate, ethylene-vinyl acetate copolymer and propylene-α-olefin copolymer; fluorine-containing polymers such as polyvinylidene fluoride, polytetrafluoroethylene, fluorinated polyvinylidene fluoride and polytetrafluoroethylene-ethylene copolymer; and polymer compositions having conductivity for alkali metal ions (in particular, lithium ions). These binders may be used singly, or two or more may be used in combination in an appropriate ratio.

The ratio of the binder to the negative electrode active material is preferably 0.1 mass % or above, more preferably 0.5 mass % or above, and particularly preferably 0.6 mass % or above, and is preferably 20 mass % or less, more preferably 15 mass % or less, still more preferably 10 mass % or less, and particularly preferably 8 mass % or less. This ratio of the binder to the negative electrode active material ensures a sufficient battery capacity and a sufficient strength of the negative electrodes.

When, in particular, the binder includes a rubber polymer such as SBR as the main component, the ratio of the binder to the negative electrode active material is usually 0.1 mass % or above, preferably 0.5 mass % or above, and more preferably 0.6 mass % or above, and is usually 5 mass % or less, preferably 3 mass % or less, and more preferably 2 mass % or less. When the binder includes a fluorine-containing polymer such as polyvinylidene fluoride as the main component, the ratio of the binder to the negative electrode active material is usually 1 mass % or above, preferably 2 mass % or above, and more preferably 3 mass % or above, and is usually 15 mass % or less, preferably 10 mass % or less, and more preferably 8 mass % or less.

(Slurry-Forming Solvents)

The solvents for forming the slurry may be any kinds of solvents without limitation as long as the negative electrode active material, the binder, and a thickener and a conductive material that are optionally used can be dissolved or dispersed in the solvents. The solvents may be aqueous solvents or organic solvents.

Examples of the aqueous solvents include water and alcohols. Examples of the organic solvents include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, diethyl ether, hexamethylphosphoramide, dimethylsulfoxide, benzene, xylene, quinoline, pyridine, methylnaphthalene and hexane.

When, in particular, an aqueous solvent is used, it is preferable that the slurry be prepared while adding an additive such as a dispersant in combination with a thickener and while using the binder such as SBR in the form of a latex. The solvents may be used singly, or two or more may be used in combination in an appropriate ratio.

(Thickeners)

The thickener is usually used to control the viscosity of the slurry. The thickeners are not particularly limited. Specific examples include carboxymethylcellulose, methylcellulose, hydroxymethylcellulose, ethylcellulose, polyvinyl alcohol, oxidized starch, phosphorylated starch, casein and salts of these compounds. The thickeners may be used singly, or two or more may be used in combination in an appropriate ratio.

When the thickener is used, the ratio of the thickener to the negative electrode active material is usually 0.1 mass % or above, preferably 0.5 mass % or above, and more preferably 0.6 mass % or above, and is usually 5 mass % or less, preferably 3 mass % or less, and more preferably 2 mass % or less. When the ratio of the thickener to the negative electrode active material is in this range, it is possible to suppress the decrease in battery capacity and the increase in resistance, and also to ensure good application properties.

(Electrode Density)

The electrode structure of the electrodes formed of the negative electrode active material is not particularly limited. It is, however, preferable that the density of the negative electrode active material present on the current collector be 1 g·cm$^{-3}$ or more, more preferably 1.2 g·cm$^{-3}$ or more, and particularly preferably 1.3 g·cm$^{-3}$ or more, and be 2.2 g·cm$^{-3}$ or less, more preferably 2.1 g·cm$^{-3}$ or less, still more preferably 2.0 g·cm$^{-3}$ or less, and particularly preferably 1.9 g·cm$^{-3}$ or less. When the density of the negative electrode active material present on the current collector is in this range, the particles of the negative electrode active material are prevented from breakage. Further, the above density makes it possible to prevent an increase in initial irreversible capacity and to suppress deteriorations in high-current density charge/discharge characteristics due to poor accessibility of the nonaqueous electrolytic solution to the vicinity of the current collector/negative electrode active material interface. Furthermore, the above density ensures that the decrease in battery capacity and the increase in resistance are prevented.

(Thickness of Negative Electrode Plates)

The thickness of the negative electrode plates is not particularly limited and is designed in accordance with the positive electrode plates that are used. The thickness of the mixture layer excluding the thickness of the metal foil as the core is usually 15 µm or more, preferably 20 µm or more, and more preferably 30 µm or more, and is usually 300 µm or less, preferably 280 µm or less, and more preferably 250 µm or less.

(Coatings on Surface of Negative Electrode Plates)

Substances having a composition different from that of the negative electrode plates may be attached to the surface of the negative electrode plates. Examples of such adherent substances include oxides such as aluminum oxide, silicon oxide, titanium oxide, zirconium oxide, magnesium oxide, calcium oxide, boron oxide, antimony oxide and bismuth oxide, sulfate salts such as lithium sulfate, sodium sulfate, potassium sulfate, magnesium sulfate, calcium sulfate and aluminum sulfate, and carbonate salts such as lithium carbonate, calcium carbonate and magnesium carbonate.

2-2. Positive Electrodes

<Positive Electrode Active Materials>

Hereinbelow, positive electrode active materials used in the positive electrodes will be described.

(Compositions)

The positive electrode active materials are not particularly limited as long as the materials can electrochemically store and release lithium ions. For example, materials containing lithium and at least one transition metal are preferable. Specific examples include lithium-transition metal composite oxides and lithium-transition metal phosphate compounds.

Preferred examples of the transition metals in the lithium-transition metal composite oxides include V, Ti, Cr, Mn, Fe, Co, Ni and Cu. Specific examples include lithium-cobalt composite oxides such as $LiCoO_2$, lithium-nickel composite oxides such as $LiNiO_2$, lithium-manganese composite oxides such as $LiMnO_2$, $LiMn_2O_4$ and $Li_2MnO_4$, lithium-nickel-manganese-cobalt composite oxides such as $LiNi_{1/3}Mn_{1/3}CO_{1/3}O_2$ and $LiNi_{0.5}Mn_{0.3}Co_{0.2}O_2$, and composite oxides corresponding to the above lithium-transition metal composite oxides except that the main transition metal atoms are partially substituted by other elements such as Na, K, B, F, Al, Ti, V, Cr, Mn, Fe, Co, Li, Ni, Cu, Zn, Mg, Ga, Zr, Si, Nb, Mo, Sn and W. Examples of such substituted composite oxides include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.45}Co_{0.10}Al_{0.45}O_2$, $LiMn_{1.8}Al_{0.2}O_4$ and $LiMn_{1.5}Ni_{0.5}O_4$.

Preferred examples of the transition metals in the lithium-transition metal phosphate compounds include V, Ti, Cr, Mn, Fe, Co, Ni and Cu. Specific examples of the compounds include iron phosphates such as $LiFePO_4$, $Li_3Fe_2(PO_4)_3$ and $LiFeP_2O_7$, cobalt phosphates such as $LiCoPO_4$, and compounds corresponding to the above lithium-transition metal phosphate compounds except that the main transition metal atoms are partially substituted by other elements such as Al, Ti, V, Cr, Mn, Fe, Co, Li, Ni, Cu, Zn, Mg, Ga, Zr, Nb and Si.

The addition of lithium phosphate to the positive electrode active material advantageously enhances continuous charging characteristics. The manner in which lithium phosphate is used is not limited. Preferably, lithium phosphate is used as a mixture with the positive electrode active material described above. With respect to the total of the positive electrode active material and lithium phosphate, the lower limit of the amount of lithium phosphate is preferably 0.1 mass % or above, more preferably 0.3 mass % or above, and still more preferably 0.5 mass % or above, and the upper limit is preferably 10 mass % or less, more preferably 8 mass % or less, and still more preferably 5 mass % or less.

(Surface Coatings)

Substances of a composition different from that of the positive electrode active material may be attached to the surface of the positive electrode active material. Examples of such attaching substances include oxides such as aluminum oxide, silicon oxide, titanium oxide, zirconium oxide, magnesium oxide, calcium oxide, boron oxide, antimony oxide and bismuth oxide, sulfate salts such as lithium sulfate, sodium sulfate, potassium sulfate, magnesium sulfate, calcium sulfate and aluminum sulfate, carbonate salts such as lithium carbonate, calcium carbonate and magnesium carbonate, and carbon.

For example, these attaching substances may be attached to the surface of the positive electrode active material by a method in which the positive electrode active material is impregnated with the substance in a solution or suspension of a solvent, and the wet material is dried; a method in which the positive electrode active material is impregnated with an attaching substance precursor in a solution or suspension of a solvent, and the wet material is treated by heating or the like to perform the reaction of the precursor; and a method in which the substance is added to a positive electrode active material precursor and the mixture is calcined together. In the case of carbon, for example, a carbonaceous substance may be mechanically attached in the form of activated carbon or the like, later.

The lower limit of the mass of the adherent substance relative to the positive electrode active material is preferably 0.1 ppm or more, more preferably 1 ppm or more, and still more preferably 10 ppm or more, and the upper limit thereof is preferably 20% or less, more preferably 10% or less, and still more preferably 5% or less. The attaching substance can suppress the oxidation reaction of the electrolytic solution on the surface of the positive electrode active material, thereby extending the battery life. If the amount of the attaching substance is too small, these effects may not be obtained sufficiently. If present in an excessively large amount, the adherent inhibits the entry and exit of lithium ions to cause an increase in resistance at times.

In the invention, the positive electrode active materials carrying an adherent substance with a different composition on the surface are also written as the "positive electrode active materials".

(Shapes)

The shapes of the particles of the positive electrode active material may be conventional shapes such as bulky masses, polyhedrons, spheres, ellipses, plates, needles and columns. Further, primary particles may be aggregated to form secondary particles.

(Tap Density)

The tap density of the positive electrode active material is preferably 0.5 g/cm$^3$ or above, more preferably 0.8 g/cm$^3$ or above, and still more preferably 1.0 g/cm$^3$ or above. When the tap density of the positive electrode active material is in this range, it is possible to reduce the amounts of a dispersion medium, a conductive material and a binder required to form positive electrode active material layers, and consequently it is possible to ensure a high fill factor of the positive electrode active material and a high battery capacity. Dense positive electrode active material layers may be formed by using a composite oxide powder having a high tap density. In general, a higher tap density is more preferable, and the upper limit is not particularly limited. It is, however, preferable that the tap density be 4.0 g/cm$^3$ or less, more preferably 3.7 g/cm$^3$ or less, and still more preferably 3.5 g/cm$^3$ or less. This tap density ensures that the decrease in load characteristics is prevented.

In the invention, the tap density is measured in such a manner that 5 to 10 g of the positive electrode active material powder is placed into a 10 ml glass graduated cylinder, which is then tapped 200 times with a stroke of about 20 mm, and the packing density (the tap density) of the powder is measured in terms of g/cc.

(Median Diameter d50)

The median diameter d50 of the particles of the positive electrode active material (the secondary particle diameter when the primary particles are aggregated into secondary particles) is preferably 0.3 µm or more, more preferably 0.5 µm or more, still more preferably 0.8 µm or more, and most preferably 1.0 µm or more, and the upper limit is preferably 30 µm or less, more preferably 27 µm or less, still more preferably 25 µm or less, and most preferably 22 µm or less. This median diameter ensures that a high tap density is obtained and the decrease in battery performance is prevented, and also ensures that a slurry of the active material and other components such as a conductive material and a binder in a solvent can be applied to form thin films as positive electrodes of batteries while preventing the occurrence of problems such as streaks. The fill factor in the fabrication of positive electrodes may be further enhanced by using a mixture of two or more kinds of the positive electrode active materials having different median diameters d50.

In the invention, the median diameter d50 is measured with a known laser diffraction/scattering grain size distribution analyzer. When LA-920 manufactured by Horiba, Ltd. is used as the grain size distribution analyzer, the particles are dispersed in a 0.1 mass % aqueous sodium hexametaphosphate solution as the dispersion medium by the application of ultrasonic waves for 5 minutes, and the diameters are measured while setting the refractive index at 1.24.

(Average Primary Particle Diameter)

When the primary particles are aggregated into secondary particles, the average primary particle diameter of the positive electrode active material is preferably 0.05 or more, more preferably 0.1 µm or more, and still more preferably 0.2 µm or more, and the upper limit is preferably 5 µm or less, more preferably 4 µm or less, still more preferably 3 µm or less, and most preferably 2 µm or less. This average diameter ensures that a good fill factor and a sufficient specific surface area of the powder are obtained and the decrease in battery performance is prevented, and also ensures that the particles have appropriate crystallinity to ensure reversibility of charging and discharging.

In the invention, the primary particle diameters are measured by observation using a scanning electron microscope (SEM). Specifically, the largest length of a segment defined by a horizontal straight line intersecting the primary particle is measured with respect to fifty primary particles randomly selected in a ×10000 photograph, the results being averaged.

(BET Specific Surface Area)

The BET specific surface area of the positive electrode active material is preferably 0.1 m$^2$/g or more, more preferably 0.2 m$^2$/g or more, and still more preferably 0.3 m$^2$/g or more, and the upper limit is 50 m$^2$/g or less, preferably 40 m$^2$/g or less, and more preferably 30 m$^2$/g or less. When the BET specific surface area is in this range, a good battery performance is ensured while maintaining good application properties of the positive electrode active material.

In the invention, the BET specific surface area is defined as a value measured using a surface area meter (for example, an automatic surface area measuring apparatus manufactured by Okura Riken) in such a manner that the sample is preliminarily dried at 150° C. under a stream of nitrogen for 30 minutes and thereafter the analysis is performed by the nitrogen adsorption BET single point method by flowing a nitrogen-helium mixed gas prepared so that the pressure of nitrogen relative to the atmospheric pressure is exactly 0.3.

(Methods for Producing Positive Electrode Active Materials)

The positive electrode active material may be produced by a common method for the production of inorganic compounds. In particular, while various methods may be used to produce spherical or elliptical active materials, an exemplary method is such that a transition metal raw material is dissolved or is crushed and dispersed in a solvent such as water, the pH is adjusted while performing stirring so as to form a spherical precursor, which is then recovered and dried as required, thereafter a Li source such as LiOH, Li$_2$CO$_3$ or LiNO$_3$ is added, and the mixture is calcined at a high temperature to give the active material.

In the production of positive electrodes, the positive electrode active materials described hereinabove may be used singly or in combination with one or more positive electrode active materials having a different composition in an appropriate ratio. In this case, some preferred combinations are combinations of LiCoO$_2$ with LiMn$_2$O$_4$ or a similar structure such as LiNi$_{0.33}$Co$_{0.33}$Mn$_{0.33}$O$_2$ resulting from partial substitution of Mn by other metals such as transition metals, or with LiCoO$_2$ or a similar structure resulting from partial substitution of Co by other metals such as transition metals.

<Configurations and Methods for Fabrication of Positive Electrodes>

Hereinbelow, configurations of positive electrodes will be described. In the invention, the positive electrode may be fabricated by forming a positive electrode active material layer containing the positive electrode active material and a binder, onto a current collector. The positive electrodes may be produced using the positive electrode active material by a conventional method. That is, the positive electrode may be obtained by dry-mixing the positive electrode active material, a binder and optionally other components such as a conductive material and a thickener, and compression bonding a sheet of the mixture to a positive electrode current collector; or by dissolving or dispersing these materials in a liquid medium to give a slurry, applying the slurry onto a positive electrode current collector, and drying the wet film to form a positive electrode active material layer on the current collector.

In the positive electrode active material layer, the content of the positive electrode active material is preferably 80 mass % or above, more preferably 82 mass % or above, and particularly preferably 84 mass % or above. The upper limit is preferably 99 mass % or less, and more preferably 98 mass % or less. With this content, the electrical capacity of the positive electrode active material in the positive electrode active material layer may be ensured, and also the strength of the positive electrodes may be maintained. In order to increase the packing density of the positive electrode active material, it is preferable that the positive electrode active material layer formed by application and drying be pressed with a device such as a hand press or a roller press. The lower limit of the density of the positive electrode active material layer is preferably 1.5 g/cm$^3$ or more, more preferably 2 g/cm$^3$, and still more preferably 2.2 g/cm$^3$ or more, and the upper limit is preferably 5 g/cm$^3$ or less, more preferably 4.5 g/cm$^3$ or less, and still more preferably 4 g/cm$^3$ or less. This density ensures that good charge and discharge characteristics may be obtained and the increase in electrical resistance may be suppressed.

(Conductive Materials)

The conductive materials may be any known conductive materials. Specific examples include metal materials such as copper and nickel; and carbon materials, for example, black leads (graphites) such as natural graphite and artificial graphite; carbon blacks such as acetylene black; and amorphous carbons such as needle cokes. These materials may be used singly, or two or more may be used in combination in an appropriate ratio. The content of the conductive material(s) in the positive electrode active material layer is usually 0.01 mass % or above, preferably 0.1 mass % or above, and more preferably 1 mass % or above, and the upper limit is usually 50 mass % or less, preferably 30 mass % or less, and more preferably 15 mass % or less. This content ensures that sufficient conductive properties and sufficient battery capacity may be obtained.

(Binders)

The binders used in the production of the positive electrode active material layers are not particularly limited. When the layers are formed by an application method, any binders which may be dissolved or dispersed in the liquid media used in the electrode production may be used. Specific examples include resin polymers such as polyethylene, polypropylene, polyethylene terephthalate, polymethyl methacrylate, polyimide, aromatic polyamide, cellulose and nitrocellulose; rubber polymers such as SBR (styrene-butadiene rubber), NBR (acrylonitrile-butadiene rubber), fluororubber, isoprene rubber, butadiene rubber and ethylene-propylene rubber; thermoplastic elastomeric polymers such as styrene-butadiene-styrene block copolymer and hydrogenated products thereof, EPDM (ethylene-propylene-diene terpolymer), styrene-ethylene-butadiene-ethylene copolymer, and styrene-isoprene-styrene block copolymer and hydrogenated products thereof; soft resin polymers such as syndiotactic 1,2-polybutadiene, polyvinyl acetate, ethylene-vinyl acetate copolymer and propylene-α-olefin copolymer; fluorine-containing polymers such as polyvinylidene fluoride (PVdF), polytetrafluoroethylene, fluorinated polyvinylidene fluoride and polytetrafluoroethylene-ethylene copolymer; and polymer compositions having conductivity for alkali metal ions (in particular, lithium ions). These binders may be used singly, or two or more may be used in combination in an appropriate ratio.

The proportion of the binder in the positive electrode active material layer is usually 0.1 mass % or above, preferably 1 mass % or above, and more preferably 1.5 mass % or above, and the upper limit is usually 80 mass % or less, preferably 60 mass % or less, more preferably 40 mass % or less, and most preferably 10 mass % or less. When used in an excessively low proportion, the binder fails to hold the positive electrode active material sufficiently and the mechanical strength of the positive electrode is decreased, possibly resulting in a decrease in battery performance such as cycle characteristics. On the other hand, adding an excessively large amount of the binder results in a decrease in battery capacity or conductive properties at times.

(Slurry-Forming Solvents)

The solvents for forming the slurry may be any kinds of solvents without limitation as long as the positive electrode active material, the conductive material, the binder and an optional thickener can be dissolved or dispersed in the solvents. The solvents may be aqueous solvents or organic solvents. Examples of the aqueous media include water, and mixed media of alcohols and water. Examples of the organic media include aliphatic hydrocarbons such as hexane; aromatic hydrocarbons such as benzene, toluene, xylene and methylnaphthalene; heterocyclic compounds such as quinoline and pyridine; ketones such as acetone, methyl ethyl ketone and cyclohexanone; esters such as methyl acetate and methyl acrylate; amines such as diethylenetriamine and N,N-dimethylaminopropylamine; ethers such as diethyl ether, propylene oxide and tetrahydrofuran (THF); amides such as N-methylpyrrolidone (NMP), dimethylformamide and dimethylacetamide; and aprotic polar solvents such as hexamethylphosphoramide and dimethylsulfoxide.

When, in particular, an aqueous medium is used, it is preferable that the slurry be prepared while adding a thickener and while using the binder such as styrene-butadiene rubber (SBR) in the form of a latex. The thickener is usually used to control the viscosity of the slurry. The thickeners are not particularly limited. Specific examples include carboxymethylcellulose, methylcellulose, hydroxymethylcellulose, ethylcellulose, polyvinyl alcohol, oxidized starch, phosphorylated starch, casein and salts of these compounds. The thickeners may be used singly, or two or more may be used in combination in an appropriate ratio. When the thickener is used, the ratio of the thickener to the active material is 0.1 mass % or above, preferably 0.2 mass % or above, and more preferably 0.3 mass % or above, and the upper limit is 5 mass % or less, preferably 3 mass % or less, and more preferably 2 mass % or less. This ratio ensures that good application properties may be obtained, and the decrease in battery capacity and the increase in resistance may be prevented.

(Current Collectors)

The materials of the positive electrode current collectors are not particularly limited, and any known materials may be used. Specific examples include metal materials such as aluminum, stainless steel, nickel plating, titanium and tantalum; and carbon materials such as carbon cloth and carbon paper. Of these, metal materials are preferable, and aluminum is particularly preferable.

Examples of the shapes of the metallic current collectors include metal foils, metal cylinders, metal coils, metal plates, metal thin films, expanded metals, punched metals and porous metals. Examples of the shapes of the carbon current collectors include carbon plates, carbon thin films and carbon cylinders. Of these, metal thin films are preferable. The thin films may be in the form of meshed films as appropriate. The thickness of the thin films is not limited. From the points of view of the strength and the handling properties of the current collectors, the thickness is usually 1 µm or more, preferably 3 µm or more, and more preferably 5 µm or more, and the upper limit is usually 1 mm or less, preferably 100 µm or less, and more preferably 50 µm or less.

In order to reduce the electronic contact resistance between the current collector and the positive electrode active material layer, it is also preferable that the surface of the current collector be coated with a conductive auxiliary. Examples of the conductive auxiliaries include carbon and noble metals such as gold, platinum and silver.

The thickness ratio of the positive electrode active material layer to the current collector is not particularly limited. It is, however, preferable that the value of (Thickness of positive electrode active material layer per side immediately before poring of electrolytic solution)/(Thickness of current collector) be 20 or less, more preferably 15 or less, and most preferably 10 or less, and the lower limit be 0.5 or more, more preferably 0.8 or more, and most preferably 1 or more. If the ratio is above this range, the current collector may generate Joule heat during charging and discharging at a high current density. The satisfaction of the above range ensures that the generation of heat from the current collector during charging and discharging at a high current density may be suppressed and the battery capacity may be ensured.

(Electrode Area)

In order to increase the output and the stability at high temperatures in the use of the electrolytic solution of the invention, it is preferable that the area of the positive electrode active material layers be larger than the outer surface area of a battery exterior case. Specifically, the total of the electrode areas of the positive electrode is preferably 15 times or more, and more preferably 40 times or more larger than the surface area of the exterior of the secondary battery. In the case of a bottomed square case, the outer surface area of the exterior case is the total area calculated from the length, the width and the thickness of the case accommodating the electricity-generating element except the projections of the terminals. In the case of a bottomed cylindrical case, the outer surface area is the geometric surface area obtained by approximating that the case accommodating the electricity-generating element except the projections of the terminals is a cylinder. The total of the electrode areas of the positive electrode is the geometric surface area of the positive electrode mixture layer(s) opposed to the mixture layer(s) including the negative electrode active material. In the case where the positive electrode mixture layers are formed on both sides of the current collector foil, the total of the electrode areas is the total of the areas of the surfaces calculated separately.

(Thickness of Positive Electrode Plates)

The thickness of the positive electrode plates is not particularly limited. From the points of view of high capacity and high output, the lower limit of the thickness of the mixture layers per side of the current collector obtained by subtracting the thickness of the metal foil as the core is preferably 10 µm or more, and more preferably 20 µm or more, and the upper limit is preferably 500 µm or less, and more preferably 450 µm or less.

(Coatings on Surface of Positive Electrode Plates)

Substances having a composition different from that of the positive electrode plates may be attached to the surface of the positive electrode plates. Examples of such adherent substances include oxides such as aluminum oxide, silicon oxide, titanium oxide, zirconium oxide, magnesium oxide, calcium oxide, boron oxide, antimony oxide and bismuth oxide, sulfate salts such as lithium sulfate, sodium sulfate, potassium sulfate, magnesium sulfate, calcium sulfate and aluminum sulfate, carbonate salts such as lithium carbonate, calcium carbonate and magnesium carbonate, and carbon.

2-3. Separators

A separator is usually disposed between the positive electrode and the negative electrode to prevent short-circuits. In this case, the separator is usually impregnated with the electrolytic solution of the invention.

The materials and the shapes of the separators are not particularly limited, and known materials and shapes may be used appropriately as long as the advantageous effects of the invention are not significantly impaired. In particular, use may be made of those materials which are stable to the electrolytic solution of the invention such as resins, glass fibers and inorganic substances. Those having excellent liquid retention properties such as porous sheets and nonwoven fabrics are preferably used.

Examples of the materials for the resin and glass fiber separators include polyolefins such as polyethylene and polypropylene, aromatic polyamide, polytetrafluoroethylene, polyethersulfone and glass filters. In particular, glass filters and polyolefins are preferable, and polyolefins are more preferable. These materials may be used singly, or two or more may be used in combination in an appropriate ratio or may be stacked. Specific examples of the stacks of two or more materials include three-layer separators in which polypropylene, polyethylene and polypropylene are stacked together in this order.

The thickness of the separators is not limited, but is usually 1 µm or more, preferably 5 µm or more, and more preferably 8 µm or more, and is usually 50 µm or less, preferably 40 µm or less, and more preferably 30 µm or less. This thickness ensures insulating properties and mechanical strength, and also ensures battery performance such as rate characteristics and energy density.

When a porous separator such as a porous sheet or a nonwoven fabric is used, the porosity of the separator is not limited, but is usually 20% or more, preferably 35% or more, and more preferably 45% or more, and is usually 90% or less, preferably 85% or less, and more preferably 75% or less. This porosity ensures insulating properties and mechanical strength and also ensures that the film resistance may be reduced and good rate characteristics may be obtained.

The average pore diameter of the separators is not limited, but is usually 0.5 µm or less, and preferably 0.2 µm or less, and is usually 0.05 µm or more. Any average pore diameter exceeding the above range increases the probability of short-circuits. The above average pore diameter ensures that the film resistance is low and good rate characteristics are obtained while preventing the occurrence of short-circuits. Examples of the inorganic substances as the materials include oxides such as alumina and silicon dioxide, nitrides such as aluminum nitride and silicon nitride, and sulfate salts such as barium sulfate and calcium sulfate. Particulate or fibrous inorganic substances are used.

The forms of such separators may be thin films such as nonwoven fabrics, woven fabrics and microporous films. Thin-film separators having a pore diameter of 0.01 to 1 μm and a thickness of 5 to 50 μm are suitably used. While the separators may be independent thin films as described above, the separators may be composite porous layers that are formed on the surface of the positive electrodes and/or the negative electrodes using particles of the inorganic substance and a resin binder. For example, porous layers may be formed on both sides of the positive electrode using alumina particles having a D90 particle diameter of less than 1 μm and a fluororesin as a binder.

2-4. Battery designs

<Electrode Assemblies>

The electrode assembly may be a stack of the positive electrode plate and the negative electrode plate through the separator, or may be a structure in which the positive electrode plate and the negative electrode plate are wound through the separator into a coil. The proportion of the mass of the electrode assembly to the inner volume of the battery (hereinafter, written as the electrode assembly occupancy rate) is usually 40% or above, and preferably 50% or above, and is usually 90% or less, and preferably 80% or less. When the electrode assembly occupancy rate is in this range, it is possible to ensure the battery capacity and to prevent inconveniences associated with the increase in internal pressure, for example, deteriorations in characteristics such as charge-discharge repetition characteristics and high-temperature storage characteristics, and the actuation of gas release valves.

<Current-Collecting Structures>

The current-collecting structures are not particularly limited. Such structures that the resistance at wirings and joints is low are preferable. In the case of a stack electrode assembly, the current-collecting structure is suitably formed by welding bundles of the metallic cores of the respective electrode layers to terminals. In view of the fact that a large electrode has a high internal resistance, it is preferable that a plurality of terminals be disposed in such an electrode to decrease the resistance. In the case of a wound electrode assembly, a plurality of leads may be provided on each of the positive and the negative electrodes and the bundles of the leads may be connected to respective terminals, thereby reducing the internal resistance.

<Exterior Cases>

The materials of the exterior cases are not particularly limited as long as they are stable to the nonaqueous electrolytic solution. Specific examples include metals such as nickel-plated steel sheets, stainless steel, aluminum, aluminum alloys and magnesium alloys, and resin/aluminum foil stack films (laminate films). From the point of view of weight reduction, metals such as aluminum and aluminum alloys, and laminate films are suitably used.

Examples of the metallic exterior cases include tightly sealed structures formed by welding the metals by laser welding, resistance welding or ultrasonic welding, and structures formed by caulking or crimping the metals via resin gaskets. Examples of the laminate-film exterior cases include tightly sealed structures formed by fusion bonding the resin layers. To enhance sealing properties, the resin layers may be fusion bonded via a resin different from the resin used in the laminate film. When, in particular, a sealed structure is produced by fusion bonding the resin layers while the current-collecting terminals are interposed between the resin layers, a polar group-containing resin or a resin modified by the introduction of a polar group is suitably used to mediate the bond between the metal and the resin. The shapes of the exterior bodies are not limited and may be, for example, any of cylindrical shapes, square shapes, laminate shapes, coin shapes and large shapes.

<Protective Elements>

Protective elements may be used such as PTC (positive temperature coefficient) detectors, thermal fuses and thermistors that increase resistance in the event of abnormal heat generation or overcurrent, and valves (current cutoff valves) that interrupt the flow of current passing through the circuits upon a rapid increase in internal pressure or internal temperature in the batteries due to abnormal heat generation. It is preferable to select protective elements that do not operate at a high current under normal conditions. It is more preferable to design the batteries so that any abnormal heat generation or thermal runaway does not occur even in the absence of protective elements.

EXAMPLES

Hereinbelow, the present invention will be described in greater detail based on Examples and Comparative Examples. The scope of the invention is not limited to such Examples without departing from the spirit of the invention.

Some of the compounds used in Examples are shown below.

[Chem. 35]

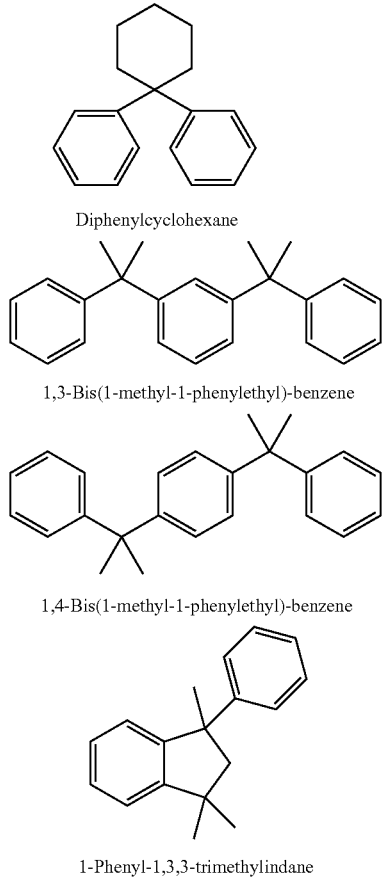

Diphenylcyclohexane 1,3-Bis(1-methyl-1-phenylethyl)-benzene 1,4-Bis(1-methyl-1-phenylethyl)-benzene 1-Phenyl-1,3,3-trimethylindane -continued

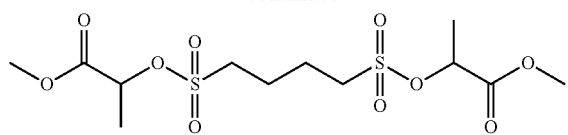

1-Methoxycarbonylethyl 1,4-butanedisulfonate

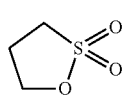 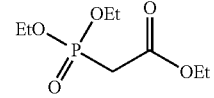

1,3-Propanesultone    Ethyl diethylphosphonoacetate

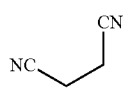 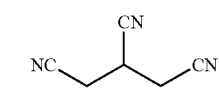

Succinonitrile    1,2,3-Propanetricarbonitrile

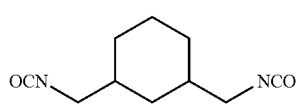

1,3-Bis(isocyanatomethyl)cyclohexane

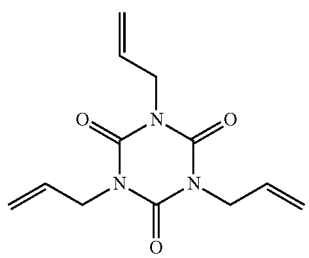

Triallyl isocyanurate

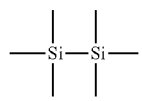

Hexamethyldisilane

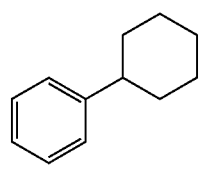

Cyclohexylbenzene

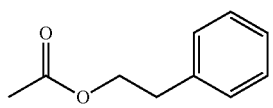

2-Phenylethyl acetate

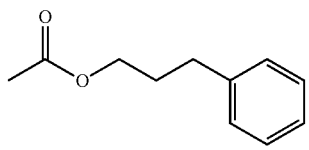

3-Phenylpropyl acetate

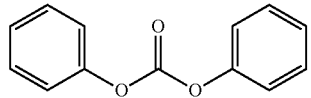

Diphenyl carbonate

-continued

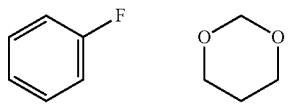

Fluorobenzene    1,3-Dioxane

The structural formulae of some of the compounds used in Comparative Examples are shown below.

[Chem. 36]

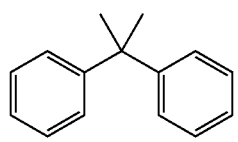

2,2-Diphenylpropane

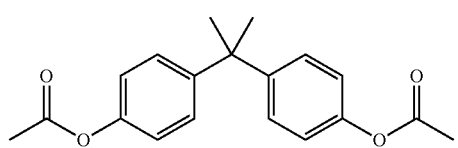

2,2-Bis(4-acetoxyphenyl)propane

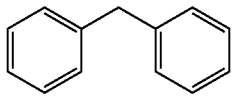

Diphenylmethane

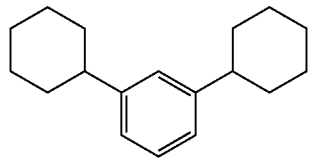

1,3-Dicyclohexylbenzene

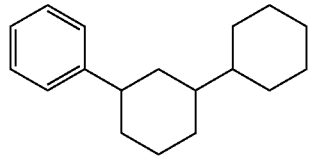

3-Phenyldicyclohexyl

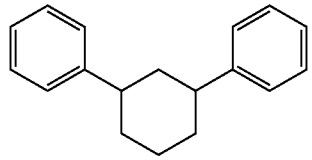

1,3-Diphenylcyclohexane

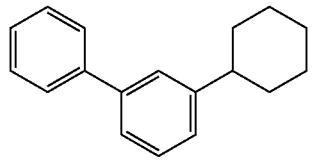

3-Cyclohexylbiphenyl

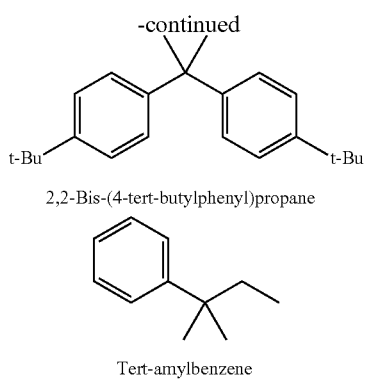

2,2-Bis-(4-tert-butylphenyl)propane

Tert-amylbenzene

Examples 1-1 to 1-4 and Comparative Examples 1-1 to 1-7

Methods for the manufacturing and the evaluations of batteries of Examples 1-1 to 1-4 and Comparative Examples 1-1 to 1-7 are described below.

[Evaluation of Initial Characteristics]

A sheet-shaped nonaqueous electrolyte secondary battery was immersed in an ethanol bath to measure the buoyancy. While being sandwiched between glass plates to increase the contact between the electrodes, the battery was charged at 25° C. and at a constant current corresponding to 0.3 C until the voltage reached 4.1 V, and was thereafter discharged to 3 V at a constant current of 0.3 C. The difference between the charge capacity and the discharge capacity in this process was obtained as the initial irreversible capacity, and the ratio of the discharge capacity to the charge capacity as the initial efficiency. After the battery was stabilized by being further subjected to three cycles of charging and discharging, the battery was charged again to 4.2 V at a constant current of 0.3 C and was charged at a constant voltage of 4.2 V until the current value reached 0.05 C. The battery was then discharged to 3 V at a constant current of 0.3 C, and the discharge capacity obtained during this discharging process was defined as the initial 0.3 C capacity. Thereafter, the battery was charged in the similar manner and was discharged to 3 V at a constant current of 3.0 C, and the initial 3 C capacity was obtained. Further, the battery was charged in the similar manner and was discharged to 3 V at a constant current of 5.0 C, and the initial 5 C capacity was obtained. 1 C indicates a value of current at which a reference capacity of a battery is discharged in 1 hour. For example, 0.3 C indicates a current that is 0.3 times the 1 C current.

[Evaluation of Overcharge Characteristics]

The sheet-shaped nonaqueous electrolyte secondary battery fabricated as described above was charged to 4.2 V at a constant current of 0.3 C, and was charged until the current value became 0.05 C. The battery was allowed to stand in a thermostatic chamber at 45° C. for 3 hours and thereby the temperature was stabilized. Thereafter, the battery was overcharged for 48 minutes at a current corresponding to 1.0 C. After being allowed to stand for 20 minutes, the OCV of the battery was measured. Further, the battery was recovered and was immersed in an ethanol bath again to measure the buoyancy. The change in volume between the battery before the evaluation of initial characteristics and the overcharged battery was measured as the overcharge gas production.

The lower the OCV of the battery after the overcharge test, the smaller the overcharge depth and the higher the overcharge safety. In such types of batteries that a safety valve is operated upon a detection of an unusual increase in internal pressure due to abnormalities such as overcharging, the generation of a larger amount of gas after overcharging is more preferable because the safety valve can be operated early.

Example 1-1

Production of Positive Electrode

In N-methylpyrrolidone solvent, 90 mass % of lithium-nickel-cobalt-manganese composite oxide (LiNi$_{1/3}$Mn$_{1/3}$Co$_{1/3}$O$_2$) as a positive electrode active material, 7 mass % of acetylene black as a conductive material and 3 mass % of polyvinylidene fluoride (PVdF) as a binder were mixed together with use of a disperser to give a slurry. The slurry was uniformly applied onto a surface of a 15 μm thick aluminum foil, and was dried and pressed. A positive electrode was thus fabricated.

[Production of Negative Electrode]

A slurry was prepared by mixing an amorphous coated graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of amorphous coated graphite:sodium carboxymethylcellulose:styrene-butadiene rubber was 97.5:1.5:1.

[Production of Electrolytic Solution]

In a dry argon atmosphere, diphenylcyclohexane was added to a mixture of ethylene carbonate (EC), ethyl methyl carbonate (EMC) and dimethyl carbonate (DMC) (volume ratio 3:4:3) so that its content in nonaqueous electrolytic solution would be 2.99 mass %. Thereafter, sufficiently dried LiPF$_6$ was dissolved therein with a concentration of 1.0 mol/L. An electrolytic solution was thus prepared.

[Production of Secondary Battery]

The positive electrode and the negative electrode described above, and a polypropylene separator were stacked in the order of the negative electrode, the separator and the positive electrode, thus forming a battery element. The battery element was inserted into a bag made of a laminate film in which both sides of aluminum (thickness 40 μm) were coated with resin layers, while the terminals of the positive electrode and the negative electrode extended beyond the bag. Thereafter, the electrolytic solution was injected into the bag, and the bag was vacuum sealed. The thus-formed nonaqueous electrolyte secondary battery was subjected to the evaluations of initial characteristics and overcharge characteristics. The evaluation results are described in Table 1.

Example 1-2

A nonaqueous electrolyte secondary battery was fabricated in the same manner as in Example 1-1, except that diphenylcyclohexane used in the electrolytic solution of Example 1 was replaced by 2.6 mass % of 1,3-bis(1-methyl-1-phenylethyl)-benzene. The battery was subjected to the evaluations of initial characteristics and overcharge characteristics. The evaluation results are described in Table 1.

Example 1-3

A nonaqueous electrolyte secondary battery was fabricated in the same manner as in Example 1-1, except that diphenylcyclohexane used in the electrolytic solution of Example 1 was replaced by 2.6 mass % of 1,4-bis(1-methyl-1-phenylethyl)-benzene. The battery was subjected to the evaluations of initial characteristics and overcharge characteristics. The evaluation results are described in Table 1.

Example 1-4

A nonaqueous electrolyte secondary battery was fabricated in the same manner as in Example 1-1, except that diphenylcyclohexane used in the electrolytic solution of Example 1 was replaced by 3.0 mass % of 1-phenyl-1,3,3-trimethylindane. The battery was subjected to the evaluations of initial characteristics and overcharge characteristics. The evaluation results are described in Table 1.

Comparative Example 1-1

A nonaqueous electrolyte secondary battery was fabricated in the same manner as in Example 1-1, except that diphenylcyclohexane used in the electrolytic solution of Example 1-1 was not added. The battery was subjected to the evaluations of initial characteristics and overcharge characteristics. The evaluation results are described in Table 1.

Comparative Example 1-2

A nonaqueous electrolyte secondary battery was fabricated in the same manner as in Example 1-1, except that diphenylcyclohexane used in the electrolytic solution of Example 1-1 was replaced by 2.0 mass % of cyclohexylbenzene. The battery was subjected to the evaluations of initial characteristics and overcharge characteristics. The evaluation results are described in Table 1.

Comparative Example 1-3

A nonaqueous electrolyte secondary battery was fabricated in the same manner as in Example 1-1, except that diphenylcyclohexane used in the electrolytic solution of Example 1-1 was replaced by 2.5 mass % of 2,2-diphenylpropane. The battery was subjected to the evaluations of initial characteristics and overcharge characteristics. The evaluation results are described in Table 1.

Comparative Example 1-4

A nonaqueous electrolyte secondary battery was fabricated in the same manner as in Example 1-1, except that diphenylcyclohexane used in the electrolytic solution of Example 1-1 was replaced by 2.0 mass % of 2,2-bis(4-acetoxyphenyl)propane. The battery was subjected to the evaluations of initial characteristics and overcharge characteristics. The evaluation results are described in Table 1.

Comparative Example 1-5

A nonaqueous electrolyte secondary battery was fabricated in the same manner as in Example 1-1, except that diphenylcyclohexane used in the electrolytic solution of Example 1-1 was replaced by 2.5 mass % of diphenylmethane. The battery was subjected to the evaluations of initial characteristics and overcharge characteristics. The evaluation results are described in Table 1.

Comparative Example 1-6

A nonaqueous electrolyte secondary battery was fabricated in the same manner as in Example 1-1, except that diphenylcyclohexane used in the electrolytic solution of Example 1-1 was replaced by 3.0 mass % of hydrogenated terphenyls (hydrogenation rate: 52.8%) including the following compounds:
(1,3-dicyclohexylbenzene 28.3 mass %
3-phenyldicyclohexyl 30.7 mass %
1,3-diphenylcyclohexane 22.8 mass %
3-cyclohexylbiphenyl 18.2 mass %). The battery was subjected to the evaluations of initial characteristics and overcharge characteristics. The evaluation results are described in Table 1.

Comparative Example 1-7

A nonaqueous electrolyte secondary battery was fabricated in the same manner as in Example 1, except that diphenylcyclohexane used in the electrolytic solution of Example 1-1 was replaced by 3.9 mass % of 2,2-bis-(4-tert-butylphenyl)-propane. The battery was subjected to the evaluations of initial characteristics and overcharge characteristics. The evaluation results are described in Table 1.

TABLE 1

| | Additives | | Amounts/ mass % | Initial charge-discharge efficiencies/% | Overcharge gas productions/% |
|---|---|---|---|---|---|
| Example 1-1 | 1,1-Diphenyl-cyclohexane | | 3.0 | 85.0 | 227 |
| Example 1-2 | 1,3-Bis(1-methyl-1-phenylethyl)-benzene | | 2.6 | 85.0 | 207 |
| Example 1-3 | 1,4-Bis(1-methyl-1-phenylethyl)-benzene | | 2.6 | 85.0 | 210 |
| Example 1-4 | 1-Phenyl-1,3,3-trimethylindane | | 3.0 | 85.0 | 223 |
| Comparative Example 1-1 | None | | — | 84.5 | 100 |
| Comparative Example 1-2 | Cyclohexylbenzene | | 2.0 | 84.4 | 173 |
| Comparative Example 1-3 | 2,2-Diphenylpropane | | 2.5 | 84.4 | 180 |
| Comparative Example 1-4 | 2,2-Bis(4-acetoxyphenyl)propane | | 2.0 | 83.2 | 107 |
| Comparative Example 1-5 | Diphenylmethane | | 2.1 | 84.3 | 107 |
| Comparative Example 1-6 | Hydrogenated terphenyls (hydrogenation rate: 52.8%) 1,3-Dicyclohexylbenzene 3-Phenyldicyclohexyl | 28.3 mass % 30.7 mass % | 3.0 | 83.7 | 217 |

TABLE 1-continued

|  | Additives | Amounts/ mass % | Initial charge-discharge efficiencies/% | Overcharge gas productions/% |
|---|---|---|---|---|
|  | 1,3-Diphenylcyclohexane | 22.8 mass % |  |  |
|  | 3-Cyclohexylbiphenyl | 18.2 mass % |  |  |
| Comparative Example 1-7 | 2,2-Bis-(4-tert-butylphenyl)-propane |  | 3.9 | 84.7 | 180 |

*Overcharge gas productions are values relative to the amount in Comparative Example 1-1 taken as 100.

As apparent from Table 1, the batteries of Examples 1-1 to 1-4 outperformed the additive-free battery of Comparative Example 1 in battery characteristics, specifically, in terms of initial efficiency. Further, their overcharge characteristics were significantly higher than those in Comparative Example 1-1. Furthermore, the batteries obtained in Examples 1-1 to 1-4 were shown to have higher initial efficiency and higher overcharge characteristics than those obtained in Comparative Examples 1-2, 1-3 and 1-7. In view of the additives used in these Comparative Examples, it is probable that the substitution of an aromatic ring in the additive with appropriate substituents results in an excellent balance between initial efficiency and overcharge characteristics of batteries.

According to the present invention, the nonaqueous electrolytic solution includes a specific compound which contains a carbon atom rendered quaternary by direct bonding of two aromatic rings and in which the number of carbon atoms in the hydrocarbon groups bonded to the aromatic ring is limited to a specific range. The results have shown that the use of such a nonaqueous electrolytic solution allows the batteries to achieve high initial efficiency and excellent performance while exhibiting an enhanced overcharge safety.

Example 1-5 and Comparative Examples 1-8 to 1-10

Methods for the manufacturing and the evaluations of batteries of Example 1-5 and Comparative Examples 1-8 to 1-10 are described below.

[Evaluation of High-Temperature Continuous Charging Characteristics]

While being sandwiched between glass plates to increase the contact between the electrodes, a sheet-shaped nonaqueous electrolyte secondary battery was charged at 25° C. for 6 hours at a constant current corresponding to 0.05 C and was further charged to 4.1 V at a constant current of 0.2 C. The battery was then discharged to 3 V at a constant current of 0.2 C. The battery was stabilized by being further subjected to two cycles in which the battery was charged at a constant current of 0.2 C to 4.4 V and then at the constant voltage (0.05 C cutoff) and was discharged to 3 V at a constant current of 0.2 C. Here, 1 C indicates a value of current at which a reference capacity of a battery is discharged in 1 hour. Thus, 0.05 C and 0.2 C indicate currents that are 1/20 and 1/5, respectively, of the 1 C current.

After being stabilized as described above, the battery was charged at 25° C. and at a constant current of 0.2 C to 4.4 V and then at the constant voltage (0.05 C cutoff) and was charged at 60° C. and at a constant current of 0.2 C and a constant voltage of 4.4 V for 68 hours. The value of current after 68 hours was obtained as the current in high-temperature continuous charging.

Example 1-5

Production of Positive Electrode

In N-methylpyrrolidone solvent, 90 mass % of lithium-nickel-cobalt-manganese composite oxide (LiNi$_{0.5}$Mn$_{0.3}$CO$_{0.2}$O$_2$) as a positive electrode active material, 7 mass % of acetylene black as a conductive material and 3 mass % of polyvinylidene fluoride (PVdF) as a binder were mixed together with use of a disperser to give a slurry. The slurry was uniformly applied onto a surface of a 15 μm thick aluminum foil, and was dried and pressed. A positive electrode was thus fabricated.

[Production of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite: sodium carboxymethylcellulose:styrene-butadiene rubber was 98:1:1.

[Production of Electrolytic Solution]

In a dry argon atmosphere, 1-phenyl-1,3,3-trimethylindane was added to a mixture of ethylene carbonate (EC), ethyl methyl carbonate (MEC) and dimethyl carbonate (DMC) (volume ratio 3:4:3) so that its content in nonaqueous electrolytic solution would be 4 mass %. Thereafter, sufficiently dried LiPF$_6$ was dissolved therein with a concentration of 1 mol/L. An electrolytic solution was thus prepared.

[Production of Secondary Battery]

The positive electrode and the negative electrode described above, and a polypropylene separator were stacked in the order of the negative electrode, the separator and the positive electrode, thus forming a battery element. The battery element was inserted into a bag made of a laminate film in which both sides of aluminum (thickness 40 μm) were coated with resin layers, while the terminals of the positive electrode and the negative electrode extended beyond the bag. Thereafter, the electrolytic solution was injected into the bag, and the bag was vacuum sealed. The thus-formed nonaqueous electrolyte secondary battery was subjected to the evaluation of high-temperature continuous charging characteristics. The evaluation results are described in Table 2.

Comparative Example 1-8

A nonaqueous electrolyte secondary battery was fabricated and evaluated in the same manner as in Example 1-5, except that 1-phenyl-1,3,3-trimethylindane used in the electrolytic solution of Example 1-5 was replaced by cyclohexylbenzene (CHB). The evaluation results are described in Table 2.

Comparative Example 1-9

A nonaqueous electrolyte secondary battery was fabricated and evaluated in the same manner as in Example 1-5, except that 1-phenyl-1,3,3-trimethylindane used in the electrolytic solution of Example 1-5 was replaced by tert-amylbenzene (TAB). The evaluation results are described in Table 2.

Comparative Example 1-10

A nonaqueous electrolyte secondary battery was fabricated and evaluated in the same manner as in Example 1-5, except that 1-phenyl-1,3,3-trimethylindane used in the electrolytic solution of Example 1-5 was not added. The evaluation results are described in Table 2.

TABLE 2

| | Additives | | Values of current in high-temperature continuous charging'/% |
|---|---|---|---|
| Example 1-5 | 1-Phenyl-1,3,3-trimethylindane | 4 mass % | 32 |
| Comparative Example 1-8 | CHB | 4 mass % | 397 |
| Comparative Example 1-9 | TAB | 4 mass % | 235 |
| Comparative Example 1-10 | None | | 100 |

*Values of current n high-temperature continuous charging are normalized values assuming the value in Comparative Example 1-10 as 100.

As apparent from Table 2, the battery of Example 1-5 achieved an excellent enhancement in high-temperature continuous charging characteristics as compared to the batteries of Comparative Examples 1-8 to 1-10 which did not contain 1-phenyl-1,3,3-trimethylindane.

Examples 2-1 to 2-2 and Comparative Examples 2-1 to 2-2

Methods for the manufacturing and the evaluations of batteries of Examples 2-1 to 2-2 and Comparative Examples 2-1 to 2-2 are described below.

Example 2-1

Production of Electrolytic Solution

In a dry argon atmosphere, LiPF$_6$ as an electrolyte was dissolved with a concentration of 1.2 mol/L into a mixed solvent including ethylene carbonate (EC), ethyl methyl carbonate (EMC) and diethyl carbonate (DEC) (volume ratio 3:4:3), thereby preparing a basic electrolytic solution. To the basic electrolytic solution, 1.0 mass % of 1-phenyl-1,3,3-trimethylindane as an additive was added. A nonaqueous electrolytic solution of Example 2-1 was thus prepared.

[Production of Positive Electrode]

In N-methylpyrrolidone solvent, 97 mass % of lithium cobaltate (LiCoO$_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Production of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10μm thick copper foil, and was dried and pressed. A negative electrode was thus fabricated. In the dried negative electrode, the mass ratio of natural graphite: sodium carboxymethylcellulose:styrene-butadiene rubber was 98:1:1.

[Production of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag made of a laminate film in which both sides of aluminum (thickness 40 μm) were coated with resin layers, while the terminals of the positive electrode and the negative electrodes extended beyond the bag. Thereafter, the nonaqueous electrolytic solution was injected into the bag, and the bag was vacuum sealed. A sheet-shaped nonaqueous electrolyte battery was thus fabricated.

[Evaluation of Initial Capacity]

While being sandwiched between glass plates in a pressed condition, the nonaqueous electrolyte battery was charged at 25° C. and at a constant current corresponding to 0.05 C for 6 hours, and was discharged to 3.0 V at a constant current of 0.2 C. Thereafter, the battery was charged at a constant current of 0.2 C to 4.1 V and then at the constant voltage (hereinafter, such charging is sometimes written as "CC-CV charging" as appropriate) (0.05 C cutoff), and was allowed to stand at 45° C. for 72 hours. Thereafter, the battery was discharged to 3 V at a constant current of 0.2 C. Next, the battery was CC-CV charged at 0.2 C to 4.35 V (0.05 C cutoff) and was discharged again at 0.2 C to 3 V. This operation was performed two times. The discharge capacity in the second process was obtained as the initial 0.2 C capacity. Further, the battery was CC-CV charged at 0.2 C to 4.35 V (0.05 C cutoff) and was discharged again at 0.5 C to 3 V, and the initial 0.5 C capacity was obtained. The initial rate characteristics were obtained by calculating (Initial 0.5 C capacity)÷(Initial 0.2 C capacity)×100.

Here, 1 C indicates a value of current at which a reference capacity of a battery is discharged in 1 hour. For example, 0.2 C indicates a current that is ⅕ of the 1 C current.

[Evaluation of High-Temperature Storage Characteristics]

The nonaqueous electrolyte battery subjected to the evaluation of initial capacity was CC-CV charged at 25° C. and at 0.2 C to 4.35 V (0.05 C cutoff), and was stored at a high temperature of 60° C. for 7 days. After being cooled sufficiently, the battery was discharged at 25° C. and at 0.2 C to 3 V, and the capacity remaining after the evaluation of high-temperature storage characteristics was measured and was expressed as a ratio to the initial capacity. The ratio was defined as the residual ratio (%). Further, the battery was CC-CV charged at 0.2 C to 4.35 V (0.05 C cutoff) and was discharged again at 0.2 C to 3 V. The ratio of the capacity to the initial capacity was obtained as the recovery ratio (%).

The nonaqueous electrolyte battery fabricated above was subjected to the evaluation of initial capacity and the evaluation of high-temperature storage characteristics. The evaluation results are described in Table 3 relative to the results of Comparative Example 2-1 taken as 100.0%. The same applies hereinafter.

Example 2-2

A nonaqueous electrolyte battery was fabricated and evaluated in the same manner as in Example 2-1, except that 1.0 mass % of 1-phenyl-1,3,3-trimethylindane used in the electrolytic solution of Example 2-1 was replaced by 1.0 mass % of 1-phenyl-1,3,3-trimethylindane and 5.0 mass % of monofluoroethylene carbonate.

Comparative Example 2-1

A nonaqueous electrolyte battery was fabricated and evaluated in the same manner as in Example 2-1, except that 1-phenyl-1,3,3-trimethylindane used in the electrolytic solution of Example 2-1 was not added.

Comparative Example 2-2

A nonaqueous electrolyte battery was fabricated and evaluated in the same manner as in Example 2-2, except that 1-phenyl-1,3,3-trimethylindane used in the electrolytic solution of Example 2-2 was not added.

and was thereafter discharged to 3 V at a constant current of 0.2 C. The difference between the charge capacity and the discharge capacity in this process was obtained as the initial irreversible capacity. The battery was stabilized by being further subjected to two cycles in which the battery was charged at a constant current of 0.2 C to 4.2 V and then at the constant voltage (0.05 C cutoff) and was discharged to 3 V at a constant current of 0.2 C. Here, 1 C indicates a value of current at which a reference capacity of a battery is discharged in 1 hour. Thus, 0.5 C and 0.2 C indicate currents that are ½ and ⅕, respectively, of the 1 C current.

[Evaluation of Discharge Storage Characteristics]

After being stabilized as described above, the battery was charged at 25° C. and at a constant current to 3 V and then at the constant voltage (2 hours cutoff). The battery was stored at 60° C. for 140 hours, and the open circuit voltage (OCV) was measured.

Example 3-1

Production of Positive Electrode

In N-methylpyrrolidone solvent, 90 mass % of lithium cobalt oxide ($LiCoO_2$) as a positive electrode active material, 5 mass % of acetylene black as a conductive material and 5 mass % of polyvinylidene fluoride (PVdF) as a binder were mixed together with use of a disperser to give a slurry. The slurry was uniformly applied to both sides of a 15 μm

TABLE 3

| | Additives | Initial rate characteristics/% | Residual ratios/% | Recovery ratios/% |
|---|---|---|---|---|
| Example 2-1 | 1-Phenyl-1,3,3-trimethylindane 1.0 mass % | 100.1 | 100.2 | 101.2 |
| Example 2-2 | 1-Phenyl-1,3,3-trimethylindane 1.0 mass % Monofluoroethylene carbonate 5.0 mass % | 101.7 | 102.6 | 101.1 |
| Comparative Example 2-1 | None | 100.0 | 100.0 | 100.0 |
| Comparative Example 2-2 | Monofluoroethylene carbonate 5.0 mass % | 101.8 | 98.2 | 100.1 |

*Initial rate characteristics, residual ratios and recovery ratios are values relative to the results of Comparative Example 2-1 taken as 100.0%.

From Table 3, it has been shown that the use of the inventive nonaqueous electrolytic solutions of Example 2-1 and Example 2-2 realized excellent initial rate characteristics, residual ratio and recovery ratio as compared to those obtained without the addition of the aromatic compounds represented by Formula (I) (Comparative Example 2-1 and Comparative Example 2-2). The results of Example 2-2 have shown that the combined use of the aromatic compound represented by Formula (I) with monofluoroethylene carbonate that is a fluorine-containing cyclic carbonate provides marked enhancements in the characteristics.

Examples 3-1 to 3-2 and Comparative Examples 3-1 to 3-2

Methods for the manufacturing and the evaluations of batteries of Examples 3-1 to 3-2 and Comparative Examples 3-1 to 3-2 are described below.

[Evaluation of Initial Characteristics]

While being sandwiched between glass plates to increase the contact between the electrodes, a sheet-shaped nonaqueous electrolyte secondary battery was charged at 25° C. and at a constant current corresponding to 0.2 C for 1.5 hours, thick aluminum foil, and was dried and pressed. A positive electrode was thus fabricated.

[Production of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite:sodium carboxymethylcellulose:styrene-butadiene rubber was 98:1:1.

[Production of Electrolytic Solution]

In a dry argon atmosphere, 1-phenyl-1,3,3-trimethylindane and lithium difluorophosphate ($LiPO_2F_2$) were added to a mixture of ethylene carbonate (EC) and ethyl methyl carbonate (EMC) (volume ratio 3:7) so that their contents in nonaqueous electrolytic solution would be 1.5 mass % and 1 mass %, respectively. Thereafter, sufficiently dried $LiPF_6$ was dissolved therein with a concentration of 1.0 mol/L. An electrolytic solution was thus prepared.

[Production of Secondary Battery]

The positive electrode and the negative electrodes described above, and polyethylene separators were stacked in the order of the negative electrode, the separator, the positive electrode, the separator and the negative electrode, thus forming a battery element. The battery element was inserted into a bag made of a laminate film in which both sides of aluminum (thickness 40 μm) were coated with resin layers, while the terminals of the positive electrode and the negative electrodes extended beyond the bag. Thereafter, the electrolytic solution was injected into the bag, and the bag was vacuum sealed. The thus-formed nonaqueous electrolyte secondary battery was subjected to the evaluations of initial characteristics and discharge storage characteristics. The evaluation results are described in Table 4.

Example 3-2

A nonaqueous electrolyte secondary battery was fabricated and evaluated in the same manner as in Example 3-1, except that $LiPO_2F_2$ used in the electrolytic solution of Example 1 was not added. The evaluation results are described in Table 4.

Comparative Example 3-1

A nonaqueous electrolyte secondary battery was fabricated and evaluated in the same manner as in Example 3-1, except that 1-phenyl-1,3,3-trimethylindane used in the electrolytic solution of Example 3-1 was not added. The evaluation results are described in Table 4.

Comparative Example 3-2

A nonaqueous electrolyte secondary battery was fabricated and evaluated in the same manner as in Example 3-1, except that 1-phenyl-1,3,3-trimethylindane and $LiPO_2F_2$ used in the electrolytic solution of Example 3-1 were not added. The evaluation results are described in Table 4.

the battery of Example 3-2 which included the aromatic compound represented by Formula (I) alone.

Examples 4-1 to 4-2 and Comparative Example 4-1

Methods for the manufacturing and the evaluations of batteries of Examples 4-1 to 4-2 and Comparative Example 4-1 are described below.

[Evaluation of Initial Characteristics]

A sheet-shaped nonaqueous electrolyte secondary battery was immersed in an ethanol bath to measure the buoyancy. While being sandwiched between glass plates to increase the contact between the electrodes, the battery was charged at 25° C. and at a constant current of 0.2 C until the voltage reached 4.2 V, and was thereafter discharged to 3 V at a constant current of 0.3 C. The ratio of the discharge capacity to the charge capacity obtained during this process was defined as the initial charge-discharge efficiency. The battery was stabilized by being further subjected to two cycles in which the battery was charged at a constant current of 0.3 C to 4.2 V and then at the constant voltage (0.05 C cutoff) and was discharged to 3 V at a constant current of 0.3 C. Here, 1 C indicates a value of current at which a reference capacity of a battery is discharged in 1 hour. Thus, 0.05 C and 0.2 C indicate currents that are ½₀ and ⅕, respectively, of the 1 C current, and 0.3 C is a current that is ³⁄₁₀ of the 1 C current.

[Evaluation of High-Temperature Cycle Characteristics]

After being stabilized as described above, the battery was subjected to 300 cycles in which the battery was charged to 4.2 V and was discharged to 3 V at 60° C. and at a constant current of 2 C. Thereafter, the battery was immersed in an ethanol bath at 25° C. to measure the buoyancy. The difference in buoyancy between before the initial charging and discharging and after the 300 cycles was obtained as the 300 cycle gas production.

TABLE 4

| | Additives | | OCV after discharge storage (mV vs. Comp. Ex. 3-2) | Initial irreversible capacities (mAh/g vs. Comp. Ex. 3-2) |
|---|---|---|---|---|
| Example 3-1 | 1-Phenyl-1,3,3-trimethylindane $LiPO_2F_2$ | 1.5 mass % 1 mass % | 97 | −0.8 |
| Example 3-2 | 1-Phenyl-1,3,3-trimethylindane | 1.5 mass % | 4 | −0.2 |
| Comparative Example 3-1 | $LiPO_2F_2$ | 1 mass % | −122 | −0.5 |
| Comparative Example 3-2 | None | | 0 | 0 |

*OCV after discharge storage and irreversible capacities are shown as differences from the values of Comparative Example 3-2 taken as 0.

From Table 4, it is clear that the batteries of Examples 3-1 to 3-2 have excellent properties in terms of simultaneous enhancements both in the suppression of the deterioration of initial irreversible capacity and in the suppression of the reduction of OCV after discharge storage as compared to the batteries of Comparative Examples 3-1 to 3-2 free from the aromatic compounds of Formula (I). Further, the battery of Example 3-1 which included the aromatic compound of Formula (I) and more than one electrolyte achieved still higher properties in terms of the simultaneous suppression of the reduction of OCV after discharge storage and of the deterioration of initial irreversible capacity as compared to Example 4-1

Production of Positive Electrode

In N-methylpyrrolidone solvent, 90 mass % of lithium-nickel-cobalt-manganese composite oxide ($LiNi_{1/3}Mn_{1/3}Co_{1/3}O_2$) as a positive electrode active material, 7 mass % of acetylene black as a conductive material and 3 mass % of polyvinylidene fluoride (PVdF) as a binder were mixed together with use of a disperser to give a slurry. The slurry was uniformly applied onto a surface of a 15 μm thick aluminum foil, and was dried and pressed. A positive electrode was thus fabricated.

[Production of Negative Electrode]

A slurry was prepared by mixing an amorphous coated graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of amorphous coated graphite:sodium carboxymethylcellulose:styrene-butadiene rubber was 97.5:1.5:1.

[Production of Electrolytic Solution]

In a dry argon atmosphere, 1-phenyl-1,3,3-trimethylindane and lithium tetrafluoroborate ($LiBF_4$) were added to a mixture of ethylene carbonate (EC), ethyl methyl carbonate (EMC) and dimethyl carbonate (DMC) (volume ratio 3:3:4) so that their contents in nonaqueous electrolytic solution would be 3.0 mass % and 0.5 mass %, respectively. Thereafter, sufficiently dried $LiPF_6$ was dissolved therein with a concentration of 1 mol/L. An electrolytic solution was thus prepared.

[Production of Secondary Battery]

The positive electrode and the negative electrode described above, and a polypropylene separator were stacked in the order of the negative electrode, the separator and the positive electrode, thus forming a battery element. The battery element was inserted into a bag made of a laminate film in which both sides of aluminum (thickness 40 μm) were coated with resin layers, while the terminals of the positive electrode and the negative electrode extended beyond the bag. Thereafter, the electrolytic solution was injected into the bag, and the bag was vacuum sealed. The thus-formed nonaqueous electrolyte secondary battery was subjected to the evaluations of initial characteristics, high-temperature cycle characteristics and overcharge characteristics. The evaluation results are described in Table 5.

Example 4-2

A nonaqueous electrolyte secondary battery was fabricated and evaluated in the same manner as in Example 4-1, except that $LiBF_4$ used in the electrolytic solution of Example 4-1 was not added. The evaluation results are described in Table 5.

Comparative Example 4-1

A nonaqueous electrolyte secondary battery was fabricated and was subjected to the evaluations and the evaluation of overcharge characteristics in the same manner as in Example 4-1, except that 1-phenyl-1,3,3-trimethylindane and $LiBF_4$ used in the electrolytic solution of Example 4-1 were not added. The evaluation results are described in Table 5.

TABLE 5

|  | Additives | Electrolyte | Initial charge-discharge efficiencies/% | 300 Cycle gas productions/% |
|---|---|---|---|---|
| Example 4-1 | 1-Phenyl-1,3,3-trimethylindane 3.0 mass % | $LiBF_4$ 0.5 mass % | 101.0 | 90 |
| Example 4-2 | 1-Phenyl-1,3,3-trimethylindane 3.0 mass % | — | 100.2 | 95 |
| Comparative Example 4-1 | — | — | 100.0 | 100 |

*Initial charge-discharge efficiencies, 300 cycle gas productions and overcharge gas productions are shown as normalized values assuming the values in Comparative Example 4-1 as 100.

From Table 5, it is clear that the batteries of Examples 4-1 to 4-2 have excellent properties in terms of simultaneous enhancements in initial charge-discharge efficiency and 300 cycle gas production as compared to the battery of Comparative Example 4-1 free from the aromatic compounds of Formula (I). Further, the battery of Example 4-1 which included the aromatic compound of Formula (I) and the borate salt achieved still higher properties in terms of simultaneous enhancements in initial charge-discharge efficiency and 300 cycle gas production as compared to the battery of Example 4-2 which included the aromatic compound represented by Formula (I) alone.

Examples 5-1 to 5-3 and Comparative Examples 5-1 to 5-2

Methods for the manufacturing and the evaluations of batteries of Examples 5-1 to 5-3 and Comparative Examples 5-1 to 5-2 are described below.

[Evaluation of Initial Characteristics]

While being sandwiched between glass plates to increase the contact between the electrodes, a sheet-shaped nonaqueous electrolyte secondary battery was charged at 25° C. and at a constant current of 0.2 C until the voltage reached 4.2 V, and was thereafter discharged to 3 V at a constant current of 0.3 C. The battery was stabilized by being further subjected to two cycles in which the battery was charged at a constant current of 0.3 C to 4.2 V and then at the constant voltage (0.05 C cutoff) and was discharged to 3 V at a constant current of 0.3 C. The battery was immersed in an ethanol bath to measure the buoyancy. Here, 1 C indicates a value of current at which a reference capacity of a battery is discharged in 1 hour. Thus, 0.05 C and 0.2 C indicate currents that are 1/20 and 1/5, respectively, of the 1 C current, and 0.3 C is a current that is 3/10 of the 1 C current.

[Evaluation of High-Temperature Cycle Characteristics]

After being stabilized as described above, the battery was subjected to 300 cycles in which the battery was charged to 4.2 V and was discharged to 3 V at 60° C. and at a constant current of 2 C. Thereafter, the battery was immersed in an ethanol bath at 25° C. to measure the buoyancy. The rate of change in buoyancy after the 300 cycles to that after the initial charging and discharging was obtained as the volume change after 300 cycles.

[Evaluation of Overcharge Characteristics]

The battery subjected to the above evaluations was charged to 4.2 V and was immersed in an ethanol bath to measure the buoyancy. The battery was then overcharged at 45° C. and at a constant current of 0.5 C for 1.6 hours. Thereafter, the battery was immersed in an ethanol bath at 25° C., and the buoyancy was measured. The difference in buoyancy between after the initial charging and discharging and after the overcharging was obtained as the overcharge gas production.

Example 5-1

Production of Positive Electrode

In N-methylpyrrolidone solvent, 90 mass % of lithium-nickel-cobalt-manganese composite oxide ($LiNi_{1/3}Mn_{1/3}Co_{1/3}O_2$) as a positive electrode active material, 7 mass % of acetylene black as a conductive material and 3 mass % of polyvinylidene fluoride (PVdF) as a binder were mixed together with use of a disperser to give a slurry. The slurry was uniformly applied onto a surface of a 15 μm thick aluminum foil, and was dried and pressed. A positive electrode was thus fabricated.

[Production of Negative Electrode]

A slurry was prepared by mixing an amorphous coated graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of amorphous coated graphite:sodium carboxymethylcellulose:styrene-butadiene rubber was 97.5:1.5:1.

[Production of Electrolytic Solution]

In a dry argon atmosphere, 1-phenyl-1,3,3-trimethylindane and lithium fluorosulfonate ($LiFSO_3$) were added to a mixture of ethylene carbonate (EC), ethyl methyl carbonate (EMC) and dimethyl carbonate (DMC) (volume ratio 3:3:4) so that their contents in nonaqueous electrolytic solution would be 3.0 mass % and 0.5 mass %, respectively. Thereafter, sufficiently dried $LiPF_6$ was dissolved therein with a concentration of 1 mol/L. An electrolytic solution was thus prepared.

[Production of Secondary Battery]

The positive electrode and the negative electrode described above, and a polypropylene separator were stacked in the order of the negative electrode, the separator and the positive electrode, thus forming a battery element. The battery element was inserted into a bag made of a laminate film in which both sides of aluminum (thickness 40 μm) were coated with resin layers, while the terminals of the positive electrode and the negative electrode extended beyond the bag. Thereafter, the electrolytic solution was injected into the bag, and the bag was vacuum sealed. The thus-formed nonaqueous electrolyte secondary battery was subjected to the evaluations of initial characteristics, high-temperature cycle characteristics and overcharge characteristics. The evaluation results are described in Table 6.

Example 5-2

A nonaqueous electrolyte secondary battery was fabricated and evaluated in the same manner as in Example 5-1, except that $LiFSO_3$ used in the electrolytic solution of Example 5-1 was replaced by lithium bis(fluorosulfonyl) imide (LiFSI). The evaluation results are described in Table 6.

Example 5-3

A nonaqueous electrolyte secondary battery was fabricated and evaluated in the same manner as in Example 5-1, except that $LiFSO_3$ used in the electrolytic solution of Example 5-1 was not added. The evaluation results are described in Table 6.

Comparative Example 5-1

A nonaqueous electrolyte secondary battery was fabricated and evaluated in the same manner as in Example 5-1, except that 1-phenyl-1,3,3-trimethylindane and $LiFSO_3$ used in the electrolytic solution of Example 5-1 were not added. The evaluation results are described in Table 6.

Comparative Example 5-2

A nonaqueous electrolyte secondary battery was fabricated and evaluated in the same manner as in Example 5-1, except that 1-phenyl-1,3,3-trimethylindane used in the electrolytic solution of Example 5-1 was not added. The evaluation results are described in Table 6.

TABLE 6

| | Additives | Electrolytes | Initial irreversible capacities/% | Volume changes after 300 cycles/% | Overcharge gas productions/% |
|---|---|---|---|---|---|
| Example 5-1 | 1-Phenyl-1,3,3-trimethylindane 3.0 mass % | $LiFSO_3$ 0.5 mass % | 98.2 | 99.2 | 204 |
| Example 5-2 | 1-Phenyl-1,3,3-trimethylindane 3.0 mass % | LiFSI 0.5 mass % | 97.3 | 99.3 | 300 |
| Example 5-3 | 1-Phenyl-1,3,3-trimethylindane 3.0 mass % | — | 98.5 | 99.6 | 231 |
| Comparative Example 5-1 | — | — | 100.0 | 100.0 | 100 |
| Comparative Example 5-2 | — | $LiFSO_3$ 0.5 mass % | 98.7 | 100.0 | 106 |

*Initial irreversible capacities, volume changes and overcharge gas productions are shown as normalized values assuming the values in Comparative Example 5-1 as 100.

From Table 6, it is clear that the batteries of Examples 5-1 to 5-3 have excellent properties in terms of simultaneous enhancements in all of initial irreversible capacity, battery volume change after cycles and overcharge safety as compared to the batteries of Comparative Examples 5-1 to 5-2 free from the aromatic compounds of Formula (I). Further, the batteries of Examples 5-1 to 5-2 which included the aromatic compound of Formula (I) and the fluorosulfonate salt achieved still higher properties in terms of simultaneous enhancements in initial irreversible capacity and battery volume change after 300 cycles as compared to the battery of Example 5-3 which included the aromatic compound represented by Formula (I) alone.

Examples 6-1 to 6-2 and Comparative Examples 6-1 to 6-2

Methods for the manufacturing and the evaluations of batteries of Examples 6-1 to 6-2 and Comparative Examples 6-1 to 6-2 are described below.

[Evaluation of Initial Characteristics]

A sheet-shaped nonaqueous electrolyte secondary battery was immersed in an ethanol bath to measure the buoyancy. While being sandwiched between glass plates to increase the contact between the electrodes, the battery was charged at 25° C. and at a constant current corresponding to 0.05 C for 6 hours and was thereafter charged at a constant current of 0.2 C until the voltage reached 4.1 V. The battery was then discharged to 3 V at a constant current of 0.2 C. The battery was stabilized by being further subjected to two cycles in which the battery was charged at a constant current of 0.2 C to 4.25 V and then at the constant voltage (0.05 C cutoff) and was discharged to 3 V at a constant current of 0.2 C. The battery was immersed in an ethanol bath again, and the buoyancy was measured. The difference in buoyancy between before and after the initial charging and discharging was obtained as the amount of initial swelling. Here, 1 C indicates a value of current at which a reference capacity of a battery is discharged in 1 hour. Thus, 0.05 C and 0.2 C indicate currents that are 1/20 and 1/5, respectively, of the 1 C current.

[Evaluation of High-Temperature Storage Characteristics]

After being stabilized as described above, the battery was charged at 25° C. and at a constant current of 0.2 C to 4.25 V and then at the constant voltage (0.05 C cutoff), and was stored in a thermostatic chamber at a high temperature of 60° C. for 10 days. The battery after the high-temperature storage test was immersed in an ethanol bath at 25° C., and the buoyancy was measured. The difference in buoyancy between before the initial charging and discharging and after the high-temperature storage test was obtained as the amount of storage swelling.

Example 6-1

Production of Positive Electrode

In N-methylpyrrolidone solvent, 90 mass % of lithium-nickel-cobalt-manganese composite oxide ($LiNi_{0.5}Mn_{0.3}Co_{0.2}O_2$) as a positive electrode active material, 7 mass % of acetylene black as a conductive material and 3 mass % of polyvinylidene fluoride (PVdF) as a binder were mixed together with use of a disperser to give a slurry. The slurry was uniformly applied onto an aluminum foil, and was dried and pressed. A positive electrode was thus fabricated.

[Production of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10 µm thick copper foil, and was dried and pressed. A negative electrode was thus fabricated. In the dried negative electrode, the mass ratio of natural graphite: sodium carboxymethylcellulose:styrene-butadiene rubber was 98:1:1.

[Production of Electrolytic Solution]

In a dry argon atmosphere, vinylene carbonate was added to a mixture of ethylene carbonate (EC), propylene carbonate (PC), ethyl methyl carbonate (EMC) and dimethyl carbonate (DMC) (volume ratio 28:5:38:29) so that its content in nonaqueous electrolytic solution would be 0.5 mass %.

Thereafter, 1-phenyl-1,3,3-trimethylindane and 1-methoxycarbonylethyl 1,4-butanedisulfonate were added so that their contents in nonaqueous electrolytic solution would be 2.0 mass % and 0.5 mass %, respectively. Next, sufficiently dried $LiPF_6$ was dissolved therein with a concentration of 1.0 mol/L. An electrolytic solution was thus prepared.

[Production of Secondary Battery]

The positive electrode and the negative electrode described above, and a polypropylene separator were stacked in the order of the negative electrode, the separator and the positive electrode, thus forming a battery element. The battery element was inserted into a bag made of a laminate film in which both sides of aluminum (thickness 40 µm) were coated with resin layers, while the terminals of the positive electrode and the negative electrode extended beyond the bag. Thereafter, the electrolytic solution was injected into the bag, and the bag was vacuum sealed. The thus-formed nonaqueous electrolyte secondary battery was subjected to the evaluations of initial characteristics and high-temperature storage characteristics. The evaluation results are described in Table 7.

Example 6-2

A nonaqueous electrolyte secondary battery was fabricated and evaluated in the same manner as in Example 6-1, except that 1-methoxycarbonylethyl 1,4-butanedisulfonate used in the electrolytic solution of Example 6-1 was not added. The evaluation results are described in Table 7.

Comparative Example 6-1

A nonaqueous electrolyte secondary battery was fabricated and evaluated in the same manner as in Example 6-1, except that 1-phenyl-1,3,3-trimethylindane and 1-methoxycarbonylethyl 1,4-butanedisulfonate used in the electrolytic solution of Example 6-1 were not added. The evaluation results are described in Table 7.

Comparative Example 6-2

A nonaqueous electrolyte secondary battery was fabricated and evaluated in the same manner as in Example 6-1, except that 1-phenyl-1,3,3-trimethylindane used in the electrolytic solution of Example 6-1 was not added. The evaluation results are described in Table 7.

TABLE 7

| | Additive I | Additive II | Amounts of initial swelling/% | Amounts of storage swelling/% |
|---|---|---|---|---|
| Example 6-1 | 1-Phenyl-1,3,3-trimethylindane 2.0 mass % | 1-Methoxycarbonylethyl 1,4-butanedisulfonate 0.5 mass % | 86 | 93 |
| Example 6-2 | 1-Phenyl-1,3,3-trimethylindane 2.0 mass % | — | 88 | 93 |
| Comparative Example 6-1 | — | — | 100 | 100 |
| Comparative Example 6-2 | — | 1-Methoxycarbonylethyl 1,4-butanedisulfonate 0.5 mass% | 102 | 94 |

*Amounts of initial swelling and amounts of storage swelling are shown as normalized values assuming the values in Comparative Example 6-1 as 100.

From Table 7, it is clear that the batteries of Examples 6-1 to 6-2 have excellent properties in terms of simultaneous enhancements both in initial swelling and in storage swelling as compared to the batteries of Comparative Examples 6-1 to 6-2 free from the aromatic compounds of Formula (I). Further, the battery of Example 6-1 which included the aromatic compound of Formula (I) and the sulfur-containing organic compound achieved a still higher enhancement in initial swelling as compared to the battery of Example 6-2 which included the aromatic compound represented by Formula (I) alone.

Examples 6-3 to 6-4 and Comparative Examples 6-3 to 6-4

Methods for the manufacturing and the evaluations of batteries of Examples 6-3 to 6-4 and Comparative Examples 6-3 to 6-4 are described below.

Example 6-3

Production of Electrolytic Solution

In a dry argon atmosphere, $LiPF_6$ as an electrolyte was dissolved with a concentration of 1.2 mol/L into a mixed solvent including ethylene carbonate (EC), ethyl methyl carbonate (EMC) and diethyl carbonate (DEC) (volume ratio 3:4:3). Further, 5.0 mass % of monofluoroethylene carbonate (MFEC) was added to the electrolyte solution, thereby preparing a basic electrolytic solution. To the basic electrolytic solution, 1.0 mass % of 1-phenyl-1,3,3-trimethylindane as an additive was added. A nonaqueous electrolytic solution of Example 6-3 was thus prepared.

[Production of Positive Electrode]

In N-methylpyrrolidone solvent, 97 mass % of lithium cobaltate ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Production of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite:sodium carboxymethylcellulose:styrene-butadiene rubber was 98:1:1.

[Production of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag made of a laminate film in which both sides of aluminum (thickness 40 μm) were coated with resin layers, while the terminals of the positive electrode and the negative electrodes extended beyond the bag. Thereafter, the nonaqueous electrolytic solution was injected into the bag, and the bag was vacuum sealed. A sheet-shaped nonaqueous electrolyte battery was thus fabricated.

[Evaluation of Initial Characteristics]

While being sandwiched between glass plates in a pressed condition, the nonaqueous electrolyte battery was charged at 25° C. and at a constant current corresponding to 0.05 C for 6 hours, and was discharged to 3.0 V at a constant current of 0.2 C. The difference between the charge capacity and the discharge capacity in this process was obtained as the first charge-discharge loss. Thereafter, the battery was CC-CV charged to 4.1 V at a current corresponding to 0.2 C (0.05 C cutoff), and was aged by being allowed to stand at 45° C. for 72 hours. Thereafter, the battery was discharged to 3 V at a constant current of 0.2 C. The difference between the charge capacity before aging and the discharge capacity after aging in this process was obtained as the aging loss. The sum of this loss and the first charge-discharge loss was obtained as the initial capacity loss. Next, the battery was CC-CV charged at 0.2 C to 4.40 V (0.05 C cutoff) and was discharged again at 0.2 C to 3 V. This operation was performed two times. The discharge capacity in the second process was obtained as the initial 0.2 C capacity.

Here, 1 C indicates a value of current at which a reference capacity of a battery is discharged in 1 hour. For example, 0.2 C indicates a current that is ⅕ of the 1 C current.

[Evaluation of High-Temperature Storage Characteristics]

The nonaqueous electrolyte battery subjected to the evaluation of initial capacity was CC-CV charged at 25° C. and at 0.2 C to 4.40 V (0.05 C cutoff), and was stored at a high temperature of 60° C. for 7 days. After being cooled sufficiently, the battery was discharged at 25° C. and at 0.2 C to 3 V. Further, the battery was CC-CV charged at 0.2 C to 4.40 V (0.05 C cutoff) and was discharged again at 0.052 C to 3 V. The ratio of the capacity to the initial capacity was obtained as the recovery ratio (0.05 C) (%).

[Test for Evaluation of Overcharge Characteristics]

The nonaqueous electrolyte battery subjected to the evaluation of high-temperature storage characteristics was CC- CV charged again at 25° C. and at a constant current of ⅓ C to 4.4 V (0.05 C cutoff), and was immersed in an ethanol bath to measure the volume thereof. Thereafter, the battery was discharged to 7 V at 45° C. and at a constant current of 0.5 C. After being cooled sufficiently, the battery was immersed in an ethanol bath and the volume was measured. The change in volume before and after the overcharge characteristics evaluation test was obtained as the overcharge gas production.

In such types of batteries that a safety valve is operated upon a detection of an unusual increase in internal pressure due to abnormalities such as overcharging, the generation of a larger amount of overcharge gas is more preferable because the safety valve can be operated early and hence the battery safety in the event of overcharging can be ensured.

The nonaqueous electrolyte battery fabricated above was subjected to the evaluation of initial characteristics, the evaluation of high-temperature storage characteristics, and the test for the evaluation of overcharge characteristics. The evaluation results are described in Table 8 relative to the results of Comparative Example 6-3 taken as 100.0%. The same applies hereinafter.

Example 6-4

A nonaqueous electrolyte battery was fabricated and evaluated in the same manner as in Example 6-3, except that 1.0 mass % of 1-phenyl-1,3,3-trimethylindane used in the electrolytic solution of Example 6-3 was replaced by 1.0 mass % of 1-phenyl-1,3,3-trimethylindane and 2.0 mass % of 1,3-propanesultone. The evaluation results are described in Table 8.

Comparative Example 6-3

A nonaqueous electrolyte battery was fabricated and evaluated in the same manner as in Example 6-3, except that 1-phenyl-1,3,3-trimethylindane used in the electrolytic solution of Example 6-3 was not added. The evaluation results are described in Table 8.

Comparative Example 6-4

A nonaqueous electrolyte battery was fabricated and evaluated in the same manner as in Example 6-4, except that 1-phenyl-1,3,3-trimethylindane used in the electrolytic solution of Example 6-4 was not added. The evaluation results are described in Table 8.

production as compared to when no aromatic compounds represented by Formula (I) are added (Comparative Example 6-3 and Comparative Example 6-4). Further, the results of Example 6-4 have shown that the combined use of the aromatic compound of Formula (I) with a sulfur-containing organic compound ensures that the battery generates a sufficient amount of overcharge gas and the battery safety is markedly enhanced without incurring a decrease in initial capacity loss, initial 0.2 C capacity or recovery ratio.

Examples 7-1 to 7-2 and Comparative Examples 7-1 to 7-2

Methods for the manufacturing and the evaluations of batteries of Examples 7-1 to 7-2 and Comparative Examples 7-1 to 7-2 are described below.

Example 7-1

Production of Electrolytic Solution

In a dry argon atmosphere, $LiPF_6$ as an electrolyte was dissolved with a concentration of 1.2 mol/L into a mixed solvent including ethylene carbonate (EC), ethyl methyl carbonate (hereinafter, "EMC" as appropriate) and diethyl carbonate (DEC) (volume ratio 3:4:3). Further, 5.0 mass % of monofluoroethylene carbonate (MFEC) was added to the electrolyte solution, thereby preparing a basic electrolytic solution. To the basic electrolytic solution, 1.0 mass % of 1-phenyl-1,3,3-trimethylindane as an additive was added. A nonaqueous electrolytic solution of Example 7-1 was thus prepared.

[Production of Positive Electrode]

In N-methylpyrrolidone solvent, 97 mass % of lithium cobaltate ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Production of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a

TABLE 8

|  | Additives |  | Initial capacity losses/% | Initial 0.2 C capacities/% | Recovery ratios (0.05 C)/% | Overcharge gas productions/% |
|---|---|---|---|---|---|---|
| Example 6-3 | 1-Phenyl-1,3,3-trimethylindane | 1.0 mass % | 99.5 | 100.2 | 100.4 | 117.7 |
| Example 6-4 | 1-Phenyl-1,3,3-trimethylindane 1,3-Propanesultone | 1.0 mass % 2.0 mass % | 94.9 | 100.4 | 101.1 | 113.3 |
| Comparative Example 6-3 | None |  | 100.0 | 100.0 | 100.0 | 100.0 |
| Comparative Example 6-4 | 1,3-Propanesultone | 2.0 mass % | 96.8 | 100.4 | 100.5 | 105.9 |

*Initial capacity losses, initial 0.2 C capacities, recovery ratios and overcharge gas productions are shown as normalized values assuming the values in Comparative Example 6-3 as 100.

From Table 8, it has been shown that the use of the inventive nonaqueous electrolytic solutions of Example 6-3 and Example 6-4 realizes excellent initial capacity loss, initial 0.2 C capacity, recovery ratio and overcharge gas binder (styrene-butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite:sodium carboxymethylcellulose:styrene-butadiene rubber was 98:1:1.

[Production of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag made of a laminate film in which both sides of aluminum (thickness 40 μm) were coated with resin layers, while the terminals of the positive electrode and the negative electrodes extended beyond the bag. Thereafter, the nonaqueous electrolytic solution was injected into the bag, and the bag was vacuum sealed. A sheet-shaped nonaqueous electrolyte battery was thus fabricated.

[Evaluation of Initial Characteristics]

While being sandwiched between glass plates in a pressed condition, the nonaqueous electrolyte battery was charged at 25° C. and at a constant current corresponding to 0.05 C for 6 hours, and was discharged to 3.0 V at a constant current of 0.2 C. Thereafter, the battery was CC-CV charged to 4.1 V at a current corresponding to 0.2 C (0.05 C cutoff), and was aged by being allowed to stand at 45° C. for 72 hours. Thereafter, the battery was discharged to 3 V at a constant current of 0.2 C. Next, the battery was CC-CV charged at 0.2 C to 4.40 V (0.05 C cutoff) and was discharged again at 0.2 C to 3 V. This operation was performed two times. The discharge capacity in the second process was obtained as the initial capacity. Further, the ratio of the discharge capacity to the charge capacity in this process was obtained as the initial charge-discharge efficiency (%).

Here, 1 C indicates a value of current at which a reference capacity of a battery is discharged in 1 hour. For example, 0.2 C indicates a current that is 1/5 of the 1 C current.

[Evaluation of High-Temperature Storage Characteristics]

The nonaqueous electrolyte battery subjected to the evaluation of initial capacity was CC-CV charged at 25° C. and at 0.2 C to 4.40 V (0.05 C cutoff), and was stored at a high temperature of 60° C. for 7 days. After being cooled sufficiently, the battery was immersed in an ethanol bath and the volume was measured. The amount of gas produced was determined based on the volume change before and after the storage. Next, the battery was discharged at 25° C. and at 0.2 C to 3 V. Further, the battery was CC-CV charged at 0.2 C to 4.40 V (0.05 C cutoff) and was discharged again at 0.05 C to 3 V. The ratio of the capacity to the initial capacity was obtained as the recovery ratio (%).

The nonaqueous electrolyte battery fabricated above was subjected to the evaluation of initial characteristics and the evaluation of high-temperature storage characteristics. The evaluation results are described in Table 9 relative to the results of Comparative Example 7-1 taken as 100.0%. The results in the later experiments are also written as relative values. The same applies hereinafter.

Example 7-2

A nonaqueous electrolyte battery was fabricated and evaluated in the same manner as in Example 7-1, except that 1.0 mass % of 1-phenyl-1,3,3-trimethylindane used in the electrolytic solution of Example 7-1 was replaced by 1.0 mass % of 1-phenyl-1,3,3-trimethylindane and 0.5 mass % of ethyl diethylphosphonoacetate. The evaluation results are described in Table 9.

Comparative Example 7-1

A nonaqueous electrolyte battery was fabricated and evaluated in the same manner as in Example 7-1, except that 1-phenyl-1,3,3-trimethylindane used in the electrolytic solution of Example 7-1 was not added. The evaluation results are described in Table 9.

Comparative Example 7-2

A nonaqueous electrolyte battery was fabricated and evaluated in the same manner as in Example 7-2, except that 1-phenyl-1,3,3-trimethylindane used in the electrolytic solution of Example 7-2 was not added. The evaluation results are described in Table 9.

TABLE 9

| | Additives | Initial charge-discharge efficiencies/% | Storage gas productions/% | Recovery ratios/% |
|---|---|---|---|---|
| Example 7-1 | 1-Phenyl-1,3,3-trimethylindane 1.0 mass % | 100.03 | 95.7 | 100.3 |
| Example 7-2 | 1-Phenyl-1,3,3-trimethylindane 1.0 mass % Ethyl diethylphosphonoacetate 0.5 mass % | 99.99 | 89.2 | 99.6 |
| Comparative Example 7-1 | None | 100.00 | 100.0 | 100.0 |
| Comparative Example 7-2 | Ethyl diethylphosphonoacetate 0.5 mass % | 99.90 | 89.9 | 99.3 |

*Initial charge-discharge efficiencies, storage gas productions and recovery ratios are shown as normalized values assuming the values in Comparative Example 7-1 as 100.

From Table 9, it has been shown that the use of the inventive nonaqueous electrolytic solutions of Example 7-1 to Example 7-2 realizes excellent suppression of storage gas generation and an excellent recovery ratio as compared to when no aromatic compounds represented by Formula (I) are added (Comparative Example 7-1 to Comparative Example 7-2). While the results of Comparative Example 7-2 have shown that the addition of a phosphorus-containing organic compound significantly decreases the initial charge-discharge efficiency and the recovery ratio, the combined use thereof with the aromatic compound of Formula (I) (Example 7-2) suppresses the decrease in initial charge-discharge efficiency and the decrease in recovery ratio and allows these characteristics to be enhanced to similar levels as when no additives are used (Comparative Example 7-1). Further, the results of Example 7-2 have shown that the combined use of the aromatic compound of Formula (I) with a phosphorus-containing organic compound suppresses the generation of storage gas without causing a decrease in initial charge-discharge efficiency or recovery ratio, thus realizing a significant enhancement in storage characteristics.

Examples 8-1 to 8-3 and Comparative Examples 8-1 to 8-3

Methods for the manufacturing and the evaluations of batteries of Examples 8-1 to 8-3 and Comparative Examples 8-1 to 8-3 are described below.

Example 8-1

Production of Electrolytic Solution

In a dry argon atmosphere, $LiPF_6$ as an electrolyte was dissolved with a concentration of 1.2 mol/L into a mixed solvent including ethylene carbonate (EC), ethyl methyl carbonate (EMC) and diethyl carbonate (DEC) (volume ratio 3:4:3). Further, 5.0 mass % of monofluoroethylene carbonate (MFEC) was added to the electrolyte solution, thereby preparing a basic electrolytic solution. To the basic electrolytic solution, 1.0 mass % of 1-phenyl-1,3,3-trimethylindane as an additive was added. A nonaqueous electrolytic solution of Example 8-1 was thus prepared.

[Production of Positive Electrode]

In N-methylpyrrolidone solvent, 97 mass % of lithium cobaltate ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Production of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite: sodium carboxymethylcellulose:styrene-butadiene rubber was 98:1:1.

[Production of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag made of a laminate film in which both sides of aluminum (thickness 40 μm) were coated with resin layers, while the terminals of the positive electrode and the negative electrodes extended beyond the bag. Thereafter, the nonaqueous electrolytic solution was injected into the bag, and the bag was vacuum sealed. A sheet-shaped nonaqueous electrolyte battery was thus fabricated.

[Evaluation of Initial Capacity]

While being sandwiched between glass plates in a pressed condition, the nonaqueous electrolyte battery was charged at 25° C. and at a constant current corresponding to 0.05 C for 6 hours, and was discharged to 3.0 V at a constant current of 0.2 C. The difference between the charge capacity and the discharge capacity in this process was obtained as the first charge-discharge loss. Thereafter, the battery was CC-CV charged to 4.1 V at a current corresponding to 0.2 C (0.05 C cutoff), and was aged by being allowed to stand at 45° C. for 72 hours. Thereafter, the battery was discharged to 3 V at a constant current of 0.2 C. The difference between the charge capacity before aging and the discharge capacity after aging in this process was obtained as the aging loss. The sum of this loss and the first charge-discharge loss was obtained as the initial capacity loss. Next, the battery was CC-CV charged at 0.2 C to 4.40 V (0.05 C cutoff) and was discharged again at 0.2 C to 3 V. This operation was performed two times. The discharge capacity in the second process was obtained as the initial capacity.

Here, 1 C indicates a value of current at which a reference capacity of a battery is discharged in 1 hour. For example, 0.2 C indicates a current that is ⅕ of the 1 C current.

[Evaluation of High-Temperature Storage Characteristics]

The nonaqueous electrolyte battery subjected to the evaluation of initial capacity was CC-CV charged at 25° C. and at 0.2 C to 4.40 V (0.05 C cutoff), and was stored at a high temperature of 60° C. for 7 days. After being cooled sufficiently, the battery was immersed in an ethanol bath and the volume was measured. The amount of gas produced was determined based on the volume change before and after the storage.

The nonaqueous electrolyte battery fabricated above was subjected to the evaluation of high-temperature storage characteristics. The evaluation results are described in Table 10 relative to the results of Comparative Example 8-1 taken as 100.0%. The same applies hereinafter.

Example 8-2

A nonaqueous electrolyte battery was fabricated and evaluated in the same manner as in Example 8-1, except that 1.0 mass % of 1-phenyl-1,3,3-trimethylindane used in the electrolytic solution of Example 8-1 was replaced by 1.0 mass % of 1-phenyl-1,3,3-trimethylindane and 3.0 mass % of succinonitrile. The evaluation results are described in Table 10.

Example 8-3

A nonaqueous electrolyte battery was fabricated and evaluated in the same manner as in Example 8-1, except that 1.0 mass % of 1-phenyl-1,3,3-trimethylindane used in the electrolytic solution of Example 8-1 was replaced by 1.0 mass % of 1-phenyl-1,3,3-trimethylindane and 3.0 mass % of 1,2,3-propanetricarbonitrile. The evaluation results are described in Table 10.

Comparative Example 8-1

A nonaqueous electrolyte battery was fabricated and evaluated in the same manner as in Example 8-1, except that 1-phenyl-1,3,3-trimethylindane used in the electrolytic solution of Example 8-1 was not added. The evaluation results are described in Table 10.

Comparative Example 8-2

A nonaqueous electrolyte battery was fabricated and evaluated in the same manner as in Example 8-2, except that 1-phenyl-1,3,3-trimethylindane used in the electrolytic solution of Example 8-2 was not added. The evaluation results are described in Table 10.

Comparative Example 8-3

A nonaqueous electrolyte battery was fabricated and evaluated in the same manner as in Example 8-3, except that 1-phenyl-1,3,3-trimethylindane used in the electrolytic solution of Example 8-3 was not added. The evaluation results are described in Table 10.

TABLE 10

| | Additives | | Initial capacity losses/% | Storage gas productions/% |
|---|---|---|---|---|
| Example 8-1 | 1-Phenyl-1,3,3-trimethylindane | 1.0 mass % | 99.3 | 95.7 |
| Example 8-2 | 1-Phenyl-1,3,3-trimethylindane | 1.0 mass % | 102.2 | 34.5 |
| | Succinonitrile | 3.0 mass % | | |
| Example 8-3 | 1-Phenyl-1,3,3-trimethylindane | 1.0 mass % | 101.3 | 44.6 |
| | 1,2,3-Propanetricarbonitrile | 3.0 mass % | | |
| Comparative Example 8-1 | None | | 100.0 | 100.0 |
| Comparative Example 8-2 | Succinonitrile | 3.0 mass % | 103.5 | 36.7 |
| Comparative Example 8-3 | 1,2,3-Propanetricarbonitrile | 3.0 mass % | 102.6 | 64.0 |

*Initial capacity losses and storage gas productions are values relative to the results of Comparative Example 8-1 taken as 100%.

From Table 10, it has been shown that the use of the inventive nonaqueous electrolytic solutions of Example 8-1 to Example 8-3 realizes excellent suppression of storage gas generation as compared to when no aromatic compounds represented by Formula (I) are added (Comparative Example 8-1 to Comparative Example 8-3). While the results of Comparative Example 8-2 to Comparative Example 8-3 have shown that the addition of a cyano group-containing organic compound significantly deteriorates the initial capacity loss, the combined use thereof with the aromatic compound of Formula (I) (Example 8-2 to Example 8-3) suppresses the deterioration in initial capacity loss and allows the characteristics to be enhanced to a similar level as when no additives are used (Comparative Example 8-1). Further, the results of Example 8-2 to Example 8-3 have shown that the combined use of the aromatic compound of Formula (I) with a cyano group-containing organic compound suppresses the generation of storage gas without causing a deterioration in initial capacity loss, thus realizing a significant enhancement in storage characteristics.

Example 9-1 and Comparative Examples 9-1 to 9-2

Methods for the manufacturing and the evaluations of batteries of Example 9-1 and Comparative Examples 9-1 to 9-2 are described below.

[Evaluation of Initial Characteristics]

While being sandwiched between glass plates to increase the contact between the electrodes, a sheet-shaped nonaqueous electrolyte secondary battery was charged at 25° C. and at a constant current of 0.2 C until the voltage reached 4.2 V, and was thereafter discharged to 3 V at a constant current of 0.3 C. The battery was stabilized by being further subjected to two cycles in which the battery was charged at a constant current of 0.3 C to 4.2 V and then at the constant voltage (0.05 C cutoff) and was discharged to 3 V at a constant current of 0.3 C. The ratio of the discharge current to the charge current in the second cycle was obtained as the 0.3 C charge-discharge efficiency before high-temperature cycles. Thereafter, the battery was immersed in an ethanol bath and the buoyancy after the initial charging and discharging was obtained. Here, 1 C indicates a value of current at which a reference capacity of a battery is discharged in 1 hour. Thus, 0.05 C and 0.2 C indicate currents that are 1/20 and 1/5, respectively, of the 1 C current, and 0.3 C is a current that is 3/10 of the 1 C current.

[Evaluation of High-Temperature Cycle Characteristics]

After being stabilized as described above, the battery was subjected to 300 cycles in which the battery was charged to 4.2 V and was discharged to 3 V at 60° C. and at a constant current of 2 C.

[Evaluation of Overcharge Characteristics]

The battery subjected to the above evaluation of high-temperature cycle characteristics was charged to 4.2 V and was overcharged at 45° C. and at a constant current of 0.5 C for 1.6 hours. Thereafter, the battery was immersed in an ethanol bath at 25° C., and the buoyancy was measured. The difference in buoyancy between after the initial charging and discharging and after the overcharging was obtained as the overcharge gas production after high-temperature cycles.

Example 9-1

Production of Positive Electrode

In N-methylpyrrolidone solvent, 90 mass % of lithium-nickel-cobalt-manganese composite oxide ($LiNi_{1/3}Mn_{1/3}Co_{1/3}O_2$) as a positive electrode active material, 7 mass % of acetylene black as a conductive material and 3 mass % of polyvinylidene fluoride (PVdF) as a binder were mixed together with use of a disperser to give a slurry. The slurry was uniformly applied onto a surface of a 15 μm thick aluminum foil, and was dried and pressed. A positive electrode was thus fabricated.

[Production of Negative Electrode]

A slurry was prepared by mixing an amorphous coated graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10 um thick copper foil, and was dried and pressed. A negative electrode was thus fabricated. In the dried negative electrode, the mass ratio of amorphous coated graphite:sodium carboxymethylcellulose:styrene-butadiene rubber was 97.5:1.5:1.

[Production of Electrolytic Solution]

In a dry argon atmosphere, 1-phenyl-1,3,3-trimethylindane and lithium bisoxalatoborate (LiBOB) were added to a mixture of ethylene carbonate (EC), ethyl methyl carbonate (EMC) and dimethyl carbonate (DMC) (volume ratio 3:3:4) so that their contents in nonaqueous electrolytic solution would be 3.0 mass % and 0.5 mass %, respectively. Thereafter, sufficiently dried LiPF$_6$ was dissolved therein with a concentration of 1 mol/L. An electrolytic solution was thus prepared.

[Production of Secondary Battery] The positive electrode and the negative electrode described above, and a polypropylene separator were stacked in the order of the negative electrode, the separator and the positive electrode, thus forming a battery element. The battery element was inserted into a bag made of a laminate film in which both sides of aluminum (thickness 40 μm) were coated with resin layers, while the terminals of the positive electrode and the negative electrode extended beyond the bag. Thereafter, the electrolytic solution was injected into the bag, and the bag was vacuum sealed. The thus-formed nonaqueous electrolyte secondary battery was subjected to the evaluations of initial characteristics, high-temperature cycle characteristics and overcharge characteristics. The evaluation results are described in Table 11.

Comparative Example 9-1

A nonaqueous electrolyte secondary battery was fabricated and evaluated in the same manner as in Example 9-1, except that 1-phenyl-1,3,3-trimethylindane and LiBOB used in the electrolytic solution of Example 9-1 were not added. The evaluation results are described in Table 11.

Comparative Example 9-2

A nonaqueous electrolyte secondary battery was fabricated and evaluated in the same manner as in Example 9-1, except that 1-phenyl-1,3,3-trimethylindane used in the electrolytic solution of Example 9-1 was not added. The evaluation results are described in Table 11.

positive electrode active material, 10 mass % of acetylene black as a conductive material and 5 mass % of polyvinylidene fluoride (PVdF) as a binder were mixed together with use of a disperser to give a slurry. The slurry was uniformly applied onto a surface of a 21 μm thick aluminum foil, and was dried and pressed. A positive electrode was thus fabricated.

[Production of Negative Electrode]

50 g of Si fine particles having an average particle diameter of 0.2 μm were dispersed in 2000 g of scale-shaped graphite having an average particle diameter of 35 p.m. The dispersion was added to a hybridization system (manufactured by NARA MACHINERY CO., LTD.) and was treated at a rotor rotational speed of 7000 rpm for 180 seconds while being circulated or retained in the system to give a complex of Si and graphite particles. The complex obtained was mixed with coal tar pitch as an organic compound which, after calcination, would form a carbonaceous substance covering the complex with a coverage ratio of 7.5%. The mixture was kneaded and dispersed with a twin-screw kneader. The resultant dispersion was introduced into a calcination furnace and was calcined in a nitrogen atmosphere at 1000° C. for 3 hours. The calcined product was crushed with a hammer mill and sieved (45 μm) to give a negative electrode active material. The material was analyzed by the aforementioned methods and was found to have a silicon content of 2.0 mass %, a median particle diameter d50 of 20 μm, a tap density of 1.0 g/cm$^3$, and a specific surface area of 7.2 m$^2$/g.

A slurry was prepared by mixing 97.5 parts by mass of the negative electrode active material with an aqueous dispersion of sodium carboxymethylcellulose as a thickener (sodium carboxymethylcellulose concentration: 1 mass %), and

TABLE 11

| | Additive | Electrolyte | 0.3 C charge-discharge efficiencies before high-temperature cycles/% | Overcharge gas productions after high-temperature cycles/% |
|---|---|---|---|---|
| Example 9-1 | 1-Phenyl-1,3,3-trimethylindane 3.0 mass % | LiBOB 0.5 mass % | 100.14 | 445 |
| Example 9-2 | 1-Phenyl-1,3,3-trimethylindane 3.0 mass % | — | 100.04 | 362 |
| Comparative Example 9-1 | — | — | 100.00 | 100 |
| Comparative Example 9-2 | — | LiBOB 0.5 mass % | 99.97 | 284 |

*0.3 C charge-discharge efficiencies before high-temperature cycles and overcharge gas productions after high-temperature cycles are shown as normalized values assuming the values in Comparative Example 9-1 as 100.

From Table 11, it is clear that the battery of Example 9-1 has excellent properties in terms of simultaneous enhancements in 0.3 C charge-discharge efficiency before high-temperature cycles and overcharge gas production after high-temperature cycles, that is, safety during overcharging after high-temperature cycles as compared to the batteries of Comparative Examples 9-1 to 9-2 free from the aromatic compounds of Formula (I).

Examples 10-1 to 10-2 and Comparative Examples 10-1 to 10-2

Methods for the manufacturing and the evaluations of batteries of Examples 10-1 to 10-2 and Comparative Examples 10-1 to 10-2 are described below.

[Production of Positive Electrode]

In N-methylpyrrolidone solvent, 85 mass % of lithium-cobalt-nickel-manganese oxide (LiNi$_{1/3}$Co$_{1/3}$Mn$_{1/3}$O$_2$) as a an aqueous dispersion of styrene-butadiene rubber as a binder (styrene-butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of negative electrode active material:sodium carboxymethylcellulose:styrene-butadiene rubber was 97.5:1:1.5.

[Production of Electrolytic Solution]

In a dry argon atmosphere, sufficiently dried LiPF6 was dissolved in a mixture of ethylene carbonate (EC) and diethyl carbonate (DEC) (volume ratio 3:7) so that its concentration (in nonaqueous electrolytic solution) would be 1 mol/L. Further, there were added 2.0 mass % each of vinylene carbonate (VC) and fluoroethylene carbonate (MFEC). (The solution thus formed will be written as the basic electrolytic solution 1.) In Examples 10-1 to 1-2 and Comparative Examples 10-1 to 10-2, an electrolytic solution was prepared by adding the compound(s) described in Table 12 in the amount(s) described relative to the basic electrolytic solution 1. The basic electrolytic solution 1 was used as such in Comparative Example 10-1.

[Production of Nonaqueous Electrolyte (Laminate) Battery]

The positive electrode and the negative electrode described above, and a polypropylene separator were stacked in the order of the negative electrode, the separator and the positive electrode. The resultant battery element was wrapped with an aluminum laminate film. The electrolytic solution described later was injected, and the film was vacuum sealed. A sheet-shaped nonaqueous electrolyte secondary battery was thus fabricated.

<Evaluations of Nonaqueous Electrolyte Secondary Battery>

[High-Temperature Storage Test]

In a thermostatic chamber at 25° C., the nonaqueous electrolyte secondary battery in the form of a laminate cell was charged at a constant current corresponding to 0.05 C to 4.0 V and then at the constant voltage, and was thereafter discharged at 0.05 C to 2.5 V. Subsequently, the nonaqueous electrolyte secondary battery was CC-CV charged at 0.2 C to 4.0 V, discharged at 0.2 C to 2.5 V, CC-CV charged at 0.2 C to 4.2 V, and discharged at 0.2 C to 2.5 V, thereby stabilizing the battery. The battery was then CC-CV charged at 0.2 C to 4.3 V and was discharged at 0.2 C to 2.5 V, thereby performing initial conditioning. Subsequently, the battery was CC-CV charged at 0.2 C to 4.2 V, and was discharged at 0.2 C or 0.5 C to 2.5 V. The ratio in percentage of the 0.5 C capacity to the 0.2 C capacity (0.5 C/0.2 C) was obtained as the "0.5 C/0.2 C load".

In Table 12, the 0.5 C/0.2 C loads are described as values normalized based on the value of Comparative Example 10-1.

The cell after the initial conditioning was CC-CV charged at 0.2 C to 4.3 V and was stored at a high temperature of 60° C. for 168 hours. After being cooled sufficiently, the battery was immersed in an ethanol bath and the volume was measured. Based on the volume change before and after the storage test, the amount of gas generated was obtained as the "storage gas production".

In Table 12, the storage gas productions are described as values normalized based on the value of Comparative Example 10-1.

[Evaluation of Overcharge Characteristics]

The battery subjected to the above evaluation was charged to 4.2 V and was overcharged at 45° C. and at a constant current of 0.5 C for 1.6 hours. After being cooled sufficiently, the battery was immersed in an ethanol bath and the volume was measured. The "overcharge gas production" was determined by measuring the amount of gas generated based on the volume change before and after the overcharge test.

In such types of batteries that a safety valve is operated upon a detection of an unusual increase in internal pressure due to abnormalities such as overcharging, the generation of a larger amount of overcharge gas is more preferable because the safety valve can be operated early and hence the battery safety in the event of overcharging can be ensured.

In Table 12, the overcharge gas productions are described as values normalized based on the value of Comparative Example 10-1.

TABLE 12

| | Additives | | 0.5 C/0.2 C loads/% | Storage gas productions/% | Overcharge gas productions/% |
|---|---|---|---|---|---|
| Example 10-1 | 1-Phenyl-1,3,3-trimethylindane | 1.0 mass % | 100.05 | 100 | 109 |
| Example 10-2 | 1-Phenyl-1,3,3-trimethylindane<br>1,3-Bis(isocyanatomethyl)cyclohexane | 1.0 mass %<br>0.5 mass % | 100.09 | 76 | 116 |
| Comparative Example 10-1 | None | | 100.00 | 100 | 100 |
| Comparative Example 10-2 | 1,3-Bis(isocyanatomethyl)cyclohexane | 0.5 mass % | 99.88 | 81 | 100 |

*0.5 C/0.2 C loads, storage gas productions and overcharge gas productions are shown as normalized values assuming the values in Comparative Example 10-1 as 100.

From Table 12, it has been shown that the use of the inventive nonaqueous electrolytic solutions of Example 10-1 to Example 10-2 enhances the 0.5 C/0.2 C load, the suppression of storage gas generation and the overcharge gas production as compared to when no aromatic compounds represented by Formula (I) are added (Comparative Example 10-1 to Comparative Example 10-2). While the results of Comparative Example 10-2 have shown that the addition of an isocyanate group-containing organic compound significantly decreases the 0.5 C/0.2 C load, the combined use thereof with the aromatic compound of Formula (I) (Example 10-2) suppresses the decrease in 0.5 C/0.2 C load and allows the characteristics to be enhanced to or above a level obtained when no additives are used (Comparative Example 10-1). Further, the results of Example 10-2 have shown that the combined use of the aromatic compound of Formula (I) with an isocyanate group-containing organic compound suppresses the generation of storage gas without causing a decrease in 0.5 C/0.2 C load and further provides a marked enhancement in overcharge characteristics, thus realizing a significant enhancement in battery safety.

Examples 10-3 to 10-4 and Comparative Examples 10-3 to 10-4

Methods for the manufacturing and the evaluations of batteries of Examples 10-3 to 10-4 and Comparative Examples 10-3 to 10-4 are described below.

[Evaluation of Initial Characteristics]

While being sandwiched between glass plates to increase the contact between the electrodes, a sheet-shaped nonaqueous electrolyte secondary battery was charged at 25° C. and at a constant current corresponding to 0.05 C for 10 hours and was thereafter charged at a constant current of 0.2 C to 4.1 V. The battery was then discharged to 3 V at a constant current of 0.3 C. The battery was stabilized by being further subjected to two cycles in which the battery was charged at a constant current of 0.3 C to 4.2 V and then at the constant voltage (0.05 C cutoff) and was discharged to 3 V at a constant current of 0.3 C. The discharge capacity in the second cycle was obtained as the initial capacity. Here, 1 C indicates a value of current at which a reference capacity of a battery is discharged in 1 hour. Thus, 0.05 C and 0.2 C indicate currents that are ½0 and ⅕, respectively, of the 1 C current, and 0.3 C is a current that is ³⁄₁₀ of the 1 C current.

[Evaluation of High-Temperature Cycle Characteristics]

After being stabilized as described above, the battery was subjected to 100 cycles in which the battery was charged to 4.2 V and was discharged to 3 V at 60° C. and at a constant current of 2 C. Thereafter, the battery was discharged to 3 V at a constant current of 0.3 C, and was subjected to two cycles in which the battery was charged at a constant current of 0.3 C to 4.2 V and then at the constant voltage (0.05 C cutoff) and was discharged to 3 V at a constant current of 0.3 C. The discharge capacity in the second cycle was obtained as the capacity after high-temperature cycles.

Example 10-3

Production of Positive Electrode

In N-methylpyrrolidone solvent, 90 mass % of lithium-nickel-cobalt-manganese composite oxide ($LiNi_{1/3}Mn_{1/3}Co_{1/3}O_2$) as a positive electrode active material, 7 mass % of acetylene black as a conductive material and 3 mass % of polyvinylidene fluoride (PVdF) as a binder were mixed together with use of a disperser to give a slurry. The slurry was uniformly applied onto a surface of a 15 µm thick aluminum foil, and was dried and pressed. A positive electrode was thus fabricated.

[Production of Negative Electrode]

A slurry was prepared by mixing an amorphous coated graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10 µm thick copper foil, and was dried and pressed. A negative electrode was thus fabricated. In the dried negative electrode, the mass ratio of amorphous coated graphite:sodium carboxymethylcellulose:styrene-butadiene rubber was 97.5:1.5:1.

[Production of Electrolytic Solution]

In a dry argon atmosphere, vinylene carbonate and lithium difluorophosphate were added to a mixture of ethylene carbonate (EC), ethyl methyl carbonate (EMC) and dimethyl carbonate (DMC) (volume ratio 3:3:4) so that their contents in nonaqueous electrolytic solution would be 0.5 mass % and 0.5 mass %, respectively.

Further, there were added triallyl isocyanurate (TAIC) and 1-phenyl-1,3,3-trimethylindane so that their contents would be 0.5 mass % and 3.5 mass %, respectively. Thereafter, sufficiently dried $LiPF_6$ was dissolved therein with a concentration of 1 mol/L. An electrolytic solution was thus prepared.

[Production of Secondary Battery]

The positive electrode and the negative electrode described above, and a polypropylene separator were stacked in the order of the negative electrode, the separator and the positive electrode, thus forming a battery element. The battery element was inserted into a bag made of a laminate film in which both sides of aluminum (thickness 40 µm) were coated with resin layers, while the terminals of the positive electrode and the negative electrode extended beyond the bag. Thereafter, the electrolytic solution was injected into the bag, and the bag was vacuum sealed. The thus-formed nonaqueous electrolyte secondary battery was subjected to the evaluations of initial characteristics and high-temperature cycle characteristics. The evaluation results are described in Table 13.

Example 10-4

A nonaqueous electrolyte secondary battery was fabricated and evaluated in the same manner as in Example 10-3, except that TAIC used in the electrolytic solution of Example 10-3 was not added. The evaluation results are described in Table 13.

Comparative Example 10-3

A nonaqueous electrolyte secondary battery was fabricated and evaluated in the same manner as in Example 10-3, except that 1-phenyl-1,3,3-trimethylindane used in the electrolytic solution of Example 10-3 was not added. The evaluation results are described in Table 13.

Comparative Example 10-4

A nonaqueous electrolyte secondary battery was fabricated and evaluated in the same manner as in Example 10-3, except that TAIC and 1-phenyl-1,3,3-trimethylindane used in the electrolytic solution of Example 10-3 were not added. The evaluation results are described in Table 13.

TABLE 13

| | Additives | | Initial capacities/% | Capacities after high-temperature cycles/% |
|---|---|---|---|---|
| Example 10-3 | 1-Phenyl-1,3,3-trimethylindane | 3.5 mass % | 100.6 | 101.7 |
| | TAIC | 0.3 mass % | | |
| Example 10-4 | 1-Phenyl-1,3,3-trimethylindane | 3.5 mass % | 100.3 | 101.0 |
| Comparative Example 10-3 | TAIC | 0.3 mass % | 100.1 | 101.0 |
| Comparative Example 10-4 | None | | 100 | 100.0 |

*Initial capacities and capacities after high-temperature cycles are shown as normalized values assuming the values in Comparative Example 10-4 as 100.

From Table 13, it is clear that the batteries of Examples 10-3 to 10-4 have excellent properties in terms of simultaneous enhancements both in initial capacity and in capacity after high-temperature cycles as compared to the batteries of Comparative Examples 10-3 to 10-4 free from the aromatic compounds of Formula (I).

Further, the battery of Example 10-4 which involved the isocyanurate skeleton-containing compound in combination with 1-phenyl-1,3,3-trimethylindane achieved excellent suppression of the decrease in capacity after high-temperature cycles while still exhibiting excellent initial capacity, as compared to the battery of Example 10-3 which included 1-phenyl-1,3,3-trimethylindane alone.

Examples 11-1 to 11-2 and Comparative Examples 11-1 to 11-2

Methods for the manufacturing and the evaluations of batteries of Examples 11-1 to 11-2 and Comparative Examples 11-1 to 11-2 are described below.

[Evaluation of Initial Characteristics]

A sheet-shaped nonaqueous electrolyte secondary battery was immersed in an ethanol bath to measure the buoyancy. While being sandwiched between glass plates to increase the contact between the electrodes, the battery was charged at 25° C. and at a constant current corresponding to 0.05 C for 6 hours and was thereafter charged at a constant current of 0.2 C until the voltage reached 4.1 V. The battery was then discharged to 3 V at a constant current of 0.2 C. The battery was stabilized by being further subjected to two cycles in which the battery was charged at a constant current of 0.2 C to 4.25 V and then at the constant voltage (0.05 C cutoff) and was discharged to 3 V at a constant current of 0.2 C. The battery was immersed in an ethanol bath again, and the buoyancy was measured. The change in buoyancy before and after the initial charging and discharging was obtained as the initial volume change. Here, 1 C indicates a value of current at which a reference capacity of a battery is discharged in 1 hour. Thus, 0.05 C and 0.2 C indicate currents that are 1/20 and 1/5, respectively, of the 1 C current.

[Evaluation of High-Temperature Storage Characteristics]

After being stabilized as described above, the battery was charged at 25° C. and at a constant current of 0.2 C to 4.25 V and then at the constant voltage (0.05 C cutoff), and was stored in a thermostatic chamber at a high temperature of 60° C. for 10 days. Thereafter, at 25° C., the battery was discharged at a constant current of 0.3 C to 3 V, and was subjected to two cycles in which the battery was charged at a constant current of 0.3 C to 4.25 V and then at the constant voltage (0.05 C cutoff) and was discharged to 3 V at a constant current of 0.3 C. The discharge capacity in the second cycle was obtained as the 0.3 C capacity after high-temperature storage. Next, the battery was charged at a constant current of 0.3 C to 4.25 V and then at the constant voltage (0.05 C cutoff) and was discharged to 3 V at a constant current of 1 C. The discharge capacity was obtained as the 1 C capacity after high-temperature storage. The ratio of the 1 C capacity after high-temperature storage to the 0.3 C capacity was calculated to obtain the ratio of 1 C rate capacity after high-temperature storage.

[Evaluation of Overcharge Characteristics]

The battery subjected to the above evaluations was charged at a constant current of 0.3 C to 4.25 V and then at the constant voltage (0.05 C cutoff), and was overcharged at 45° C. and at a constant current of 0.5 C for 1.6 hours. The battery voltage after the completion of overcharging was obtained as the OCV after overcharging.

With a lower OCV after overcharging, it is more unlikely that the voltage will reach a potential which causes the self-collapse of the positive electrode in the event of an unusual increase in voltage due to abnormalities such as overcharging. Consequently, battery safety during overcharging may be ensured.

Example 11-1

Production of Positive Electrode

In N-methylpyrrolidone solvent, 90 mass % of lithium-nickel-cobalt-manganese composite oxide (LiNi$_{0.5}$Mn$_{0.3}$Co$_{0.2}$O$_2$) as a positive electrode active material, 7 mass % of acetylene black as a conductive material and 3 mass % of polyvinylidene fluoride (PVdF) as a binder were mixed together with use of a disperser to give a slurry. The slurry was uniformly applied onto a surface of a 15 μm thick aluminum foil, and was dried and pressed. A positive electrode was thus fabricated.

[Production of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite: sodium carboxymethylcellulose:styrene-butadiene rubber was 98:1:1.

[Production of Electrolytic Solution]

In a dry argon atmosphere, vinylene carbonate was added to a mixture of ethylene carbonate (EC), propylene carbonate (PC), ethyl methyl carbonate (EMC) and dimethyl carbonate (DMC) (volume ratio 28:5:38:29) so that its content in nonaqueous electrolytic solution would be 0.5 mass %. Further, there were added 1-phenyl-1,3,3-trimethylindane and hexamethyldisilane so that their contents in nonaqueous electrolytic solution would be 2 mass % and 0.5 mass %, respectively. Thereafter, sufficiently dried LiPF$_6$ was dissolved therein with a concentration of 1 mol/L. An electrolytic solution was thus prepared.

[Production of Secondary Battery]

The positive electrode and the negative electrode described above, and a polypropylene separator were stacked in the order of the negative electrode, the separator and the positive electrode, thus forming a battery element. The battery element was inserted into a bag made of a laminate film in which both sides of aluminum (thickness 40 μm) were coated with resin layers, while the terminals of the positive electrode and the negative electrode extended beyond the bag. Thereafter, the electrolytic solution was injected into the bag, and the bag was vacuum sealed. The thus-formed nonaqueous electrolyte secondary battery was subjected to the evaluations of initial characteristics and high-temperature storage characteristics. The evaluation results are described in Table 14.

(Example 11-2)

A nonaqueous electrolyte secondary battery was fabricated and evaluated in the same manner as in Example 11-1, except that hexamethyldisilane used in the electrolytic solution of Example 11-1 was not added. The evaluation results are described in Table 14.

Comparative Example 11-1

A nonaqueous electrolyte secondary battery was fabricated and evaluated in the same manner as in Example 11-1, except that 1-phenyl-1,3,3-trimethylindane and hexamethyldisilane used in the electrolytic solution of Example 11-1 were not added. The evaluation results are described in Table 14.

Comparative Example 11-2

A nonaqueous electrolyte secondary battery was fabricated and evaluated in the same manner as in Example 11-1, except that 1-phenyl-1,3,3-trimethylindane used in the electrolytic solution of Example 11-1 was not added. The evaluation results are described in Table 14.

nylidene fluoride (PVdF) as a binder were mixed together with use of a disperser to give a slurry. The slurry was uniformly applied onto a surface of a 15 μm thick aluminum foil, and was dried and pressed. A positive electrode was thus fabricated.

[Production of Negative Electrode]

A slurry was prepared by mixing an amorphous coated graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration:

TABLE 14

| | Additive I | | Additive II | | Initial volume changes/% | Ratios of 1 C rate capacity after high-temperature storage/% | OCV after overcharging/ mV |
|---|---|---|---|---|---|---|---|
| Example 11-1 | 1-Phenyl-1,3,3-trimethylindane | 2.0 mass % | Hexamethyldisilane | 0.5 mass % | 99.3 | 101.0 | 4.563 |
| Example 11-2 | 1-Phenyl-1,3,3-trimethylindane | 2.0 mass % | — | | 99.6 | 100.5 | 4.563 |
| Comparative Example 11-1 | — | | — | | 100.0 | 100.0 | 4.592 |
| Comparative Example 11-2 | — | | Hexamethyldisilane | 0.5 mass % | 100.6 | 99.9 | 4.590 |

*Initial volume changes and ratios of 1 C rate capacity after high-temperature storage are shown as normalized values assuming the values in Comparative Example 11-1 as 100.

From Table 14, it is clear that the batteries of Examples 11-1 to 11-2 have excellent properties in terms of simultaneous enhancements in all of the suppression of initial volume change, the ratio of 1 C rate capacity after high-temperature storage and the overcharge safety as compared to the batteries of Comparative Examples 11-1 to 11-2 free from the aromatic compounds of Formula (I). Further, the battery of Example 11-1 which included the aromatic compound of Formula (I) and the silicon-containing compound achieved still higher properties in terms of simultaneous enhancements in all of the initial volume change, the ratio of 1 C rate capacity after high-temperature storage and the overcharge safety as compared to the battery of Example 11-2 which included the aromatic compound represented by Formula (I) alone.

Examples 12-1 to 12-6 and Comparative Examples 12-1 to 12-6

Methods for the manufacturing and the evaluations of batteries of Examples 12-1 to 12-6 and Comparative Examples 12-1 to 12-6 are described below.

Example 12-1

Production of Electrolytic Solution

In a dry argon atmosphere, LiPF$_6$ as an electrolyte was dissolved with a concentration of 1.0 mol/L into a mixed solvent including ethylene carbonate (EC), ethyl methyl carbonate (EMC) and dimethyl carbonate (DMC) (volume ratio 3:4:3), thereby preparing a basic electrolytic solution. To the basic electrolytic solution, 3.0 mass % of 1-phenyl-1,3,3-trimethylindane as an additive was added. A nonaqueous electrolytic solution of Example 12-1 was thus prepared.

[Production of Positive Electrode]

In N-methylpyrrolidone solvent, 90 mass % of lithium-cobalt-nickel-manganese oxide (LiNi$_{1/3}$Co$_{1/3}$Mn$_{1/3}$O$_2$) as a positive electrode active material, 7 mass % of acetylene black as a conductive material and 3 mass % of polyvi- 50 mass %) with use of a disperser. The slurry was uniformly applied onto a surface of a 10 μm thick copper foil, and was dried and pressed. A negative electrode was thus fabricated. In the dried negative electrode, the mass ratio of amorphous coated graphite:sodium carboxymethylcellulose:styrene-butadiene rubber was 97.5:1.5:1.

[Production of Secondary Battery]

The positive electrode and the negative electrode described above, and a polypropylene separator were stacked in the order of the negative electrode, the separator and the positive electrode, thus forming a battery element. The battery element was inserted into a bag made of a laminate film in which both sides of aluminum (thickness 40 μm) were coated with resin layers, while the terminals of the positive electrode and the negative electrode extended beyond the bag. Thereafter, the nonaqueous electrolytic solution was injected into the bag, and the bag was vacuum sealed. A sheet-shaped nonaqueous electrolyte battery was thus fabricated.

[Initial Conditioning]

While being sandwiched between glass plates in a pressed condition, the nonaqueous electrolyte battery was charged at 25° C. and at a constant current corresponding to 0.2 C to 4.1 V and then at the constant voltage (hereinafter, such charging is sometimes written as "CC-CV charging" as appropriate) (0.05 C cutoff), and was discharged to 3.0 V at a constant current of ⅓ C. Thereafter, the battery was CC-CV charged at a current corresponding to ⅓ C to 4.1 V (0.05 C cutoff) and was allowed to stand at 60° C. for 12 hours. After being cooled sufficiently, the battery was discharged at a constant current of ⅓ C to 3 V. Next, the battery was CC-CV charged at ⅓ C to 4.2 V (0.05 C cutoff) and was discharged again at ⅓ C to 3 V. In this manner, the initial conditioning of the battery was performed.

Here, 1 C indicates a value of current at which a reference capacity of a battery is discharged in 1 hour. For example, 0.2 C indicates a current that is ⅕ of the 1 C current.

[Test for Evaluation of Overcharge Characteristics]

The battery subjected to the initial conditioning was CC-CV charged again at 25° C. and at a constant current of ⅓ C to 4.2 V (0.05 C cutoff), and was immersed in an ethanol bath to measure the volume thereof. Thereafter, a current of 1 C was applied at 45° C. for 0.8 hours. After being cooled sufficiently, the battery was immersed in an ethanol bath and the volume was measured. The change in volume before and after the overcharge characteristics evaluation test was obtained as the overcharge gas production.

In such types of batteries that a safety valve is operated upon a detection of an unusual increase in internal pressure due to abnormalities such as overcharging, the generation of a larger amount of overcharge gas is more preferable because the safety valve can be operated early and hence the battery safety in the event of overcharging can be ensured.

The nonaqueous electrolyte secondary battery fabricated above was subjected to the test for the evaluation of overcharge characteristics. The evaluation results are described in Table 15 relative to the results of Comparative Example 12-1 taken as 100.0%. The same applies hereinafter.

Example 12-2

A nonaqueous electrolyte battery was fabricated and evaluated in the same manner as in Example 12-1, except that 3.0 mass % of 1-phenyl-1,3,3-trimethylindane used in the electrolytic solution of Example 12-1 was replaced by 3.0 mass % of 1-phenyl-1,3,3-trimethylindane and 1.0 mass % of cyclohexylbenzene (CHB). The evaluation results are described in Table 15.

Example 12-3

A nonaqueous electrolyte battery was fabricated and evaluated in the same manner as in Example 12-1, except that 3.0 mass % of 1-phenyl-1,3,3-trimethylindane used in the electrolytic solution of Example 12-1 was replaced by 3.0 mass % of 1-phenyl-1,3,3-trimethylindane and 1.0 mass % of 2-phenylethyl acetate. The evaluation results are described in Table 15.

Example 12-4

A nonaqueous electrolyte battery was fabricated and evaluated in the same manner as in Example 12-1, except that 3.0 mass % of 1-phenyl-1,3,3-trimethylindane used in the electrolytic solution of Example 12-1 was replaced by 3.0 mass % of 1-phenyl-1,3,3-trimethylindane and 1.0 mass % of 3-phenylpropyl acetate. The evaluation results are described in Table 15.

Example 12-5

A nonaqueous electrolyte battery was fabricated and evaluated in the same manner as in Example 12-1, except that 3.0 mass % of 1-phenyl-1,3,3-trimethylindane used in the electrolytic solution of Example 12-1 was replaced by 3.0 mass % of 1-phenyl-1,3,3-trimethylindane and 1.0 mass % of diphenyl carbonate. The evaluation results are described in Table 15.

Example 12-6

A nonaqueous electrolyte battery was fabricated and evaluated in the same manner as in Example 12-1, except that 3.0 mass % of 1-phenyl-1,3,3-trimethylindane used in the electrolytic solution of Example 12-1 was replaced by 3.0 mass % of 1-phenyl-1,3,3-trimethylindane and 1.0 mass % of difluorobenzene. The evaluation results are described in Table 15.

Comparative Example 12-1

A nonaqueous electrolyte battery was fabricated and evaluated in the same manner as in Example 12-1, except that 1-phenyl-1,3,3-trimethylindane used in the electrolytic solution of Example 12-1 was not added. The evaluation results are described in Table 15.

Comparative Example 12-2

A nonaqueous electrolyte battery was fabricated and evaluated in the same manner as in Example 12-2, except that 1-phenyl-1,3,3-trimethylindane used in the electrolytic solution of Example 12-2 was not added. The evaluation results are described in Table 15.

Comparative Example 12-3

A nonaqueous electrolyte battery was fabricated and evaluated in the same manner as in Example 12-3, except that 1-phenyl-1,3,3-trimethylindane used in the electrolytic solution of Example 12-3 was not added. The evaluation results are described in Table 15.

Comparative Example 12-4

A nonaqueous electrolyte battery was fabricated and evaluated in the same manner as in Example 12-4, except that 1-phenyl-1,3,3-trimethylindane used in the electrolytic solution of Example 12-4 was not added. The evaluation results are described in Table 15.

Comparative Example 12-5

A nonaqueous electrolyte battery was fabricated and evaluated in the same manner as in Example 12-5, except that 1-phenyl-1,3,3-trimethylindane used in the electrolytic solution of Example 12-5 was not added. The evaluation results are described in Table 15.

Comparative Example 12-6

A nonaqueous electrolyte battery was fabricated and evaluated in the same manner as in Example 12-6, except that 1-phenyl-1,3,3-trimethylindane used in the electrolytic solution of Example 12-6 was not added. The evaluation results are described in Table 15.

TABLE 15

| | Additives | | Overcharge gas productions/% |
|---|---|---|---|
| Example 12-1 | 1-Phenyl-1,3,3-trimethylindane | 3.0 mass % | 342.8 |
| Example 12-2 | 1-Phenyl-1,3,3-trimethylindane CHB | 3.0 mass % 1.0 mass % | 459.7 |
| Example 12-3 | 1-Phenyl-1,3,3-trimethylindane 2-Phenylethyl acetate | 3.0 mass % 1.0 mass % | 402.2 |
| Example 12-4 | 1-Phenyl-1,3,3-trimethylindane 3-Phenylpropyl acetate | 3.0 mass % 1.0 mass % | 402.3 |
| Example 12-5 | 1-Phenyl-1,3,3-trimethylindane Diphenyl carbonate | 3.0 mass % 1.0 mass % | 379.9 |

TABLE 15-continued

| | Additives | | Overcharge gas productions/% |
|---|---|---|---|
| Example 12-6 | 1-Phenyl-1,3,3-trimethylindane | 3.0 mass % | |
| | Fluorobenzene | 1.0 mass % | 391.8 |
| Comparative Example 12-1 | None | | 100.0 |
| Comparative Example 12-2 | CHB | 1.0 mass % | 290.2 |
| Comparative Example 12-3 | 2-Phenylethyl acetate | 1.0 mass % | 214.2 |
| Comparative Example 12-4 | 3-Phenylpropyl acetate | 1.0 mass % | 204.7 |
| Comparative Example 12-5 | Diphenyl carbonate | 1.0 mass % | 251.9 |
| Comparative Example 12-6 | Fluorobenzene | 1.0 mass % | 284.3 |

*Overcharge gas productions are shown as values relative to the value in Comparative Example 12-1 as 100%.

From Table 15, it has been shown that the use of the inventive nonaqueous electrolytic solutions of Examples 12-1 to 12-6 results in the generation of sufficient amounts of overcharge gas as compared to when no additives are used (Comparative Example 12-1).

While an increase in overcharge gas production was obtained when an aromatic compound other than those of Formula (I) was added singly (Comparative Examples 12-2 to 12-6), the amounts of the gas were small and overcharge characteristics were insufficient. The results of Examples 12-1 to 12-6 have shown that the combined use of the aromatic compound represented by Formula (I) with an aromatic compound other than those of Formula (I) significantly enhances overcharge characteristics and hence the battery safety is markedly enhanced.

Examples 12-7 to 12-9 and Comparative Examples 12-7 to 12-9

Methods for the manufacturing and the evaluations of batteries of Examples 12-7 to 12-9 and Comparative Examples 12-7 to 12-9 are described below.

Example 12-7

Production of Electrolytic Solution

In a dry argon atmosphere, $LiPF_6$ as an electrolyte was dissolved with a concentration of 1.2 mol/L into a mixed solvent including EC, EMC and diethyl carbonate (DEC) (volume ratio 3:4:3). Further, 5.0 mass % of monofluoroethylene carbonate (MFEC) was added to the electrolyte solution, thereby preparing a basic electrolytic solution. To the basic electrolytic solution, 3.0 mass % of 1-phenyl-1,3,3-trimethylindane as an additive was added. A nonaqueous electrolytic solution of Example 12-7 was thus prepared.

[Production of Positive Electrode]

In N-methylpyrrolidone solvent, 97 mass % of lithium cobaltate ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Production of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite:sodium carboxymethylcellulose:styrene-butadiene rubber was 98:1:1.

[Production of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag made of a laminate film in which both sides of aluminum (thickness 40 μm) were coated with resin layers, while the terminals of the positive electrode and the negative electrodes extended beyond the bag. Thereafter, the nonaqueous electrolytic solution was injected into the bag, and the bag was vacuum sealed. A sheet-shaped nonaqueous electrolyte battery was thus fabricated.

[Evaluation of Initial Capacity]

While being sandwiched between glass plates in a pressed condition, the nonaqueous electrolyte battery was charged at 25° C. and at a constant current corresponding to 0.05 C for 6 hours, and was discharged to 3.0 V at a constant current of 0.2 C. Thereafter, the battery was CC-CV charged at a current corresponding to 0.2 C to 4.1 V (0.05 C cutoff), and was allowed to stand at 45° C. for 72 hours. Thereafter, the battery was discharged to 3 V at a constant current of 0.2 C. Next, the battery was CC-CV charged at 0.2 C to 4.35 V (0.05 C cutoff) and was discharged again at 0.2 C to 3 V, and the capacity during this process was obtained as the initial 0.2 C capacity.

Here, 1 C indicates a value of current at which a reference capacity of a battery is discharged in 1 hour. For example, 0.2 C indicates a current that is ⅕ of the 1 C current.

[Evaluation of High-Temperature Storage Characteristics]

The nonaqueous electrolyte battery subjected to the evaluation of initial capacity was CC-CV charged at 25° C. and at 0.2 C to 4.35 V (0.05 C cutoff), and was stored at a high temperature of 60° C. for 7 days. After being cooled sufficiently, the battery was discharged at 25° C. and at 0.2 C to 3 V. Further, the battery was CC-CV charged at 0.2 C to 4.35 V (0.05 C cutoff) and was discharged again at 0.2 C to 3 V. The ratio of the capacity to the initial capacity was obtained as the recovery ratio (%).

The nonaqueous electrolyte battery fabricated above was subjected to the evaluation of initial capacity and the evaluation of high-temperature storage characteristics. The evaluation results are described in Table 16 relative to the results of Comparative Example 12-7 taken as 100.0%. The same applies hereinafter.

Example 12-8

A nonaqueous electrolyte battery was fabricated and evaluated in the same manner as in Example 12-7, except that 3.0 mass % of 1-phenyl-1,3,3-trimethylindane used in the electrolytic solution of Example 12-7 was replaced by 3.0 mass % of 1-phenyl-1,3,3-trimethylindane and 1.0 mass % of CHB. The evaluation results are described in Table 16.

Example 12-9

A nonaqueous electrolyte battery was fabricated and evaluated in the same manner as in Example 12-7, except that 3.0 mass % of 1-phenyl-1,3,3-trimethylindane used in the electrolytic solution of Example 12-7 was replaced by 3.0 mass % of 1-phenyl-1,3,3-trimethylindane and 1.0 mass % of 2-phenylethyl acetate. The evaluation results are described in Table 16.

Comparative Example 12-7

A nonaqueous electrolyte battery was fabricated and evaluated in the same manner as in Example 12-7, except that 1-phenyl-1,3,3-trimethylindane used in the electrolytic solution of Example 12-7 was not added. The evaluation results are described in Table 16.

Comparative Example 12-8

A nonaqueous electrolyte battery was fabricated and evaluated in the same manner as in Example 12-8, except that 1-phenyl-1,3,3-trimethylindane used in the electrolytic solution of Example 12-8 was not added. The evaluation results are described in Table 16.

Comparative Example 12-9

A nonaqueous electrolyte battery was fabricated and evaluated in the same manner as in Example 12-9, except that 1-phenyl-1,3,3-trimethylindane used in the electrolytic solution of Example 12-9 was not added. The evaluation results are described in Table 16.

TABLE 16

| | Additives | | Initial 0.2 C capacities/ % | Recovery ratios/ % |
|---|---|---|---|---|
| Example 12-7 | 1-Phenyl-1,3,3-trimethylindane | 3.0 mass % | 100.1 | 100.2 |
| Example 12-8 | 1-Phenyl-1,3,3-trimethylindane CHB | 3.0 mass % 1.0 mass % | 100.1 | 96.5 |
| Example 12-9 | 1-Phenyl-1,3,3-trimethylindane 2-Phenylethyl acetate | 3.0 mass % 1.0 mass % | 100.0 | 100.5 |
| Comparative Example 12-7 | None | | 100.0 | 100.0 |
| Comparative Example 12-8 | CHB | 1.0 mass % | 99.8 | 94.5 |
| Comparative Example 12-9 | 2-Phenylethyl acetate | 1.0 mass % | 99.8 | 99.3 |

*Initial 0.2 C capacities and recovery ratios are shown as values relative to the values in Comparative Example 12-7 as 100%.

From Table 16, it has been shown that the use of the inventive nonaqueous electrolytic solutions of Example 12-7 to Example 12-9 realizes excellent initial 0.2 C capacity and excellent recovery ratio as compared to when no aromatic compounds represented by Formula (I) are added (Comparative Example 12-7 to Comparative Example 12-9). The results of Example 12-8 to Example 12-9 have shown that the characteristics are enhanced more significantly by the combined use of the aromatic compound represented by Formula (I) with an aromatic compound other than those of Formula (I).

Example 13-1 and Comparative Examples 13-1 to 13-2

Methods for the manufacturing and the evaluations of batteries of Example 13-1 and Comparative Examples 13-1 to 13-2 are described below.

[Evaluation of Initial Characteristics]

While being sandwiched between glass plates to increase the contact between the electrodes, a sheet-shaped nonaqueous electrolyte secondary battery was charged at 25° C. and at a constant current corresponding to 0.2 C for 1.5 hours and was discharged to 3 V at a constant current of 0.2 C. The difference between the charge capacity and the discharge capacity in this process was obtained as the initial irreversible capacity. The battery was stabilized by being further subjected to two cycles in which the battery was charged at a constant current of 0.2 C to 4.2 V and then at the constant voltage (0.05 C cutoff) and was discharged to 3 V at a constant current of 0.2 C. Here, 1 C indicates a value of current at which a reference capacity of a battery is discharged in 1 hour. Thus, 0.5 C and 0.2 C indicate currents that are ½ and ⅕, respectively, of the 1 C current.

[Evaluation of Discharge Storage Characteristics]

After being stabilized as described above, the battery was charged at 25° C. and at a constant current to 3 V and then at the constant voltage (2 hours cutoff). The battery was stored at 60° C. for 140 hours, and the open circuit voltage (OCV) was measured.

Example 13-1

Production of Positive Electrode

In N-methylpyrrolidone solvent, 90 mass % of lithium cobalt oxide ($LiCoO_2$) as a positive electrode active material, 5 mass % of acetylene black as a conductive material and 5 mass % of polyvinylidene fluoride (PVdF) as a binder were mixed together with use of a disperser to give a slurry. The slurry was uniformly applied to both sides of an aluminum foil, and was dried and pressed. A positive electrode was thus fabricated.

[Production of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite: sodium carboxymethylcellulose:styrene-butadiene rubber was 98:1:1.

[Production of Electrolytic Solution]

In a dry argon atmosphere, 1-phenyl-1,3,3-trimethylindane and vinylene carbonate (VC) were added to a mixture of ethylene carbonate and ethyl methyl carbonate (volume ratio 3:7) so that their contents in nonaqueous electrolytic solution would be 1.5 mass % and 1 mass %, respectively. Thereafter, sufficiently dried $LiPF_6$ was dissolved therein with a concentration of 1.0 mol/L. An electrolytic solution was thus prepared.

[Production of Secondary Battery]

The positive electrode and the negative electrodes described above, and polyethylene separators were stacked in the order of the negative electrode, the separator, the positive electrode, the separator and the negative electrode, thus forming a battery element. The battery element was inserted into a bag made of a laminate film in which both sides of aluminum (thickness 40 μm) were coated with resin layers, while the terminals of the positive electrode and the negative electrodes extended beyond the bag. Thereafter, the electrolytic solution was injected into the bag, and the bag was vacuum sealed. The thus-formed nonaqueous electrolyte secondary battery was subjected to the evaluations of initial characteristics and discharge storage characteristics. The evaluation results are described in Table 17.

Comparative Example 13-1

A nonaqueous electrolyte secondary battery was fabricated and evaluated in the same manner as in Example 13-1, except that 1-phenyl-1,3,3-trimethylindane used in the electrolytic solution of Example 13-1 was not added. The evaluation results are described in Table 17.

Comparative Example 13-2

A nonaqueous electrolyte secondary battery was fabricated and evaluated in the same manner as in Example 13-1, except that 1-phenyl-1,3,3-trimethylindane and vinylene carbonate used in the electrolytic solution of Example 13-1 were not added. The evaluation results are described in Table 17.

solvent including ethylene carbonate (EC), ethyl methyl carbonate (EMC) and diethyl carbonate (DEC) (volume ratio 3:4:3). Further, 5.0 mass % of monofluoroethylene carbonate (MFEC) was added to the electrolyte solution, thereby preparing a basic electrolytic solution. To the basic electrolytic solution, 1.0 mass % of 1-phenyl-1,3,3-trimethylindane as an additive was added. A nonaqueous electrolytic solution of Example 14-1 was thus prepared.

[Production of Positive Electrode]

In N-methylpyrrolidone solvent, 97 mass % of lithium cobaltate ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Production of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10 μm thick copper foil, and was dried and pressed. A negative electrode was thus fabricated. In the

TABLE 17

| Additives | | | OCV after discharge storage (mV vs. Comp. Ex. 13-2) | Initial irreversible capacities (mAh/g vs. Comp. Ex. 13-2) |
|---|---|---|---|---|
| Example 13-1 | 1-Phenyl-1,3,3-trimethylindane | 1.5 mass % | 367 | −0.7 |
| | VC | 1 mass % | | |
| Comparative Example 13-1 | VC | 1 mass % | 304 | 0.1 |
| Comparative Example 13-2 | None | | 0 | 0 |

*OCV after discharge storage and irreversible capacities are shown as differences from the values of Comparative Example 13-2 taken as 0.

From Table 17, it is clear that the battery of Example 13-1 has excellent properties in terms of simultaneous enhancements both in the suppression of the deterioration of initial irreversible capacity and in the suppression of the reduction of OCV after discharge storage as compared to the battery of Comparative Example 13-1 free from 1-phenyl-1,3,3-trimethylindane. Thus, the results have shown that the characteristics are specifically enhanced by the combined use of the aromatic compound represented by Formula (I) with a cyclic carbonate having a carbon-carbon unsaturated bond.

Examples 14-1 to 14-2 and Comparative Examples 14-1 to 14-2

Methods for the manufacturing and the evaluations of batteries of Examples 14-1 to 14-2 and Comparative Examples 14-1 to 14-2 are described below.

Example 14-1

Production of Electrolytic Solution

In a dry argon atmosphere, $LiPF_6$ as an electrolyte was dissolved with a concentration of 1.2 mol/L into a mixed dried negative electrode, the mass ratio of natural graphite: sodium carboxymethylcellulose:styrene-butadiene rubber was 98:1:1.

[Production of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag made of a laminate film in which both sides of aluminum (thickness 40 μm) were coated with resin layers, while the terminals of the positive electrode and the negative electrodes extended beyond the bag. Thereafter, the nonaqueous electrolytic solution was injected into the bag, and the bag was vacuum sealed. A sheet-shaped nonaqueous electrolyte battery was thus fabricated.

[Evaluation of Initial Characteristics]

While being sandwiched between glass plates in a pressed condition, the nonaqueous electrolyte battery was charged at 25° C. and at a constant current corresponding to 0.05 C for 6 hours, and was discharged to 3.0 V at a constant current of 0.2 C. The difference between the charge capacity and the discharge capacity in this process was obtained as the first charge-discharge loss. Thereafter, the battery was CC-CV charged to 4.1 V at a current corresponding to 0.2 C (0.05 C cutoff), and was aged by being allowed to stand at 45° C. for 72 hours. Thereafter, the battery was discharged to 3 V at a constant current of 0.2 C. The difference between the charge capacity before aging and the discharge capacity after aging in this process was obtained as the aging loss. The sum of this loss and the first charge-discharge loss was obtained as the initial capacity loss. Next, the battery was CC-CV charged at 0.2 C to 4.40 V (0.05 C cutoff) and was discharged again at 0.2 C to 3 V, and the capacity was obtained as the initial capacity.

that 1-phenyl-1,3,3-trimethylindane used in the electrolytic solution of Example 14-1 was not added. The evaluation results are described in Table 18.

Comparative Example 14-2

A nonaqueous electrolyte battery was fabricated and evaluated in the same manner as in Example 14-2, except that 1-phenyl-1,3,3-trimethylindane used in the electrolytic solution of Example 14-2 was not added. The evaluation results are described in Table 18.

TABLE 18

| Electrolytic solutions | | Initial capacity losses/% | Recovery ratios (0.2 C)/% | Recovery ratios (0.5 C)/% |
|---|---|---|---|---|
| Example 14-1 | 1.2M LiPF$_6$ EC/EMC/DEC = 3/4/3 + MFEC (5 mass %) + 1-phenyl-1,3,3-trimethylindane 1.0 mass % | 99.5 | 100.4 | 100.2 |
| Example 14-2 | 1.2M LiPF$_6$ EC/EP/DEC = 3/4/3 + MFEC (5 mass %) + 1-phenyl-1,3,3-trimethylindane 1.0 mass% | 105.8 | 100.0 | 100.4 |
| Comparative Example 14-1 | 1.2M LiPF$_6$ EC/EMC/DEC = 3/4/3 + MFEC (5 mass %) | 100.0 | 100.0 | 100.0 |
| Comparative Example 14-2 | 1.2M LiPF$_6$ EC/EP/DEC = 3/4/3 + MFEC (5 mass %) | 106.4 | 99.2 | 99.5 |

*Initial capacity losses, recovery ratios (0.2 C) and recovery ratios (0.5 C) are values relative to the results of Comparative Example 14-1 taken as 100%.

Here, 1 C indicates a value of current at which a reference capacity of a battery is discharged in 1 hour. For example, 0.2 C indicates a current that is ⅕ of the 1 C current.

[Evaluation of High-Temperature Storage Characteristics]

The nonaqueous electrolyte battery subjected to the evaluation of initial capacity was CC-CV charged at 25° C. and at 0.2 C to 4.40 V (0.05 C cutoff), and was stored at a high temperature of 60° C. for 7 days. After being cooled sufficiently, the battery was discharged at 25° C. and at 0.2 C to 3 V. Further, the battery was CC-CV charged at 0.2 C to 4.40 V (0.05 C cutoff) and was discharged again at 0.2 C to 3 V. The ratio of the capacity to the initial capacity was obtained as the recovery ratio (0.2 C) (%). Further, the battery was CC-CV charged at 0.2 C to 4.40 V (0.05 C cutoff), and was discharged again at 0.5 C to 3 V. The ratio of the capacity to the initial capacity was obtained as the recovery ratio (0.5 C) (%).

The nonaqueous electrolyte battery fabricated above was subjected to the evaluations of initial characteristics and high-temperature storage characteristics. The evaluation results are described in Table 18 relative to the results of Comparative Example 14-1 taken as 100.0%. The same applies hereinafter.

Example 14-2

A nonaqueous electrolyte battery was fabricated and evaluated in the same manner as in Example 14-1, except that EMC used as a solvent in the basic electrolytic solution of Example 14-1 was replaced by ethyl propionate (EP). The evaluation results are described in Table 18.

Comparative Example 14-1

A nonaqueous electrolyte battery was fabricated and evaluated in the same manner as in Example 14-1, except From Table 18, it has been shown that the use of the inventive nonaqueous electrolytic solutions of Example 14-1 and Example 14-2 realizes excellent initial capacity loss, recovery ratio (0.2 C) and recovery ratio (0.5 C) as compared to when no aromatic compounds represented by Formula (I) are added (Comparative Example 14-1 and Comparative Example 14-2). The results of Example 14-2 have shown that the characteristics are enhanced more significantly by the combined use of the aromatic compound represented by Formula (I) with ethyl propionate that is a carboxylate ester.

Examples 15-1 to 15-2 and Comparative Examples 15-1 to 15-2

Methods for the manufacturing and the evaluations of batteries of Examples 15-1 to 15-2 and Comparative Examples 15-1 to 15-2 are described below.

[Evaluation of Initial Characteristics]

While being sandwiched between glass plates to increase the contact between the electrodes, a sheet-shaped nonaqueous electrolyte secondary battery was charged at 25° C. and at a constant current corresponding to 0.05 C for 6 hours and was thereafter charged at a constant current of 0.2 C until the voltage reached 4.1 V. The battery was then discharged to 3 V at a constant current of 0.2 C. The difference between the charge capacity and the discharge capacity in this process was obtained as the initial irreversible capacity. The battery was stabilized by being further subjected to two cycles in which the battery was charged at a constant current of 0.2 C to 4.25 V and then at the constant voltage (0.05 C cutoff) and was discharged to 3 V at a constant current of 0.2 C. Here, 1 C indicates a value of current at which a reference capacity of a battery is discharged in 1 hour. Thus, 0.05 C and 0.2 C indicate currents that are 1/20 and ⅕, respectively, of the 1 C current.

Example 15-1

Production of Positive Electrode

In N-methylpyrrolidone solvent, 90 mass % of lithium-nickel-cobalt-manganese composite oxide (LiNi$_{0.5}$Mn$_{0.3}$Co$_{0.2}$O$_2$) as a positive electrode active material, 7 mass % of acetylene black as a conductive material and 3 mass % of polyvinylidene fluoride (PVdF) as a binder were mixed together with use of a disperser to give a slurry. The slurry was uniformly applied to an aluminum foil, and was dried and pressed. A positive electrode was thus fabricated.

[Production of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene-butadiene rubber as a binder (styrene-butadiene rubber concentration: 50 mass %) with use of a disperser. The slurry was uniformly applied onto a surface of a 10 µm thick copper foil, and was dried and pressed. A negative electrode was thus fabricated. In the dried negative electrode, the mass ratio of natural graphite:sodium carboxymethylcellulose:styrene-butadiene rubber was 98:1:1.

[Production of Electrolytic Solution]

In a dry argon atmosphere, vinylene carbonate was added to a mixture of ethylene carbonate (EC), propylene carbonate (PC), ethyl methyl carbonate (EMC) and dimethyl carbonate (DMC) (volume ratio 28:5:38:29) so that its content in nonaqueous electrolytic solution would be 0.5 mass %.

Further, there were added 1-phenyl-1,3,3-trimethylindane and 1,3-dioxane so that their contents in nonaqueous electrolytic solution would be 2.0 mass % and 0.5 mass %, respectively.

Thereafter, sufficiently dried LiPF$_6$ was dissolved therein with a concentration of 1 mol/L. An electrolytic solution was thus prepared.

[Production of Secondary Battery]

The positive electrode and the negative electrode described above, and a polypropylene separator were stacked in the order of the negative electrode, the separator and the positive electrode, thus forming a battery element. The battery element was inserted into a bag made of a laminate film in which both sides of aluminum (thickness 40 µm) were coated with resin layers, while the terminals of the positive electrode and the negative electrode extended beyond the bag. Thereafter, the electrolytic solution was injected into the bag, and the bag was vacuum sealed. The thus-formed nonaqueous electrolyte secondary battery was subjected to the evaluation of initial characteristics. The evaluation results are described in Table 19.

Example 15-2

A nonaqueous electrolyte secondary battery was fabricated and evaluated in the same manner as in Example 15-1, except that 1,3-dioxane used in the electrolytic solution of Example 15-1 was not added. The evaluation results are described in Table 19.

Comparative Example 15-1

A nonaqueous electrolyte secondary battery was fabricated and evaluated in the same manner as in Example 15-1, except that 1-phenyl-1,3,3-trimethylindane and 1,3-dioxane used in the electrolytic solution of Example 15-1 were not added. The evaluation results are described in Table 19.

Comparative Example 15-2

A nonaqueous electrolyte secondary battery was fabricated and evaluated in the same manner as in Example 15-1, except that 1-phenyl-1,3,3-trimethylindane used in the electrolytic solution of Example 15-1 was not added. The evaluation results are described in Table 19.

TABLE 19

|  | Additive I | Additive II | Initial irreversible capacities/% |
|---|---|---|---|
| Example 15-1 | 1-Phenyl-1,3,3-trimethylindane 2.0 mass % | 1,3-Dioxane 0.5 mass % | 100.0 |
| Example 15-2 | 1-Phenyl-1,3,3-trimethylindane 2.0 mass % | — | 99.5 |
| Comparative Example 15-1 | — | — | 100.0 |
| Comparative Example 15-2 | — | 1,3-Dioxane 0.5 mass % | 101.9 |

*Initial irreversible capacities are normalized values assuming the value in Comparative Example 15-1 as 100.

From Table 19, it has been shown that the battery of Example 15-2 which involved the aromatic compound represented by Formula (I) achieved excellent initial irreversible capacity as compared to the battery of Comparative Example 15-1 which did not contain any aromatic compounds of Formula (I) or cyclic ethers. The comparison of Example 15-1 with Comparative Example 15-2 shows that the combined use of the aromatic compound of Formula (I) makes it possible to maintain good initial characteristics.

INDUSTRIAL APPLICABILITY

The nonaqueous electrolyte batteries using the electrolytic solutions of the present invention exhibit a high capacity and excellent high-temperature continuous charging characteristics while achieving higher safety during overcharging. The nonaqueous electrolyte batteries may be used in various known applications, with specific examples including notebook computers, pen-input computers, mobile computers, electronic book players, mobile phones, mobile fax machines, mobile copy machines, portable printers, headphone stereos, video movie machines, liquid crystal televisions, handy cleaners, portable CD players, mini-disc players, transceivers, electronic organizers, calculators, memory cards, portable tape recorders, radios, back-up power supplies, motors, automobiles, motorcycles, motor bikes, bicycles, lighting equipment, toys, game machines, watches, power tools, electronic flashes, cameras, load leveling power supplies, natural energy storage power supplies and lithium ion capacitors.

The invention claimed is:

1. A nonaqueous electrolytic solution, comprising:
an electrolyte and a nonaqueous solvent, the nonaqueous electrolytic solution further comprising an aromatic compound represented by Formula (I):

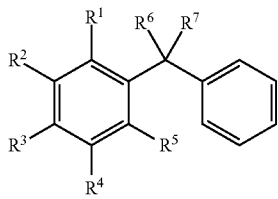

wherein:
$R^1$ to $R^5$ are independently hydrogen, a halogen, or an unsubstituted or halogen-substituted hydrocarbon group having 1 to 20 carbon atoms;
$R^6$ and $R^7$ are independently a hydrocarbon group having 1 to 12 carbon atoms, at least two of $R^1$ to $R^7$ may be bonded together to form a ring; and
Formula (I) satisfies at least one of the requirements (A) and (B):
(A) at least one of $R^1$ to $R^5$ is a halogen, or an unsubstituted or halogen-substituted hydrocarbon group having 1 to 20 carbon atoms,
(B) the total number of carbon atoms in $R^1$ to $R^7$ is 3 to 20.

2. The nonaqueous electrolytic solution according to claim 1, wherein two of $R^1$, $R^6$ and $R^7$ in Formula (I) are bonded together to form a ring.

3. The nonaqueous electrolytic solution according to claim 2, wherein $R^1$ and $R^6$ in Formula (I) are bonded together to form a ring.

4. The nonaqueous electrolytic solution according to claim 3, wherein the aromatic compound represented by Formula (I) is 1-phenyl-1,3,3-trimethylindane.

5. The nonaqueous electrolytic solution according to claim 2, wherein $R^6$ and $R^7$ in Formula (I) are bonded together to form a ring.

6. The nonaqueous electrolytic solution according to claim 5, wherein the aromatic compound represented by Formula (I) is 1,1-diphenylcyclohexane, 1,1-diphenylcyclopentane, or 1,1-diphenyl-4-methylcyclohexane.

7. The nonaqueous electrolytic solution according to claim 1, wherein at least one of $R^1$ to $R^5$ in Formula (I) is a hydrocarbon group having 1 to 5 carbon atoms.

8. The nonaqueous electrolytic solution according to claim 1, wherein the nonaqueous electrolytic solution comprises the aromatic compound of Formula (I) in an amount of 0.001 mass % to 10 mass %.

9. The nonaqueous electrolytic solution according to claim 1, wherein the nonaqueous electrolytic solution comprises two or more kinds of electrolytes.

10. The nonaqueous electrolytic solution according to claim 9, wherein the two or more kinds of electrolytes include at least one compound selected from the group consisting of monofluorophosphate salts, difluorophosphate salts, borate salts, oxalate salts, and fluorosulfonate salts.

11. The nonaqueous electrolytic solution according to claim 10, wherein the nonaqueous electrolytic solution comprises 0.001 mass % to 20 mass % of the at least one compound selected from the group consisting of monofluorophosphate salts, difluorophospbate salts, borate salts, oxalate salts, and fluorosulfonate salts.

12. The nonaqueous electrolytic solution according to claim 1, further comprising:
at least one compound selected from the group consisting of fluorine-comprising cyclic carbonates, sulfur-comprising organic compounds, phosphorus-comprising organic compounds, cyano group-comprising organic compounds, isocyanate group-comprising organic compounds, silicon-comprising compounds, aromatic compounds other than those of Formula (I), cyclic carbonates having a carbon-carbon unsaturated bond, fluorine-free carboxylate esters, cyclic ethers, and isocyanurate skeleton-comprising compounds.

13. The nonaqueous electrolytic solution according to claim 1, further comprising:
from 0.001 mass % to 20 mass % of at least one compound selected from the group consisting of fluorine-comprising cyclic carbonates, sulfur-comprising organic compounds, phosphorus-comprising organic compounds, cyano group-comprising organic compounds, isocyanate group-comprising organic compounds, silicon-comprising compounds, aromatic compounds other than those of Formula (I), cyclic carbonates having a carbon-carbon unsaturated bond, fluorine-free carboxylate esters, cyclic ethers, and isocyanurate skeleton-comprising compounds.

14. A nonaqueous electrolyte battery, comprising: a negative electrode and a positive electrode capable of storing and releasing lithium ions, and the nonaqueous electrolytic solution according to claim 1.

* * * * *